US010274708B2

(12) United States Patent
Abe et al.

(10) Patent No.: US 10,274,708 B2
(45) Date of Patent: Apr. 30, 2019

(54) VARIABLE MAGNIFICATION OPTICAL SYSTEM, AND IMAGE PICKUP APPARATUS AND IMAGE PICKUP OPTICAL SYSTEM USING THE SAME

(71) Applicant: OLYMPUS CORPORATION, Tokyo (JP)

(72) Inventors: Kenichiro Abe, Tokyo (JP); Takahiro Amanai, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 203 days.

(21) Appl. No.: 15/177,050

(22) Filed: Jun. 8, 2016

(65) Prior Publication Data
US 2016/0282592 A1 Sep. 29, 2016

Related U.S. Application Data

(63) Continuation of application No. PCT/JP2014/077673, filed on Oct. 17, 2014.

(30) Foreign Application Priority Data

Dec. 11, 2013 (JP) ................................. 2013-256384

(51) Int. Cl.
G02B 15/14 (2006.01)
G02B 15/16 (2006.01)
(Continued)

(52) U.S. Cl.
CPC ............. G02B 15/16 (2013.01); G02B 13/18 (2013.01); G02B 15/163 (2013.01);
(Continued)

(58) Field of Classification Search
CPC ............ G02B 13/0045; G02B 27/0025; G02B 13/18; G02B 9/60; G02B 5/005;
(Continued)

(56) References Cited

U.S. PATENT DOCUMENTS

| 3,728,010 A | 4/1973 | Mikami |
| 5,816,321 A | 9/1998 | Shimo |
| 6,674,562 B1 | 1/2004 | Kawasaki |
| 6,775,071 B1 | 8/2004 | Suzuki et al. |
| 6,822,806 B2 | 11/2004 | Suzuki et al. |

(Continued)

FOREIGN PATENT DOCUMENTS

| JP | S52-082227 | 7/1977 |
| JP | S57-013849 | 3/1982 |

(Continued)

OTHER PUBLICATIONS

International Search Report dated Jan. 20, 2015, issued in International Application No. PCT/JP2014/077673.

(Continued)

Primary Examiner — Evelyn A Lester
(74) Attorney, Agent, or Firm — Hunton Andrews Kurth LLP

(57) ABSTRACT

A variable magnification optical system is an optical system in which, a magnification ratio varies from a lower magnification end to a high magnification end, and includes at least a first lens unit having a positive refractive power, which is disposed nearest to an object, and a second lens unit having a positive refractive power, which is disposed on an image side of the first lens unit. At the time of varying magnification, a distance between the first lens unit and the second lens unit changes, and the following conditional expression (1) is satisfied:

$$0 < 1/\beta_{HG1} < 1 \qquad (1),$$

where, $\beta_{HG1}$ denotes an imaging magnification of the first lens unit at the high magnification end.

36 Claims, 42 Drawing Sheets

(51) Int. Cl.
*G02B 13/18* (2006.01)
*G02B 15/167* (2006.01)
*G02B 15/20* (2006.01)
*G02B 21/02* (2006.01)
*G02B 21/36* (2006.01)
*G02B 27/00* (2006.01)
*H04N 5/225* (2006.01)
*G02B 15/163* (2006.01)
*G02B 9/60* (2006.01)
*G02B 5/00* (2006.01)
*G02B 13/00* (2006.01)
*G02B 21/26* (2006.01)

(52) U.S. Cl.
CPC ........... *G02B 15/167* (2013.01); *G02B 15/20* (2013.01); *G02B 21/025* (2013.01); *G02B 21/361* (2013.01); *G02B 27/0025* (2013.01); *H04N 5/2254* (2013.01); *G02B 5/005* (2013.01); *G02B 9/60* (2013.01); *G02B 13/0045* (2013.01); *G02B 15/14* (2013.01); *G02B 21/26* (2013.01)

(58) Field of Classification Search
CPC ........ G02B 15/20; G02B 15/14; G02B 15/16; G02B 15/167
USPC ......... 359/683–686, 689, 695, 713–716, 740
See application file for complete search history.

(56) References Cited

U.S. PATENT DOCUMENTS

| | | | |
|---|---|---|---|
| 6,867,924 B2* | 3/2005 | Takato | G02B 15/163 359/676 |
| 8,385,002 B2 | 2/2013 | Misaka | |
| 8,643,954 B2 | 2/2014 | Misaka | |
| 9,134,515 B2 | 9/2015 | Ishibashi | |

FOREIGN PATENT DOCUMENTS

| | | |
|---|---|---|
| JP | H05-084918 | 11/1993 |
| JP | H08-210987 | 8/1996 |
| JP | H09-101458 | 4/1997 |
| JP | 2000-275516 | 10/2000 |
| JP | 2004-264714 | 9/2004 |
| JP | 2007-093974 | 4/2007 |
| JP | 4576402 | 11/2010 |
| JP | 2011-118159 | 6/2011 |
| JP | 2011-128371 | 6/2011 |
| JP | 2011-191743 | 9/2011 |

OTHER PUBLICATIONS

International Preliminary Report on Patentability dated Jun. 23, 2016, issued in International Application No. PCT/JP2014/077673.
Office Action issued in Japanese Patent Application No. 2015-552357, dated Aug. 29, 2018, 12 pages (with English- language translation).

* cited by examiner

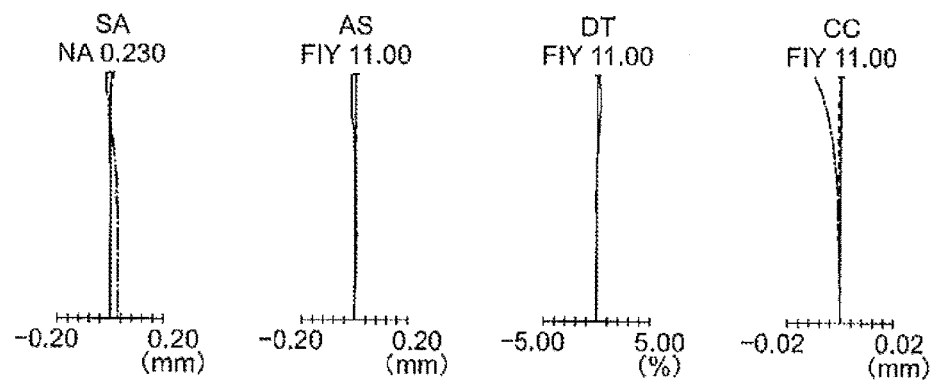
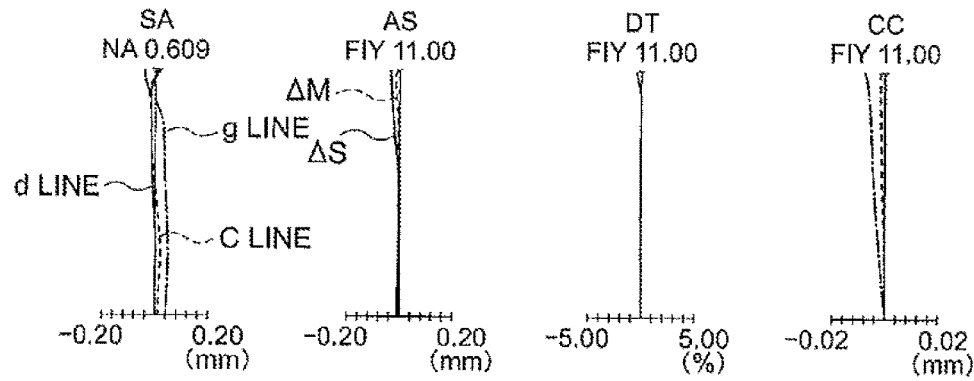

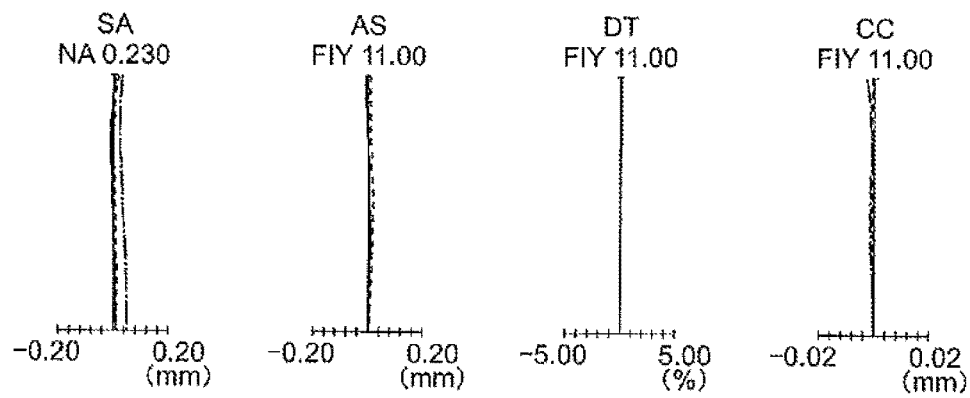
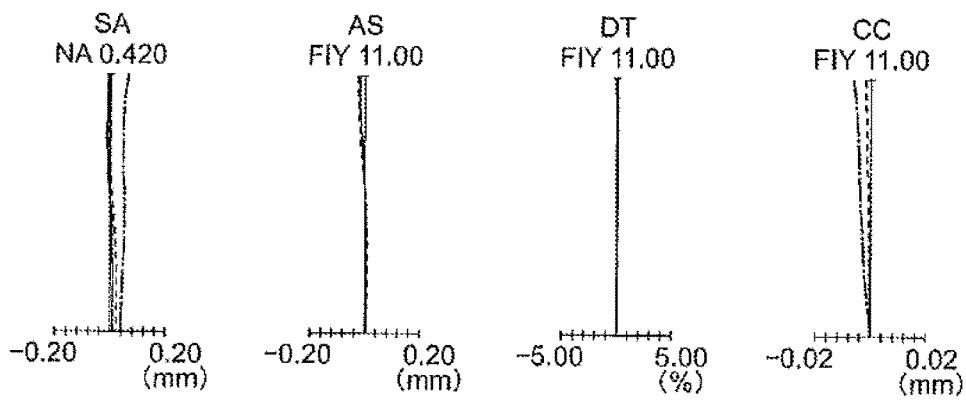
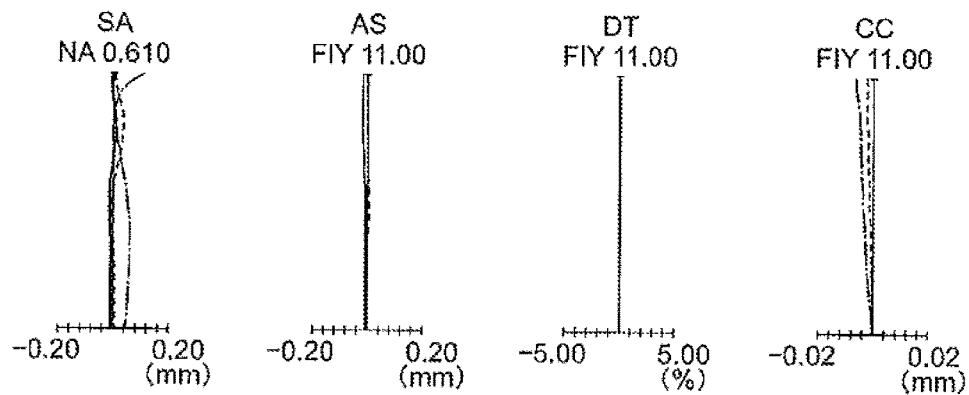

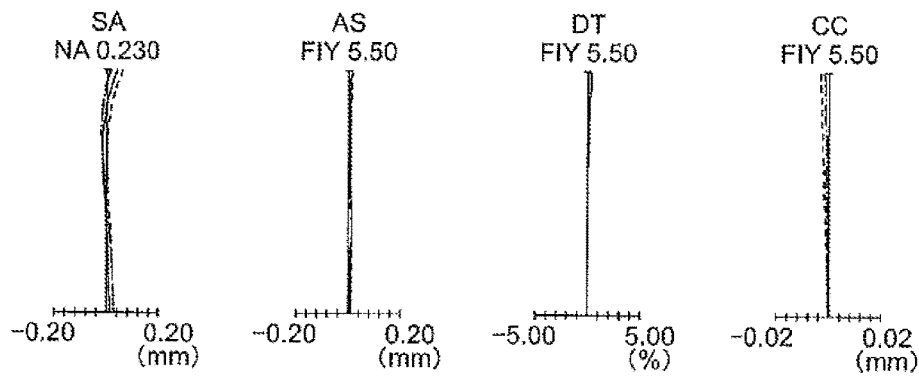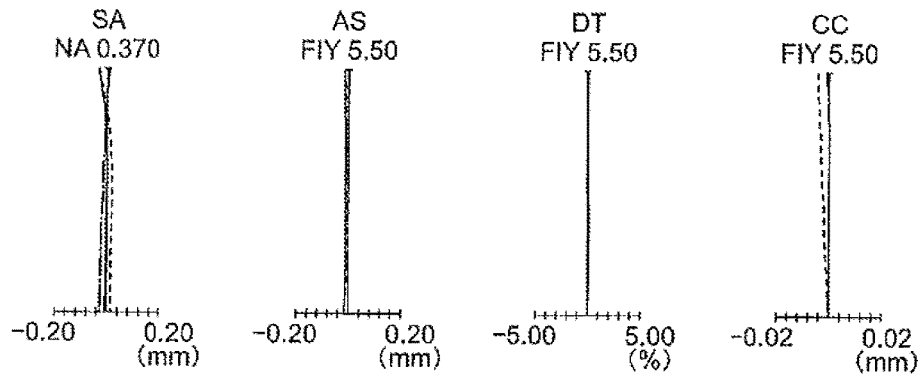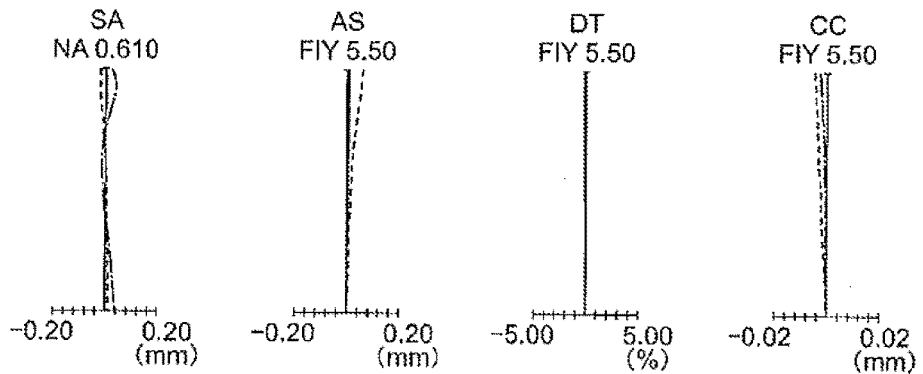

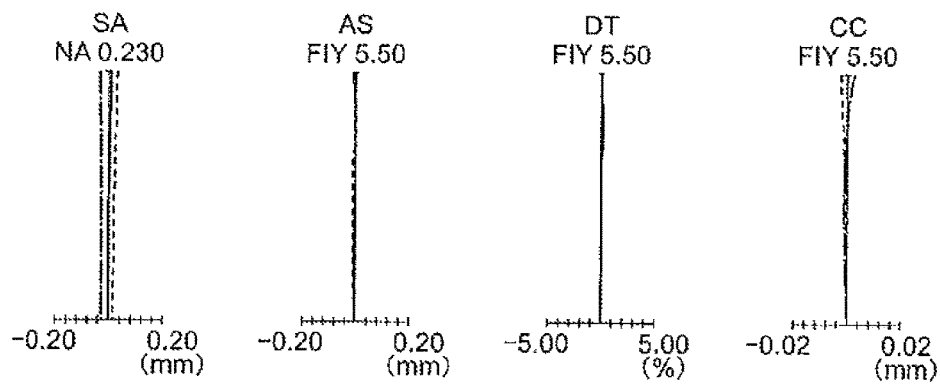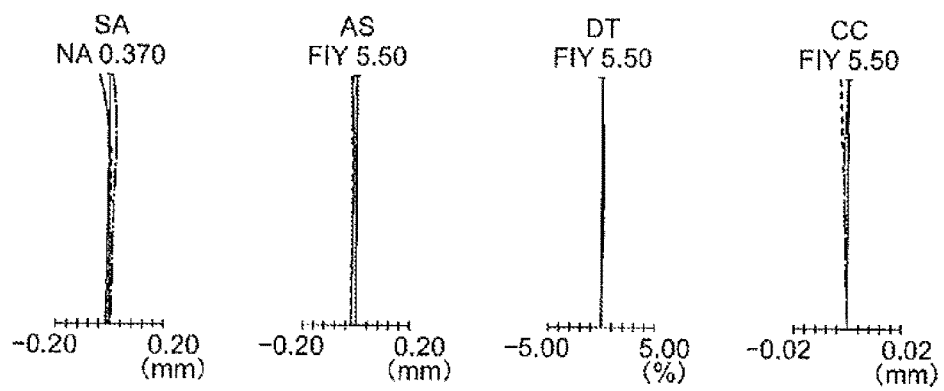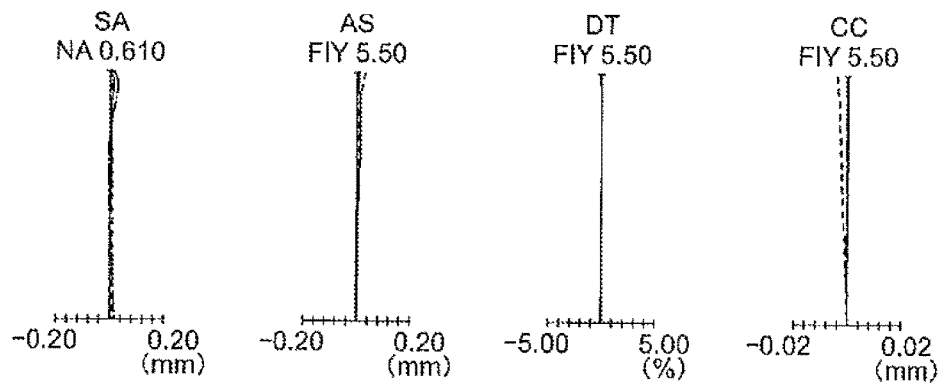

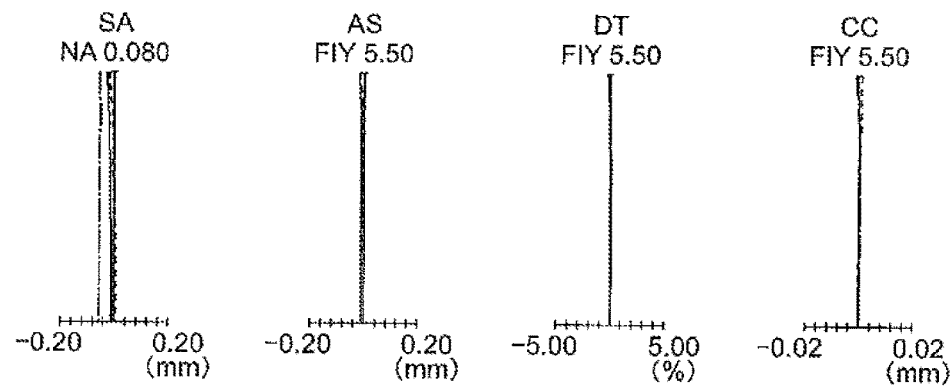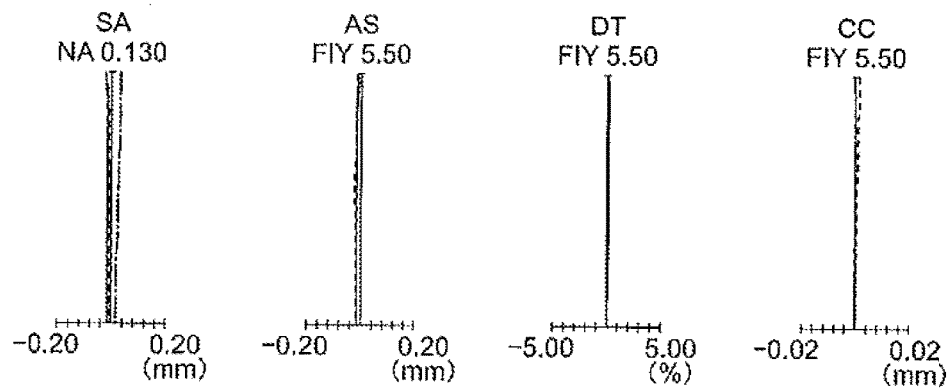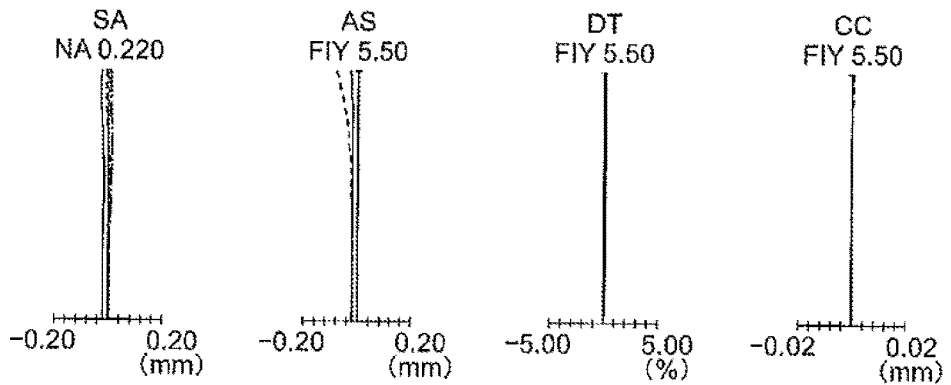

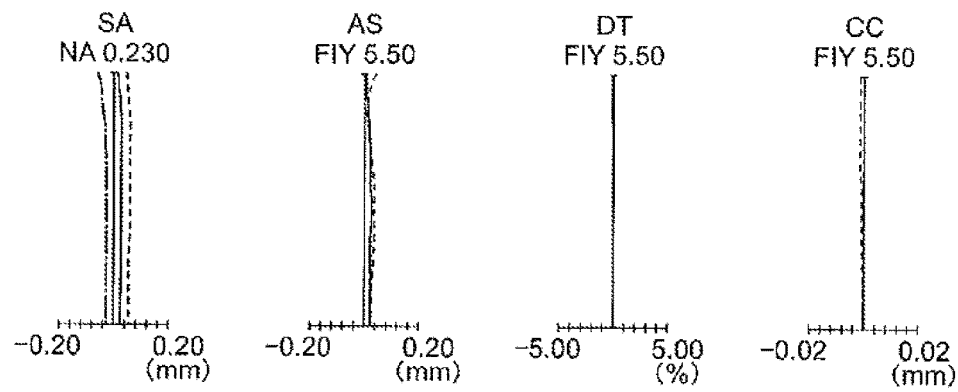
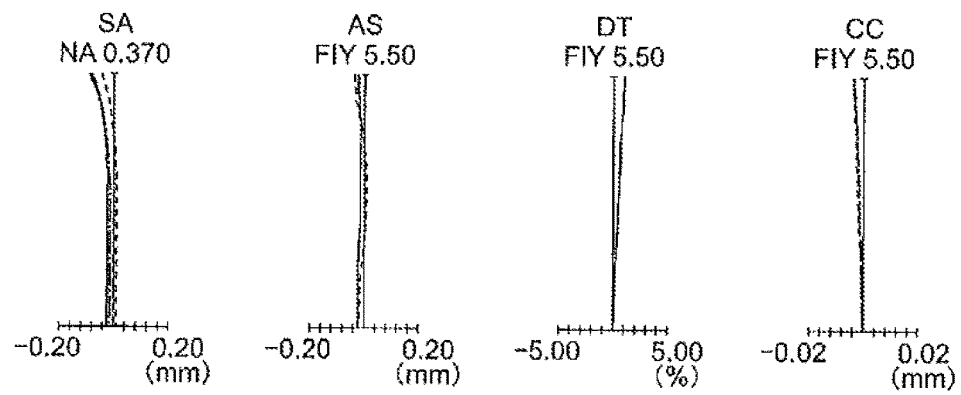
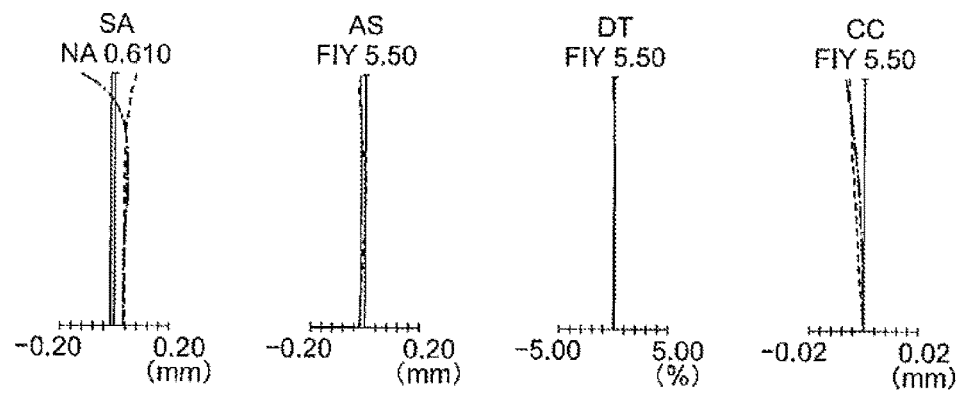

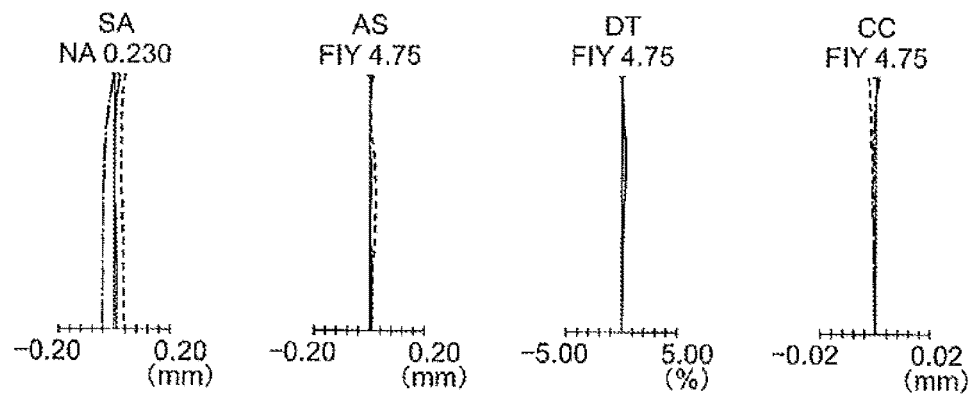
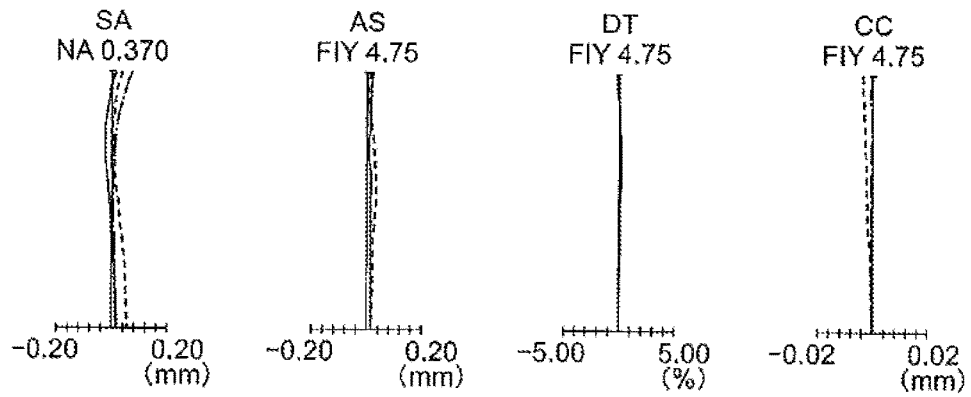
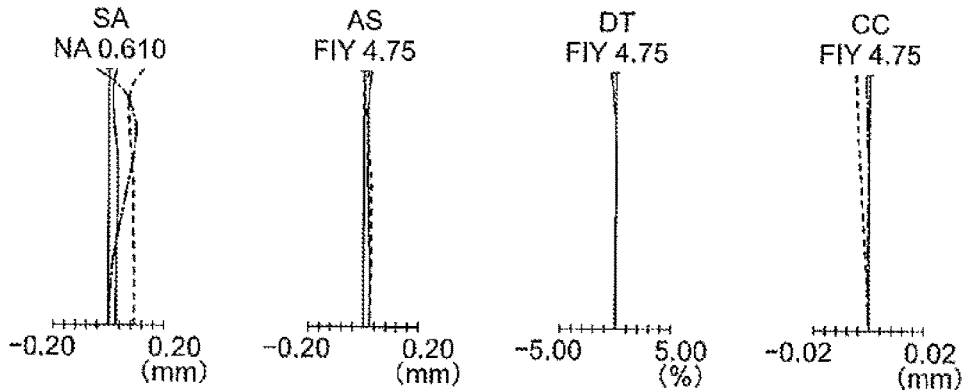

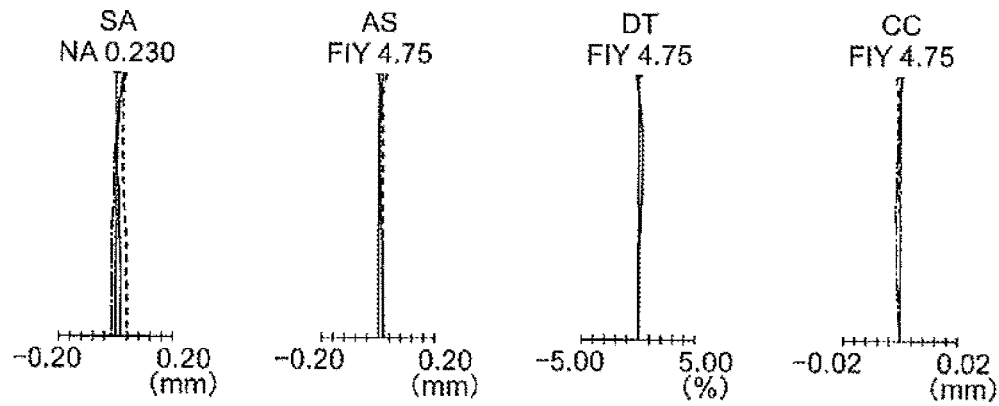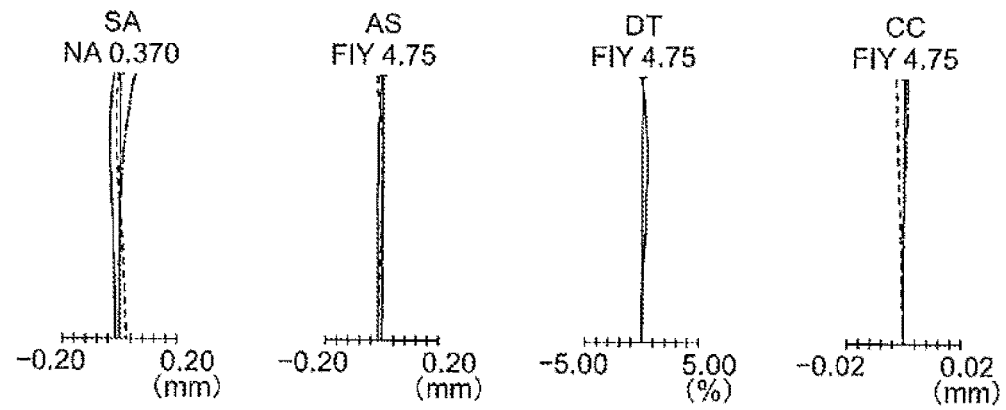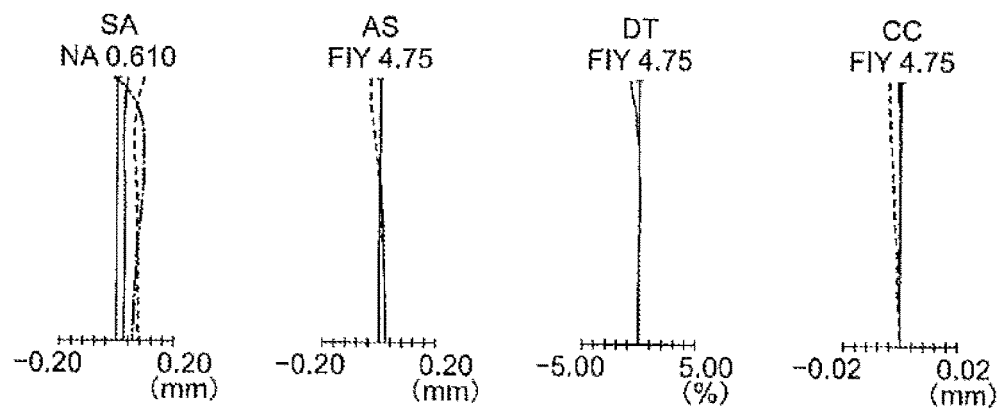

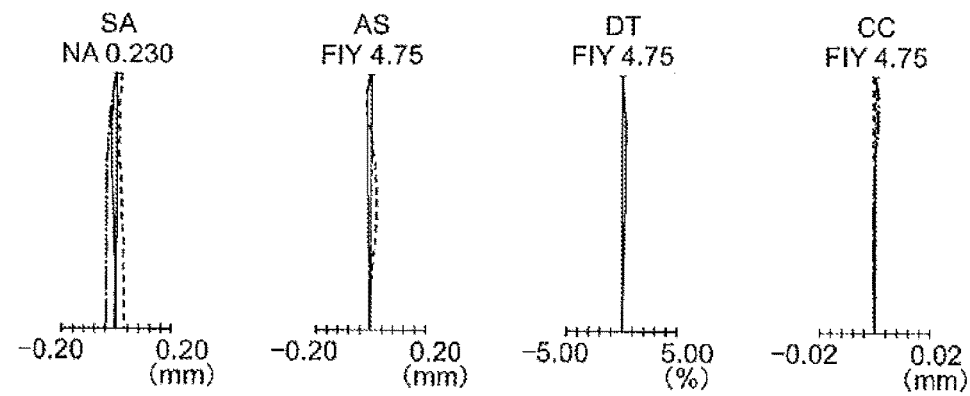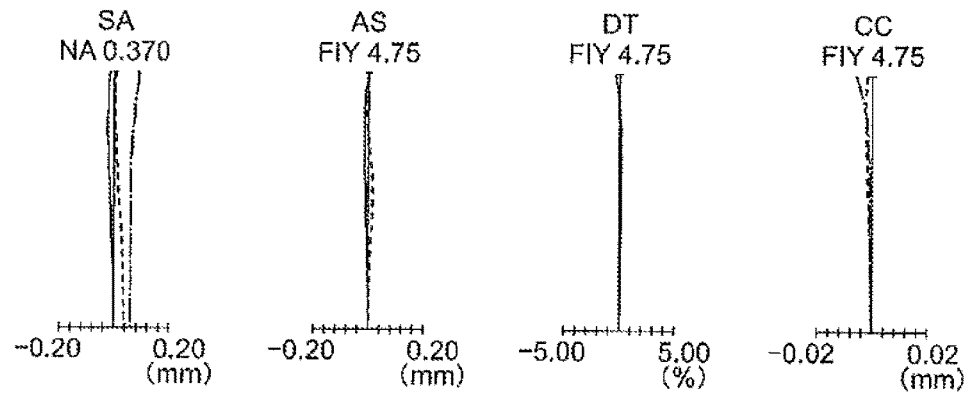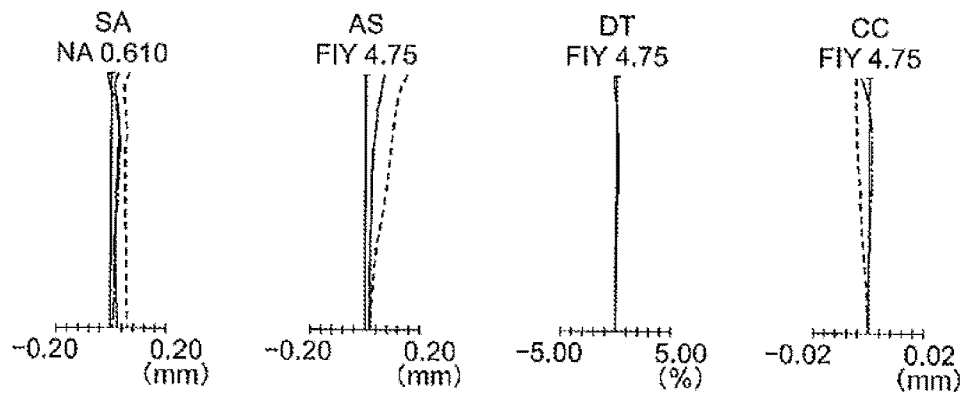

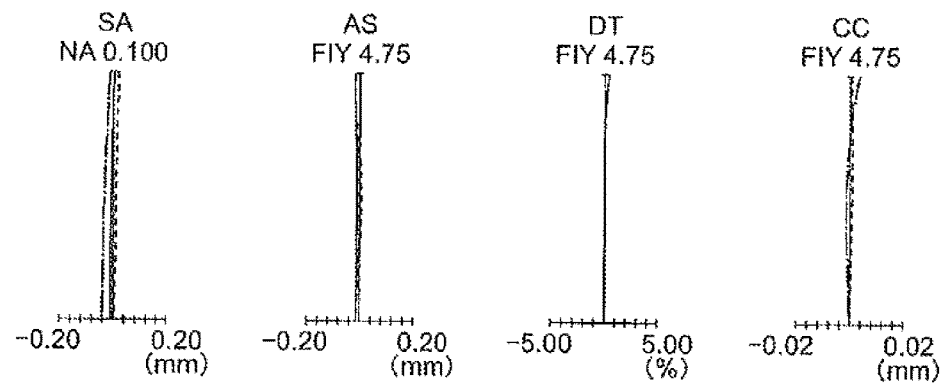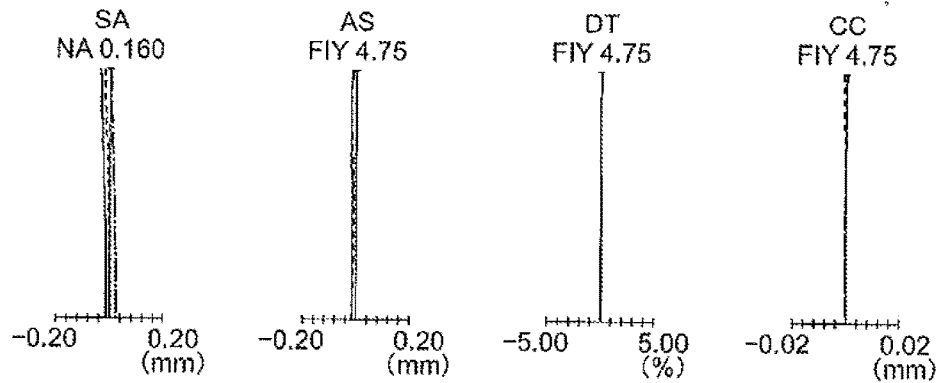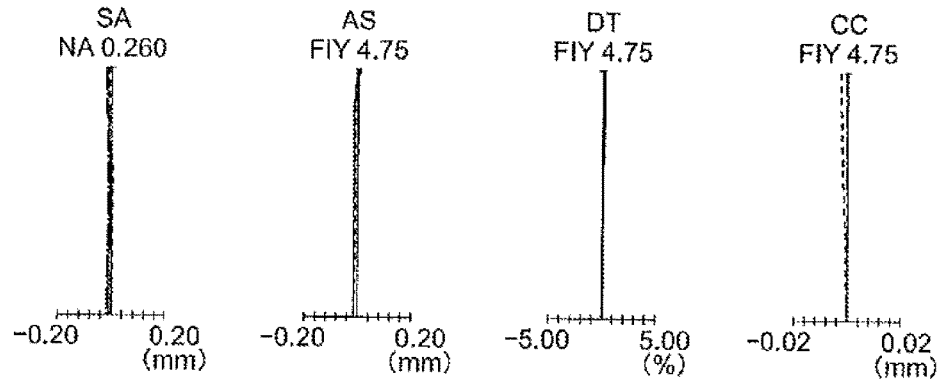

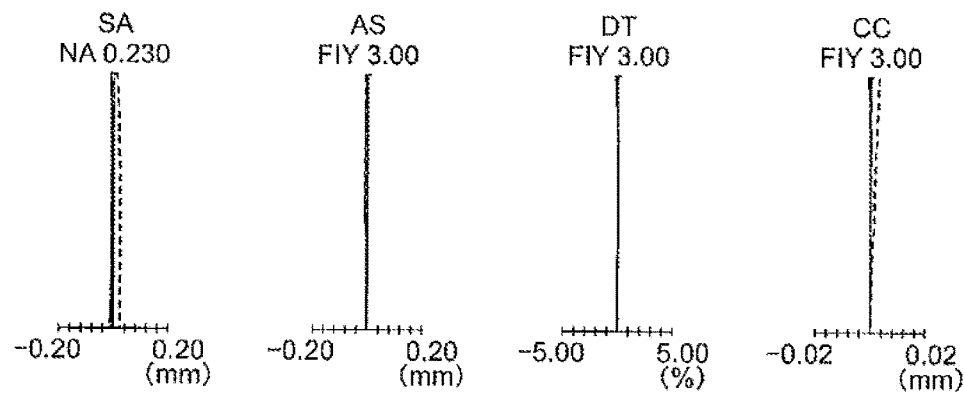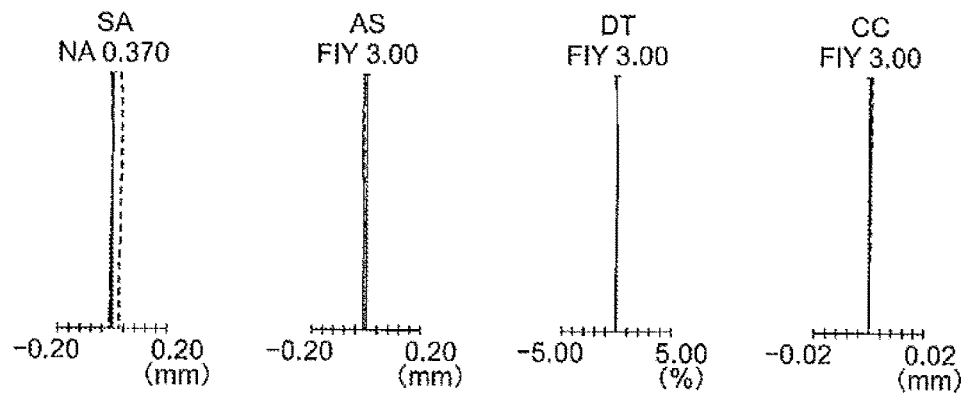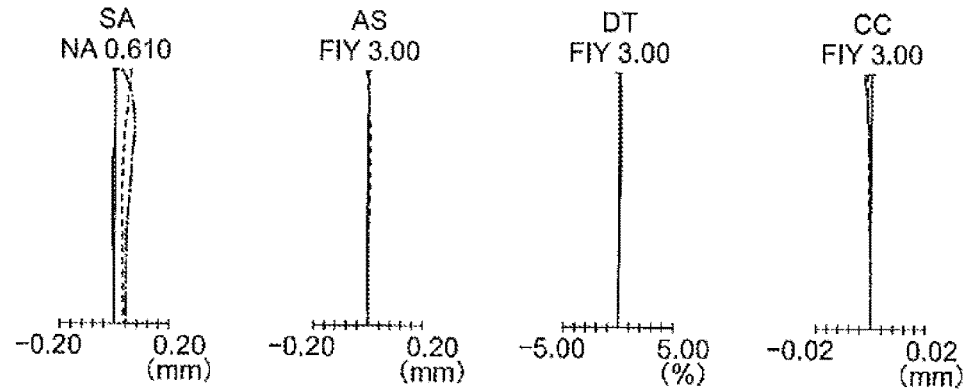

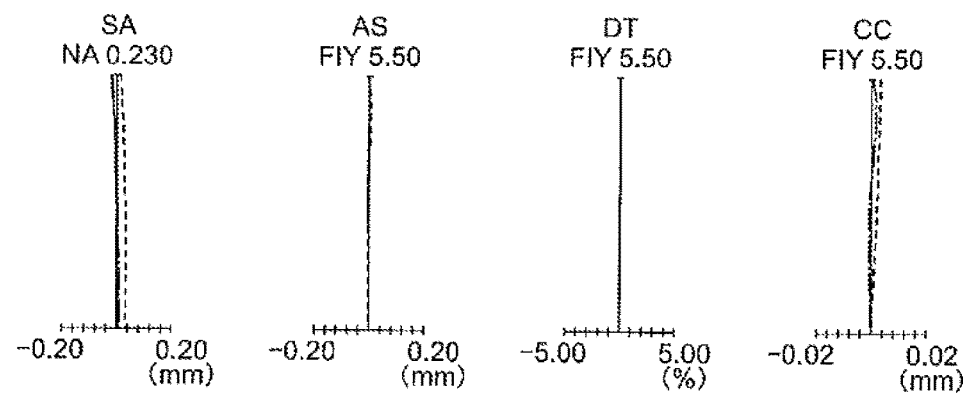
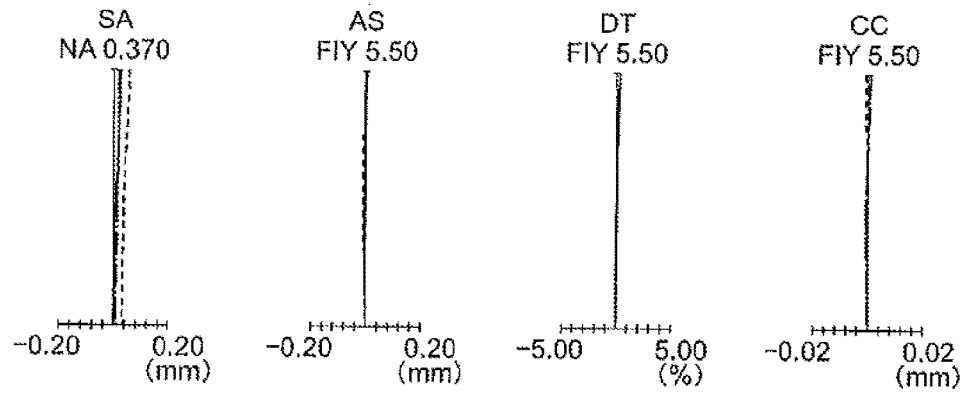
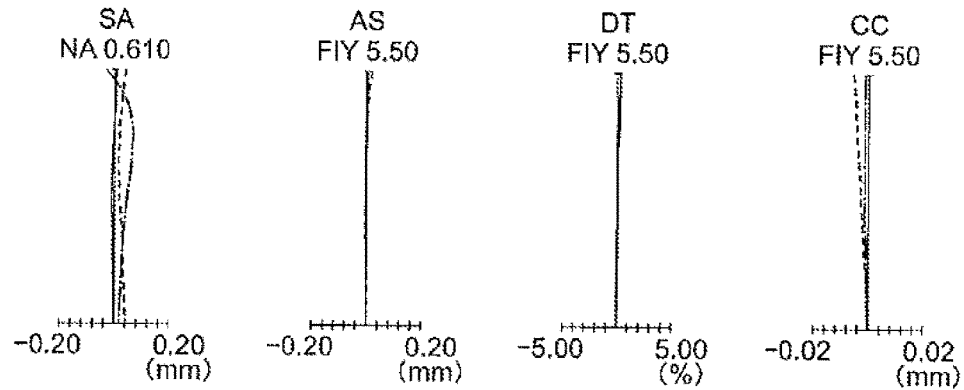

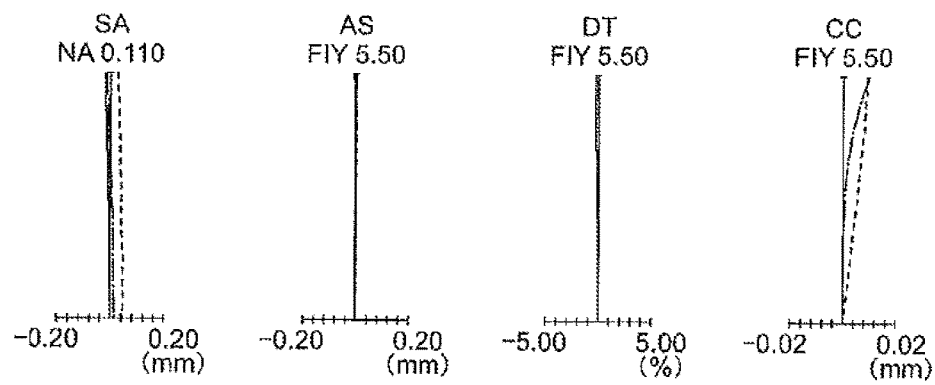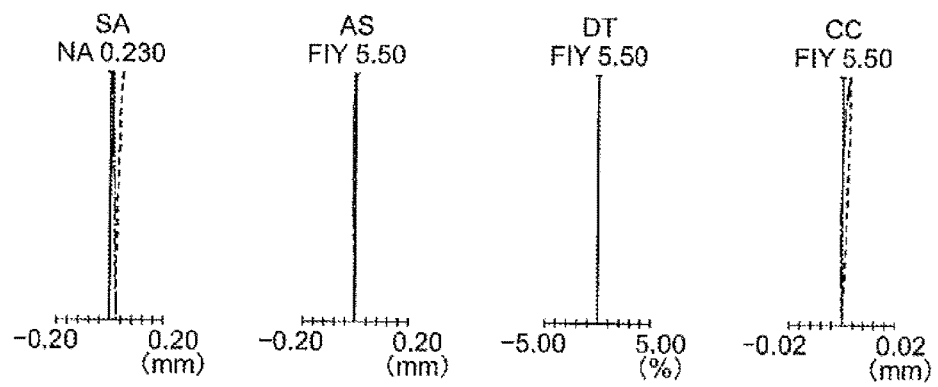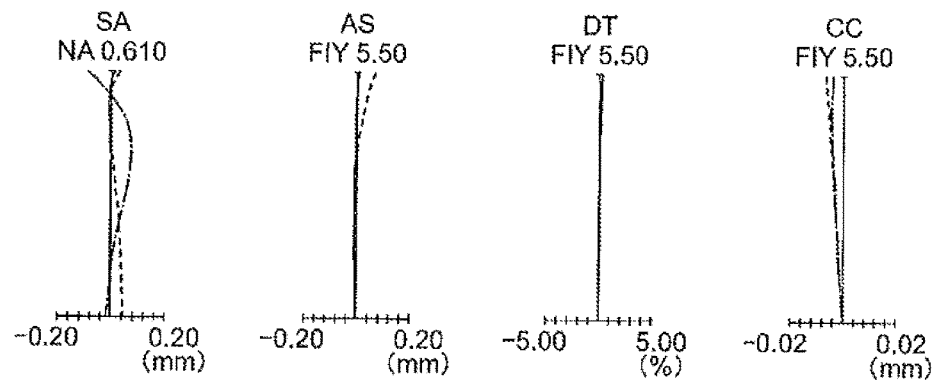

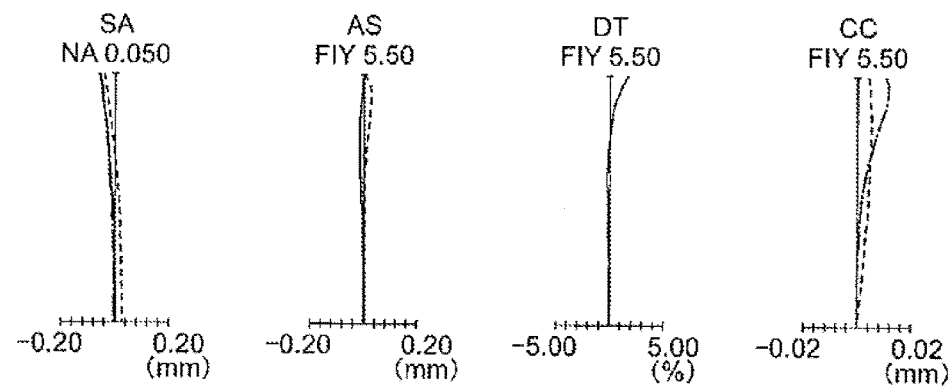
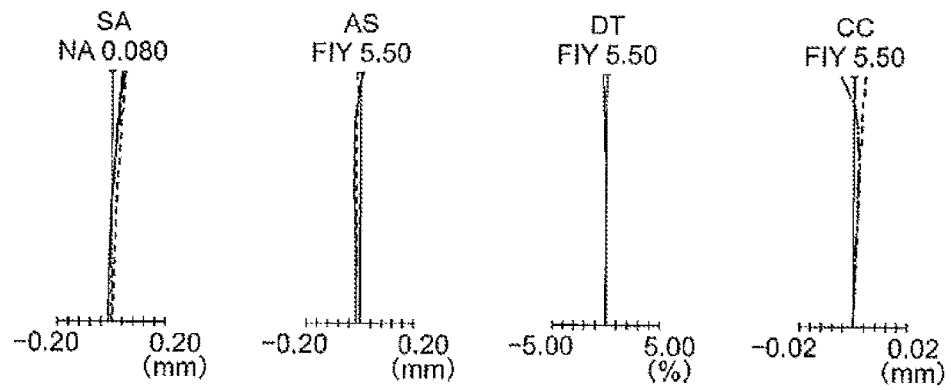
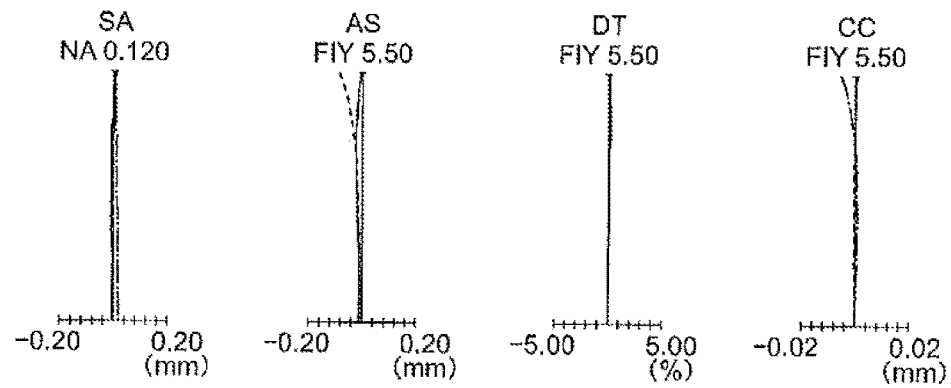

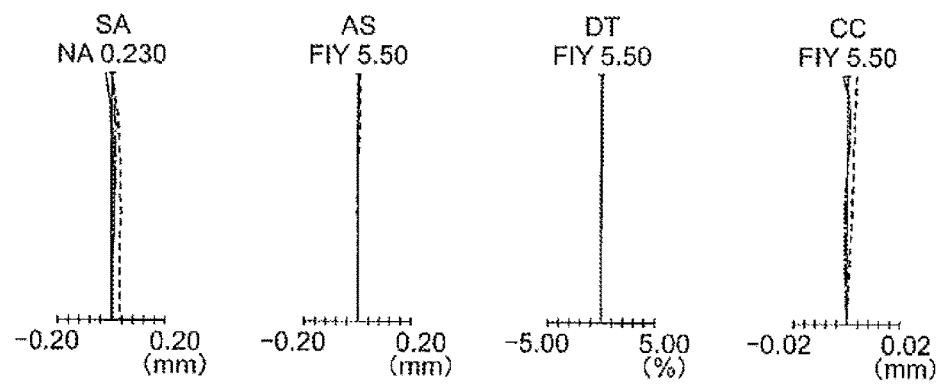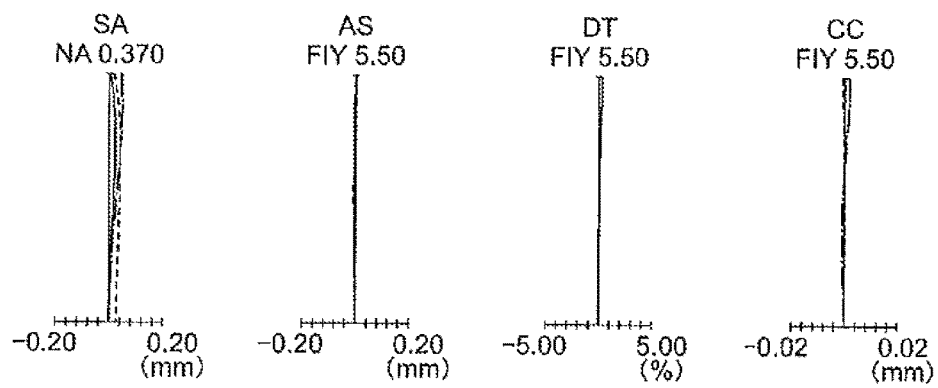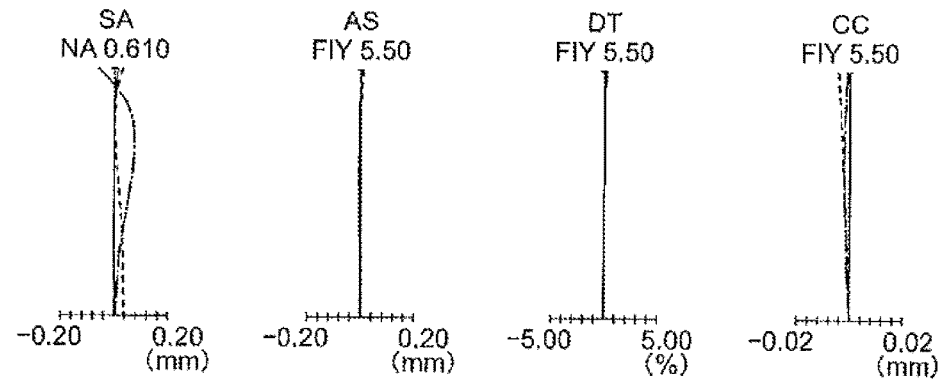

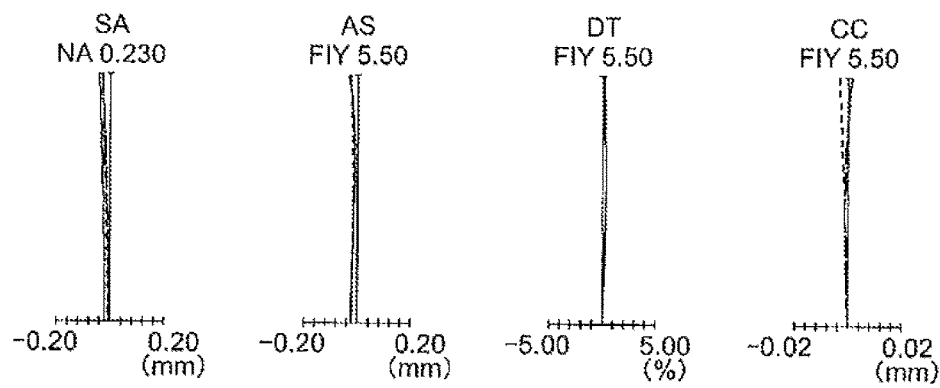
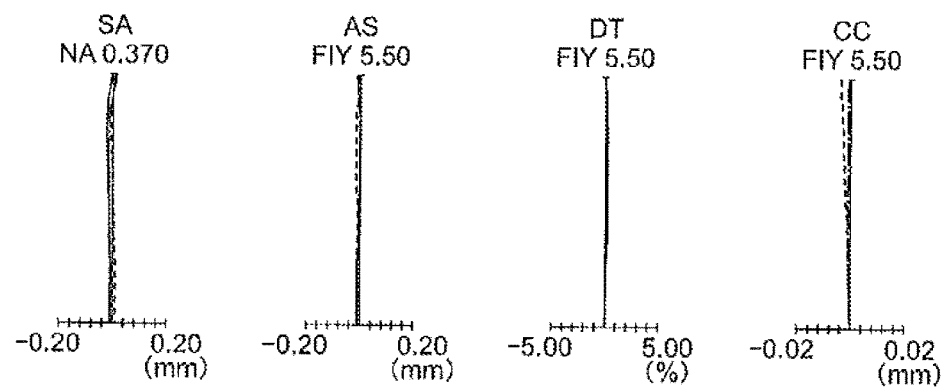
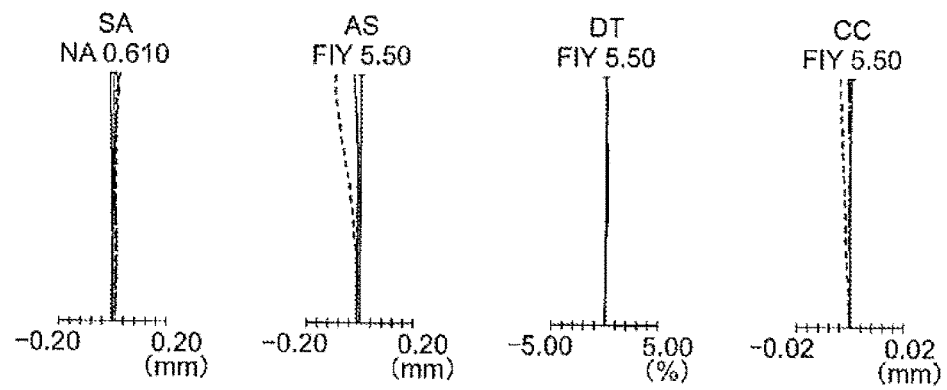

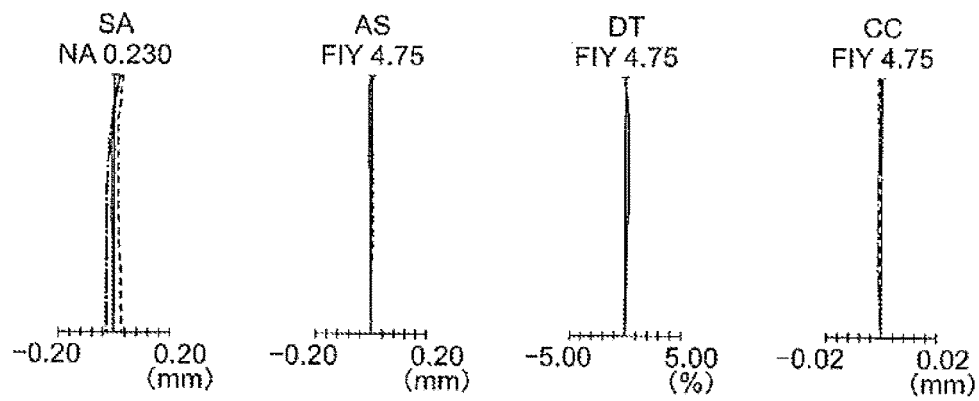
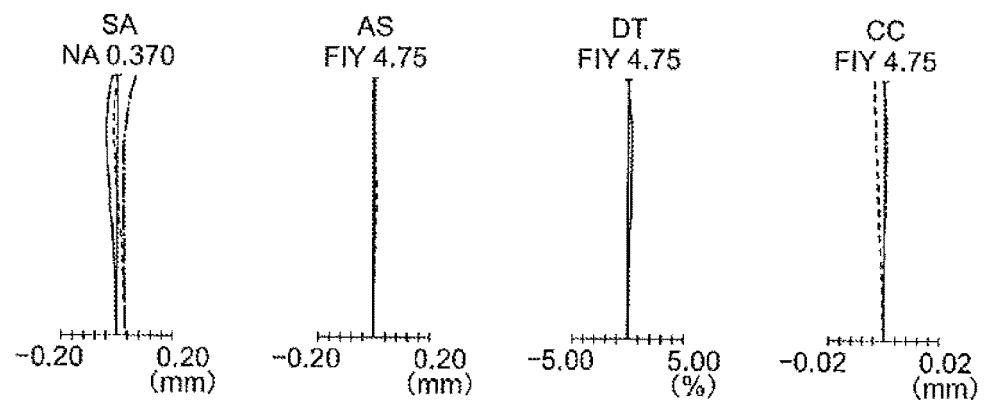
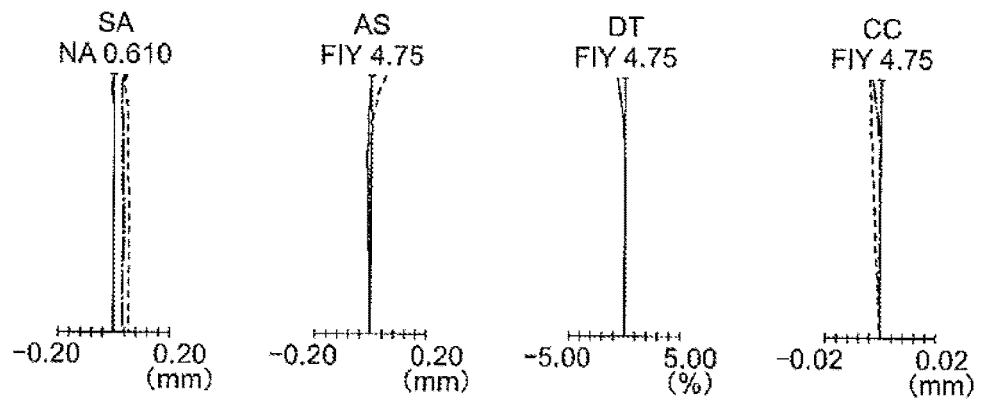

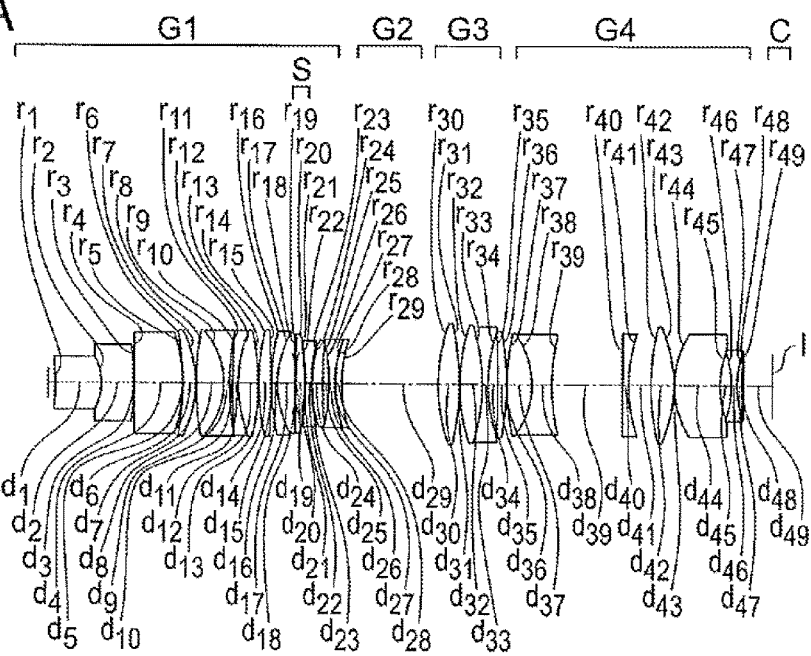
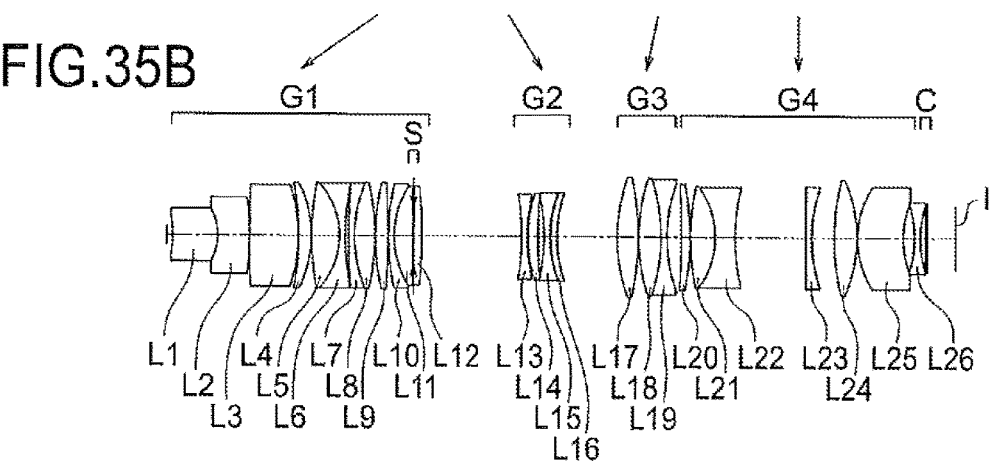
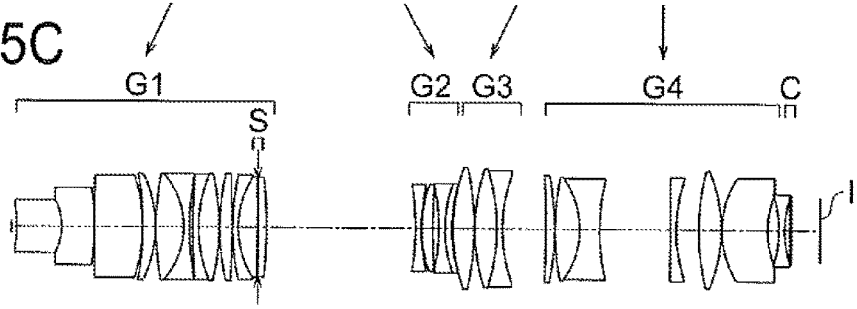

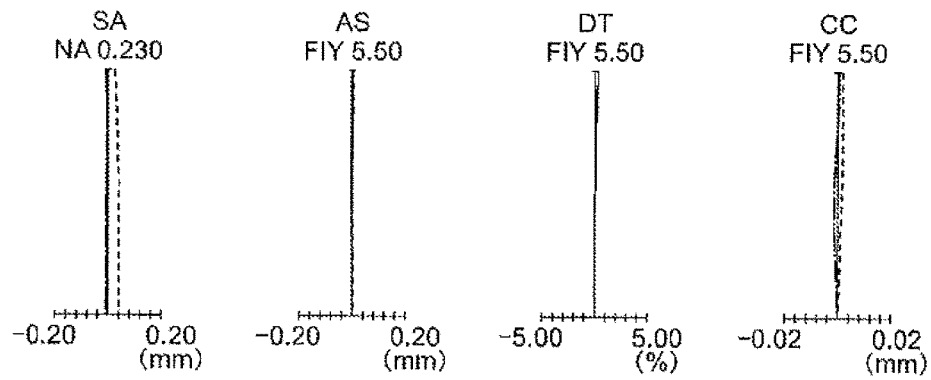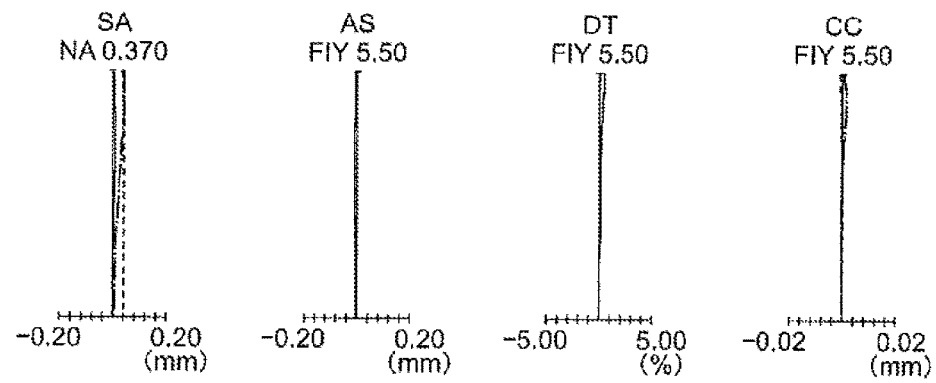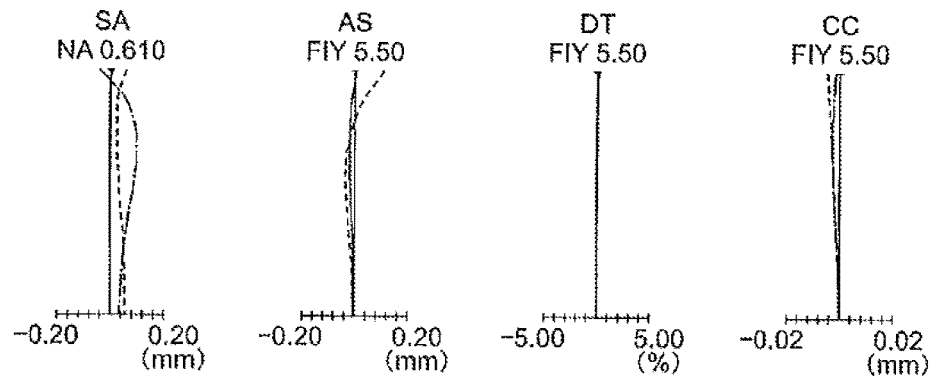

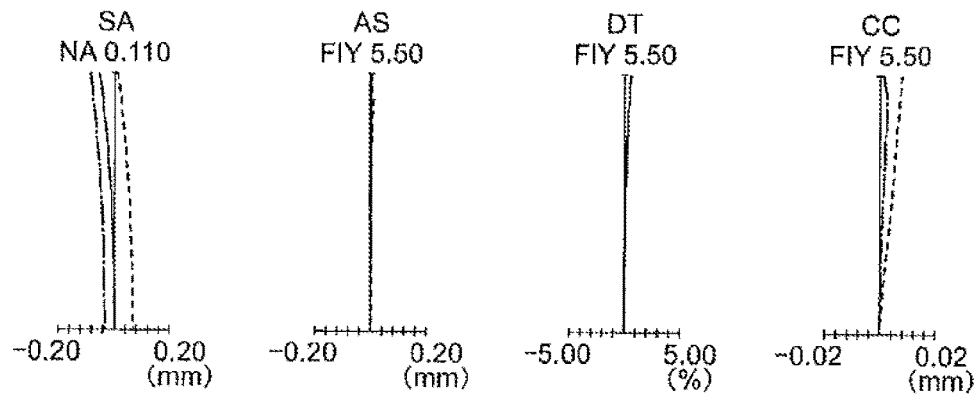
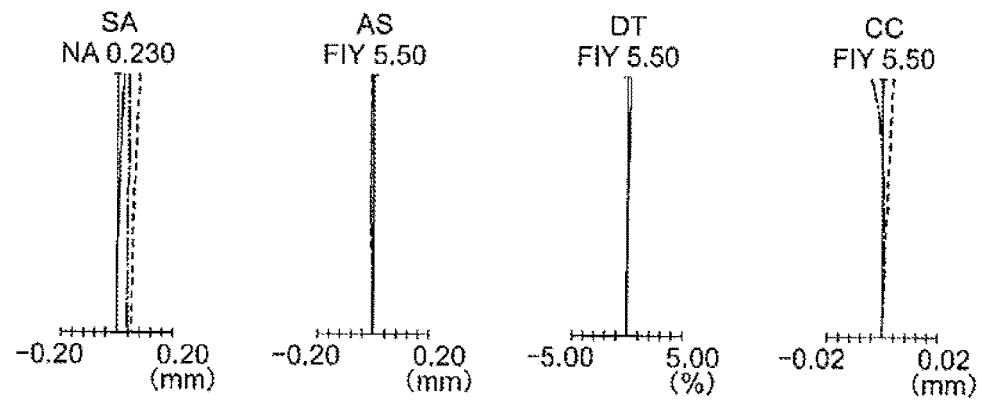
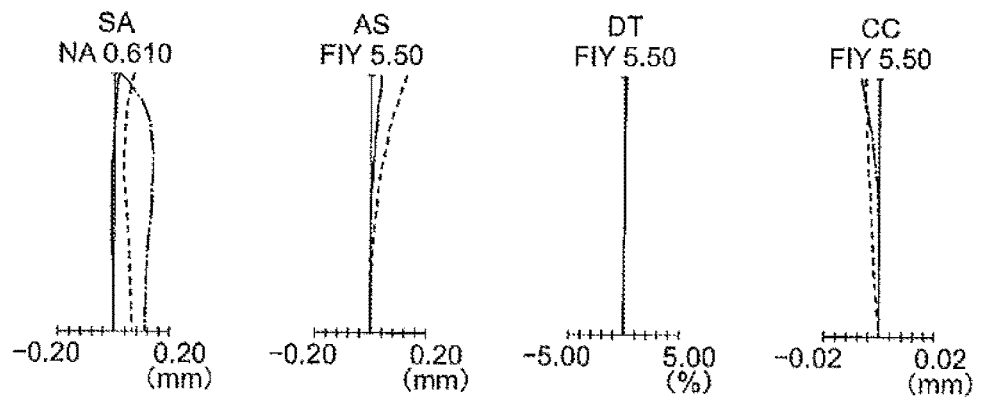

VARIABLE MAGNIFICATION OPTICAL SYSTEM, AND IMAGE PICKUP APPARATUS AND IMAGE PICKUP OPTICAL SYSTEM USING THE SAME

CROSS-REFERENCE TO RELATED APPLICATION

The present application is a continuation application of PCT/JP2014/077673 filed on Oct. 17, 2014 which is based upon and claims the benefit of priority from Japanese Patent Application No. 2013-256384 filed on Dec. 11, 2013; the entire contents of which are incorporated herein by reference.

BACKGROUND OF THE INVENTION

Field of the Invention

The present invention relates to a variable magnification optical system, and an image pickup apparatus and an image pickup optical system using the same.

Description of the Related Art

In a case of observing a sample having a width (area) of certain degree, a method in which, a site to be observed in detail is identified by observing the overall sample initially, and thereafter, the site to be observed in detail is magnified and observed, has been adopted heretofore. When it is possible to photograph the overall sample, a part of a captured image can be magnified digitally, and the magnified image can be displayed. Digital magnification of an image is called as digital zooming.

On the other hand, as another method of capturing a magnified image of the site to be observed, optical zooming is available. An optical system capable of optical zooming, or in other words, a variable magnification optical system includes a plurality of lens units. In the variable magnification optical system, distances between the lens units are changed by moving some of the plurality of lens units, and accordingly, an imaging magnification is changed. As such variable magnification optical system, a microscope zoom objective lens disclosed in Japanese Patent Publication No. 4576402 is available.

SUMMARY OF THE INVENTION

A variable magnification optical system according to an aspect of the present invention is an optical system in which, a magnification ratio varies from a low magnification end to a high magnification end, and which comprises a first lens unit having a positive refractive power, which is disposed nearest to an object, and a second lens unit having a positive refractive power, which is disposed on an image side of the first lens unit, wherein at a time of varying magnification, a distance between the first lens unit and the second lens unit changes, and the following conditional expression (1) is satisfied:

$$0 < 1/\beta_{HG1} < 1 \qquad (1),$$

where, $\beta_{HG1}$ denotes an imaging magnification of the first lens unit at the high magnification end.

Moreover, a variable magnification optical system according to another aspect of the present invention is an optical system in which, a magnification ratio varies from a low magnification end to a high magnification end, and which comprises a first lens unit having a positive refractive power, which is disposed nearest to an object, and a second lens unit having a negative refractive power, which is disposed on an image side of the first lens unit, wherein a stop which is disposed on the object side of the second lens unit is included, and at a time of varying magnification, the second lens unit moves, and a distance between the first lens unit and the second lens unit changes, and a third lens unit is disposed on an image side of the second lens unit, wherein the following conditional expression (8) is satisfied:

$$0.15 \leq \Delta_{G2max}/D_{HIGi} \leq 2 \qquad (8),$$

where, $\Delta_{G2max}$ denotes a maximum amount of movement from among amounts of movement of the second lens unit on the optical axis, and $D_{HIGi}$ denotes a distance on the optical axis from a lens surface nearest to the object in the third lens unit up to an image plane, at the high magnification end.

Furthermore, a variable magnification optical system according to still another aspect of the present invention is an optical system in which, a magnification ratio varies from a low magnification end to a high magnification end, and which comprises a first lens unit having a positive refractive power, which is disposed nearest to an object, and a second lens unit which is disposed on an image side of the first lens unit, wherein a conjugate length of the variable magnification optical system changes at a time of varying magnification, and a lens unit which moves at the time of varying magnification is included, and the following conditional expression (12) is satisfied:

$$0.01 \leq |\Delta_{iomax}/\Delta_{max}| \leq 5 \qquad (12),$$

where, $\Delta_{iomax}$ denotes a maximum amount of change from among amounts of change in the conjugate length, and $\Delta_{max}$ denotes a maximum amount of movement from among amounts of movement of the lens unit which moves.

An image pickup apparatus according to the present invention comprises an image pickup element, and a variable magnification optical system, wherein an optical image is formed on the image pickup element by the variable magnification optical system, and the variable magnification optical system is an optical system in which, a magnification ratio varies from a low magnification end to a high magnification end, and includes at least a first lens unit having a positive refractive power, which is disposed nearest to an object, and a second lens unit which is disposed on an image side of the first lens unit, and at the time of varying magnification, a distance between the first lens unit and the second lens unit is variable, and the following conditional expressions (14) and (15) are satisfied.

$$3000 \leq 2 \times Y/p \qquad (14)$$

$$0.08 \leq NA_H \qquad (15)$$

where,

Y denotes the maximum image height in the overall variable magnification optical system, p denotes a pixel pitch of the image pickup element, and $NA_H$ denotes a numerical aperture on the object side of the variable magnification optical system at the high magnification end.

An image pickup system according to the present invention comprises the abovementioned image pickup apparatus, a stage which holds an object to be observed, and a light source which illuminates the object.

BRIEF DESCRIPTION OF THE DRAWINGS

FIG. 2A, FIG. 2B, FIG. 2C, FIG. 2D, FIG. 2E, FIG. 2F, FIG. 2G, and FIG. 2H are aberration diagrams at the time of infinite object point focusing of the variable magnification optical system according to the example 1;

FIG. 4A, FIG. 4B, FIG. 4C, FIG. 4D, FIG. 4E, FIG. 4F, FIG. 4G, FIG. 4H, FIG. 4I, FIG. 4J, FIG. 4K, and FIG. 4L are aberration diagrams at the time of infinite object point focusing of the variable magnification optical system according to the example 2;

FIG. 6A, FIG. 6B, FIG. 6C, FIG. 6D, FIG. 6E, FIG. 6F, FIG. 6G, FIG. 6H, FIG. 6I, FIG. 6J, FIG. 6K, and FIG. 6L are aberration diagrams at the time of infinite object point focusing of a variable magnification optical system according to the example 3;

FIG. 8A, FIG. 8B, FIG. 8C, FIG. 8D, FIG. 8E, FIG. 8F, FIG. 8G, FIG. 8H, FIG. 8I, FIG. 8J, FIG. 8K, and FIG. 8L are aberration diagrams at the time of infinite object point focusing of a variable magnification optical system according to the example 4;

FIG. 10A, FIG. 10B, FIG. 10C, FIG. 10D, FIG. 10E, FIG. 10F, FIG. 10G, FIG. 10H, FIG. 10I, FIG. 10J, FIG. 10K, and FIG. 10L are aberration diagrams at the time of infinite object point focusing of a variable magnification optical system according to the example 5;

FIG. 12A, FIG. 12B, FIG. 12C, FIG. 12D, FIG. 12E, FIG. 12F, FIG. 12G, FIG. 12H, FIG. 12I, FIG. 12J, FIG. 12K, and FIG. 12L are aberration diagrams at the time of infinite object point focusing of the variable magnification optical system according to the example 6;

FIG. 14A, FIG. 14B, FIG. 14C, FIG. 14D, FIG. 14E, FIG. 14F, FIG. 14G, FIG. 14H, FIG. 14I, FIG. 14J, FIG. 14K, and FIG. 14L are aberration diagrams at the time of infinite object point focusing of the variable magnification optical system according to the example 7;

FIG. 16A, FIG. 16B, FIG. 16C, FIG. 16D, FIG. 16E, FIG. 16F, FIG. 16G, FIG. 16H, FIG. 16I, FIG. 16J, FIG. 16K, and FIG. 16L are aberration diagrams at the time of infinite object point focusing of the variable magnification optical system according to the example 8;

FIG. 18A, FIG. 18B, FIG. 18C, FIG. 18D, FIG. 18E, FIG. 18F, FIG. 18G, FIG. 18H, FIG. 18I, FIG. 18J, FIG. 18K, and FIG. 18L are aberration diagrams at the time of infinite object point focusing of the variable magnification optical system according to the example 9;

FIG. 20A, FIG. 20B, FIG. 20C, FIG. 20D, FIG. 20E, FIG. 20F, FIG. 20G, FIG. 20H, FIG. 20I, FIG. 20J, FIG. 20K, and FIG. 20L are aberration diagrams at the time of infinite object point focusing of the variable magnification optical system according to the example 10;

FIG. 22A, FIG. 22B, FIG. 22C, FIG. 22D, FIG. 22E, FIG. 22F, FIG. 22G, FIG. 22H, FIG. 22I, FIG. 22J, FIG. 22K, and FIG. 22L are aberration diagrams at the time of infinite object point focusing of the variable magnification optical system according to the example 11;

FIG. 24A, FIG. 24B, FIG. 24C, FIG. 24D, FIG. 24E, FIG. 24F, FIG. 24G, FIG. 24H, FIG. 24I, FIG. 24J, FIG. 24K, and FIG. 24L are aberration diagrams at the time of infinite object point focusing of the variable magnification optical system according to the example 12;

FIG. 26A, FIG. 26B, FIG. 26C, FIG. 26D, FIG. 26E, FIG. 26F, FIG. 26G, FIG. 26H, FIG. 26I, FIG. 26J, FIG. 26K, and FIG. 26L are aberration diagrams at the time of infinite object point focusing of the variable magnification optical system according to the example 13;

FIG. 28A, FIG. 28B, FIG. 28C, FIG. 28D, FIG. 28E, FIG. 28F, FIG. 28G, FIG. 28H, FIG. 28I, FIG. 28J, FIG. 28K, and FIG. 28L are aberration diagrams at the time of infinite object point focusing of the variable magnification optical system according to the example 14;

FIG. 30A, FIG. 30B, FIG. 30C, FIG. 30D, FIG. 30E, FIG. 30F, FIG. 30G, FIG. 30H, FIG. 30I, FIG. 30J, FIG. 30K, and FIG. 30L are aberration diagrams at the time of infinite object point focusing of the variable magnification optical system according to the example 15;

FIG. 32A, FIG. 32B, FIG. 32C, FIG. 32D, FIG. 32E, FIG. 32F, FIG. 32G, FIG. 32H, FIG. 32I, FIG. 32J, FIG. 32K, and FIG. 32L are aberration diagrams at the time of infinite object point focusing of the variable magnification optical system according to the example 16;

FIG. 34A, FIG. 34B, FIG. 34C, FIG. 34D, FIG. 34E, FIG. 34F, FIG. 34G, FIG. 34H, FIG. 34I, FIG. 34J, FIG. 34K, and FIG. 34L are aberration diagrams at the time of infinite object point focusing of the variable magnification optical system according to the example 17;

FIG. 35A, FIG. 35B, and FIG. 35C are cross-sectional views along an optical axis showing an optical arrangement at the time of infinite object point focusing of a variable magnification optical system according to an example 18;

FIG. 36A, FIG. 36B, FIG. 36C, FIG. 36D, FIG. 36E, FIG. 36F, FIG. 36G, FIG. 36H, FIG. 36I, FIG. 36J, FIG. 36K, and FIG. 36L are aberration diagrams at the time of infinite object point focusing of the variable magnification optical system according to the example 18;

FIG. 38A, FIG. 38B, FIG. 38C, FIG. 38D, FIG. 38E, FIG. 38F, FIG. 38G, FIG. 38H, FIG. 38I, FIG. 38J, FIG. 38K, and FIG. 38L are aberration diagrams at the time of infinite object point focusing of the variable magnification optical system according to the example 19;

DETAILED DESCRIPTION OF THE INVENTION

Figure 1A:
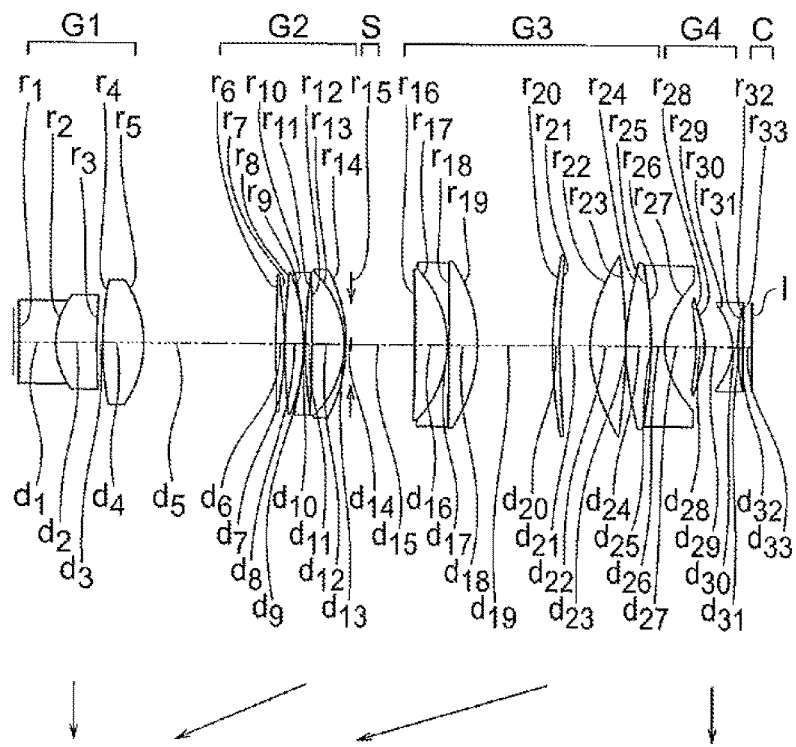
FIG. 1A and FIG. 1B are cross-sectional views along an optical axis showing an optical arrangement at the time of infinite object point focusing of a variable magnification optical system according to an example 1.

Prior to the explanation of examples, action and effect of embodiments according to certain aspects of the present invention will be described below. In the explanation of the action and effect of the embodiments concretely, the explanation will be made by citing concrete examples. However, similar to a case of the examples to be described later, aspects exemplified thereof are only some of the aspects included in the present invention, and there exists a large number of variations in these aspects. Consequently, the present invention is not restricted to the aspects that will be exemplified.

Moreover, in the following description, a 'sample' is appropriately let to be an 'object', and a 'sample image' is appropriately let to be an 'image'.

Moreover, in an image pickup apparatus using a variable magnification optical system according to the present embodiment, enlarged display of a captured image is possible by digital zooming. Therefore, variable magnification optical systems of these embodiments have a high resolving power as various aberrations have been corrected favorably, and also, are capable of forming an image of a wide area of observation. In the variable magnification optical systems according to these embodiments, particularly, since an axial chromatic aberration and an off-axis chromatic aberration are corrected favorably, by combining with image pickup elements with small pixel pitch, it is possible to achieve an enlarged image with high resolution even in a case in which, a captured image has been magnified by digital zooming.

Moreover, in the following description, a low magnification end denotes a minimum magnification ratio in a range of variable magnification, and a high magnification end denotes a maximum magnification in the range of the variable magnification. Moreover, at the time of low magnification, the range includes the low magnification end and vicinity thereof, and at the time of high magnification, the range includes the high magnification end and vicinity thereof.

Moreover, in a microscope, an optical image is formed by an objective lens and a tube lens, and the optical image is observed through an eye-piece. In this case, as the image formation is carried out twice, the optical image formed by the objective lens and the tube lens becomes a primary image, and a virtual plane at a position of the primary image becomes a primary imaging plane. The optical image formed on an image plane of the variable magnification optical system according to the present embodiment corresponds to a primary image in an optical system of the microscope. Therefore, the image plane in the following description corresponds to a primary imaging plane in the optical system of the microscope.

Prior to the description of the variable magnification optical system according to the present embodiment, a basic arrangement of the variable magnification optical system according to the present embodiment will be described below.

In the basic arrangement, the variable magnification optical system is an optical system in which, a magnification ratio changes from the low magnification end to the high magnification end, and which includes at least a first lens unit having a positive refractive power, which is disposed nearest to an object, and a second lens unit which is disposed on an image side of the first lens unit.

The variable magnification optical system according to the present embodiment is an optical system in which, the magnification ratio changes from the low magnification end to the high magnification end. In other words, in the variable magnification optical system according to the present embodiment, it is possible to change the imaging magnification ratio (hereinafter, appropriately referred to as 'magnification ratio') of the optical system between the low magnification and the high magnification. At the low magnification end, since the magnification ratio becomes minimum, it is possible to achieve a wider area of observation as compared to an area of observation at the high magnification end. Whereas, at the high magnification end, since the magnification ratio becomes maximum, the area of observation becomes narrower as compared to the area of observation at the low magnification end, but it is possible to achieve a high resolving power. Changing the magnification ratio, or in other words, variable magnification, includes a variable magnification which is carried out in a state of keeping a conjugate length (a distance from an object up to an image) constant, and a variable magnification which is carried out in a state of changing the conjugate length.

Moreover, the variable magnification optical system includes at least the first lens unit having a positive refractive power, which is disposed nearest to the object, and the second lens unit which is disposed on the image side of the first lens unit.

When a numerical aperture on the object side of the optical system (hereinafter, referred to as 'numerical aperture') is made large, it is possible to make light with even larger divergence angle (diffraction angle) incident from the object on the optical system. As a result, it is possible to observe a micro structure of the object more minutely. However, for the light with a large divergence angle, the height of a light ray at the first lens unit is high. When such light ray is bent sharply in the first lens unit, a high-order aberration is susceptible to occur in the first lens unit.

In the variable magnification optical system according to the present embodiment, by the first lens unit having a positive refractive power, a light ray with a large divergence angle, is bent gradually in an area near the object, or in other words, in the first lens unit. By making such arrangement, while being a small-size optical system, it is possible to form an optical image of a micro structure with a high resolution, particularly at the time of high magnification.

In the first lens unit, a divergent light beam may be made to be a convergent light beam. However, the divergent light beam is not necessarily to be made to be a convergent light beam. By making such arrangement, it is possible to make a light beam from an object to be a light beam with a small divergence angle, while suppressing a high-order aberration from occurring substantially.

Moreover, by disposing an image pickup element on an image plane of the variable magnification optical system, small-sizing of an image pickup apparatus is possible. Here, a microscope is an example of an image pickup apparatus. In a microscope, generally, a field number is about 22 mm. The field number 22 mm, when converted to the image height of a variable magnification optical system, is about 11 mm.

Therefore, in a case of using the variable magnification optical system according to the present embodiment for an optical system of a microscope, for achieving the area of observation corresponding to the field number 22 mm, it is preferable that an aberration of the variable magnification optical system is corrected up to the image height of about 11 mm.

In a digital microscope, an image of an object image picked up is observed on a monitor. In the digital microscope, when a pixel pitch of the image pickup element is sufficiently small with respect to the image height, the area of observation corresponding to the field number 22 mm is achieved even when the image height is small. Moreover, even without making the image height larger than 11 mm (corresponding to the field number 22 mm), the area of observation corresponding to even larger field number is achieved.

Therefore, by the variable magnification optical system having even higher resolving power, a combination with an image pickup element (hereinafter, appropriately referred to as 'predetermined image pickup element') having a small pixel pitch and a large number of pixels is possible. As a result, even without making the image height large, it is possible to achieve the area of observation corresponding to even larger field number as compared to that in the conventional microscope.

A variable magnification optical system according to a first embodiment is an optical system in which, a magnification ratio varies from a low magnification end to a high magnification end, and which includes a first lens unit having a positive refractive power, which is disposed nearest to an object, and a second lens unit having a positive refractive power, which is disposed on an image side of the first lens unit, and at a time of varying magnification, a distance between the first lens unit and the second lens unit changes, and the following conditional expression (1) is satisfied:

$$0<1/\beta_{HG1}<1 \quad (1),$$

where, $\beta_{HG1}$ denotes an imaging magnification of the first lens unit at the high magnification end.

The variable magnification optical system according to the first embodiment has the abovementioned basic arrangement, and furthermore, the second lens unit is imparted the positive refractive power, and the magnification is changed by changing the distance between the first lens unit and the second lens unit. In the variable magnification optical system according to the first embodiment, variable magnification is carried out in a state of keeping the conjugate length constant.

Since technical significance of the basic arrangement has already been explained, the description thereof is omitted here.

By imparting the positive refractive power to the second lens unit, it is possible to make a combined refractive power of the first lens unit and the second lens unit sufficiently large at the time of high magnification, without making the refractive power of the first lens unit excessively large. In this case, since it is possible to suppress divergence of a marginal ray in an area near the object at the time of high magnification, it is possible to make the optical system small-sized. Besides, since it is not necessary to impart an excessive refractive power to the first lens unit, it is possible to correct favorably various aberrations, and particularly, a spherical aberration and a curvature of field, in the first lens unit, with comparatively fewer number of lenses.

Moreover, in a case in which, a lens unit is disposed on the image side of the second lens unit, it is possible to suppress the occurrence of various aberrations, and particularly, the spherical aberration and a coma, in the lens unit disposed on the image side.

Moreover, in the variable magnification optical system according to the present embodiment, conditional expression (1) is satisfied.

By satisfying conditional expression (1), even when a lens unit is disposed on the image side of the second lens unit, it is possible to enhance an imaging magnification in the overall optical system without an absolute value of a combined magnification of lens units from the second lens unit onward becoming excessively large. Consequently, even when an aberration occurs in the first lens unit, it is possible to suppress spreading of the aberration to lens units from the second lens unit onward. As a result, it is possible to correct favorably various aberrations, and particularly, the spherical aberration and the curvature of field, in the overall optical system.

In such manner, in the variable magnification optical system according to the present embodiment, various aberrations are corrected favorably. Therefore, by combining the variable magnification optical system according to the present embodiment with a predetermined image pickup element, it is possible to make the image pickup apparatus small-sized while maintaining a large area of observation.

Here, it is preferable that the following conditional expression (1') is satisfied instead of conditional expression (1).

$$0.1<1/\beta_{HG1}<0.9 \qquad (1'),$$

Moreover, it is more preferable that the following conditional expression (1") is satisfied instead of conditional expression (1).

$$0.2<1/\beta_{HG1}<0.85 \qquad (1'')$$

Furthermore, it is even more preferable that the following conditional expression (1''') is satisfied instead of conditional expression (1).

$$0.3<1/\beta_{HG1}<0.8 \qquad (1''')$$

In the variable magnification optical system according to the present embodiment, it is preferable that the following conditional expression (2) is satisfied:

$$0<BF_L/Y \leq 4.3 \qquad (2),$$

where,
$BF_L$ denotes a back focus at the low magnification end, and
Y denotes a maximum image height of the overall variable magnification optical system.

In an area near the image plane, the height of a light ray of an off-axis light beam becomes high, and a diameter of the light beam becomes small. Moreover, in this area, a fluctuation in the height of a light ray of an off-axis beam due to the variable magnification, and a fluctuation in the diameter of a light beam are small. Therefore, when it is possible to dispose a lens in this area, it is possible to correct favorably an off-axis aberration such as a chromatic aberration of magnification and the curvature of field in particular.

By making so as not to fall below a lower limit value of conditional expression (2), a back focus does not become excessively small. Therefore, in a case of disposing a lens in the area near the image plane, it is possible to make a distance between the lens and the image pickup element wide. As a result, even when a ghost image is generated due to multiple reflections between the lens and the image pickup element, it is possible to prevent the ghost image from being incident on a surface of an image pickup element with a high density.

By making so as not to exceed an upper limit value of conditional expression (2), the back focus does not become excessively large. In this case, since it is possible to suppress the back focus to be small, it is possible to make the optical system small-sized while securing sufficiently a space for the movement of a lens unit which moves at the time of varying magnification.

Moreover, by making the image height large with respect to the pixel pitch, it is possible to achieve a wide area of observation corresponding to even larger field number. However, in this case, correcting favorably an off-axis aberration at the time of low magnification in particular becomes important. By making so as not to exceed an upper limit value of conditional expression (2), since it is possible to suppress the back focus to be small, it is possible to dispose a lens in the area near the image plane. Accordingly, it is possible to correct an off-axis aberration favorably. Therefore, it is possible to achieve a wide area of observation corresponding to even larger field number while maintaining a favorable imaging performance.

Here, it is preferable that the following conditional expression (2') is satisfied instead of conditional expression (2).

$$0.1<BF_L/Y \leq 4 \qquad (2')$$

Moreover, it is more preferable that the following conditional expression (2") is satisfied instead of conditional expression (2).

$$0.2<BF_L/Y \leq 3 \qquad (2'')$$

Furthermore, it is even more preferable that the following conditional expression (2''') is satisfied instead of conditional expression (2).

$$0.3<BF_L/Y \leq 2 \qquad (2''')$$

In the variable magnification optical system according to the present embodiment, it is preferable that a stop is disposed on the image side of the second lens unit, and a predetermined positive lens unit is disposed on the image side of the stop, and the predetermined positive lens unit has a positive refractive power, and is a lens unit of which, a distance from the stop at the high magnification end is smaller than a distance from the stop at the low magnification end.

In the variable magnification optical system according to the present embodiment, the stop is disposed on the image side of the first lens unit and the second lens unit, and the predetermined positive lens unit is disposed on the image side of the stop. By making such arrangement, a lens unit having a positive refractive power is disposed on the image side of the stop. Accordingly, at the time of low magnification in particular, while converging an off-axis light beam that has passed through the stop, it is possible to suppress the height of a light ray of the off-axis light beam from becoming excessively high. Consequently, it is possible to make a diameter of the optical system thin and moreover, to correct an off-axis aberration favorably.

Especially, as the overall length of the optical system is shortened, when the off-axis light beam emerges from the stop, an angle of emergence of the off-axis light beam becomes large at the time of low magnification. Consequently, by having the abovementioned arrangement, the thinning of the optical system and an effect of correcting the off-axis aberration favorably becomes remarkable when the overall length of the optical system is shortened.

Moreover, by disposing the predetermined positive lens unit on the image side of the stop, at the time of high magnification, a distance between the stop and the lens unit having a positive refractive power becomes small. Accordingly, since it is possible to position a principal plane of the optical system on the object side, and moreover, to lessen the abovementioned action of suppressing the height of a light ray of the off-axis light beam from becoming excessively high, while converging the off-axis light beam that has passed through the stop, it is possible to achieve the desired imaging magnification.

A lens unit having a positive refractive power or a lens unit having a negative refractive power may be disposed between the stop and the predetermined positive lens unit.

In the variable magnification optical system according to the present embodiment, it is preferable that the predetermined positive lens unit includes at least two or more than two positive lenses, and one or more than one negative lens.

By the predetermined positive lens unit having two or more than two positive lenses, it is possible to make the positive lenses share the positive refractive power of the predetermined positive lens unit. Accordingly, since it is possible to make the off-axis light beam refract gradually, it is possible suppress the occurrence of coma. Moreover, by the predetermined positive lens unit having one or more than one negative lens, it is possible to correct favorably a longitudinal chromatic aberration and a chromatic aberration of magnification in the predetermined positive lens unit.

In such manner, in the variable magnification optical system according to the present embodiment, various aberrations are corrected favorably. Consequently, by combining the variable magnification optical system according to the present embodiment with a predetermined image pickup element, it is possible to make the image pickup apparatus small-sized while maintaining a large area of observation.

The positive lens and the negative lens may be cemented.

In the variable magnification optical system according to the present embodiment, it is preferable that a plurality of predetermined positive lens units is disposed on the image side of the stop, and a first predetermined positive lens unit from among the plurality of predetermined positive lens units, is disposed nearest to an object, and the following conditional expression (3) is satisfied:

$$0 < \Delta_{Gpmax}/\Delta_{Gpobj} \leq 0.6 \quad (3),$$

where, $\Delta_{Gpmax}$ denotes a maximum amount of change from among amounts of change in a distance on an optical axis between any two predetermined positive lens units, and $\Delta_{Gpobj}$ denotes a maximum amount of movement from among amounts of movement on the optical axis of the first predetermined positive lens unit, and here, $\Delta_{Gpmax}$ is the maximum amount of change in distance on the optical axis between the positive lens units from among all combinations of two lens units selected from three or more than three lens units in a case in which, the plurality of predetermined positive lens units includes three or more than three lens units.

By disposing the plurality of predetermined positive lens units, and changing the distance between the two predetermined positive lens units at the time of varying magnification, it is possible to make an arrangement such that the image plane does not fluctuate even when the variable magnification is carried out.

By making so as not to exceed an upper limit value of conditional expression (3), an amount of change in the distance between the two predetermined positive lens units does not become excessively large. In this case, it is possible to exert a function in a case of one predetermined positive lens unit by the plurality of predetermined positive lens units. Consequently, even in a case in which, the plurality of predetermined positive lens units is disposed, it is possible to correct favorably various aberrations, and particularly, an off-axis aberration at the time of low magnification.

An amount of movement of a lens unit is an amount of change in a distance between the lens unit and the image plane, and the distance between the lens unit and the image plane is calculated with reference to the image plane. For instance, in a case in which, the distance between the lens unit and the image plane is $D_L$ at the low magnification end and is $D_H$ at the high magnification end, the amount of movement of the lens becomes $|D_H - D_L|$.

Here, it is more preferable that the following conditional expression (3') is satisfied instead of conditional expression (3).

$$0.01 < \Delta_{Gpmax}/\Delta_{Gpobj} \leq 0.5 \quad (3')$$

Moreover, it is more preferable that the following conditional expression (3'') is satisfied instead of conditional expression (3).

$$0.02 < \Delta_{Gpmax}/\Delta_{Gpobj} \leq 0.4 \quad (3'')$$

Furthermore, it is even more preferable that the following conditional expression (3''') is satisfied instead of conditional expression (3).

$$0.03 < \Delta_{Gpmax}/\Delta_{Gpobj} \leq 0.35 \quad (3''')$$

In the variable magnification optical system according to the present embodiment, it is preferable that the following conditional expression (4) is satisfied:

$$0.1 \leq f_{G1}/f_{G2} \leq 5 \quad (4),$$

where, $f_{G1}$ denotes a focal length of the first lens unit, and
$f_{G2}$ denotes a focal length of the second lens unit.

By making so as not to fall below a lower limit value of conditional expression (4), the focal length of the first lens unit does not become excessively small. As a result, it is possible to correct favorably various aberrations, and particularly, the spherical aberration and the curvature of field in the first lens unit, with comparatively fewer number of lenses.

By making so as not to exceed an upper limit value of conditional expression (4), the focal length of the first lens unit does not become excessively large. As a result, it is possible to suppress diverging of an axial light beam and an off-axis light beam emerged from the first lens unit. Moreover, it is possible to suppress a diameter of a light beam incident on the second lens unit in particular, from becoming excessively large at the time of high magnification. For such reasons, it is possible to correct favorably various aberrations, and particularly, the spherical aberration and the coma at the time of low magnification.

Here, it is preferable that the following conditional expression (4') is satisfied instead of conditional expression (4).

$$0.2 \leq f_{G1}/f_{G2} \leq 4 \quad (4')$$

Moreover, it is more preferable that the following conditional expression (4'') is satisfied instead of conditional expression (4).

$$0.3 \leq f_{G1}/f_{G2} \leq 3 \quad (4'')$$

Furthermore, it is even more preferable that the following conditional expression (4''') is satisfied instead of conditional expression (4).

$$0.4 \leq f_{G1}/f_{G2} \leq 2 \quad (4''')$$

In the variable magnification optical system according to the present embodiment, it is preferable that at the time of varying magnification from the low magnification end to the high magnification end, the stop moves from the image side toward the object side.

By the stop moving at the time of varying magnification, a space for the movement of lens units with respect to the overall length of the optical system becomes large. Consequently, it is possible to shorten the overall length of the optical system while securing a desired magnification ratio.

Moreover, the chromatic aberration of magnification occurs in each of lens units on the object side of the stop and lens units on the image side of the stop. In the variable magnification optical system of the present embodiment, irrespective of the variable magnification, it is possible to keep balance of the chromatic aberration of magnification that occurs in each lens unit. Therefore, at the time of low magnification as well as high magnification, it is possible to correct favorably the chromatic aberration of magnification of the overall optical system.

In the variable magnification optical system according to the present embodiment, it is preferable that the following conditional expression (5) is satisfied:

$$0.2 \leq f_{G1}/f_{LGp} \leq 10 \quad (5),$$

where, $f_{G1}$ denotes a focal length of the first lens unit, and $f_{LGP}$ denotes a focal length of the predetermined positive lens unit at the low magnification end.

By making so as not to fall below a lower limit value of conditional expression (5), the focal length of the predetermined positive lens unit does not become excessively large. As a result, at the time of low magnification, while converging the off-axis light beam that has passed through the stop, it is possible to suppress the height of a light ray of off-axis light beam from becoming excessively high. Consequently, it is possible to achieve both shortening the overall length of the optical system and thinning the diameter of the optical system, and moreover, it is possible to correct favorably an off-axis aberration, and particularly, the coma.

By making so as not to exceed an upper limit value of conditional expression (5), the focal length of the predetermined positive lens unit does not become excessively small. As a result, even when the curvature of field and the chromatic aberration of magnification occur in the predetermined positive lens unit, it is possible to suppress the amount of aberrations that occur. Consequently, it is possible to correct favorably an off-axis aberration at the time of low magnification in particular.

When there is one predetermined positive lens unit, $f_{LGp}$ is the focal length of one predetermined positive lens unit.

Moreover, in a case of a plurality of predetermined positive lens units, lens units from a predetermined positive lens unit positioned nearest to the stop up to a predetermined positive lens unit positioned nearest to the image are to be deemed as one lens unit. Moreover, this one lens unit is to be considered as the predetermined positive lens unit. Consequently, in the case of the plurality of predetermined positive lens units, $f_{LGp}$ is a focal length of this one lens unit. In a case in which, on image side of the stop, the first predetermined positive lens unit, a negative lens unit, and a second predetermined positive lens unit are disposed in order from the object side to the image side, $f_{LGp}$ is a combined focal length of the first predetermined positive lens unit, the negative lens unit, and the second predetermined positive lens unit.

Here, it is preferable that the following conditional expression (5') is satisfied instead of conditional expression (5).

$$0.3 \leq f_{G1}/f_{LGp} \leq 8 \quad (5')$$

Moreover, it is more preferable that the following conditional expression (5") is satisfied instead of conditional expression (5).

$$0.35 \leq f_{G1}/f_{LGp} \leq 4 \quad (5'')$$

Furthermore, it is even more preferable that the following conditional expression (5''') is satisfied instead of conditional expression (5).

$$0.4 \leq f_{G1}/f_{LGp} \leq 2 \quad (5''')$$

In the variable magnification optical system according to the present embodiment, it is preferable that one or more one predetermined positive lens is included, and a high-dispersion glass material is used for the predetermined positive lens.

When the longitudinal chromatic aberration and the chromatic aberration of magnification are corrected between C-line and d-line, sometimes the correction of chromatic aberration about g-line is excessive. Here, generally, a value of a partial dispersion ratio θgf for the high-dispersion glass material is high. Therefore, by using the high-dispersion glass material as a positive lens, it is possible to correct favorably the chromatic aberration about the g-line which is corrected excessively.

Here, the high-dispersion glass material refers to a glass material with Abbe number not more than 30.

In the variable magnification optical system according to the present embodiment, it is preferable that the following conditional expression (6) is satisfied:

$$-1 \leq D_{HGpop}/D_{HGpoi} \leq 0.655 \quad (6),$$

where, $D_{HGpop}$ denotes a distance on the optical axis from a lens surface nearest to the object up to a principal plane on the object side in the predetermined positive lens unit at the high magnification end, and $D_{HGpoi}$ denotes a distance on the optical axis from a lens surface nearest to the object up to a lens surface nearest to the image in the predetermined positive lens unit at the high magnification end.

Here, in a case in which, an object-side principal plane is positioned on the image side of a lens surfaces nearest to the object, of the predetermined positive lens unit, $D_{HGpop}$ assumes a positive value, and in a case in which, the object-side principal plane is positioned on the object side of the lens surface nearest to the object, of the predetermined lens unit, $D_{HGpop}$ assumes a negative value.

By making so as not to fall below a lower limit value of conditional expression (6), it is possible to not let the positive refractive power of the object-side lens surface of the predetermined positive lens unit to be excessively large near the stop where the height of an axial light ray is high. Therefore, it is possible to correct favorably the spherical aberration in particular.

By making so as not to exceed an upper limit value of conditional expression (6), an arrangement of the predetermined positive lens unit is made to be a telephoto arrangement, and it is possible to position a principal point of the predetermined positive lens unit on the object side. By doing so, at the time of high magnification, the predetermined positive lens unit is positioned near the stop. In other words, since the large positive refractive power is imparted to the proximity of the stop, the diverging of an axial light beam and an off-axis light beam is suppressed. Consequently, it is possible to correct the curvature of field sufficiently while suppressing the occurrence of coma. As a result, it is possible to make the optical system small while making the area of observation large, and moreover, it is possible to correct favorably aberrations such as the coma and the curvature of field.

A negative refraction effect may be imparted to the lens unit on the image side of the predetermined positive lens unit. By making such arrangement, it is possible to secure a desired magnification while shortening the overall length of the optical system.

When there is one predetermined positive lens unit, $D_{HGpoi}$ is a distance on the optical axis from a lens surface nearest to the object up to a lens surface nearest to the image in one predetermined positive lens unit. Moreover, when there is a plurality of predetermined positive lens units, $D_{HGpoi}$ is a distance on the optical axis from a lens surface nearest to the object in a predetermined positive lens unit positioned nearest to the object up to a lens surface nearest to the image in a predetermined positive lens unit positioned nearest to the image.

Here, it is preferable that the following conditional expression (6') is satisfied instead of conditional expression (6).

$$-0.7 \leq D_{HGpop}/D_{HGpoi} \leq 0.55 \quad (6')$$

Moreover, it is more preferable that the following conditional expression (6") is satisfied instead of conditional expression (6).

$$-0.3 \leq D_{HGpop}/D_{HGpoi} \leq 0.5 \quad (6'')$$

Furthermore, it is even more preferable that the following conditional expression (6''') is satisfied instead of conditional expression (6).

$$0 \leq D_{HGpop}/D_{HGpoi} \leq 0.3 \quad (6''')$$

In the variable magnification optical system according to the present embodiment, it is preferable that the stop and a predetermined negative lens unit are included, and the predetermined negative lens unit has a negative refractive power, and is disposed to be adjacent to the stop, and the following conditional expression (7) is satisfied:

$$|D_{sGno}/\phi_{Hs}| \leq 1 \quad (7),$$

where, $D_{sGno}$ denotes a distance on the optical axis from the stop up to a lens surface nearest to the stop in the predetermined negative lens unit, and $\phi_{Hs}$ denotes a diameter of the stop at the high magnification end.

In the variable magnification optical system according to the present embodiment, the predetermined negative lens unit is disposed to be adjacent to the stop. Here, the stop and the lens unit are adjacent means that there is no lens unit disposed between the stop and the lens unit. Moreover, by satisfying conditional expression (7), it is possible to dispose a lens unit having a negative refractive power near the stop. Accordingly, it is possible to suppress a fluctuation in the chromatic aberration of magnification due to variable magnification, while correcting favorably the longitudinal chromatic aberration at the time of high magnification in particular. Consequently, even when the stop is fixed at the time of varying magnification, or even when an amount of movement of the stop is made as small as possible, it is possible to correct the longitudinal chromatic aberration favorably while suppressing the fluctuation in the chromatic aberration of magnification due to the variable magnification.

$D_{sGnos}$ is a distance when a value thereof becomes the maximum from the low magnification end to the high magnification end in a case in which, the value of $D_{sGnos}$ changes at the time of varying magnification.

Here, it is preferable that the following conditional expression (7') is satisfied instead of conditional expression (7).

$$|D_{sGno}/\phi_{Hs}| \leq 0.6 \quad (7')$$

Moreover, it is more preferable that the following conditional expression (7") is satisfied instead of conditional expression (7).

$$|D_{sGno}/\phi Hs| \leq 0.4 \quad (7'')$$

Furthermore, it is even more preferable that the following conditional expression (7''') is satisfied instead of conditional expression (7).

$$|D_{sGno}/\phi_{Hs}| \leq 0.3 \quad (7''')$$

In the variable magnification optical system according to the present embodiment, it is preferable that the predetermined negative lens unit includes at least one or more than one positive lens and one or more than one negative lens, and a glass material having a dispersion higher than that of the negative lens is used for the positive lens.

By disposing the positive lens in which the glass material having a high dispersion is used, in the predetermined negative lens unit, it is possible to prevent an effect of correcting the chromatic aberration from becoming excessive. Consequently, it is possible to correct favorably the longitudinal chromatic aberration at the time of high magnification.

Moreover, when the longitudinal chromatic aberration and the chromatic aberration of magnification are corrected between the C-line and the d-line, sometimes, the correction of chromatic aberration about the g-line becomes excessive. Here, generally, the value of the partial dispersion ratio θgf for the high-dispersion glass material is high. Therefore, by using the high-dispersion glass material having a large value of the partial dispersion ratio θgf as the positive lens, it is possible to correct favorably the chromatic aberration about the g-line which is corrected excessively.

In the variable magnification optical system according to the present embodiment, it is preferable that the positive lens and the negative lens are cemented.

The predetermined negative lens unit is disposed to be adjacent to the stop. Here, the height of a light ray becomes high near the stop. Therefore, the positive lens and the negative lens are included in the predetermined negative lens unit disposed near the stop. Since a pair of a positive lens and a negative lens has a large effect of correcting the chromatic aberration, by cementing the pair of lenses, it is possible to suppress the occurrence of chromatic coma.

A variable magnification optical according to a second embodiment is an optical system in which, a magnification ratio varies from a low magnification end to a high magnification end, and which includes at least a first lens unit having a positive refractive power, which is disposed nearest to an object, and a second lens unit having a negative refractive power, which is disposed on an image side of the first lens unit, and a stop which is disposed on the object side of the second lens unit is included, and at a time of varying magnification, the second lens unit moves, and a distance between the first lens unit and the second lens unit changes, and a third lens unit is disposed on an image side of the second lens unit, and the following conditional expression (8) is satisfied:

$$0.15 \leq \Delta_{G2max}/D_{HIGi} \leq 2 \quad (8),$$

where, $\Delta_{G2max}$ denotes a maximum amount of movement from among amounts of movement of the second lens unit on the optical axis, and $D_{HIGi}$ denotes a distance on the optical axis from a lens surface nearest to the object of the third lens unit up to an image plane, at the high magnification end.

The variable magnification optical system according to the second embodiment, by having the abovementioned basic arrangement, and furthermore, by imparting the negative refractive power to the second lens unit and moving the second lens unit, the distance between the first lens unit and the second lens unit is changed, thereby the variable magnification is carried out. Moreover, the stop is disposed on the object side of the second lens unit, and the third lens unit is disposed on the image side of the second lens unit. In the variable magnification optical system according to the second embodiment, the variable magnification is carried out in a state of keeping the conjugate length constant.

Since the technical significance of the basic arrangement has already been explained, the description thereof is omitted here.

By the second lens unit having a negative refractive power, it is possible to make a lens diameter small on the object side of the stop.

Moreover, by disposing the stop on the object side of the second lens unit, even when the stop is fixed at the time of varying magnification, or even when the amount of movement of the stop is made as small as possible, it is possible to suppress a fluctuation in a position of an entrance pupil due to the variable magnification. As a result, irrespective of the variable magnification, it is possible to secure telecentricity appropriately.

Furthermore, the third lens unit is disposed on the image side of the second lens unit.

By making such an optical system, it is possible to make an apparatus small-sized while maintaining a wide area of observation.

The stop may be disposed at an interior of the first lens unit, or may be disposed between the first lens unit and the second lens unit.

In the variable magnification optical system according to the present embodiment, the following conditional expression (8) is satisfied.

By making so as not to fall below a lower limit value of conditional expression (8), it is possible to shorten the overall length of the optical system while securing sufficiently an amount of movement of the second lens unit which mainly bears the load of the variable magnification. Moreover, it is possible to secure a desired ratio of variable magnification without making an absolute value of refractive power excessively large in each of the first lens unit and the second lens unit. Consequently, it is possible to correct favorably various aberrations, and particularly, the curvature of field, in each of the first lens unit and the second lens unit. As a result, it is possible correct an aberration in the overall optical system in a balanced manner, and moreover, to correct favorably an aberration in each lens unit.

By making so as not to exceed an upper limit value of conditional expression (8), a distance from an object-side lens in the third lens unit up to the image plane does not become excessively short at the time of high magnification. Consequently, desired magnification ratio is achieved without the lens arrangement of the third lens unit becoming a telephoto arrangement of extreme degree, at the time of high magnification. As a result, it is possible to correct various aberrations, and particularly, the spherical aberration and the coma, in the third lens unit favorably.

In such manner, in the variable magnification optical system according to the present embodiment, various aberrations are corrected favorably. Consequently, by combining the variable magnification optical system according to the present embodiment with a predetermined image pickup element, it is possible to make an image pickup apparatus small-sized while maintaining a large area of observation.

Here, it is preferable that the following conditional expression (8') is satisfied instead of conditional expression (8).

$$0.2 \leq \Delta_{G2max}/D_{HIGi} \leq 1.7 \tag{8'}$$

Moreover, it is more preferable that the following conditional expression (8") is satisfied instead of conditional expression (8).

$$0.3 \leq \Delta_{G2max}/D_{HIGi} \leq 1.5 \tag{8"}$$

Furthermore, it is even more preferable that the following conditional expression (8''') is satisfied instead of conditional expression (8).

$$0.35 \leq \Delta_{G2max}/D_{HIGi} \leq 1 \tag{8'''}$$

In the variable magnification optical system according to the present embodiment, it is preferable that the following conditional expression (2) is satisfied:

$$0 < BF_L/Y \leq 4.3 \tag{2},$$

where, $BF_L$ denotes the back focus at the low magnification end, and

Y denotes the maximum image height of the overall variable magnification optical system.

Since the technical significance of conditional expression (2) has already been explained, the description thereof is omitted here.

In the variable magnification optical system according to the present embodiment, it is preferable that one or more than one predetermined positive lens is included, and a high-dispersion glass material is used for the predetermined positive lens.

When the longitudinal chromatic aberration and the chromatic aberration of magnification are corrected between the C-line and the d-line, sometimes, the correction of chromatic aberration about the g-line becomes excessive. Here, generally, the value of the partial dispersion ratio θgf for the high-dispersion glass material is high. Therefore, by using the high-dispersion glass material as the positive lens, it is possible to correct favorably the chromatic aberration about the g-line which is corrected excessively.

Here, the high-dispersion glass material refers to a glass material with Abbe number not more than 30.

In the variable magnification optical system according to present embodiment, it is preferable that the following conditional expression (4-1) is satisfied:

$$-2.5 \leq f_{G1}/f_{G2} \leq -0.2 \tag{4-1},$$

where, $f_{G1}$ denotes the focal length of the first lens unit, and $f_{G2}$ denotes the focal length of the second lens unit.

By making so as not to fall below a lower limit value of conditional expression (4-1), the focal length of the second lens unit does not become excessively small. In this case, it is possible to suppress diverging of an axial light beam and diverging of an off-axis light beam in the second lens unit from becoming excessively strong. Consequently, it is possible to correct favorably various aberrations and mainly the coma at the time of low magnification and the spherical aberration at the time of high magnification.

By making so as not to exceed an upper limit value of conditional expression (4-1), the focal length of the second lens unit does not become excessively large. In this case, it is possible to cause a large part of an effect of the variable magnification by a change in the distance between the first lens unit and the second lens unit. Besides, it is possible to achieve a desired ratio of variable magnification without letting an amount of change in the distance between the first lens unit and the second lens unit excessively large. Consequently, it is possible to shorten the overall length of the optical system. Moreover, since the negative refractive power of the second lens unit does not become excessively small, it is possible to correct sufficiently the curvature of field at the time of high magnification in particular.

Here, it is preferable that the following conditional expression (4-1') is satisfied instead of conditional expression (4-1).

$$-2.4 \leq f_{G1}/f_{G2} \leq -0.25 \tag{4-1'}$$

Moreover, it is more preferable that the following conditional expression (4-1'') is satisfied instead of conditional expression (4-1).

$$-2.2 \leq f_{G1}/f_{G2} \leq -0.3 \tag{4-1''}$$

Furthermore, it is even more preferable that the following conditional expression (4-1''') is satisfied instead of conditional expression (4-1).

$$-2 \leq f_{G1}/f_{G2} \leq -0.35 \tag{4-1'''}$$

In the variable magnification optical system according to the present embodiment, it is preferable that the third lens unit has a positive refractive power, and is disposed on the image side of the second lens unit, to be adjacent to the second lens unit, and at the time of varying magnification, a distance between the second lens unit and the third lens unit changes, and the following conditional expression (9) is satisfied:

$$-7.5 \leq f_{G3}/f_{G2} \leq -1 \tag{9}$$

where, $f_{G2}$ denotes the focal length of the second lens unit, and
$f_{G3}$ denotes a focal length of the third lens unit.

The third lens unit having a positive refractive power is disposed on the image side of the second lens unit.

By making so as not to fall below a lower limit value of conditional expression (9), the focal length of the third lens unit does not become excessively large. Consequently, at the low magnification end in particular, while converging an off-axis light beam that has diverged at the second lens unit by the third lens unit, it is possible to suppress the height of a light ray of the off-axis light beam from becoming excessively high. Consequently, it is possible to make the diameter of the optical system thin and moreover, to correct an off-axis aberration favorably.

By making so as not to exceed an upper limit value of conditional expression (9), the focal length of the third lens unit does not become excessively short. Consequently, it is possible to suppress the occurrence of various aberrations, and particularly, the occurrence of coma and chromatic aberration of magnification in the third lens unit. As a result, it is possible to correct favorably various aberrations in the overall optical system and particularly, an off-axis aberration at the time of low magnification.

Here, it is preferable that the following conditional expression (9') is satisfied instead of conditional expression (9).

$$-7 \leq f_{G3}/f_{G2} \leq -1.3 \tag{9'}$$

Moreover, it is more preferable that the following conditional expression (9'') is satisfied instead of conditional expression (9).

$$-6 \leq f_{G3}/f_{G2} \leq -1.7 \tag{9''}$$

Furthermore, it is even more preferable that the following conditional expression (9''') is satisfied instead of conditional expression (9).

$$-5 \leq f_{G3}/f_{G2} \leq -2 \tag{9'''}$$

In the variable magnification optical system according to the present embodiment, it is preferable that a third lens unit having a positive refractive power is disposed on the image side of the second lens unit, and one or more than one lens unit is included on the image side of the third lens unit, and the following conditional expression (10) is satisfied:

$$0.07 \leq f_{HG1G3}/f_{HGI} \leq 1 \tag{10}$$

where, $f_{HG1G3}$ denotes a combined focal length of the first lens unit, the second lens unit, and the third lens unit at the high magnification end, and $f_{HGI}$ denotes a combined focal length of lens units positioned on the image side of the third lens unit at the high magnification end.

By making so as not to fall below a lower limit value of conditional expression (10), the focal length of the lens unit positioned on the image side of the third lens unit does not become excessively large. In this case, it is possible to achieve desired magnification ratio at the time of high magnification without letting the magnification ratio of the lens units positioned on the image side of the third lens unit to be excessively large. Consequently, an aberration occurred in lens units from the first lens unit to the third lens unit, is contracted at the image plane. As a result, it is possible to correct favorably various aberrations, and particularly, the spherical aberration and the longitudinal chromatic aberration at the time of high magnification.

By making so as not to exceed an upper limit value of conditional expression (10), the combined focal length of lens units from the first lens unit up to the third lens unit does not become excessively small. In this case, at the time of high magnification, in a state of the divergence of an off-axis light beam emerged from an object with a large numerical aperture, being suppressed, it is possible to make the off-axis light beam to be incident on the lens unit positioned on the image side of the third lens unit. Consequently, it is possible to correct favorably various aberrations, and particularly, the curvature of field and the chromatic aberration of magnification, while suppressing the occurrence of coma in the lens unit positioned on the image side of the third lens unit.

Here, it is preferable that the following conditional expression (10') is satisfied instead of conditional expression (10).

$$0.08 \leq f_{HG1G3}/f_{HGI} \leq 0.9 \tag{10'}$$

Moreover, it is more preferable that the following conditional expression (10'') is satisfied instead of conditional expression (10).

$$0.1 \leq f_{HG1G3}/f_{HGI} \leq 0.8 \tag{10''}$$

Furthermore, it is even more preferable that the following conditional expression (10''') is satisfied instead of conditional expression (10).

$$0.2 \leq f_{HG1G3}/f_{HGI} \leq 0.7 \tag{10'''}$$

In the variable magnification optical system according to the present embodiment, it is preferable that the second lens unit includes at least one or more than one positive lens and one or more than one negative lens, a glass material having a dispersion higher than a dispersion of the negative lens is used for the positive lens.

By disposing the positive lens using the high-dispersion glass material in the second lens unit having a negative refractive power, it is possible to correct favorably the longitudinal chromatic aberration at the time of high magnification in particular.

When the longitudinal chromatic aberration and the chromatic aberration of magnification are corrected between the C-line and the d-line, sometimes, the correction of chromatic aberration about the g-line becomes excessive. Here, generally, the value of the partial dispersion ratio θgf for the high-dispersion glass material is high. Therefore, by using the high-dispersion glass material having a large value of the partial dispersion ratio θgf as the positive lens, it is possible to correct favorably the chromatic aberration about the g-line which is corrected excessively.

In the variable magnification optical system according to the present embodiment, it is preferable that the second lens unit includes two or more than two negative lenses.

By making such arrangement, it is possible to share negative refractive power of the second lens unit by two or more than two negative lenses. Accordingly, it is possible to suppress the spherical aberration in the second lens unit from being corrected excessively. Consequently, it is possible to correct favorably the spherical aberration in the overall optical system stably irrespective of the variable magnification.

In the variable magnification optical system according to the present embodiment, it is preferable that the first lens unit includes two or more than two sets of cemented lenses.

By making such arrangement, it is possible to correct the longitudinal chromatic aberration favorably while imparting a strong refraction effect to the first lens unit. Furthermore, by the lenses being cemented, it is possible to correct the chromatic aberration of magnification and the chromatic coma favorably.

Particularly, in the variable magnification optical system according to the present embodiment, a function of diverging is imparted to the second lens unit. In such optical system, an aberration in the first lens unit is enlarged by a lens unit positioned on the image side of the first lens unit. Consequently, favorable correction of the longitudinal chromatic aberration and the chromatic aberration of magnification that has been carried out in the first lens unit contributes largely to the favorable correction of the longitudinal chromatic aberration and the chromatic aberration of magnification in the overall optical system.

In the variable magnification optical system according to the present embodiment, it is preferable that one or more than one positive lens and one or more than one negative lens are included on the image side of the third lens unit, and out of the positive lens and the negative lens, an object-side positive lens which is disposed nearest to the object and an image-side negative lens which is disposed nearest to the image satisfy the following conditional expression (11):

$$0.5 \leq D_{Hpn}/D_{Hpi} \leq 0.99 \tag{11}$$

where, $D_{Hpn}$ denotes a distance on the optical axis from an object-side surface of the object-side positive lens up to an image-side surface of the image-side negative lens, at the high magnification end, and $D_{Hpi}$ denotes a distance on the optical axis from the object-side surface up to an image-side surface of the object-side positive lens, at the high magnification end.

By disposing at least one or more than one positive lens and one or more than one negative lens on the image side of the third lens unit, and by adjusting appropriately distances between the lenses, it is possible to shorten the overall length of the optical system while maintaining a state of the off-axis aberration corrected favorably.

By making so as not to fall below a lower limit value of conditional expression (11), it is possible to make the an arrangement of lens units positioned on the image side of the third lens unit to be telephoto arrangement. In this case, since it is possible to shorten a back focus, it is possible to shorten the overall length of the optical system. Moreover, since it is possible to dispose the negative lens at a position at which, a diameter of light beam converged by the positive lens becomes sufficiently small, it is possible to correct the curvature of field favorably.

By making so as not to exceed an upper limit value of conditional expression (11), it is possible to secure the back focus appropriately. Accordingly, even when a ghost image is generated due to multiple reflections between the lens and the image pickup element, it is possible to prevent the ghost image from being incident with a high density on an image pickup element surface.

Here, it is preferable that the following conditional expression (11') is satisfied instead of conditional expression (11).

$$0.55 \leq D_{Hpn}/D_{Hpi} \leq 0.95 \tag{11'}$$

Moreover, it is more preferable that the following conditional expression (11") is satisfied instead of conditional expression (11).

$$0.6 \leq D_{Hpn}/D_{Hpi} \leq 0.93 \tag{11"}$$

Furthermore, it is even more preferable that the following conditional expression (11''') is satisfied instead of conditional expression (11).

$$0.65 \leq D_{Hpn}/D_{Hpi} \leq 0.9 \tag{11'''}$$

A variable magnification optical system according to a third embodiment is an optical system in which, a magnification ratio varies from a low magnification end to a high magnification end, and which includes at least a first lens unit having a positive refractive power, which is disposed nearest to an object, and a second lens unit which is disposed on an image side of the first lens unit, and a conjugate length of the variable magnification optical system at a time of varying magnification, and a lens unit which moves at the time of varying magnification is included, and the following conditional expression (12) is satisfied:

$$0.01 \leq |\Delta_{iomax}/\Delta_{max}| \leq 5 \tag{12},$$

where, $\Delta_{iomax}$ denotes a maximum amount of change from among amounts of change in the conjugate length, and $\Delta_{max}$ denotes a maximum amount of movement from among amounts of movement of the lens unit which moves.

The variable magnification optical system according to the third embodiment has the abovementioned basic arrangement, and furthermore, includes a lens unit which moves at the time of varying magnification. Moreover, in the variable magnification optical system according to the present embodiment, the conjugate length changes with the variable magnification.

Since the technical significance of the basic arrangement has already been explained, the description thereof is omitted here.

In the variable magnification optical system according to the present embodiment, conditional expression (12) is satisfied.

By making so as not to fall below a lower limit value of conditional expression (12), it is possible to secure sufficiently an amount of change in the conjugate length at the time of varying magnification. In this case, at any magnification ratio, it is possible to adjust relative positions of lens units with respect to three positions namely, an object position, an image position, and a stop position, irrespective of distances between the lens units. Consequently, it is possible to correct favorably various aberrations, and particularly, the chromatic aberration of magnification and distortion.

By making so as not to exceed an upper limit value of conditional expression (12), it is possible to not let the amount of change in the conjugate length at the time of varying magnification, to be excessively large. Consequently, without letting the optical system to be large-sized, it is possible to secure sufficiently a space for the movement of lens units which move irrespective of the variable magnification, and moreover to correct an aberration favorably.

In such manner, in the variable magnification optical system according to the present embodiment, various aberrations are corrected favorably. Consequently, by combining the variable magnification optical system according to the present embodiment with a predetermined image pickup element, it is possible to make the image pickup apparatus further smaller in size while maintaining a large area of observation.

Here, it is preferable that the following conditional expression (12') is satisfied instead of conditional expression (12).

$$0.1 \leq |\Delta_{iomax}/\Delta_{max}| \leq 3 \quad (12')$$

Moreover, it is more preferable that the following conditional expression (12") is satisfied instead of conditional expression (12).

$$0.15 \leq |\Delta_{iomax}/\Delta_{max}| \leq 2 \quad (12'')$$

Furthermore, it is even more preferable that the following conditional expression (12''') is satisfied instead of conditional expression (12).

$$0.2 \leq |\Delta_{iomax}/\Delta_{max}| \leq 1 \quad (12''')$$

In the variable magnification optical system according to the present embodiment, it is preferable that the first lens unit includes a first object-side lens which is disposed nearest to the object, and the following conditional expression (13) is satisfied:

$$|\Delta_{wd}/D_{wdmax}| \leq 0.5 \quad (13),$$

where, $\Delta_{wd}$ denotes a maximum amount of change from among amounts of change in a distance from the object up to an object-side surface of the first object-side lens, and $D_{wdmax}$ denotes a maximum distance from among distances from the object up to the object-side surface of the first object-side lens.

An optical system with a large numerical aperture on the object side is used as an optical system of a microscope. In such optical system, since a depth of field is generally small, it is necessary to carry out the adjustment of a distance from the first-object side lens unit to the object with high accuracy. On the other hand, in an actuator used for the variable magnification or for the focusing, generally it is difficult to achieve both namely, a wide driving width and high positional accuracy. For such reasons, by making the driving width small, it is possible to realize higher positional accuracy easily.

By making so as not to exceed an upper limit value of conditional expression (13), it is possible to suppress to be small, an amount of change in the distance from the first object-side lens up to the object caused due to the variable magnification. Therefore, highly accurate positioning of lens units is possible.

Here, it is preferable that the following conditional expression (13') is satisfied instead of conditional expression (13).

$$|\Delta_{wd}/D_{wdmax}| \leq 0.4 \quad (13')$$

Moreover, it is more preferable that the following conditional expression (13") is satisfied instead of conditional expression (13).

$$|\Delta_{wd}/D_{wdmax}| \leq 0.35 \quad (13'')$$

Furthermore, it is even more preferable that the following conditional expression (13''') is satisfied instead of conditional expression (13).

$$|\Delta_{wd}/D_{wdmax}| \leq 0.3 \quad (13''')$$

In the variable magnification optical system according to the present embodiment, it is preferable that the first lens unit moves such that a distance from the first lens unit up to the object is constant.

By making such an arrangement, when an object is placed on a stage, at the time of varying magnification, the stage and the first lens unit move substantially integrally. Accordingly, it is possible to carry out the variable magnification without allowing the distance from the first lens unit up to the object to fluctuate largely. Consequently, it is possible to prevent the variable magnification optical system from hitting the object. Moreover, even when each of the first lens unit and the stage is driven by a separate actuator, there is no substantial shift in the focusing position.

In the abovementioned description, substantially integrally refers to a state of the stage and the first lens unit being driven by the same actuator for the variable magnification. For fine adjustment of the distance from the first lens unit up to the object, as aforementioned, sometimes each of the first lens unit and the stage is driven by a separate actuator. Therefore, in a case in which, the variable magnification is carried out in a state of the fine adjustment of the distance satisfying conditional expression (13), even when separate actuators are used for driving, the stage and the first lens unit are deemed to be driven substantially integrally.

It is preferable that the variable magnification optical system according to the present embodiment is an optical system in which, the magnification ratio varies from a low magnification end to a high magnification end, and which includes in order from an object side, a first lens unit having a positive refractive power, a second lens unit having a positive refractive power, one or two lens units having a positive refractive power, and one or two lens units having a negative refractive power, and at a time of varying magnification, distances between adjacent lens units change. Here, it is preferable that a stop is disposed between the second lens unit and one or two lens units having a positive refractive power. Moreover, it is preferable that the stop moves together with the second lens unit.

More specifically, it is preferable that the variable magnification optical system according to the present embodiment includes five lens units arranged in order of the first lens unit having a positive refractive power, the second lens unit having a positive refractive power, a third lens unit having a positive refractive power, a fourth lens unit having a positive refractive power, and a fifth lens unit having a negative refractive power, from the object side, and at the time of varying magnification, distances between adjacent lens units change.

Here, in the first lens unit, it is preferable that a lens disposed nearest to the image side is a meniscus lens having a convex surface directed toward the image side. Moreover, in the first lens unit, it is preferable that a lens positioned second from the image side is a biconvex positive lens.

Moreover, in the second lens unit, it is preferable that an object-side surface of a lens disposed nearest to the object is a convex surface directed toward the object side. Moreover, in the second lens unit, it is preferable to dispose from the object side toward the image side, a negative meniscus lens having a convex surface directed toward the image side, a biconvex positive lens, and a biconcave negative lens.

Moreover, in the third lens unit, it is preferable that an object-side surface of a lens disposed nearest to the object is a convex surface directed toward the object side. Moreover, in the third lens unit, it is preferable that a lens disposed nearest to the image is a meniscus lens having a convex surface directed toward the object side.

Moreover, in the fourth lens unit, it is preferable that an image-side surface of a lens disposed nearest to the object is a convex surface directed toward the image side. Moreover, in the fourth lens unit, it is preferable that an object-side surface of a lens disposed nearest to the image is a convex surface directed toward the image. Furthermore, in the fourth lens unit, it is preferable that the lens disposed nearest to the object has a positive refractive power. Furthermore, in the fourth lens unit, it is preferable that the lens disposed nearest to the image has a negative refractive power.

Moreover, in the fifth lens unit, it is preferable that a lens disposed nearest to the object directs a convex surface toward the image side. Moreover, in the fifth lens unit, it is preferable that an object-side surface of a lens disposed nearest to the image is a convex surface directed toward the image side. Furthermore, in the fifth lens unit, it is preferable that the lens disposed nearest to the object has a positive refractive power. Moreover, in the fifth lens unit, it is preferable that the lens disposed nearest to the image has a negative refractive power.

Moreover, it is preferable that a variable magnification optical system according to the present embodiment is an optical system in which, a magnification ratio varies from a low magnification end to a high magnification end, and which includes in order from an object side, a first lens unit having a positive refractive power, a second lens unit having a negative refractive power, a third lens unit having a positive refractive power, and a fourth lens unit having a positive refractive power, and at a time of varying magnification, distances between adjacent lens units change.

Here, it is preferable that a stop is disposed in the first lens unit, or between the first lens unit and the second lens unit.

Here, in the first lens unit, it is preferable that a lens disposed nearest to the image is a planoconvex lens. Moreover, in the first lens unit, it is preferable that a lens disposed nearest to the image has a positive refractive power.

Moreover, in the second lens unit, it is preferable that an image-side surface of a lens disposed nearest to the object is a convex surface directed toward the object side. Moreover, in the second lens unit, it is preferable that a lens disposed nearest to the image directs a convex surface toward the object side. In the second lens unit, it is preferable that the lens disposed nearest to the object has a negative refractive power. Moreover, in the second lens unit, it is preferable that the lens disposed nearest to the image has a positive refractive power.

In the third lens unit, it is preferable that a lens disposed nearest to the object is a biconvex positive lens. Moreover, in the third lens unit, it is preferable that an image-side surface of a lens disposed nearest to the image is a convex surface directed toward the object side.

In the fourth lens unit, it is preferable that an object-side surface of a lens disposed nearest to the object has a convex surface directed toward the object side. Moreover, in the fourth lens unit, it is preferable that an image-side surface of a lens nearest to the image is a convex surface directed toward the object side. Furthermore, in the fourth lens unit, it is preferable that the lens disposed nearest to the object has a positive refractive power.

It is preferable that the variable magnification optical system according to the present embodiment is an optical system in which, a magnification ratio varies from a low magnification end to a high magnification end, and which includes in order from an object side, one or two lens units having a positive refractive power, one lens unit having a negative refractive power, one or two lens units having a positive refractive power, and one or two lens units having a negative refractive power, and at a time of a variable magnification, distances between adjacent lens units change.

Here, it is preferable that a stop is disposed in one or two lens units having a positive refractive power which is positioned nearest to the object, or between one or two lens units having a positive refractive power which is positioned nearest to the object, and one lens unit having a negative refractive power.

More specifically, it is preferable that the variable magnification optical system according to the present embodiment includes five lens units which are disposed in order of a first lens unit having a positive refractive power, a second lens unit having a positive refractive power, a third lens unit having a negative refractive power, a fourth lens unit having a positive refractive power, and a fifth lens unit having a negative refractive power, from the object side, and at the time of varying magnification, distances between adjacent lens units change.

Here, in the first lens unit, it is preferable that a lens disposed nearest to the object is a meniscus lens having a convex surface directed toward the image side. Moreover, in the first lens unit, it is preferable that an object-side surface of a lens disposed nearest to the image is a convex surface directed toward the object side. In the first lens unit, it is preferable that the lens disposed nearest to the object has a positive refractive power. Moreover, in the first lens unit, it is preferable that the lens disposed nearest to the image has a positive refractive power.

In the second lens unit, it is preferable that a lens disposed nearest to the object is a meniscus lens having a convex surface directed toward the image side. Moreover, in the second lens unit, it is preferable that a lens disposed nearest to the image is a meniscus lens having a convex surface directed toward the image side. In the second lens unit, it is preferable that the lens disposed nearest to the object has a positive refractive power. Moreover, in the second lens unit, it is preferable that the lens disposed nearest to the image has a negative refractive power.

In the third lens unit, it is preferable that a lens disposed nearest to the object is a meniscus lens having a convex surface directed toward the image side. Moreover, in the third lens unit, it is preferable that a lens disposed nearest to the image is a meniscus lens having a convex surface directed toward the image side. Furthermore, in the third lens unit, it is preferable that the lens disposed nearest to the object has a positive refractive power. Also, in the third lens unit, it is preferable that the lens disposed nearest to the image has a negative refractive power.

In the fourth lens unit, it is preferable that a lens disposed nearest to the object is a biconvex positive lens. Moreover, in the fourth lens unit, it is preferable that a lens disposed nearest to the image is a biconcave negative lens. Furthermore, it is preferable that the fourth lens unit includes in order from the object side, a biconvex positive lens, a biconvex positive lens, and a biconcave negative lens.

In the fifth lens unit, it is preferable that an object-side surface of a lens disposed nearest to the object is a convex surface directed toward object side. Moreover, in the fifth lens unit, it is preferable that a lens disposed nearest to the image is a biconcave negative lens. Furthermore, in the fifth lens unit, it is preferable that the lens disposed nearest to the image has a negative refractive power.

It is preferable that adjacent lenses from among the lenses forming the lens units are resin lenses. In this case, the number of adjacent lenses may be two or more than two.

By making such arrangement, it is possible to make the lens units light-weight. Moreover, since the lenses are formed of a resin material, as a method for holding lenses, a method of press-fitting the lenses in a lens holder and a method in which, a lens holder structure is formed on an edge of one of the lenses, and another lens is fitted in the lens holder structure can be used. By using such method, it is possible to reduce decentering of lenses.

An image pickup apparatus according to the present embodiment includes an image pickup element and a variable magnification optical system, and an optical image is formed on the image pickup element by the variable magnification optical system, and the variable magnification optical system is an optical system in which, a magnification ratio varies from a low magnification end to a high magnification end, and includes at least a first lens unit having a positive refractive power, which is disposed nearest to an object, and a second lens unit which is disposed on an image side of the first lens unit, and at a time of varying magnification, a distance between the first lens unit and the second lens unit is variable, and the following conditional expressions (14) and (15) are satisfied:

$$3000 \leq 2 \times Y/p \qquad (14),$$

and $$0.08 \leq NA_H \qquad (15),$$

where,

Y denotes a maximum image height in the overall variable magnification optical system, p denotes a pixel pitch of the image pickup element, and $NA_H$ denotes a numerical aperture on the object side of the variable magnification optical system at the high magnification end.

The variable magnification optical system used in the image pickup apparatus according to the present embodiment has the abovementioned basic arrangement. Since the technical significance of the basic arrangement has already been explained, the description thereof is omitted here.

In the image pickup apparatus according to the present embodiment, conditional expressions (14) and (15) are satisfied.

An example of the image pickup apparatus is a microscope. In a microscope, generally, the field number is about 22 mm. The field number 22 mm, when converted to the image height of the variable magnification optical system, is about 11 mm.

Therefore, in a case of using the variable magnification optical system according to the present embodiment for an optical system of a microscope, for achieving the area of observation corresponding to the field number 22 mm, it is necessary that an aberration of the variable magnification optical system is corrected up to the image height of about 11 mm.

In a digital microscope, an image of an object image picked up is observed on a monitor. In the digital microscope, when the pixel pitch of the image pickup element is sufficiently small with respect to the image height, the area of observation corresponding to the field number 22 mm is achieved even when the image height is small. Moreover, even without making the image height larger than 11 mm (corresponding to the field number 22 mm), the area of observation corresponding to even larger field number is achieved. In this case, it is needless to mention that the variable magnification optical system is sought to have a higher resolving power.

In a normal microscope, an airy-disc diameter at a primary imaging surface is about 28 μm. Taking this into consideration, by satisfying conditional expressions (14) and (15), it is possible to secure sufficiently a high resolving power in the variable magnification optical system. In this case, it is possible to achieve an image of an object with a sufficiently small sampling pitch corresponding to the image height. Consequently, it is possible to achieve the area of observation with a field number of about 22 mm, or a wide area of observation corresponding to field number 22 or more, without letting the image height in the variable magnification optical system to be larger than 11 mm.

For instance, when the pixel pitch of the image pickup element is 3 μm, the image height of 4.5 mm is a lower limit value of conditional expression (14). In this case, if an aberration is corrected favorably up to the image height of 4.5 mm in the variable magnification optical system, it is possible to realize the area of observation corresponding to the field number 22 mm. Moreover, when the image height at which an aberration is corrected favorably is let to be 9 mm, irrespective of the image height being smaller as compared to the image height in the normal microscope, it is possible realize wide area of observation corresponding to the field number 44 mm.

In such manner, by satisfying conditional expressions (14) and (15), it is possible to capture an area of observation same as or wider than an area of observation in a normal microscope, with high resolving power, without letting the image height in the variable magnification optical system to be larger than the image height corresponding to the field number in a normal microscope. Consequently, it is possible to realize an image pickup apparatus which is small-sized and which also enables to achieve an image with a high resolving power, while maintaining a wide area of observation.

For realizing an image pickup apparatus having a smaller size and wide area of observation, it is desirable that the pixel pitch of the image pickup element is not more than 3 μm.

Here, it is preferable that the following conditional expression (14') is satisfied instead of conditional expression (14).

$$3500 \leq 2 \times Y/p \quad (14')$$

Moreover, it is more preferable that the following conditional expression (14") is satisfied instead of conditional expression (14).

$$4000 \leq 2 \times Y/p \quad (14'')$$

Furthermore, it is even more preferable that the following conditional expression (14''') is satisfied instead of conditional expression (14).

$$4800 \leq 2 \times Y/p \quad (14''')$$

Here, it is preferable that the following conditional expression (15') is satisfied instead of conditional expression (15).

$$0.1 \leq NA_H \quad (15')$$

Moreover, it is more preferable that the following conditional expression (15") is satisfied instead of conditional expression (15).

$$0.12 \leq NA_H \quad (15'')$$

Furthermore, it is even more preferable that the following conditional expression (15''') is satisfied instead of conditional expression (15).

$$0.2 \leq NA_H \quad (15''')$$

In the image pickup apparatus according to the present embodiment, it is preferable that the following conditional expression (16) is satisfied:

$$1.0 < \varepsilon_{H90}/p < 10 \quad (16),$$

where, $\varepsilon_{H90}$ denotes a diameter of a 90% encircled energy of a point spread function on a best image plane when a point image for wavelength e-line was formed near a substantial center of the image pickup element, at the high magnification end of the variable magnification optical system, and p denotes a pixel pitch of the image pickup element.

In a digital microscope, by imparting an imaging performance proportional to the pixel pitch of the image pickup element, it is possible to small-size the image pickup apparatus with the high resolving power maintained as it is. The high resolving power is necessary at the time of high magnification in particular.

Since the point spread function has an expanse, light demonstrating the point spread function is received by the plurality of pixels. However, in the point spread function, the light intensity at the periphery decreases rapidly, as compared to the light intensity at the center. In this case, most of the light, in other words, most of the energy, is concentrated near the center of a point image. Therefore, when most of the light, which is the encircled energy, is incident on one pixel positioned at the center of the point image, it is possible to achieve a high resolving power.

By making so as not to fall below a lower limit value of conditional expression (16), since it is possible to carry out sampling with sufficiently small pitch corresponding to the imaging performance of the variable magnification optical system, it is possible to realize a high resolving power. Moreover, since there is no need to form an image of structures having a frequency component higher than the sampling pitch with high contrast, it is possible to make the optical system small-sized.

By making so as not to exceed an upper limit value of conditional expression (16), most of the light of the encircled energy is incident on one pixel. Consequently, in a case in which, the object has a pattern of light and dark for instance, it is possible to form an optical image of the object with a sufficiently high contrast till the pitch of light and dark becomes about Nyquist frequency of the image pickup element.

In such manner, in the variable magnification optical system to be used in the image pickup apparatus according to the present embodiment, various aberrations are corrected up to a degree such that most of the light of encircled energy is incident on one pixel. Consequently, by combining the variable magnification optical system according to the present embodiment with a predetermined image pickup element, further small-sizing of the image pickup apparatus is possible while maintaining a large area of observation.

Here, it is preferable that the following conditional expression (16') is satisfied instead of conditional expression (16).

$$2 < \varepsilon_{H90}/p < 9 \quad (16')$$

Moreover, it is more preferable that the following conditional expression (16") is satisfied instead of conditional expression (16).

$$3 < \varepsilon_{H90}/p < 8 \quad (16'')$$

Furthermore, it is even more preferable that the following conditional expression (16''') is satisfied instead of conditional expression (16).

$$4 < \varepsilon_{H90}/p < 6 \quad (16''')$$

In the image pickup apparatus according to the present embodiment, it is preferable that the following conditional expression (17) is satisfied:

$$0.06 < NA'_H \quad (17),$$

where, $NA'_H$ denotes a numerical aperture on the image side of the variable magnification optical system at the high magnification end.

By making large the numerical aperture on the image side of the variable magnification optical system, image formation with a favorable resolving power on an image pickup element with a small pixel pitch is possible. Moreover, as it has been mentioned above, in the observation at the time of high magnification, a higher resolving power is necessary. Therefore, by satisfying conditional expression (17) at the time of high magnification, even in a case in which, an image pickup element with the pixel pitch not larger than 3 μm is used, a favorable image formation is possible in the variable magnification optical system. Moreover, by combining this variable magnification optical system with an image pickup element with a small pixel pitch, it is possible to make the size of the apparatus further smaller while maintaining a large area of observation.

Here, it is preferable that the following conditional expression (17') is satisfied instead of conditional expression (17).

$$0.08 < NA'_H \quad (17')$$

Moreover, it is more preferable that the following conditional expression (17") is satisfied instead of conditional expression (17).

$$0.1 < NA'_H \quad (17'')$$

Furthermore, it is even more preferable that the following conditional expression (17''') is satisfied instead of conditional expression (17).

$$0.12 < NA'_H \quad (17''')$$

In the image pickup apparatus according to the present embodiment, it is preferable that the following conditional expression (18) is satisfied:

$$-7 < LT_L/p < 7 \quad (18),$$

where, $LT_L$ denotes a distance between centers of gravity at the low magnification end of the variable magnification optical system, and the distance between the centers of gravity is a distance between a center of gravity of the point spread function about a C-line and a center of gravity of the point spread function about a d-line, at a position which is 70% of the maximum image height, and p denotes the pixel pitch of the image pickup element.

In the observation at the time of low magnification, the imaging performance in a peripheral portion of the image becomes significant. At the time of low magnification, particularly, small chromatic aberration of magnification of the peripheral portion is sought in the variable magnification optical system. Chromatic blurring developed in the image due to the chromatic aberration of magnification can be suppressed to some extent by carrying out digital correction (image processing). However, when an amount of chromatic blurring which is caused due to the chromatic aberration of magnification of the variable magnification optical system is excessively large with respect to the pixel pitch, the chromatic blurring cannot be corrected sufficiently even by digital correction.

By making so as not to fall below a lower limit value of conditional expression (18), as well as by making so as not to exceed an upper limit value of conditional expression (18), it is possible to make small an amount of the chromatic aberration of magnification developed at the time of low magnification. Accordingly, since the occurrence of chromatic blurring in the peripheral area of the image is suppressed favorably even at the time of low magnification, there is no need of digital correction. Or, even if there is a need of digital correction, favorable digital correction of the chromatic blurring is possible. As a result, it is possible to suppress favorably the chromatic blurring at the time of observation.

In a case in which, an aberration is rotationally asymmetric due to a manufacturing error, the point spread function also become asymmetric. In such a case, $LT_L$ may be calculated from a position of the maximum intensity in point spread function and not from the center of gravity of the point spread function.

Here, it is preferable that the following conditional expression (18') is satisfied instead of conditional expression (18).

$$-5 < LT_L/p < 5 \quad (18')$$

Moreover, it is more preferable that the following conditional expression (18'') is satisfied instead of conditional expression (18).

$$-4 < LT_L/p < 4 \quad (18'')$$

Furthermore, it is even more preferable that the following conditional expression (18''') is satisfied instead of conditional expression (18).

$$-3 < LT_L/p < 3 \quad (18''')$$

In the image pickup apparatus according to the present embodiment, it is preferable that the following conditional expression (19) is satisfied:

$$-50 < AT_H/p < 50 \quad (19),$$

where, $AT_H$ denotes a difference between the best focus position about a C-line and the best focus position about a d-line, near a substantial center of the image pickup element, and p denotes the pixel pitch of the image pickup element.

In the observation at the time of high magnification, the imaging performance in a central portion of the image becomes significant. At the time of high magnification, high resolving power is necessary, and particularly, small longitudinal chromatic aberration is sought in the variable magnification optical system. Here, in a case in which, the pixel pitch is large, by making the numerical aperture on the image side small, and by making the spherical aberration large, a depth of focus is made large, and accordingly, it is possible to reduce chromatic blurring which is caused due to the longitudinal chromatic aberration.

However, when the pixel pitch becomes small, it becomes difficult to make the numerical aperture on the image side small, and to make the depth of focus large. Therefore, by making so as not to fall below a lower limit value of conditional expression (19), as well as by making so as not to exceed an upper limit value of conditional expression (19), even in a case in which, an image pickup element with a small pixel pitch is used, it is possible to suppress favorably the occurrence of chromatic blurring at the central portion of the image even at the time of high magnification.

Here, it is preferable that the following conditional expression (19') is satisfied instead of conditional expression (19).

$$-40 < AT_H/p < 40 \quad (19')$$

Moreover, it is more preferable that the following conditional expression (19'') is satisfied instead of conditional expression (19).

$$-35 < AT_H/p < 35 \quad (19'')$$

Furthermore, it is even more preferable that the following conditional expression (19''') is satisfied instead of conditional expression (19).

$$-30 < AT_H/p < 30 \quad (19''')$$

In the image pickup apparatus according to the present embodiment, it is preferable that the following conditional expressions (20) and (21) are satisfied:

$$-7° < CRA_{Lobj} < 7° \quad (20),$$

and $$-7° < CRA_{Hobj} < 7° \quad (21),$$

where, $CRA_{Lobj}$ denotes an angle made by an object-side principal ray with an optical axis, at the low magnification end, and $CRA_{Hobj}$ denotes an angle made by the object-side principal ray with the optical axis, at the high magnification end, and here, the object-side principal ray is a principal ray that reaches a position at 90% of the maximum image height, from among principal rays that are incident on the first lens unit, and regarding the sign of the angle, the angle is let to be negative when measured in a clockwise direction from the optical axis and the angle is let to be positive when measured in a counterclockwise direction from the optical axis.

By making so as not to fall below lower limit values of conditional expressions (20) and (21), as well as by making so as not to exceed an upper limit values of conditional expressions (20) and (21), it is possible to secure appropriately the telecentricity on the image side, in the variable magnification optical system. In other words, it is possible to make an off-axis principal ray that is incident from the object to the first lens unit more parallel to the optical axis. Accordingly, it is possible to make the variable magnification optical system to be used in the image pickup apparatus according to the present embodiment an optical system which is telecentric more on the object side. An angle made by an object-side principal ray and the optical axis is an angle at an arbitrary position between an object plane and an object-side lens surface of the first lens unit.

In the optical system which is telecentric on the object side, a fluctuation in the magnification ratio is less. In other words, even when a distance from the optical system up to the object changes to some extent, it is possible to suppress a fluctuation in a size of an optical image formed by the optical system. For such reason, in a case in which, the optical system to be used in the image pickup apparatus according to the present embodiment is used for measuring dimensions, even when an object position with respect to the optical system changes to certain extent, and accordingly, there is some change in a distance from the optical system up to the object, the fluctuation in the size of the optical image is small. Therefore, in the image pickup apparatus according to the present embodiment, even when the distance from the optical system up to the object changes to some extent, it is possible to measure the size of the object accurately. The size of the object is a size in a plane perpendicular to the optical axis.

Here, it is preferable that the following conditional expression (20') is satisfied instead of conditional expression (20).

$$-6° < CRA_{Lobj} < 6° \quad (20')$$

Moreover, it is more preferable that the following conditional expression (20") is satisfied instead of conditional expression (20).

$$-5.5° < CRA_{Lobj} < 5.5° \quad (20'')$$

Furthermore, it is even more preferable that the following conditional expression (20''') is satisfied instead of conditional expression (20).

$$-5° < CRA_{Lobj} < 5° \quad (20''')$$

Here, it is preferable that the following conditional expression (21') is satisfied instead of conditional expression (21).

$$-6° < CRA_{Hobj} < 6° \quad (21')$$

Moreover, it is more preferable that the following conditional expression (21") is satisfied instead of conditional expression (21).

$$-5.5° < CRA_{Hobj} < 5.5° \quad (21'')$$

Furthermore, it is even more preferable that the following conditional expression (21''') is satisfied instead of conditional expression (21).

$$-5° < CRA_{Hobj} < 5° \quad (21''')$$

In the image pickup apparatus according to the present embodiment, it is preferable that focusing is carried out automatically while detecting an image contrast of an optical image.

By carrying out the focusing automatically, a user is able to carry out smoothly an observation with different magnification ratios.

It is preferable to make the variable magnification in the variable magnification optical system can be carried out also automatically. By making such arrangement, the user, at the time of carrying out observation with different magnification ratios, is able to change to different magnification ratio by one-touch. Moreover, automation of a general observation at the low magnification and a minute observation at the high magnification is possible by a series of sequences.

In the image pickup apparatus according to the present embodiment, it is preferable to carry out focusing by moving the image pickup element in an optical axial direction.

For making large the numerical aperture on the object side of the variable magnification optical system at the time of high magnification, and for realizing correction of various aberrations, in many cases, the distance from the variable magnification optical system up to the object is to be shortened. However, in an optical system in which, the distance from the variable magnification optical system up to the object has been shortened, when a method of focusing by changing the distance up to the object is adopted, the optical system hits the object, and there is a possibility that either the optical system or the object is damaged.

In a case of focusing automatically while detecting the contrast of the image, since it is necessary to have a large amount of movement of the optical system or the stage in general, as compared to a case in which, the user carries out focusing manually, the possibility of the optical system hitting the object is high.

For focusing without letting the distance from the variable magnification optical system up to the object to change, there is a method of moving a lens unit other than a lens unit positioned nearest to the object, and a method of moving the image pickup element. Here, since the fluctuation in the magnification ratio due to focusing and fluctuation in aberration are suppressed, the method of moving the image pickup element is desirable as the method for focusing.

Since the depth of focus on the image side is large in a normal microscope, in a case of focusing by moving the image pickup element, it was necessary to make the amount of movement of the image pickup element extremely large. Whereas, the depth of focus on the image side is comparatively smaller in the variable magnification optical system according to the present embodiment. Consequently, it is possible to make the amount of movement of the image pickup element small. For such reason, as a method for focusing, the method of focusing by moving the image pickup apparatus in the optical axial direction is suitable.

The image pickup apparatus according to the present embodiment includes one of the abovementioned variable magnification optical systems, and an image pickup element.

An image pickup system according to the present embodiment includes one of the abovementioned image pickup apparatuses, a stage which hold an object to be observed, and a light source which illuminates the object.

By including the stage which holds the object to be observed, it is possible to hold stably a position of the object with respect to the image pickup apparatus. Accordingly, in a case in which, a predetermined image pickup element is used, since it is possible to optimize the resolving power of the image pickup element, it is possible to achieve a favorable image.

Furthermore, by irradiating light to the object by a illumination unit, it is possible to reduce noise at the time of capturing an image. As a result, it is possible to achieve an image with high resolution.

In the image pickup system according to the present embodiment, it is preferable to carry out focusing by moving the stage in an optical axial direction.

In the variable magnification optical system to be used in the image pickup apparatus according to the present embodiment, by satisfying conditional expressions (20) and (21), the optical system becomes an optical system which is telecentric on the object side. In the optical system in which, the telecentricity is secured on the object side, in a case of focusing by changing the distance up to the object, a fluctuation in the magnification ratio due to focusing and a fluctuation in the size of the image due to distortion are suppressed. Consequently, it is possible to measure the size of the object more accurately.

As a method for changing the distance up to the object, a method of moving the optical system and the image pickup element, and a method of moving the stage are available. However, by adopting the method of moving the stage, it is possible to make a moving body comparatively light-weight. As a result, highly accurate focusing is possible.

For each conditional expression, it is preferable to restrict one of or both of a lower limit value and an upper limit value, as this enables to have that function in more assured manner. Moreover, for each conditional expression, only an upper limit value or a lower limit value of a numerical range of a further restricted conditional expression may be restricted. While restricting the numerical range of a conditional expression, an upper limit value or a lower limit value of each conditional expression may be let to be an upper limit value or a lower limit value of another conditional expression.

Examples of the variable magnification optical system according to certain aspects of the present invention will be described below in detail by referring to the accompanying diagrams. However, the present invention should not be construed as being limited by these examples. Moreover, as to whether the refractive power is positive or negative is based on a paraxial radius of curvature.

Figure 1B:
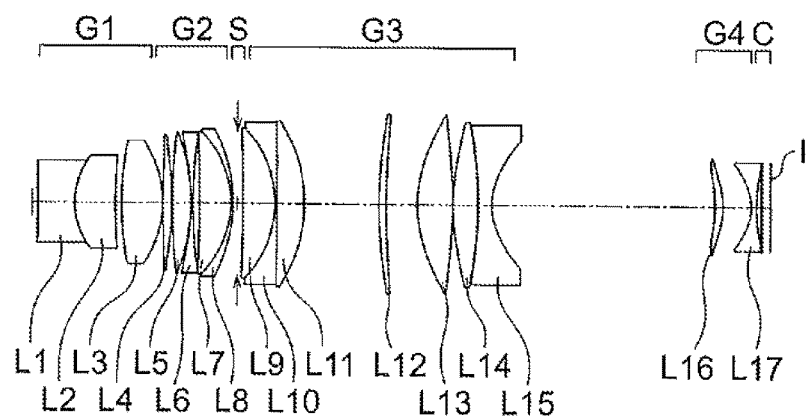

A variable magnification optical system according to an example 1 will be described below. FIG. 1A and FIG. 1B are cross-sectional views (lens cross-sectional views) along an optical axis showing an optical arrangement at the time of infinite object point focusing of the variable magnification optical system according to the example 1. FIG. 1A is a cross-sectional view at a low magnification end, and FIG. 1B is a cross-sectional view at a high magnification end. In all the following examples, in cross-sectional views, C denotes a cover glass and I denotes an image pickup surface of an image pickup element.

FIG. 2A, FIG. 2B, FIG. 2C, FIG. 2D, FIG. 2E, FIG. 2F, FIG. 2G, and FIG. 2H are aberration diagrams at the time of infinite object point focusing of the variable magnification optical system according to the example 1. Here, "FIY" denotes an image height. Symbols in the aberration diagrams are same for all the examples to be described later.

In the aberration diagrams, FIG. 2A, FIG. 2B, FIG. 2C, and FIG. 2D show a spherical aberration (SA), an astigmatism (AS), a distortion (DT), and a chromatic aberration of magnification (CC) respectively, at the low magnification end.

Moreover, in the aberration diagrams, FIG. 2E, FIG. 2F, FIG. 2G, and FIG. 2H show a spherical aberration (SA), an astigmatism (AS), a distortion (DT), and a chromatic aberration of magnification (CC) respectively, at the high magnification end.

The variable magnification optical system according to the example 1, as shown in FIG. 1A and FIG. 1B, includes in order from an object side, a first lens unit G1 having a positive refractive power, a second lens unit G2 having a positive refractive power, an aperture stop S, a third lens unit G3 having a positive refractive power, and a fourth lens unit G4 having a negative refractive power. In examples from the example 1 to example 19, in the lens cross-sectional views, S denotes a stop (hereinafter, referred to as an aperture stop), C denotes the cover glass, and I denotes the image pickup surface of the image pickup element.

The first lens unit G1 includes a biconcave negative lens L1, a positive meniscus lens L2 having a convex surface directed toward the object side, and a biconvex positive lens L3. Here, the biconcave negative lens L1 and the positive meniscus lens L2 are cemented.

The second lens unit G2 includes a biconvex positive lens L4, a biconvex positive lens L5, a biconcave negative lens L6, a positive meniscus lens L7 having a convex surface directed toward an image side, and a negative meniscus lens L8 having a convex surface directed toward the image side. Here, the positive meniscus lens L7 and the negative meniscus lens L8 are cemented.

The third lens unit G3 includes a positive meniscus lens L9 having a convex surface directed toward the image side, a negative meniscus lens L10 having a convex surface directed toward the image side, a positive meniscus lens L11 having a convex surface directed toward the image side, a positive meniscus lens L12 having a convex surface directed toward the object side, a biconvex positive lens L13, a biconvex positive lens L14, and a biconcave negative lens L15. Here, the positive meniscus lens L9, the negative meniscus lens L10, and the positive meniscus lens L11 are cemented.

The fourth lens unit G4 includes a positive meniscus lens L16 having a convex surface directed toward the image side and a biconcave negative lens L17.

The aperture stop S is disposed between the second lens unit G2 and the third lens unit G3. More specifically, the aperture stop S is disposed on the image side of the second lens unit G2, near the negative meniscus lens L8.

At the time of varying magnification from a low magnification end to a high magnification end, the first lens unit G1 is fixed, the second lens unit G2 moves toward the object side, the aperture stop S moves together with the second lens unit G2 toward the object side, the third lens unit G3 moves toward the object side, and the fourth lens unit G4 is fixed. Here, "a lens unit is fixed" means that the lens unit is stationary.

Moreover, at the time of varying magnification from the low magnification end to the high magnification end, distances between the lens units change as follows. A distance between the first lens unit G1 and the second lens unit G2 narrows. A distance between the second lens unit G2 and the third lens unit G3 narrows. A distance between the third lens unit G3 and the fourth lens unit G4 widens.

An aspheric surface is used for 20 surfaces namely, both surfaces of the biconvex positive lens L3, both surfaces of the biconvex positive lens L4, both surfaces of the biconvex positive lens L5, both surfaces of the biconcave negative lens L6, both surfaces of the positive meniscus lens L12, both surfaces of the biconvex positive lens L13, both surfaces of the biconvex positive lens L14, both surfaces of the biconcave negative lens L15, both surface of the positive meniscus lens L16, and both surfaces of the biconcave negative lens L17.

The variable magnification optical system according to the present example is an optical system suitable for an image pickup element having a pixel pitch of 1.1 µm. The third lens unit G3 corresponds to a predetermined positive lens unit. The fourth lens unit G4 includes a resin lens.

Figure 3A:
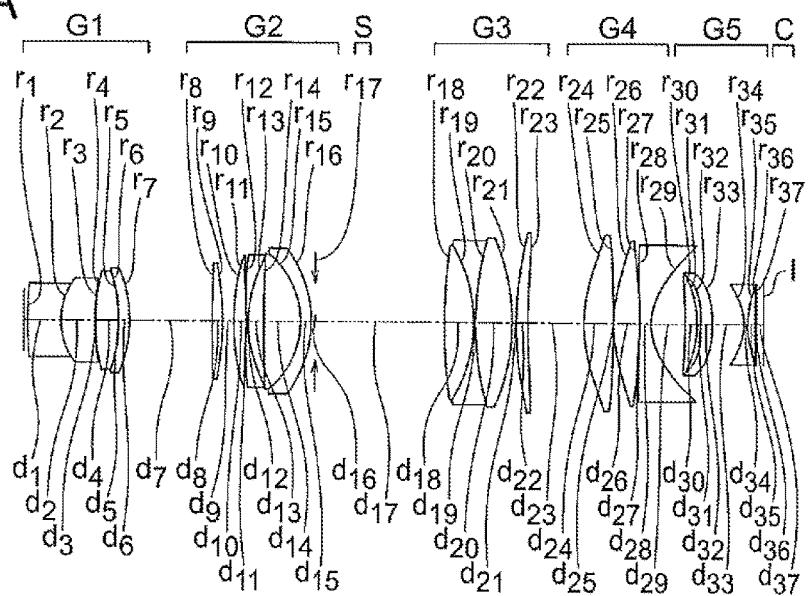
FIG. 3A, FIG. 3B, and FIG. 3C are cross-sectional views along an optical axis showing an optical arrangement at the time of infinite object point focusing of a variable magnification optical system according to an example 2.
Figure 3B:
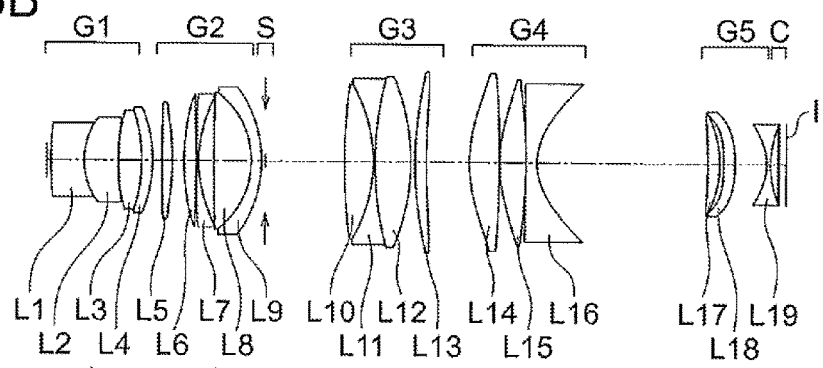
Figure 3C:
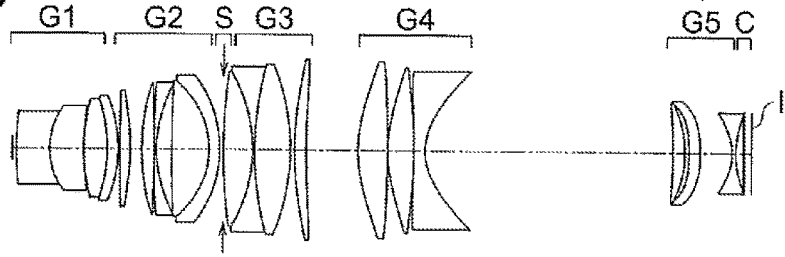

Next, a variable magnification optical system according to an example 2 will be described below. FIG. 3A, FIG. 3B, and FIG. 3C are cross-sectional views along an optical axis showing an optical arrangement at the time of infinite object point focusing of the variable magnification optical system according to the example 2. FIG. 3A is a cross-sectional view at a low magnification end, FIG. 3B is a cross-sectional view of an intermediate state, and FIG. 3C is a cross-sectional view at a high magnification end. Even in the examples from an example 3 to example 19 to be described later, lens cross-sectional views and aberration diagrams at the low magnification end, the intermediate state, and the high magnification end are shown.

FIG. 4A, FIG. 4B, FIG. 4C, FIG. 4D, FIG. 4E, FIG. 4F, FIG. 4G, FIG. 4H, FIG. 4I, FIG. 4J, FIG. 4K, and FIG. 4L are aberration diagrams at the time of infinite object point focusing of the variable magnification optical system according to the example 2. In these aberration diagrams, FIG. 4A, FIG. 4B, FIG. 4C, and FIG. 4D show a spherical aberration (SA), an astigmatism (AS), a distortion (DT), and a chromatic aberration of magnification (CC) respectively, at the low magnification end.

FIG. 4E, FIG. 4F, FIG. 4G, and FIG. 4H show a spherical aberration (SA), an astigmatism (AS), a distortion (DT), and a chromatic aberration of magnification (CC) respectively, in the intermediate state.

FIG. 4I, FIG. 4J, FIG. 4K, and FIG. 4L show a spherical aberration (SA), an astigmatism (AS), a distortion (DT), and a chromatic aberration of magnification (CC) respectively, at the high magnification end.

The variable magnification optical system according to the example 2, as shown in FIG. 3A, FIG. 3B, and FIG. 3C, includes in order from an object side, a first lens unit G1 having a positive refractive power, a second lens unit G2 having a positive refractive power, an aperture stop S, a third lens unit G3 having a positive refractive power, a fourth lens unit G4 having a positive refractive power, and a fifth lens unit G5 having a negative refractive power.

The first lens unit G1 includes a negative meniscus lens L1 having a convex surface directed toward the object side, a positive meniscus lens L2 having a convex surface directed toward the object side, a biconvex positive lens L3, and a positive meniscus lens L4 having a convex surface directed toward an image side. Here, the negative meniscus lens L1 and the positive meniscus lens L2 are cemented.

The second lens unit G2 includes a biconvex positive lens L5, a biconvex positive lens L6, a biconcave negative lens L7, a biconvex positive lens L8, and a negative meniscus lens L9 having a convex surface directed toward the image side. Here, the biconvex positive lens L8 and the negative meniscus lens L9 are cemented.

The third lens unit G3 includes a biconvex positive lens L10, a biconcave negative lens L11, a biconvex positive lens L12, and a positive meniscus lens L13 having a convex surface directed toward the object side. Here, the biconvex positive lens L10, the biconcave negative lens L11, and the biconvex positive lens L12 are cemented.

The fourth lens unit G4 includes a biconvex positive lens L14, a biconvex positive lens L15, and a biconcave negative lens L16.

The fifth lens unit G5 includes a positive meniscus lens L17 having a convex surface directed toward the image side, a positive meniscus lens L18 having a convex surface directed toward the image side, and a biconcave negative lens L19.

The aperture stop S is disposed between the second lens unit G2 and the third lens unit G3. More specifically, the aperture stop S is disposed on the image side of the second lens unit G2, near the negative meniscus lens L9.

At the time of varying magnification from a low magnification end to a high magnification end, the first lens unit G1 is fixed, the second lens unit G2 moves toward the object side, the aperture stop S moves together with the second lens unit G2 toward the object side, the third lens unit G3 moves toward the object side, the fourth lens unit G4 moves toward the object side, and the fifth lens unit G5 is fixed.

Moreover, at the time of varying magnification from the low magnification end to the high magnification end, distances between the lens units change as follows. A distance between the first lens unit G1 and the second lens unit G2 narrows. A distance between the second lens unit G2 and the third lens unit G3 narrows. A distance between the third lens unit G3 and the fourth lens unit G4 narrows from the low magnification end to an intermediate state, and widens from the intermediate state to the high magnification end. A distance between the fourth lens unit G4 and the fifth lens unit G5 widens.

An aspheric surface is used for 21 surfaces namely, an object-side surface of the biconvex positive lens L3, an image-side surface of the positive meniscus lens L4, both surfaces of the biconvex positive lens L5, both surfaces of the biconvex positive lens L6, both surfaces of the biconcave negative lens L7, both surfaces of the positive meniscus lens L13, both surfaces of the biconvex positive lens L14, both surfaces of the biconvex positive lens L15, both surfaces of the biconcave negative lens L16, an object-side surface of the positive meniscus lens L17, both surfaces of the positive meniscus lens L18, and both surfaces of the biconcave negative lens L19.

The variable magnification optical system according to the present example is an optical system suitable for an image pickup element having a pixel pitch of 1.1 µm. The third lens unit G3 and the fourth lens unit G4 correspond to a predetermined positive lens unit. The second lens unit G2, the fourth lens unit G4, and the fifth lens unit G5 include a resin lens.

Figure 5A:
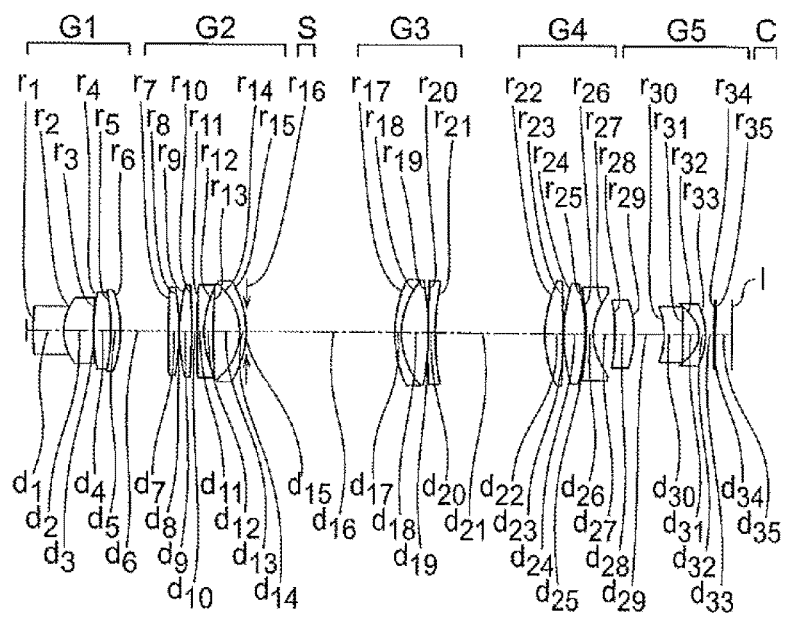
FIG. 5A, FIG. 5B, and FIG. 5C are cross-sectional views along an optical axis showing an optical arrangement at the time of infinite object point focusing of a variable magnification optical system according to an example 3.
Figure 5B:
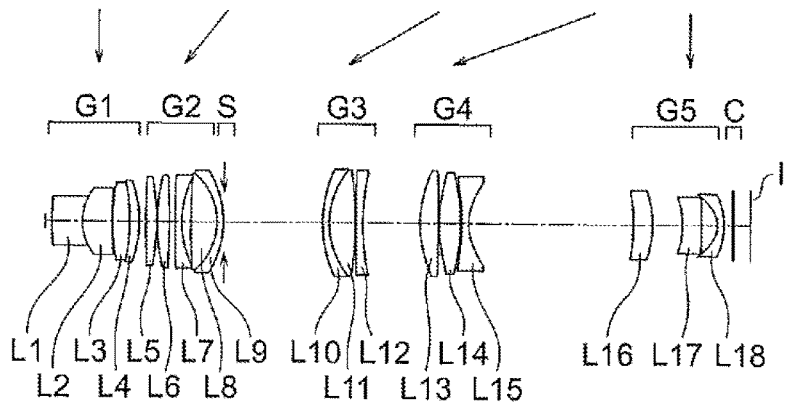
Figure 5C:
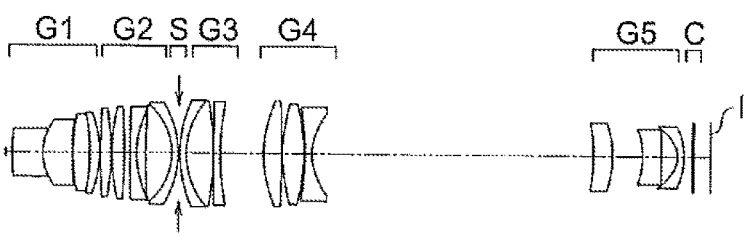

Next, a variable magnification optical system according to an example 3 will be described below. FIG. 5A, FIG. 5B, and FIG. 5C are cross-sectional views along an optical axis showing an optical arrangement at the time of infinite object point focusing of the variable magnification optical system according to the example 3. FIG. 6A, FIG. 6B, FIG. 6C, FIG. 6D, FIG. 6E, FIG. 6F, FIG. 6G, FIG. 6H, FIG. 6I, FIG. 6J, FIG. 6K, and FIG. 6L are aberration diagrams at the time of infinite object point focusing of the variable magnification optical system according to the example 3.

The variable magnification optical system according to the example 3, as shown in FIG. 5A, FIG. 5B, and FIG. 5C, includes in order from an object side, a first lens unit G1 having a positive refractive power, a second lens unit G2 having a positive refractive power, an aperture stop S, a third lens unit G3 having a positive refractive power, a fourth lens unit G4 having a positive refractive power, and a fifth lens unit G5 having a negative refractive power.

The first lens unit G1 includes a negative meniscus lens L1 having a convex surface directed toward the object side, a positive meniscus lens L2 having a convex surface directed toward the object side, a biconvex positive lens L3, and a positive meniscus lens L4 having a convex surface directed toward an image side. Here, the negative meniscus lens L1 and the positive meniscus lens L2 are cemented. Moreover, the biconvex positive lens L3 and the positive meniscus lens L4 are cemented.

The second lens unit G2 includes a biconvex positive lens L5, a biconvex positive lens L6, a biconcave negative lens L7, a biconvex positive lens L8, and a negative meniscus lens L9 having a convex surface directed toward the image side. Here, the biconvex positive lens L8 and the negative meniscus lens L9 are cemented.

The third lens unit G3 includes a negative meniscus lens L10 having a convex surface directed toward the object side, a biconvex positive lens L11, and a negative meniscus lens L12 having a convex surface directed toward the object side. Here, the negative meniscus lens L10 and the biconvex positive lens L11 are cemented.

The fourth lens unit G4 includes a biconvex positive lens L13, a biconvex positive lens L14, and a biconcave negative lens L15.

The fifth lens unit G5 includes a positive meniscus lens L16 having a convex surface directed toward the image side, a negative meniscus lens L17 having a convex surface directed toward the image side, and a negative meniscus lens L18 having a convex surface directed toward the image side.

The aperture stop S is disposed between the second lens unit G2 and the third lens unit G3. More specifically, the aperture stop S is disposed on the image side of the second lens unit G2, near the negative meniscus lens L9.

At the time of varying magnification from a low magnification end to a high magnification end, the first lens unit G1 is fixed, the second lens unit G2 moves toward the object side, the aperture stop S moves together with the second lens unit G2 toward the object side, the third lens unit G3 moves toward the object side, the fourth lens unit G4 moves toward the object side, and the fifth lens unit G5 is fixed.

Moreover, at the time of varying magnification from the low magnification end to the high magnification end, distances between the lens units change as follows. A distance between the first lens unit G1 and the second lens unit G2 narrows. A distance between the second lens unit G2 and the third lens unit G3 narrows. A distance between the third lens unit G3 and the fourth lens unit G4 narrows. A distance between the fourth lens unit G4 and the fifth lens unit G5 widens.

An aspheric surface is used for 14 surfaces namely both surfaces of the biconvex positive lens L5, both surfaces of the biconvex positive lens L6, both surfaces of the biconcave negative lens L7, both surfaces of the biconvex positive lens L13, both surfaces of the biconvex positive lens L14, both surfaces of the biconcave negative lens L15, and both surfaces of the negative meniscus lens L18.

The variable magnification optical system according to the present example is an optical system suitable for an image pickup element having a pixel pitch of 2.8 μm. The third lens unit G3 and the fourth lens unit G4 correspond to a predetermined positive lens unit. The second lens unit G2 and the fourth lens unit G4 include a resin lens.

Figure 7A:
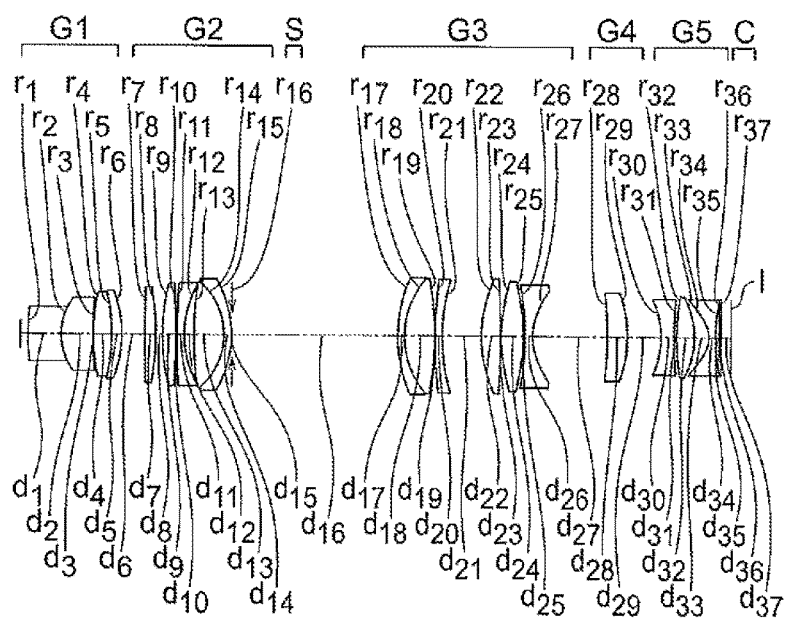
FIG. 7A, FIG. 7B, and FIG. 7C are cross-sectional views along an optical axis showing an optical arrangement at the time of infinite object point focusing of a variable magnification optical system according to an example 4.
Figure 7B:
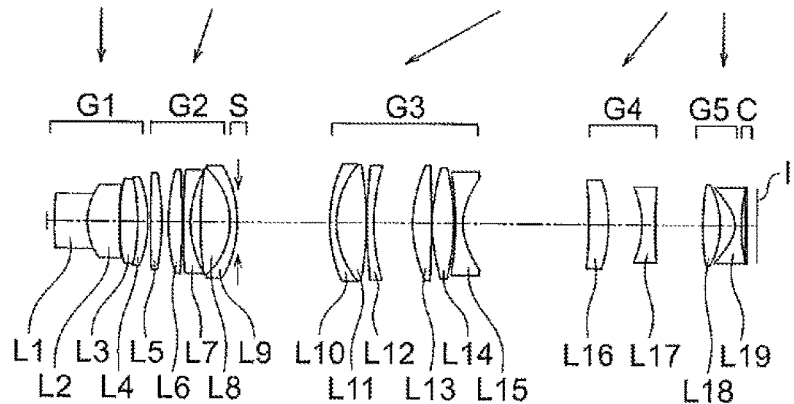
Figure 7C:
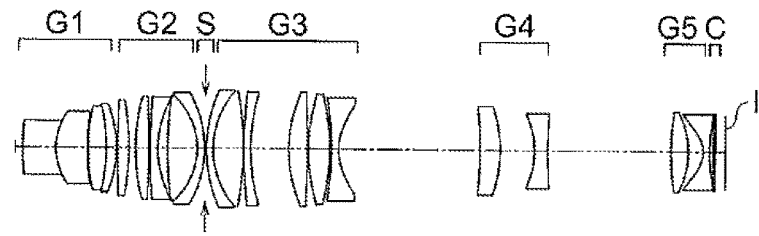

Next, a variable magnification optical system according to an example 4 will be described below. FIG. 7A, FIG. 7B, and FIG. 7C are cross-sectional views along an optical axis showing an optical arrangement at the time of infinite object point focusing of the variable magnification optical system according to the example 4. FIG. 8A, FIG. 8B, FIG. 8C, FIG. 8D, FIG. 8E, FIG. 8F, FIG. 8G, FIG. 8H, FIG. 8I, FIG. 8J, FIG. 8K, and FIG. 8L are aberration diagrams at the time of infinite object point focusing of the variable magnification optical system according to the example 4.

The variable magnification optical system according to the example 4, as shown in FIG. 7A, FIG. 7B, and FIG. 7C, includes in order from an object side, a first lens unit G1 having a positive refractive power, a second lens unit G2 having a positive refractive power, an aperture stop S, a third lens unit G3 having a positive refractive power, a fourth lens unit G4 having a negative refractive power, and a fifth lens unit G5 having a negative refractive power.

The first lens unit G1 includes a negative meniscus lens L1 having a convex surface directed toward the object side, a positive meniscus lens L2 having a convex surface directed toward the object side, a biconvex positive lens L3, and a positive meniscus lens L4 having a convex surface directed toward an image side. Here, the negative meniscus lens L1 and the positive meniscus lens L2 are cemented. Moreover, the biconvex positive lens L3 and the positive meniscus lens L4 are cemented.

The second lens unit G2 includes a biconvex positive lens L5, a biconvex positive lens L6, a biconcave negative lens L7, a biconvex positive lens L8, and a negative meniscus lens L9 having a convex surface directed toward the image side. Here, the biconvex positive lens L8 and the negative meniscus lens L9 are cemented.

The third lens unit G3 includes a negative meniscus lens L10 having a convex surface directed toward the object side, a biconvex positive lens L11, a negative meniscus lens L12 having a convex surface directed toward the object side, a biconvex positive lens L13, a biconvex positive lens L14, and a biconcave negative lens L15. Here, the negative meniscus lens L10 and the biconvex positive lens L11 are cemented.

The fourth lens unit G4 includes a positive meniscus lens L16 having a convex surface directed toward the image side and a biconcave negative lens L17.

The fifth lens unit G5 includes a biconvex positive lens L18 and a biconcave negative lens L19.

The aperture stop S is disposed between the second lens unit G2 and the third lens unit G3. More specifically, the aperture stop S is disposed on the image side of the second lens unit G2, near the negative meniscus lens L9.

At the time of varying magnification from a low magnification end to a high magnification end, the first lens unit G1 is fixed, the second lens unit G2 moves toward the object side, the aperture stop S moves together with the second lens unit G2 toward the object side, the third lens unit G3 moves toward the object side, the fourth lens unit G4 moves toward the object side, and the fifth lens unit G5 is fixed.

Moreover, at the time of varying magnification from the low magnification end to the high magnification end, distances between the lens units change as follows. A distance between the first lens unit G1 and the second lens unit G2 narrows. A distance between the second lens unit G2 and the third lens unit G3 narrows. A distance between the third lens unit G3 and the fourth lens unit G4 widens. A distance between the fourth lens unit G4 and the fifth lens unit G5 widens.

An aspheric surface is used for 14 surfaces namely, both surfaces of the biconvex positive lens L5, both surfaces of the biconvex positive lens L6, both surfaces of the biconcave negative lens L7, both surfaces of the biconvex positive lens L13, both surfaces of the biconvex positive lens L14, both surfaces of the biconcave negative lens L15, and both surfaces of the biconcave negative lens L19.

The variable magnification optical system according to the present example is an optical system suitable for an image pickup element having a pixel pitch of 2.2 μm. The third lens unit G3 corresponds to a predetermined positive lens unit. The second lens unit G2 and the third lens unit G3 include a resin lens.

Figure 9A:
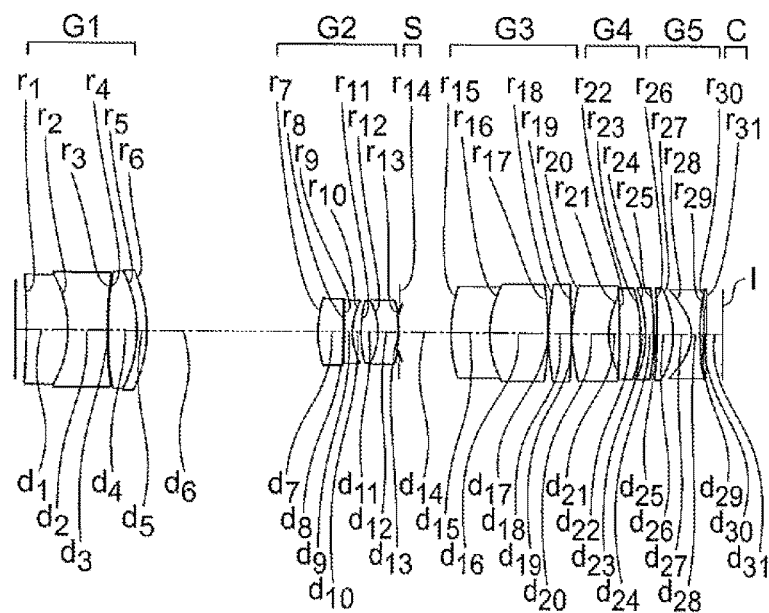
FIG. 9A, FIG. 9B, and FIG. 9C are cross-sectional views along an optical axis showing an optical arrangement at the time of infinite object point focusing of a variable magnification optical system according to an example 5.
Figure 9B:
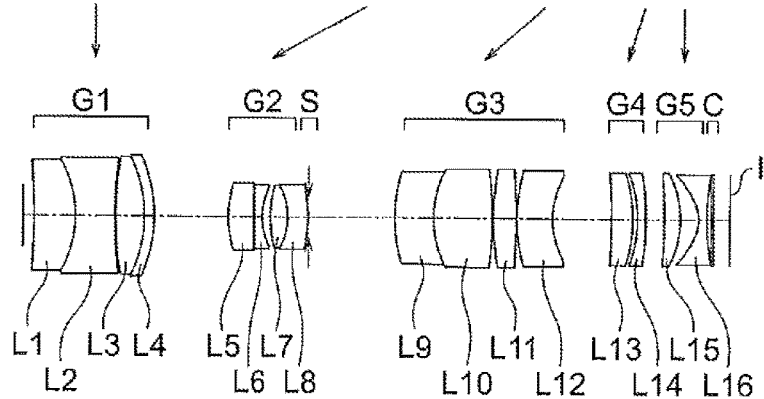
Figure 9C:
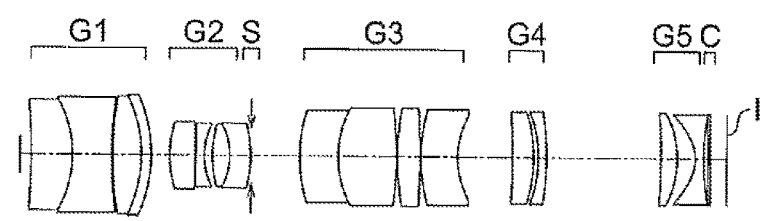

Next, a variable magnification optical system according to an example 5 will be described below. FIG. 9A, FIG. 9B, and FIG. 9C are cross-sectional views along an optical axis showing an optical arrangement at the time of infinite object point focusing of the variable magnification optical system according to the example 5. FIG. 10A, FIG. 10B, FIG. 10C, FIG. 10D, FIG. 10E, FIG. 10F, FIG. 10G, FIG. 10H, FIG. 10I, FIG. 10J, FIG. 10K, and FIG. 10L are aberration diagrams at the time of infinite object point focusing of the variable magnification optical system according to the example 5.

The variable magnification optical system according to the example 5, as shown in FIG. 9A, FIG. 9B, and FIG. 9C, includes in order from an object side, a first lens unit G1 having a positive refractive power, a second lens unit G2 having a positive refractive power, an aperture stop S, a third lens unit G3 having a positive refractive power, a fourth lens unit G4 having a positive refractive power, and a fifth lens unit G5 having a negative refractive power.

The first lens unit G1 includes a positive meniscus lens L1 having a convex surface directed toward an image side, a biconcave negative lens L2, a biconvex positive lens L3, and a negative meniscus lens L4 having a convex surface directed toward the image side. Here, the positive meniscus lens L1 and the biconcave negative lens L2 are cemented. Moreover, the biconvex positive lens L3 and the negative meniscus lens L4 are cemented.

The second lens unit G2 includes a positive meniscus lens L5 having a convex surface directed toward the object side, a biconcave negative lens L6, a biconvex positive lens L7, and a negative meniscus lens L8 having a convex surface directed toward the image side. Here, the biconvex positive lens L7 and the negative meniscus lens L8 are cemented.

The third lens unit G3 includes a negative meniscus lens L9 having a convex surface directed toward the object side, a biconvex positive lens L10, a biconvex positive lens L11, and a negative meniscus lens L12 having a convex surface directed toward the object side. Here, the negative meniscus lens L9 and the biconvex positive lens L10 are cemented.

The fourth lens unit G4 includes a positive meniscus lens L13 having a convex surface directed toward the image side, and a negative meniscus lens L14 having a convex surface directed toward the image side.

The fifth lens unit G5 includes a positive meniscus lens L15 having a convex surface directed toward the image side and a biconcave negative lens L16.

The aperture stop S is disposed between the second lens unit G2 and the third lens unit G3. More specifically, the aperture stop S is disposed on the image side of the second lens unit G2, near the negative meniscus lens L8.

At the time of varying magnification from a low magnification end to a high magnification end, the first lens unit G1 is fixed, the second lens unit G2 moves toward the object side, the aperture stop S moves together with the second lens unit G2 toward the object side, the third lens unit G3 moves toward the object side, the fourth lens unit G4 moves toward the object side, and the fifth lens unit G5 is fixed.

Moreover, at the time of varying magnification from the low magnification end to the high magnification end, dis- tances between the lens units change as follows. A distance between the first lens unit G1 and the second lens unit G2 narrows. A distance between the second lens unit G2 and the third lens unit G3 widens from the low magnification end to an intermediate state, and narrows from the intermediate state to the high magnification end. A distance between the third lens unit G3 and the fourth lens unit G4 widens from the low magnification end to the intermediate state, and narrows from the intermediate state to the high magnification end. A distance between the fourth lens unit G4 and the fifth lens unit G5 widens.

An aspheric surface is used for 10 surfaces namely, both surfaces of the positive meniscus lens L5, both surfaces of the biconcave negative lens L6, both surfaces of the biconvex positive lens L11, both surfaces of the negative meniscus lens L12, and both surfaces of the biconcave negative lens L16.

The variable magnification optical system according to the present example is an optical system suitable for an image pickup element having a pixel pitch of 2.2 μm. The third lens unit G3 corresponds to a predetermined positive lens unit. The second lens unit G2 and the third lens unit G3 include a resin lens.

Figure 11A:
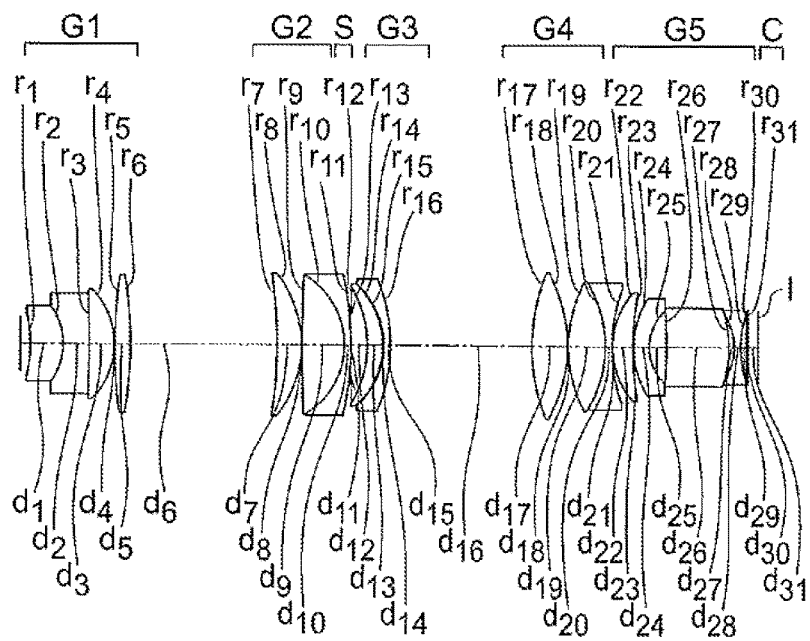
FIG. 11A, FIG. 11B, and FIG. 11C are cross-sectional views along an optical axis showing an optical arrangement at the time of infinite object point focusing of a variable magnification optical system according to an example 6.
Figure 11B:
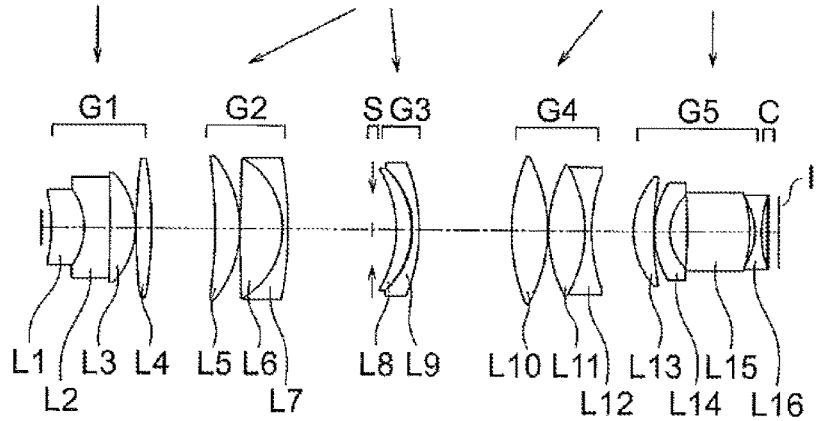
Figure 11C:
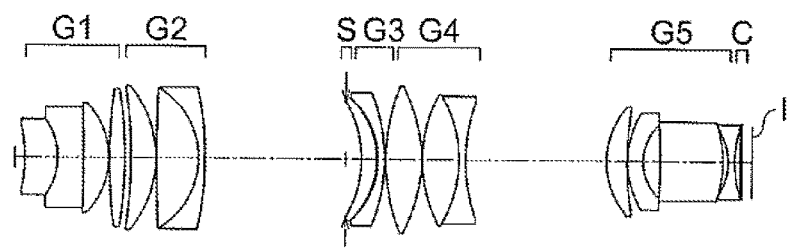

Next, a variable magnification optical system according to an example 6 will be described below. FIG. 11A, FIG. 11B, and FIG. 11C are cross-sectional views along an optical axis showing an optical arrangement at the time of infinite object point focusing of the variable magnification optical system according to the example 6. FIG. 12A, FIG. 12B, FIG. 12C, FIG. 12D, FIG. 12E, FIG. 12F, FIG. 12G, FIG. 12H, FIG. 12I, FIG. 12J, FIG. 12K, and FIG. 12L are aberration diagrams at the time of infinite object point focusing of the variable magnification optical system according to the example 6.

The variable magnification optical system according to the example 6, as shown in FIG. 11A, FIG. 11B, and FIG. 11C, includes in order from an object side, a first lens unit G1 having a positive refractive power, a second lens unit G2 having a positive refractive power, an aperture stop S, a third lens unit G3 having a negative refractive power, a fourth lens unit G4 having a positive refractive power, and a fifth lens unit G5 having a negative refractive power.

The first lens unit G1 includes a positive meniscus lens L1 having a convex surface directed toward an image side, a negative meniscus lens L2 having a convex surface directed toward the image side, a positive meniscus lens L3 having a convex surface directed toward the image side, and a biconvex positive lens L4. Here, the positive meniscus lens L1, the negative meniscus lens L2, and the positive meniscus lens L3 are cemented.

The second lens unit G2 includes a positive meniscus lens L5 having a convex surface directed toward the image side, a biconvex positive lens L6, and a negative meniscus lens L7 having a convex surface directed toward the image side. Here, the biconvex positive lens L6 and the negative meniscus lens L7 are cemented.

The third lens unit G3 includes a positive meniscus lens L8 having a convex surface directed toward the image side and a negative meniscus lens L9 having a convex surface directed toward the image side.

The fourth lens unit G4 includes a biconvex positive lens L10, a biconvex positive lens L11, and a biconcave negative lens L12. Here, the biconvex positive lens L11 and the biconcave negative lens L12 are cemented.

The fifth lens unit G5 includes a positive meniscus lens L13 having a convex surface directed toward the object side, a negative meniscus lens L14 having a convex surface directed toward the object side, a positive meniscus lens L15 having a convex surface directed toward the image side, and a biconcave negative lens L16.

The aperture stop S is disposed between the second lens unit G2 and the third lens unit G3. More specifically, the aperture stop S is disposed on the object side of the third lens unit G3, near the positive meniscus lens L8.

At the time of varying magnification from a low magnification end to a high magnification end, the first lens unit G1 is fixed, the second lens unit G2 moves toward the object side, the aperture stop S is fixed, the third lens unit G3, after moving toward the image side, moves toward the object side, the fourth lens unit G4 moves toward the object side, and the fifth lens unit G5 is fixed.

Moreover, at the time of varying magnification from the low magnification end to the high magnification end, distances between the lens units change as follows. A distance between the first lens unit G1 and the second lens unit G2 narrows. A distance between the second lens unit G2 and the third lens unit G3 widens. A distance between the third lens unit G3 and the fourth lens unit G4 narrows. A distance between the fourth lens unit G4 and the fifth lens unit G5 widens. Moreover, a distance between the aperture stop S and the third lens unit G3 widens from the low magnification end to an intermediate state, and narrows from the intermediate state to the high magnification end.

An aspheric surface is used for four surfaces namely, an image-side surface of the positive meniscus lens L5, an image-side surface of the biconvex positive lens L10, an object-side surface of the positive meniscus lens L13, and an object-side surface of the biconcave negative lens L16.

The variable magnification optical system according to the present example is an optical system suitable for an image pickup element having a pixel pitch of 1.1 µm. The fourth lens unit G4 corresponds to a predetermined positive lens unit. The third lens unit G3 corresponds to a predetermined negative lens unit.

Figure 13A:
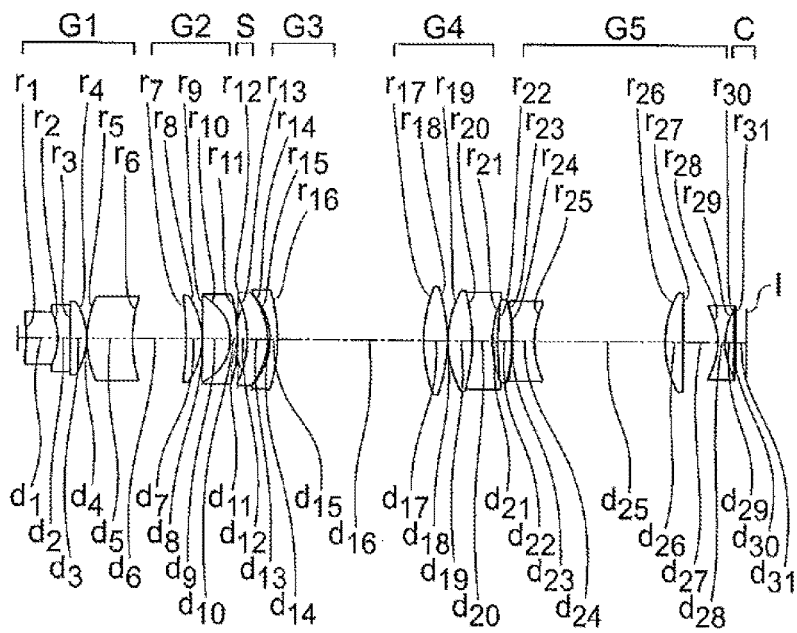
FIG. 13A, FIG. 13B, and FIG. 13C are cross-sectional views along an optical axis showing an optical arrangement at the time of infinite object point focusing of a variable magnification optical system according to an example 7.
Figure 13B:
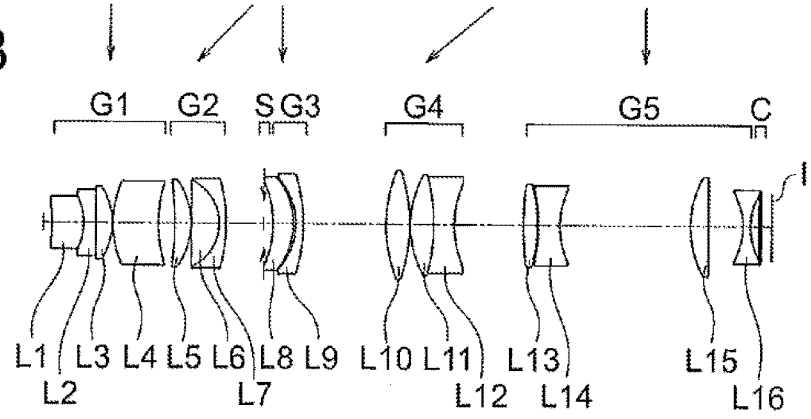
Figure 13C:
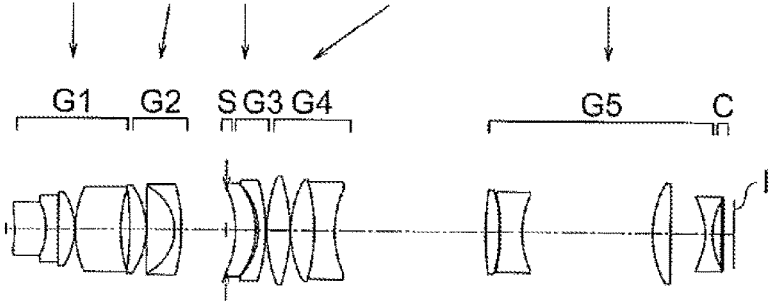

Next, a variable magnification optical system according to an example 7 will be described below. FIG. 13A, FIG. 13B, and FIG. 13C are cross-sectional views along an optical axis showing an optical arrangement at the time of infinite object point focusing of the variable magnification optical system according to the example 7. FIG. 14A, FIG. 14B, FIG. 14C, FIG. 14D, FIG. 14E, FIG. 14F, FIG. 14G, FIG. 14H, FIG. 14I, FIG. 14J, FIG. 14K, and FIG. 14L are aberration diagrams at the time of infinite object point focusing of the variable magnification optical system according to the example 7.

The variable magnification optical system according to the example 7, as shown in FIG. 13A, FIG. 13B, and FIG. 13C, includes in order from an object side, a first lens unit G1 having a positive refractive power, a second lens unit G2 having a positive refractive power, an aperture stop S, a third lens unit G3 having a negative refractive power, a fourth lens unit G4 having a positive refractive power, and a fifth lens unit G5 having a negative refractive power.

The first lens unit G1 includes a positive meniscus lens L1 having a convex surface directed toward an image side, a biconcave negative lens L2, a biconvex positive lens L3, and a positive meniscus lens L4 having a convex surface directed toward the object side. Here, the positive meniscus lens L1, the biconcave negative lens L2, and the biconvex positive lens L3 are cemented.

The second lens unit G2 includes a positive meniscus lens L5 having a convex surface directed toward the image side, a positive meniscus lens L6 having a convex surface directed toward the image side, and a negative meniscus lens L7 having a convex surface directed toward the image side. Here, the positive meniscus lens L6 and the negative meniscus lens L7 are cemented.

The third lens unit G3 includes a positive meniscus lens L8 having a convex surface directed toward the image side and a negative meniscus lens L9 having a convex surface directed toward the image side.

The fourth lens unit G4 includes a biconvex positive lens L10, a biconvex positive lens L11, and a biconcave negative lens L12. Here, the biconvex positive lens L11 and the biconcave negative lens L12 are cemented.

The fifth lens unit G5 includes a biconvex positive lens L13, a biconcave negative lens L14, a biconvex positive lens L15, and a biconcave negative lens L16.

The aperture stop S is disposed between the second lens unit G2 and the third lens unit G3. More specifically, the aperture stop S is disposed on the object side of the third lens unit G3, near the positive meniscus lens L8.

At the time of varying magnification from a low magnification end to a high magnification end, the first lens unit G1 is fixed, the second lens unit G2 moves toward the object side, the aperture stop S is fixed, the third lens unit G3 is fixed, the fourth lens unit G4 moves toward the object side, and the fifth lens unit G5 is fixed.

Moreover, at the time of varying magnification from the low magnification end to the high magnification end, distances between the lens units change as follows. A distance between the first lens unit G1 and the second lens unit G2 narrows. A distance between the second lens unit G2 and the third lens unit G3 widens. A distance between the third lens unit G3 and the fourth lens unit G4 narrows. A distance between the fourth lens unit G4 and the fifth lens unit G5 widens.

An aspheric surface is used for four surfaces namely, an image-side surface of the positive meniscus lens L5, an image-side surface of the biconvex positive lens L10, an object-side surface of the biconvex positive lens L13, and an object-side surface of the biconcave negative lens L16.

The variable magnification optical system according to the present example is an optical system suitable for an image pickup element having a pixel pitch of 2.2 µm. The fourth lens unit G4 corresponds to a predetermined positive lens unit. The third lens unit G3 corresponds to a predetermined negative lens unit.

Figure 15A:
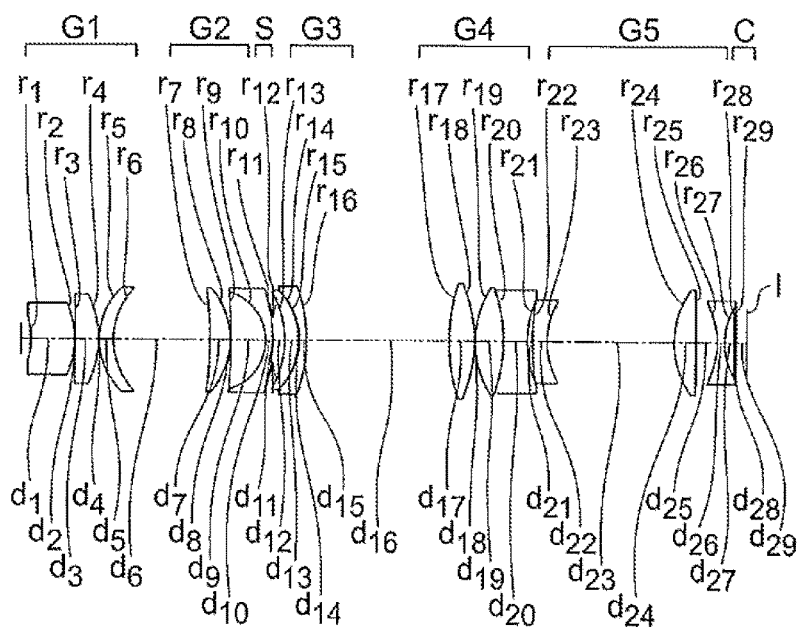
FIG. 15A, FIG. 15B, and FIG. 15C are cross-sectional views along an optical axis showing an optical arrangement at the time of infinite object point focusing of a variable magnification optical system according to an example 8.
Figure 15B:
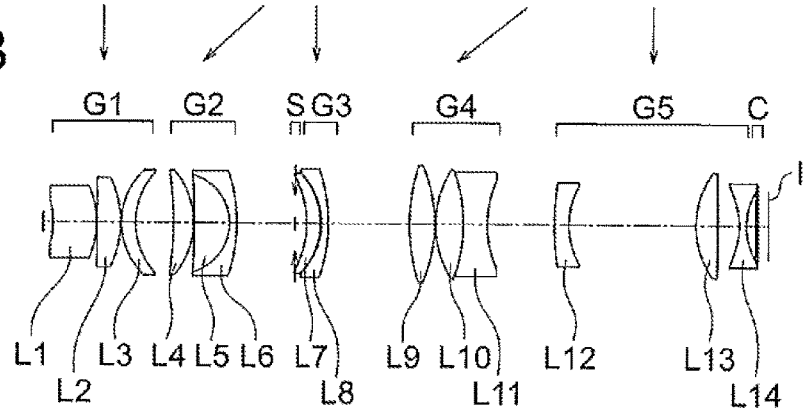
Figure 15C:
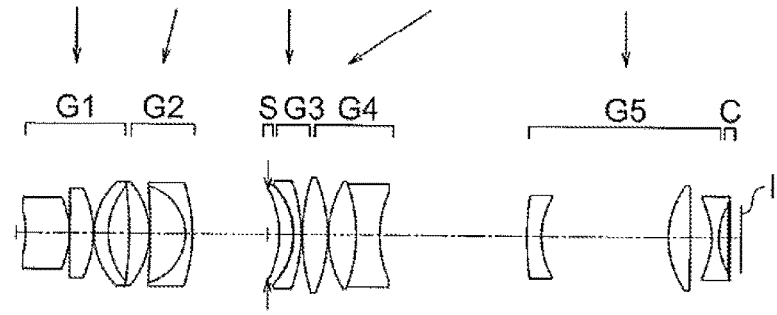

Next, a variable magnification optical system according to an example 8 will be described below. FIG. 15A, FIG. 15B, and FIG. 15C are cross-sectional views along an optical axis showing an optical arrangement at the time of infinite object point focusing of the variable magnification optical system according to the example 8. FIG. 16A, FIG. 16B, FIG. 16C, FIG. 16D, FIG. 16E, FIG. 16F, FIG. 16G, FIG. 16H, FIG. 16I, FIG. 16J, FIG. 16K, and FIG. 16L are aberration diagrams at the time of infinite object point focusing of the variable magnification optical system according to the example 8.

The variable magnification optical system according to the example 8, as shown in FIG. 15A, FIG. 15B, and FIG. 15C, includes in order from an object side, a first lens unit G1 having a positive refractive power, a second lens unit G2 having a positive refractive power, an aperture stop S, a third lens unit G3 having a negative refractive power, a fourth lens unit G4 having a positive refractive power, and a fifth lens unit G5 having a negative refractive power.

The first lens unit G1 includes a positive meniscus lens L1 having a convex surface directed toward an image side, a positive meniscus lens L2 having a convex surface directed toward the image side, and a positive meniscus lens L3 having a convex surface directed toward the object side.

The second lens unit G2 includes a positive meniscus lens L4 having a convex surface directed toward the image side, a positive meniscus lens L5 having a convex surface directed toward the image side, and a negative meniscus lens L6 having a convex surface directed toward the image side. Here, the positive meniscus lens L5 and the negative meniscus lens L6 are cemented.

The third lens unit G3 includes a positive meniscus lens L7 having a convex surface directed toward the image side and a negative meniscus lens L8 having a convex surface directed toward the image side.

The fourth lens unit G4 includes a biconvex positive lens L9, a biconvex positive lens L10, and a biconcave negative lens L11. Here, the biconvex positive lens L10 and the biconcave negative lens L11 are cemented.

The fifth lens unit G5 includes a negative meniscus lens L12 having a convex surface directed toward the object side, a biconvex positive lens L13, and a biconcave negative lens L14.

The aperture stop S is disposed between the second lens unit G2 and the third lens unit G3. More specifically, the aperture stop S is disposed on the object side of the third lens unit G3, near the positive meniscus lens L7.

At the time of varying magnification from a low magnification end to a high magnification end, the first lens unit G1 is fixed, the second lens unit G2 moves toward the object side, the aperture stop S is fixed, the third lens unit G3 is fixed, the fourth lens unit G4 moves toward the object side, and the fifth lens unit G5 is fixed.

Moreover, at the time of varying magnification from the low magnification end to the high magnification end, distances between the lens units change as follows. A distance between the first lens unit G1 and the second lens unit G2 narrows. A distance between the second lens unit G2 and the third lens unit G3 widens. A distance between the third lens unit G3 and the fourth lens unit G4 narrows. A distance between the fourth lens unit G4 and the fifth lens unit G5 widens.

An aspheric surface is used for four surfaces namely, an image-side surface of the positive meniscus lens L4, an image-side surface of the biconvex positive lens L9, an object-side surface of the negative meniscus lens L12, and an object-side surface of the biconcave negative lens L14.

The variable magnification optical system according to the present example is an optical system suitable for an image pickup element having a pixel pitch of 1.8 µm. The fourth lens unit G4 corresponds to a predetermined positive lens unit. The third lens unit G3 corresponds to a predetermined negative lens unit.

Figure 17A:
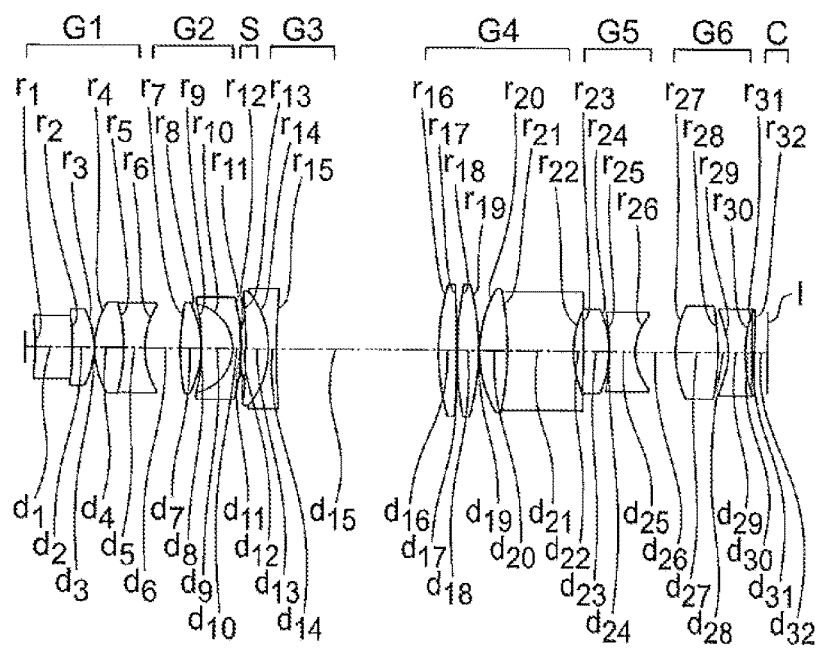
FIG. 17A, FIG. 17B, and FIG. 17C are cross-sectional views along an optical axis showing an optical arrangement at the time of infinite object point focusing of a variable magnification optical system according to an example 9.
Figure 17B:
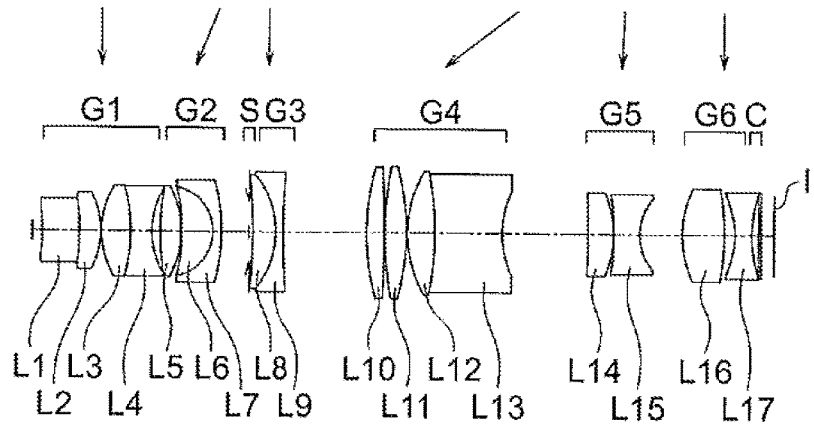
Figure 17C:
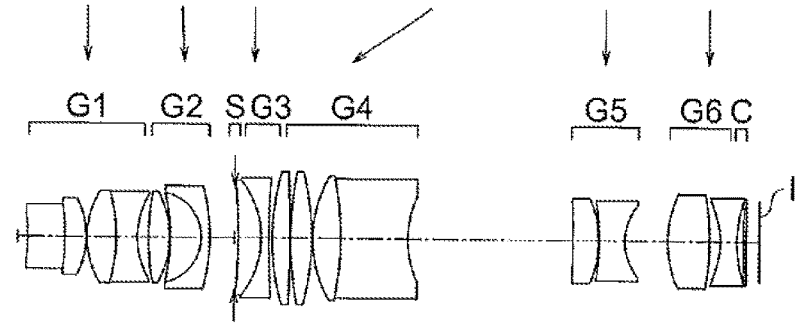

Next, a variable magnification optical system according to an example 9 will be described below. FIG. 17A, FIG. 17B, and FIG. 17C are cross-sectional views along an optical axis showing an optical arrangement at the time of infinite object point focusing of the variable magnification optical system according to the example 9. FIG. 18A, FIG. 18B, FIG. 18C, FIG. 18D, FIG. 18E, FIG. 18F, FIG. 18G, FIG. 18H, FIG. 18I, FIG. 18J, FIG. 18K, and FIG. 18L are aberration diagrams at the time of infinite object point focusing of the variable magnification optical system according to the example 9.

The variable magnification optical system according to the example 9, as shown in FIG. 17A, FIG. 17B, and FIG. 17C, includes in order from an object side, a first lens unit G1 having a positive refractive power, a second lens unit G2 having a positive refractive power, an aperture stop S, a third lens unit G3 having a positive refractive power, a fourth lens unit G4 having a positive refractive power, a fifth lens unit G5 having a negative refractive power, and a sixth lens unit G6 having a positive refractive power.

The first lens unit G1 includes a negative meniscus lens L1 having a convex surface directed toward an image side, a positive meniscus lens L2 having a convex surface directed toward the image side, a biconvex positive lens L3, and a biconcave negative lens L4. Here, the negative meniscus lens L1 and the positive meniscus lens L2 are cemented. Moreover, the biconvex positive lens L3 and the biconcave negative lens L4 are cemented.

The second lens unit G2 includes a biconvex positive lens L5, a positive meniscus lens L6 having a convex surface directed toward the image side, and a negative meniscus lens L7 having a convex surface directed toward the image side. Here, the positive meniscus lens L6 and the negative meniscus lens L7 are cemented.

The third lens unit G3 includes a positive meniscus lens L8 having a convex surface directed toward the image side and a biconcave negative lens L9. Here, the positive meniscus lens L8 and the biconcave negative lens L9 are cemented.

The fourth lens unit G4 includes a biconvex positive lens L10, a biconvex positive lens L11, a biconvex positive lens L12, and a biconcave negative lens L13. Here, the biconvex positive lens L12 and the biconcave negative lens L13 are cemented.

The fifth lens unit G5 includes a positive meniscus lens L14 having a convex surface directed toward the image side and a biconcave negative lens L15.

The sixth lens unit G6 includes a biconvex positive lens L16 and a biconcave negative lens L17.

The aperture stop S is disposed between the second lens unit G2 and the third lens unit G3. More specifically, the aperture stop S is disposed on the object side of the third lens unit G3, near the positive meniscus lens L8.

At the time of varying magnification from a low magnification end to a high magnification end, the first lens unit G1 is fixed, the second lens unit G2, after moving toward the object side, moves toward the image side, the aperture stop S is fixed, the third lens unit G3 is fixed, the fourth lens unit G4 moves toward the object side, the fifth lens unit G5 moves toward the object side, and the sixth lens unit G6 is fixed.

Moreover, at the time of varying magnification from the low magnification end to the high magnification end, distances between the lens units change as follows. A distance between the first lens unit G1 and the second lens unit G2 narrows from the low magnification end to an intermediate state, and widens from the intermediate state to the high magnification end. A distance between the second lens unit G2 and the third lens unit G3 widens from the low magnification end to the intermediate state, and narrows from the intermediate state to the high magnification end. A distance between the third lens unit G3 and the fourth lens unit G4 narrows. A distance between the fourth lens unit G4 and the fifth lens unit G5 widens. A distance between the fifth lens unit G5 and the sixth lens unit G6 widens.

An aspheric surface is used for four surfaces namely, an image-side surface of the biconvex positive lens L5, an image-side surface of the biconvex positive lens L11, an object-side surface of the positive meniscus lens L14, and an object-side surface of the biconcave negative lens L17.

The variable magnification optical system according to the present example is an optical system suitable for an image pickup element having a pixel pitch of 2.2 µm. The fourth lens unit G4 corresponds to a predetermined positive lens unit. The fourth lens unit G4 includes a resin lens.

Figure 19A:
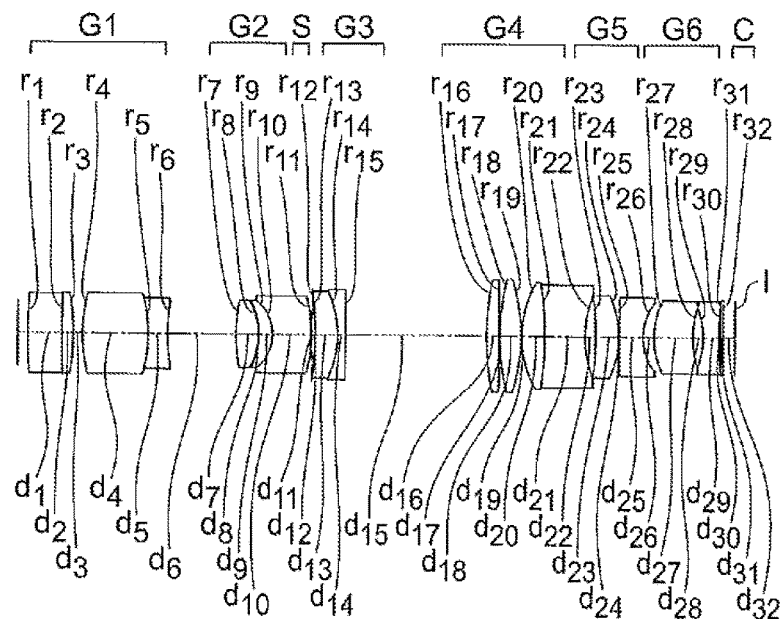
FIG. 19A, FIG. 19B, and FIG. 19C are cross-sectional views along an optical axis showing an optical arrangement at the time of infinite object point focusing of a variable magnification optical system according to an example 10.
Figure 19B:
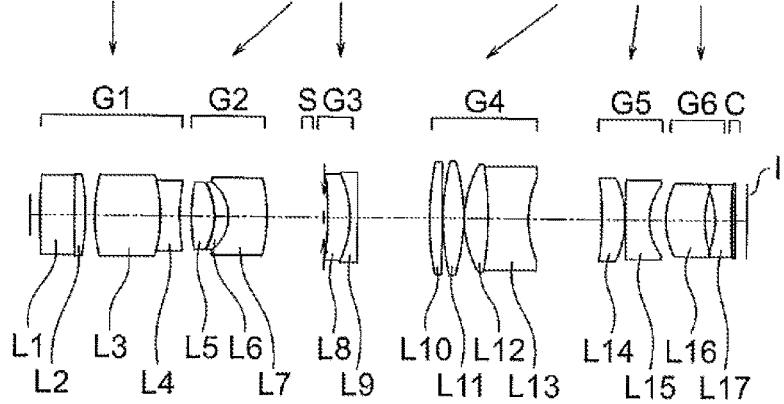
Figure 19C:
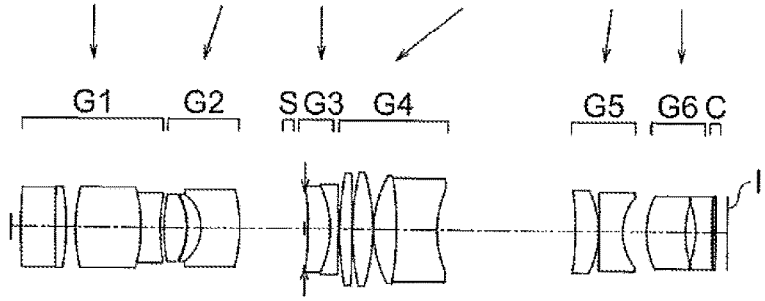

Next, a variable magnification optical system according to an example 10 will be described below. FIG. 19A, FIG. 19B, and FIG. 19C are cross-sectional views along an optical axis showing an optical arrangement at the time of infinite object point focusing of the variable magnification optical system according to the example 10. FIG. 20A, FIG. 20B, FIG. 20C, FIG. 20D, FIG. 20E, FIG. 20F, FIG. 20G, FIG. 20H, FIG. 20I, FIG. 20J, FIG. 20K, and FIG. 20L are aberration diagrams at the time of infinite object point focusing of the variable magnification optical system according to the example 10.

The variable magnification optical system according to the example 10, as shown in FIG. 19A, FIG. 19B, and FIG. 19C, includes in order from an object side, a first lens unit G1 having a positive refractive power, a second lens unit G2 having a positive refractive power, an aperture stop S, a third lens unit G3 having a negative refractive power, a fourth lens unit G4 having a positive refractive power, a fifth lens unit G5 having a negative refractive power, and a sixth lens unit G6 having a negative refractive power.

The first lens unit G1 includes a positive meniscus lens L1 having a convex surface directed toward the object side, a biconvex positive lens L2, a biconvex positive lens L3, and a biconcave negative lens L4. Here, the positive meniscus lens L1 and the biconvex positive lens L2 are cemented. Moreover, the biconvex positive lens L3 and the biconcave negative lens L4 are cemented.

The second lens unit G2 includes a biconvex positive lens L5, a positive meniscus lens L6 having a convex surface directed toward an image side, and a negative meniscus lens L7 having a convex surface directed toward the image side. Here, the positive meniscus lens L6 and the negative meniscus lens L7 are cemented.

The third lens unit G3 includes a positive meniscus lens L8 having a convex surface directed toward the image side and a negative meniscus lens L9 having a convex surface directed toward the image side. Here, the positive meniscus lens L8 and the negative meniscus lens L9 are cemented.

The fourth lens unit G4 includes a biconvex positive lens L10, a biconvex positive lens L11, a biconvex positive lens L12, and a biconcave negative lens L13. Here, the biconvex positive lens L12 and the biconcave negative lens L13 are cemented.

The fifth lens unit G5 includes a positive meniscus lens L14 having a convex surface directed toward the image side and a biconcave negative lens L15.

The sixth lens unit G6 includes a positive meniscus lens L16 having a convex surface directed toward the object side and a biconcave negative lens L17.

The aperture stop S is disposed between the second lens unit G2 and the third lens unit G3. More specifically, the aperture stop S is disposed on the object side of the third lens unit G3, near the positive meniscus lens L8.

At the time of varying magnification from a low magnification end to a high magnification end, the first lens unit G1 is fixed, the second lens unit G2 moves toward the object side, the aperture stop S is fixed, the third lens unit G3, after moving toward the image side, moves toward the object side, the fourth lens unit G4 moves toward the object side, the fifth lens unit G5 moves toward the object side, and the sixth lens unit G6 is fixed.

Moreover, at the time of varying magnification from the low magnification end to the high magnification end, distances between the lens units change as follows. A distance between the first lens unit G1 and the second lens unit G2 narrows. A distance between the second lens unit G2 and the third lens unit G3 widens. A distance between the third lens unit G3 and the fourth lens unit G4 narrows. A distance between the fourth lens unit G4 and the fifth lens unit G5 widens. A distance between the fifth lens unit G5 and the sixth lens unit G6 widens.

An aspheric surface is used for four surfaces namely, an image-side surface of the biconvex positive lens L5, an image-side surface of the biconvex positive lens L11, an object-side surface of the positive meniscus lens L14, and an object-side surface of the biconcave negative lens L17.

The variable magnification optical system according to the present example is an optical system suitable for an image pickup element having a pixel pitch of 2.2 μm. The fourth lens unit G4 corresponds to a predetermined positive lens unit. The third lens unit G3 corresponds to a predetermined negative lens unit. The fourth lens unit G4 includes a resin lens.

Figure 21A:
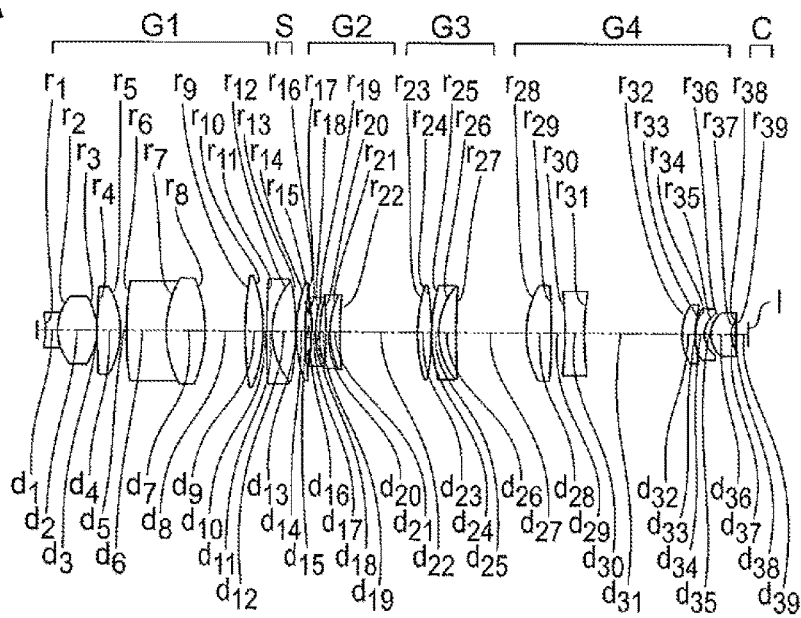
FIG. 21A, FIG. 21B, and FIG. 21C are cross-sectional views along an optical axis showing an optical arrangement at the time of infinite object point focusing of a variable magnification optical system according to an example 11.
Figure 21B:
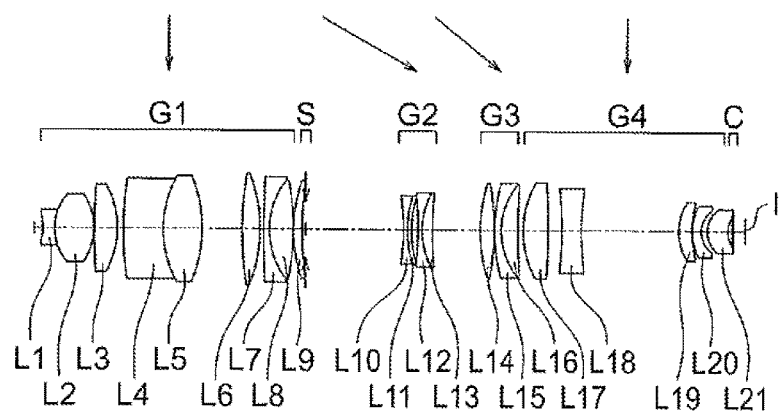
Figure 21C:
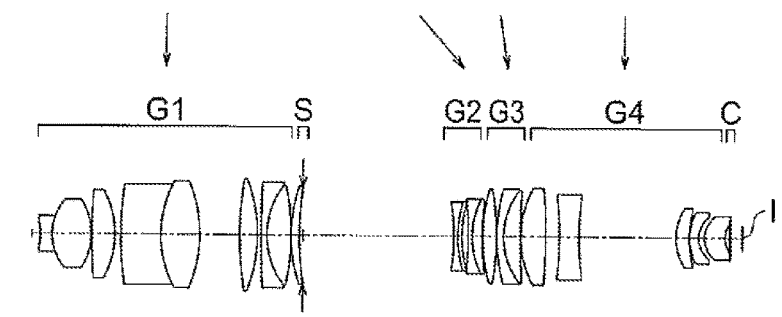

Next, a variable magnification optical system according to an example 11 will be described below. FIG. 21A, FIG. 21B, and FIG. 21C are cross-sectional views along an optical axis showing an optical arrangement at the time of infinite object point focusing of the variable magnification optical system according to the example 11. FIG. 22A, FIG. 22B, FIG. 22C, FIG. 22D, FIG. 22E, FIG. 22F, FIG. 22G, FIG. 22H, FIG. 22I, FIG. 22J, FIG. 22K, and FIG. 22L are aberration diagrams at the time of infinite object point focusing of the variable magnification optical system according to the example 11.

The variable magnification optical system according to the example 11, as shown in FIG. 21A, FIG. 21B, and FIG. 21C, includes in order from an object side, a first lens unit G1 having a positive refractive power, an aperture stop S, a second lens unit G2 having a negative refractive power, a third lens unit G3 having a positive refractive power, and a fourth lens unit G4 having a positive refractive power.

The first lens unit G1 includes a biconcave negative lens L1, a biconvex positive lens L2, a biconvex positive lens L3, a negative meniscus lens L4 having a convex surface directed toward the object side, a biconvex positive lens L5, a biconvex positive lens L6, a negative meniscus lens L7 having a convex surface directed toward the object side, a biconvex positive lens L8, and a positive meniscus lens L9 having a convex surface directed toward the object side. Here, the biconcave negative lens L1 and the biconvex positive lens L2 are cemented. Moreover, the negative meniscus lens L4 and the biconvex positive lens L5 are cemented. Furthermore, the negative meniscus lens L7 and the biconvex positive lens L8 are cemented.

The second lens unit G2 includes a biconcave negative lens L10, a negative meniscus lens L11 having a convex surface directed toward the object side, a biconcave negative lens L12, and a positive meniscus lens L13 having a convex surface directed toward the object side. Here, the biconcave negative lens L10 and the negative meniscus lens L11 are cemented. Moreover, the biconcave negative lens L12 and the positive meniscus lens L13 are cemented.

The third lens unit G3 includes a biconvex positive lens L14, a negative meniscus lens L15 having a convex surface directed toward the object side, and a positive meniscus lens L16 having a convex surface directed toward the object side. Here, the negative meniscus lens L15 and the positive meniscus lens L16 are cemented.

The fourth lens unit G4 includes a biconvex positive lens L17, a biconcave negative lens L18, a positive meniscus lens L19 having a convex surface directed toward the object side, a negative meniscus lens L20 having a convex surface directed toward the object side, and a positive meniscus lens L21 having a convex surface directed toward the object side.

The aperture stop S is disposed between the first lens unit G1 and the second lens unit G2. More specifically, the aperture stop S is disposed on an image side of the first lens unit G1, near the positive meniscus lens L9.

At the time of varying magnification from a low magnification end to a high magnification end, the first lens unit G1 is fixed, the aperture stop S is fixed, the second lens unit G2 moves toward the image side, the third lens unit G3 moves toward the image side, and the fourth lens unit G4 is fixed.

Moreover, at the time of varying magnification from the low magnification end to the high magnification end, distances between the lens units change as follows. A distance between the first lens unit G1 and the second lens unit G2 widens. A distance between the second lens unit G2 and the third lens unit G3 narrows. A distance between the third lens unit G3 and the fourth lens unit G4 narrows.

An aspheric surface is used for two surfaces namely, an object-side surface of the biconvex positive lens L17 and an image-side surface of the positive meniscus lens L21.

The variable magnification optical system according to the present example is an optical system suitable for an image pickup element having a pixel pitch of 1.1 μm.

Figure 23A:
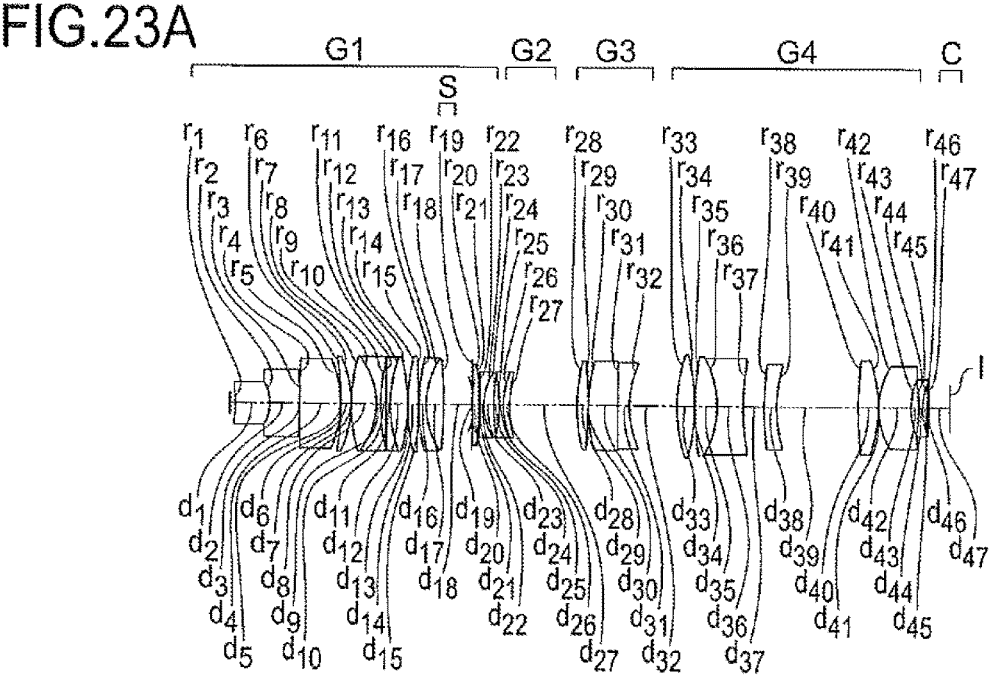
FIG. 23A, FIG. 23B, and FIG. 23C are cross-sectional views along an optical axis showing an optical arrangement at the time of infinite object point focusing of a variable magnification optical system according to an example 12.
Figure 23B:
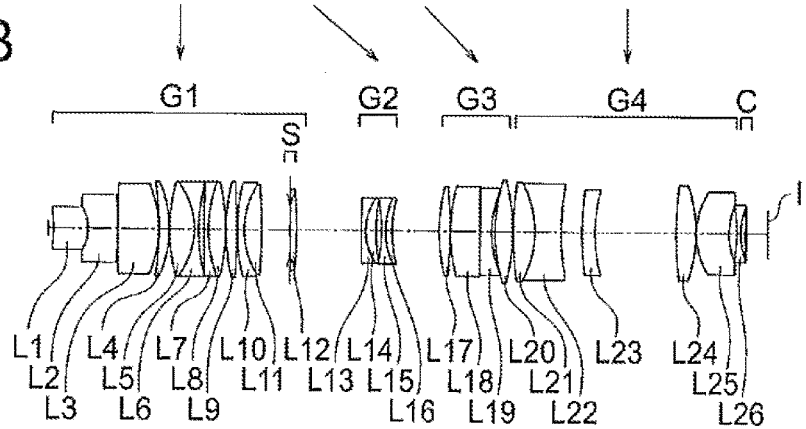
Figure 23C:
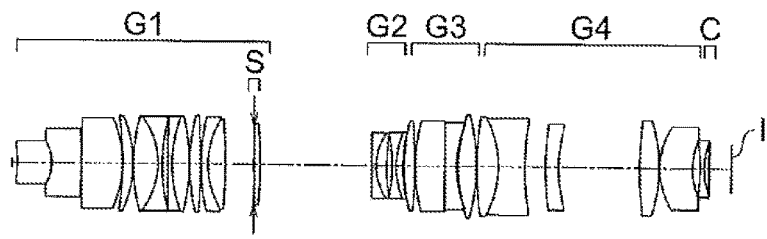

Next, a variable magnification optical system according to an example 12 will be described below. FIG. 23A, FIG. 23B, and FIG. 23C are cross-sectional views along an optical axis showing an optical arrangement at the time of infinite object point focusing of the variable magnification optical system according to the example 12. FIG. 24A, FIG. 24B, FIG. 24C, FIG. 24D, FIG. 24E, FIG. 24F, FIG. 24G, FIG. 24H, FIG. 24I, FIG. 24J, FIG. 24K, and FIG. 24L are aberration diagrams at the time of infinite object point focusing of the variable magnification optical system according to the example 12.

The variable magnification optical system according to the example 12, as shown in FIG. 23A, FIG. 23B, and FIG. 23C, includes in order from an object side, a first lens unit G1 having a positive refractive power, a second lens unit G2 having a negative refractive power, a third lens unit G3 having a positive refractive power, and a fourth lens unit G4 having a positive refractive power.

The first lens unit G1 includes a positive meniscus lens L1 having a convex surface directed toward an image side, a negative meniscus lens L2 having a convex surface directed toward the image side, a biconvex positive lens L3, a positive meniscus lens L4 having a convex surface directed toward the image side, a biconvex positive lens L5, a biconcave negative lens L6, a negative meniscus lens L7 having a convex surface directed toward the object side, a biconvex positive lens L8, a biconvex positive lens L9, a negative meniscus lens L10 having a convex surface directed toward the object side, a biconvex positive lens L11, and a planoconvex positive lens L12.

Here, the positive meniscus lens L1 and the negative meniscus lens L2 are cemented. Moreover, the biconvex positive lens L5 and the biconcave negative lens L6 are cemented. Furthermore, the negative meniscus lens L7 and the biconvex positive lens L8 are cemented. Also, the negative meniscus lens L10 and the biconvex positive lens L11 are cemented.

The second lens unit G2 includes a negative meniscus lens L13 having a convex surface directed toward the object side, a positive meniscus lens L14 having a convex surface directed toward the object side, a biconcave negative lens L15, and a positive meniscus lens L16 having a convex surface directed toward the object side. Here, the negative meniscus lens L13 and the positive meniscus lens L14 are cemented. Moreover, the biconcave negative lens L15 and the positive meniscus lens L16 are cemented.

The third lens unit G3 includes a biconvex positive lens L17, a biconvex positive lens L18, and a biconcave negative lens L19. Here, the biconvex positive lens L18 and the biconcave negative lens L19 are cemented.

The fourth lens unit G4 includes a biconvex positive lens L20, a biconvex positive lens L21, a biconcave negative lens L22, a negative meniscus lens L23 having a convex surface directed toward the object side, a biconvex positive lens L24, a positive meniscus lens L25 having a convex surface directed toward the object side, and a biconcave negative lens L26. Here, the biconvex positive lens L21 and the biconcave negative lens L22 are cemented.

An aperture stop S is disposed in the first lens unit G1, between the biconvex positive lens L11 and the planoconvex positive lens L12.

At the time of varying magnification from a low magnification end to a high magnification end, the first lens unit G1 is fixed, the aperture stop S is fixed, the second lens unit G2 moves toward the image side, the third lens unit G3 moves toward the image side, and the fourth lens unit G4 is fixed.

Moreover, at the time of varying magnification from the low magnification end to the high magnification end, distances between the lens units change as follows. A distance between the first lens unit G1 and the second lens unit G2 widens. A distance between the second lens unit G2 and the third lens unit G3 narrows. A distance between the third lens unit G3 and the fourth lens unit G4 narrows.

An aspheric surface is used for two surfaces namely, an object-side surface of the biconvex positive lens L20 and an image-side surface of the biconcave negative lens L26.

The variable magnification optical system according to the present example is an optical system suitable for an image pickup element having a pixel pitch of 1.8 μm.

Figure 25A:
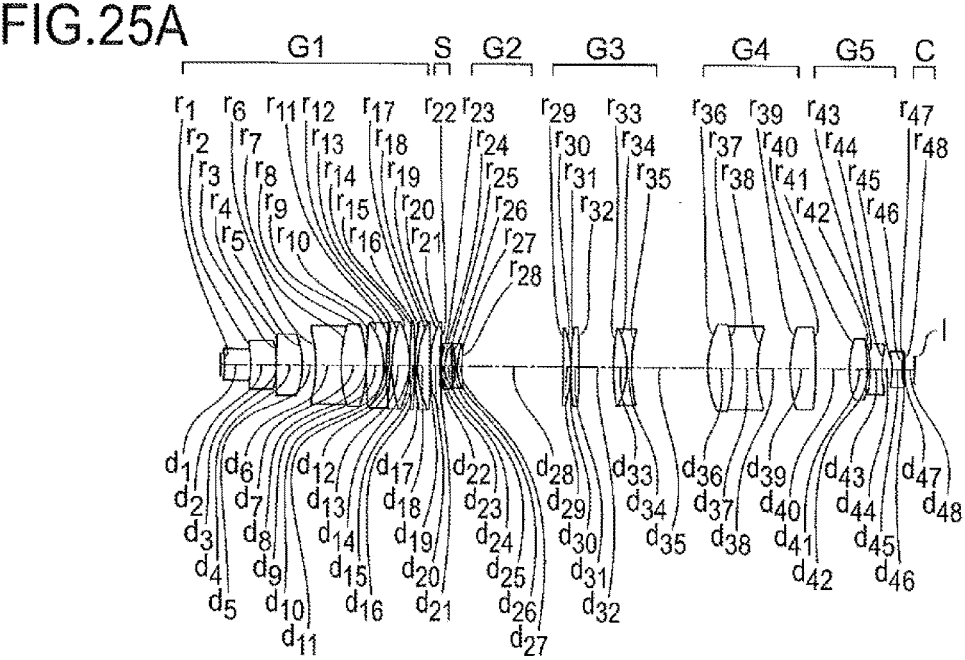
FIG. 25A, FIG. 25B, and FIG. 25C are cross-sectional views along an optical axis showing an optical arrangement at the time of infinite object point focusing of a variable magnification optical system according to an example 13.
Figure 25B:
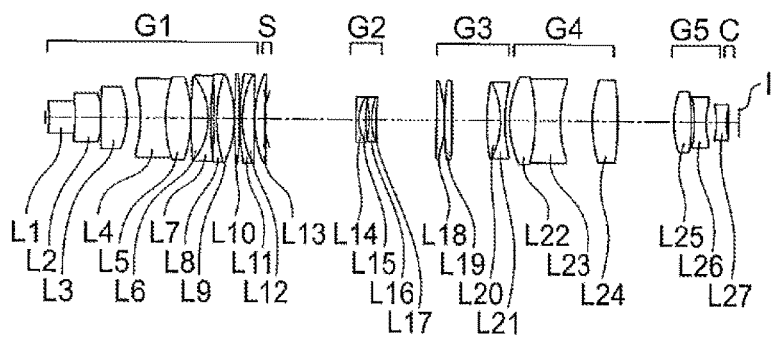
Figure 25C:
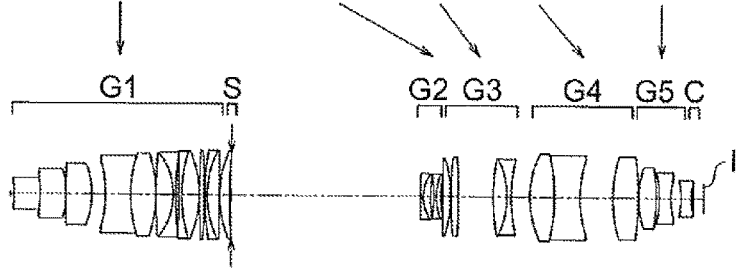

Next, a variable magnification optical system according to an example 13 will be described below. FIG. 25A, FIG. 25B, and FIG. 25C are cross-sectional views along an optical axis showing an optical arrangement at the time of infinite object point focusing of the variable magnification optical system according to the example 13. FIG. 26A, FIG. 26B, FIG. 26C, FIG. 26D, FIG. 26E, FIG. 26F, FIG. 26G, FIG. 26H, FIG. 26I, FIG. 26J, FIG. 26K, and FIG. 26L are aberration diagrams at the time of infinite object point focusing of the variable magnification optical system according to the example 13.

The variable magnification optical system according to the example 13, as shown in FIG. 25A, FIG. 25B, and FIG. 25C, includes in order from an object side, a first lens unit G1 having a positive refractive power, an aperture stop S, a second lens unit G2 having a negative refractive power, a third lens unit G3 having a positive refractive power, a fourth lens unit G4 having a positive refractive power, and a fifth lens unit G5 having a negative refractive power.

The first lens unit G1 includes a negative meniscus lens L1 having a convex surface directed toward an image side, a positive meniscus lens L2 having a convex surface directed toward the image side, a biconvex positive lens L3, a biconcave negative lens L4, a biconvex positive lens L5, a biconvex positive lens L6, a biconcave negative lens L7, a biconcave negative lens L8, a biconvex positive lens L9, a biconvex positive lens L10, a negative meniscus lens L11 having a convex surface directed toward the object side, a biconvex positive lens L12, and a positive meniscus lens L13 having a convex surface directed toward the object side.

Here, the negative meniscus lens L1 and the positive meniscus lens L2 are cemented. Moreover, the biconcave negative lens L4 and the biconvex positive lens L5 are cemented. Furthermore, the biconvex positive lens L6 and the biconcave negative lens L7 are cemented. Also the biconcave negative lens L8 and the biconvex positive lens L9 are cemented. The negative meniscus lens L11 and the biconvex positive lens L12 are cemented.

The second lens unit G2 includes a negative meniscus lens L14 having a convex surface directed toward the object side, a positive meniscus lens L15 having a convex surface directed toward the object side, a biconcave negative lens L16, and a positive meniscus lens L17 having a convex surface directed toward the object side. Here, the negative meniscus lens L14 and the positive meniscus lens L15 are cemented. Moreover, the biconcave negative lens L16 and the positive meniscus lens L17 are cemented.

The third lens unit G3 includes a positive meniscus lens L18 having a convex surface directed toward the image side, a biconvex positive lens L19, a biconvex positive lens L20, and a biconcave negative lens L21. Here, the biconvex positive lens L20 and the biconcave negative lens L21 are cemented.

The fourth lens unit G4 includes a biconvex positive lens L22, a biconcave negative lens L23, and a biconvex positive lens L24. Here, the biconvex positive lens L22 and the biconcave negative lens L23 are cemented.

The fifth lens unit G5 includes a biconvex positive lens L25, a biconcave negative lens L26, and a biconcave negative lens L27.

The aperture stop S is disposed between the first lens unit G1 and the second lens unit G2. More specifically, the aperture stop S is disposed on the image side of the first lens unit G1, near the positive meniscus lens L13.

At the time of varying magnification from a low magnification end to a high magnification end, the first lens unit G1 is fixed, the aperture stop S is fixed, the second lens unit G2 moves toward the image side, the third lens unit G3 moves toward the image side, the fourth lens unit G4, after moving toward the object side, moves toward the image side, and the fifth lens unit G5 is fixed.

Moreover, at the time of varying magnification from the low magnification end to the high magnification end, distances between the lens units change as follows. A distance between the first lens unit G1 and the second lens unit G2 widens. A distance between the second lens unit G2 and the third lens unit G3 narrows. A distance between the third lens unit G3 and the fourth lens unit G4 narrows from the low magnification end to an intermediate state, and widens from the intermediate state to the high magnification end. A distance between the fourth lens unit G4 and the fifth lens unit G5 widens from the low magnification end to the intermediate state, and narrows from the intermediate state to the high magnification end.

An aspheric surface is used for one surface namely, an image-side surface of the biconcave negative lens L27.

The variable magnification optical system according to the present example is an optical system suitable for an image pickup element having a pixel pitch of 2.2 μm.

Figure 27A:
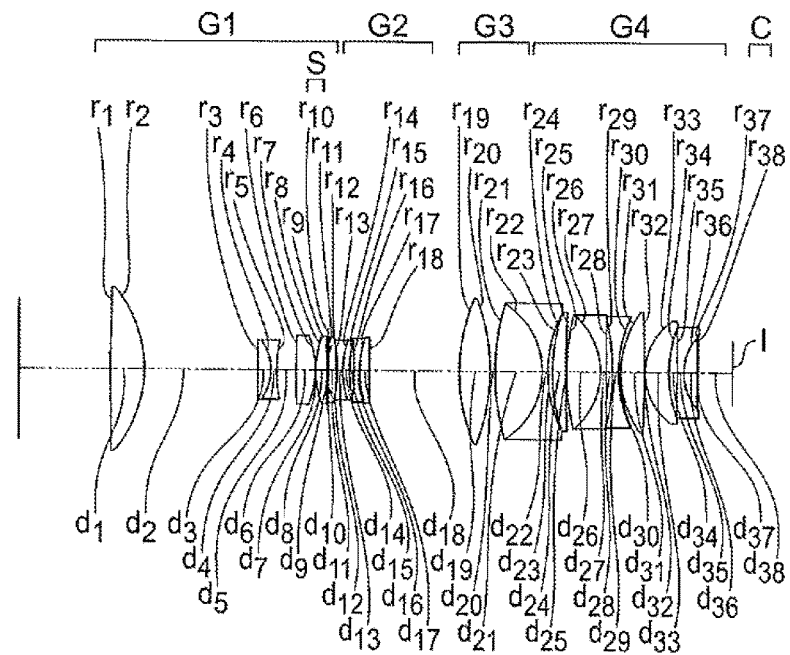
FIG. 27A, FIG. 27B, and FIG. 27C are cross-sectional views along an optical axis showing an optical arrangement at the time of infinite object point focusing of a variable magnification optical system according to an example 14.
Figure 27B:
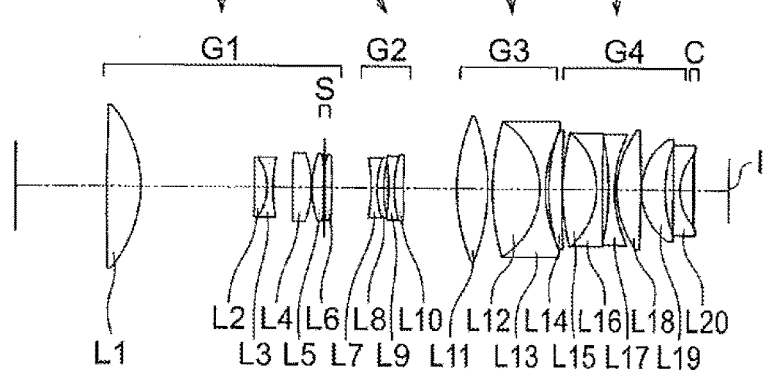
Figure 27C:
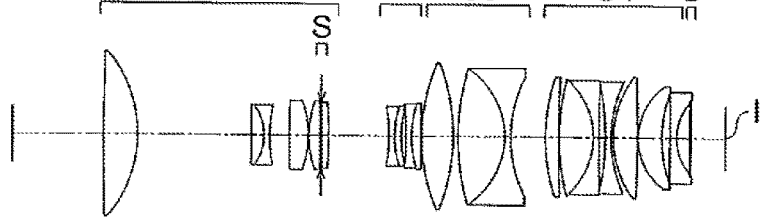

Next, a variable magnification optical system according to an example 14 will be described below. FIG. 27A, FIG. 27B, and FIG. 27C are cross-sectional views along an optical axis showing an optical arrangement at the time of infinite object point focusing of the variable magnification optical system according to the example 14. FIG. 28A, FIG. 28B, FIG. 28C, FIG. 28D, FIG. 28E, FIG. 28F, FIG. 28G, FIG. 28H, FIG. 28I, FIG. 28J, FIG. 28K, and FIG. 28L are aberration diagrams at the time of infinite object point focusing of the variable magnification optical system according to the example 14.

The variable magnification optical system according to the example 14, as shown in FIG. 27A, FIG. 27B, and FIG. 27C, includes in order from an object side, a first lens unit G1 having a positive refractive power, a second lens unit G2 having a negative refractive power, a third lens unit G3 having a positive refractive power, and a fourth lens unit G4 having a positive refractive power.

The first lens unit G1 includes a biconvex positive lens L1, a positive meniscus lens L2 having a convex surface directed toward an image side, a biconcave negative lens L3, a biconvex positive lens L4, a biconvex positive lens L5, and a planoconvex positive lens L6. Here, the positive meniscus lens L2 and the biconcave negative lens L3 are cemented.

The second lens unit G2 includes a biconcave negative lens L7, a positive meniscus lens L8 having a convex surface directed toward the object side, a biconcave negative lens L9, and a positive meniscus lens L10 having a convex surface directed toward the object side. Here, the biconcave negative lens L7 and the positive meniscus lens L8 are cemented. Moreover, the biconcave negative lens L9 and the positive meniscus lens L10 are cemented.

The third lens unit G3 includes a biconvex positive lens L11, a biconvex positive lens L12, and a biconcave negative lens L13. Here, the biconvex positive lens L12 and the biconcave negative lens L13 are cemented.

The fourth lens unit G4 includes a positive meniscus lens L14 having a convex surface directed toward the object side, a biconvex positive lens L15, a biconcave negative lens L16, a biconcave negative lens L17, a biconvex positive lens L18, a positive meniscus lens L19 having a convex surface directed toward the object side, and a biconcave negative lens L20. Here, the biconvex positive lens L15 and the biconcave negative lens L16 are cemented.

An aperture stop S is disposed in the first lens unit G1, between the biconvex positive lens L5 and the planoconvex positive lens L6.

At the time of varying magnification from a low magnification end to a high magnification end, the first lens unit G1 is fixed, the aperture stop S is fixed, the second lens unit G2 moves toward the image side, the third lens unit G3, after moving toward the image side, moves toward the object side, and the fourth lens unit G4 is fixed.

Moreover, at the time of varying magnification from the low magnification end to the high magnification end, distances between the lens units change as follows. A distance between the first lens unit G1 and the second lens unit G2 widens. A distance between the second lens unit G2 and the third lens unit G3 narrows. A distance between the third lens unit G3 and the fourth lens unit G4 narrows from the low magnification end to an intermediate state, and widens from the intermediate state to the high magnification end.

An aspheric surface is used for one surface namely, an image-side surface of the biconcave negative lens L20.

The variable magnification optical system according to the present example is an optical system suitable for an image pickup element having a pixel pitch of 1.8 μm.

Figure 29A:
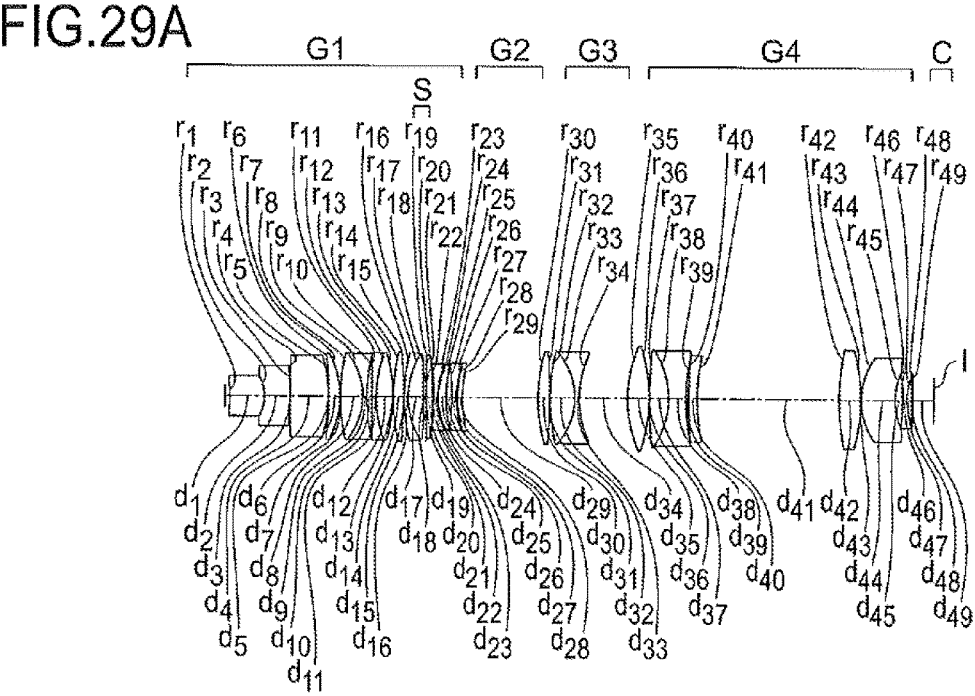
FIG. 29A, FIG. 29B, and FIG. 29C are cross-sectional views along an optical axis showing an optical arrangement at the time of infinite object point focusing of a variable magnification optical system according to an example 15.
Figure 29B:
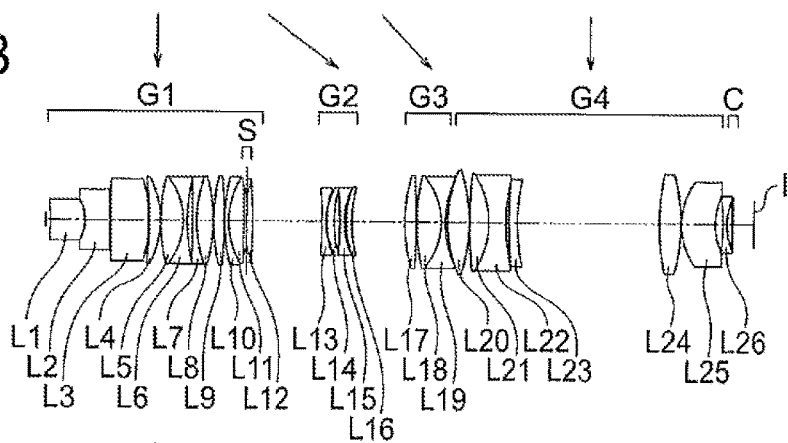
Figure 29C:
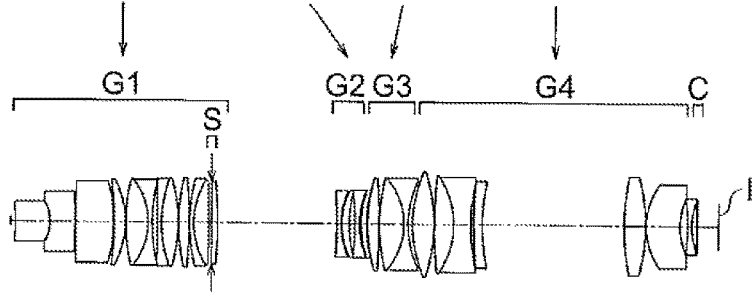

Next, a variable magnification optical system according to an example 15 will be described below. FIG. 29A, FIG. 29B, and FIG. 29C are cross-sectional views along an optical axis showing an optical arrangement at the time of infinite object point focusing of the variable magnification optical system according to the example 15. FIG. 30A, FIG. 30B, FIG. 30C, FIG. 30D, FIG. 30E, FIG. 30F, FIG. 30G, FIG. 30H, FIG. 30I, FIG. 30J, FIG. 30K, and FIG. 30L are aberration diagrams at the time of infinite object point focusing of the variable magnification optical system according to the example 15.

The variable magnification optical system according to the example 15, as shown in FIG. 29A, FIG. 29B, and FIG. 29C, includes in order from an object side, a first lens unit G1 having a positive refractive power, a second lens unit G2 having a negative refractive power, a third lens unit G3 having a positive refractive power, and a fourth lens unit G4 having a positive refractive power.

The first lens unit G1 includes a positive meniscus lens L1 having a convex surface directed toward an image side, a negative meniscus lens L2 having a convex surface directed toward the image side, a biconvex positive lens L3, a positive meniscus lens L4 having a convex surface directed toward the image side, a biconvex positive lens L5, a biconcave negative lens L6, a biconcave negative lens L7, a biconvex positive lens L8, a biconvex positive lens L9, a negative meniscus lens L10 having a convex surface directed toward the object side, a biconvex positive lens L11, and a planoconvex positive lens L12.

Here, the positive meniscus lens L1 and the negative meniscus lens L2 are cemented. Moreover, the biconvex positive lens L5 and the biconcave negative lens L6 are cemented. Furthermore, the biconcave negative lens L7 and the biconvex positive lens L8 are cemented. Also, the negative meniscus lens L10 and the biconvex positive lens L11 are cemented.

The second lens unit G2 includes a biconcave negative lens L13, a positive meniscus lens L14 having a convex surface directed toward the object side, a biconcave negative lens L15, and a positive meniscus lens L16 having a convex surface directed toward the object side.

The third lens unit G3 includes a biconvex positive lens L17, a biconvex positive lens L18, and a biconcave negative lens L19. Here, the biconvex positive lens L18 and the biconcave negative lens L19 are cemented.

The fourth lens unit G4 includes a biconvex positive lens L20, a biconvex positive lens L21, a biconcave negative lens L22, a negative meniscus lens L23 having a convex surface directed toward the object side, a biconvex positive lens L24, a positive meniscus lens L25 having a convex surface directed toward the object side, and a biconcave negative lens L26. Here, the biconvex positive lens L21 and the biconcave negative lens L22 are cemented.

An aperture stop S is disposed in the first lens unit G1, between the biconvex positive lens L11 and the planoconvex positive lens L12.

At the time of varying magnification from a low magnification end to a high magnification end, the first lens unit G1 is fixed, the aperture stop S is fixed, the second lens unit G2 moves toward the image side, the third lens unit G3, after moving toward the image side, moves toward the object side, and the fourth lens unit G4 is fixed.

Moreover, at the time of varying magnification from the low magnification end to the high magnification end, distances between the lens units change as follows. A distance between the first lens unit G1 and the second lens unit G2 widens. A distance between the second lens unit G2 and the third lens unit G3 narrows. A distance between the third lens unit G3 and the fourth lens unit G4 narrows from the low magnification end to an intermediate state, and widens from the intermediate state to the high magnification end.

An aspheric surface is used for six surfaces namely, an object-side surface of the biconcave negative lens L13, an image-side surface of the positive meniscus lens L14, an object-side surface of the biconcave negative lens L15, an image-side surface of the positive meniscus lens L16, an object-side surface of the biconvex positive lens L20, and an image-side surface of the biconcave negative lens L26.

The variable magnification optical system according to the present example is an optical system suitable for an image pickup element having a pixel pitch of 1.8 µm. The second lens unit G2 includes a resin lens.

Figure 31A:
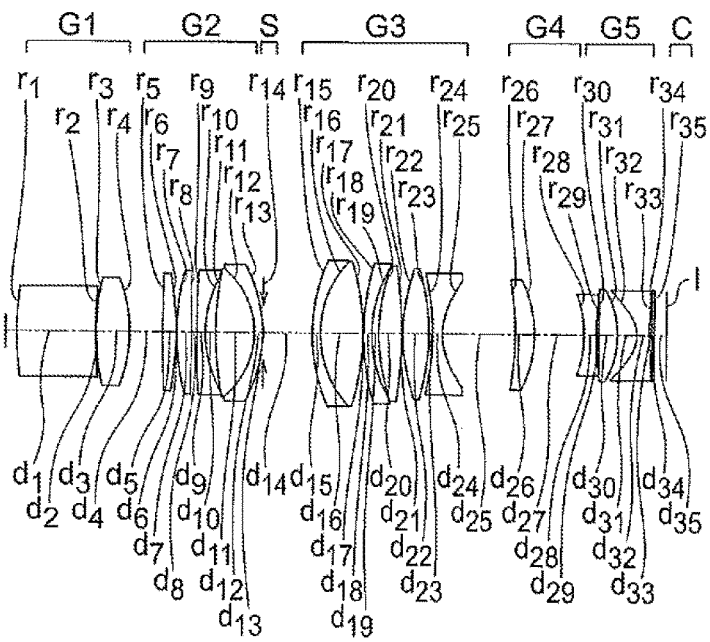
FIG. 31A, FIG. 31B, and FIG. 31C are cross-sectional views along an optical axis showing an optical arrangement at the time of infinite object point focusing of a variable magnification optical system according to an example 16.
Figure 31B:
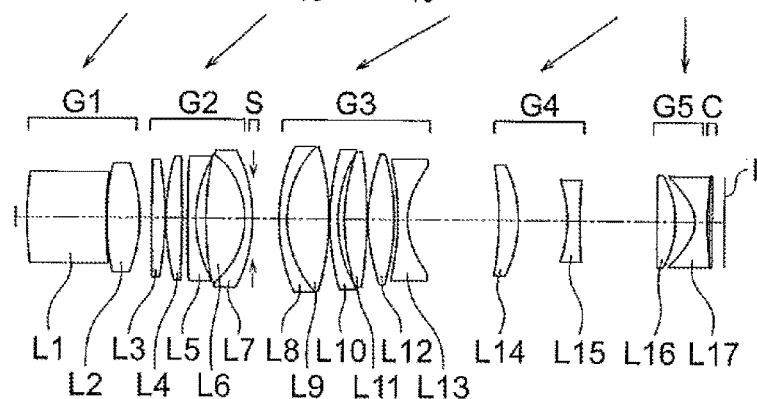
Figure 31C:
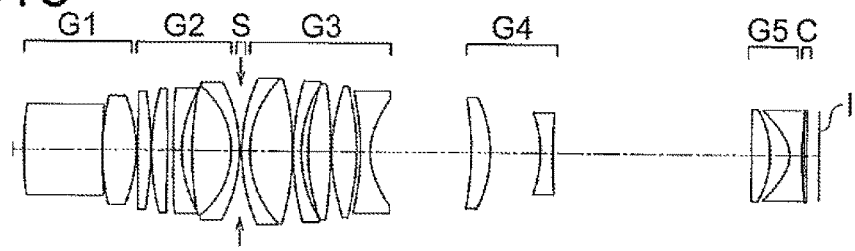

Next, a variable magnification optical system according to an example 16 will be described below. FIG. 31A, FIG. 31B, and FIG. 31C are cross-sectional views along an optical axis showing an optical arrangement at the time of infinite object point focusing of the variable magnification optical system according to the example 16. FIG. 32A, FIG. 32B, FIG. 32C, FIG. 32D, FIG. 32E, FIG. 32F, FIG. 32G, FIG. 32H, FIG. 32I, FIG. 32J, FIG. 32K, and FIG. 32L are aberration diagrams at the time of infinite object point focusing of the variable magnification optical system according to the example 16.

The variable magnification optical system according to the example 16, as shown in FIG. 31A, FIG. 31B, and FIG. 31C, includes in order from an object side, a first lens unit G1 having a positive refractive power, a second lens unit G2 having a positive refractive power, an aperture stop S, a third lens unit G3 having a positive refractive power, a fourth lens unit G4 having a negative refractive power, and a fifth lens unit G5 having a negative refractive power.

The first lens unit G1 includes a positive meniscus lens L1 having a convex surface directed toward the object side and a biconvex positive lens L2.

The second lens unit G2 includes a biconvex positive lens L3, a biconvex positive lens L4, a biconcave negative lens L5, a biconvex positive lens L6, and a negative meniscus lens L7 having a convex surface directed toward an image side. Here, the biconvex positive lens L6 and the negative meniscus lens L7 are cemented.

The third lens unit G3 includes a negative meniscus lens L8 having a convex surface directed toward the object side, a biconvex positive lens L9, a negative meniscus lens L10 having a convex surface directed toward the object side, a biconvex positive lens L11, a biconvex positive lens L12, and a biconcave negative lens L13. Here, the negative meniscus lens L8 and the biconvex positive lens L9 are cemented.

The fourth lens unit G4 includes a positive meniscus lens L14 having a convex surface directed toward the image side and a biconcave negative lens L15.

The fifth lens unit G5 includes a positive meniscus lens L16 having a convex surface directed toward the image side and a biconcave negative lens L17.

The aperture stop S is disposed between the second lens unit G2 and the third lens unit G3. More specifically, the aperture stop S is disposed on the image side of the second lens unit G2, near the negative meniscus lens L7.

At the time of varying magnification from a low magnification end to a high magnification end, the first lens unit G1 moves toward the object side, the second lens unit G2 moves toward the object side, the aperture stop S moves together with the second lens unit G2 toward the object side, the third lens unit G3 moves toward the object side, the fourth lens unit G4 moves toward the object side, and the fifth lens unit G5 is fixed.

Moreover, at the time of varying magnification from the low magnification end to the high magnification end, distances between the lens units change as follows. A distance between the first lens unit G1 and the second lens unit G2 narrows. A distance between the second lens unit G2 and the third lens unit G3 narrows. A distance between the third lens unit G3 and the fourth lens unit G4 widens. A distance between the fourth lens unit G4 and the fifth lens unit G5 widens.

An aspheric surface is used for 14 surfaces namely, both surfaces of the biconvex positive lens L3, both surfaces of the biconvex positive lens L4, both surfaces of the biconcave negative lens L5, both surfaces of the biconvex positive lens L11, both surfaces of the biconvex positive lens L12, both surfaces of the biconcave negative lens L13, and both surfaces of the biconcave negative lens L17.

The variable magnification optical system according to the present example is an optical system suitable for an image pickup element having a pixel pitch of 2.2 µm. The third lens unit G3 corresponds to a predetermined positive lens unit. The second lens unit G2 and the third lens unit G3 include a resin lens.

Figure 33A:
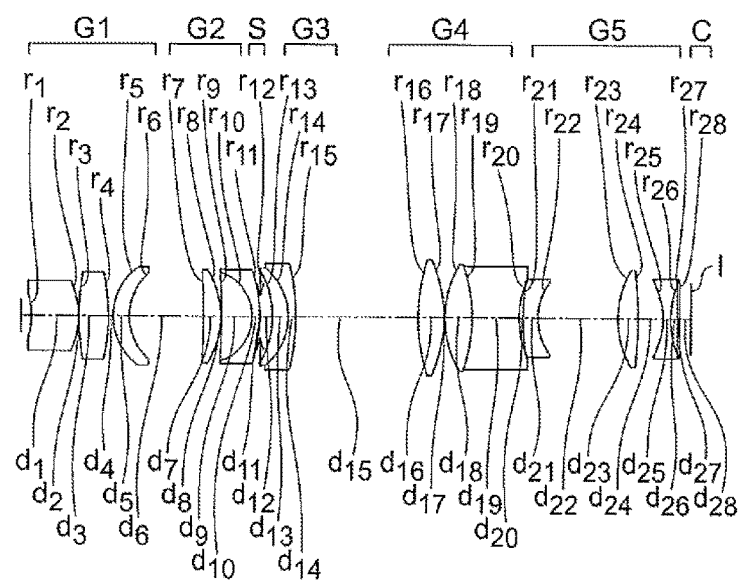
FIG. 33A, FIG. 33B, and FIG. 33C are cross-sectional views along an optical axis showing an optical arrangement at the time of infinite object point focusing of a variable magnification optical system according to an example 17.
Figure 33B:
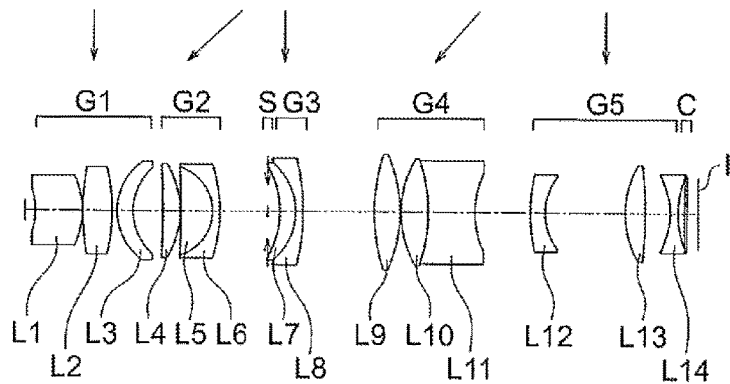
Figure 33C:
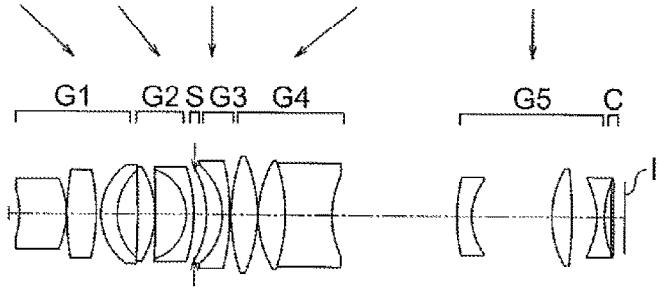

Next, a variable magnification optical system according to an example 17 will be described below. FIG. 33A, FIG. 33B, and FIG. 33c are cross-sectional views along an optical axis showing an optical arrangement at the time of infinite object point focusing of the variable magnification optical system according to the example 17. FIG. 34A, FIG. 34B, FIG. 34C, FIG. 34D, FIG. 34E, FIG. 34F, FIG. 34G, FIG. 34H, FIG. 34I, FIG. 34J, FIG. 34K, and FIG. 34L are aberration diagrams at the time of infinite object point focusing of the variable magnification optical system according to the example 17.

The variable magnification optical system according to the example 17, as shown in FIG. 33A, FIG. 33B, and FIG. 33C, includes in order from an object side, a first lens unit G1 having a positive refractive power, a second lens unit G2 having a positive refractive power, an aperture stop S, a third lens unit G3 having a negative refractive power, a fourth lens unit G4 having a positive refractive power, and a fifth lens unit G5 having a negative refractive power.

The first lens unit G1 includes a positive meniscus lens L1 having a convex surface directed toward an image side, a biconvex positive lens L2, and a positive meniscus lens L3 having a convex surface directed toward the object side.

The second lens unit G2 includes a positive meniscus lens L4 having a convex surface directed toward the image side, a positive meniscus lens L5 having a convex surface directed toward the image side, and a negative meniscus lens L6 having a convex surface directed toward the image side. Here, the positive meniscus lens L5 and the negative meniscus lens L6 are cemented.

The third lens unit G3 includes a positive meniscus lens L7 having a convex surface directed toward the image side and a negative meniscus lens L8 having a convex surface directed toward the image side. Here, the positive meniscus lens L7 and the negative meniscus lens L8 are cemented.

The fourth lens unit G4 includes a biconvex positive lens L9, a biconvex positive lens L10, and a biconcave negative lens L11. Here, the biconvex positive lens L10 and the biconcave negative lens L11 are cemented.

The fifth lens unit G5 includes a negative meniscus lens L12 having a convex surface directed toward the object side, a biconvex positive lens L13, and a biconcave negative lens L14.

The aperture stop S is disposed between the second lens unit G2 and the third lens unit G3. More specifically, the aperture stop S is disposed on the object side of the third lens unit G3, near the positive meniscus lens L7.

At the time of varying magnification from a low magnification end to a high magnification end, the first lens unit G1, after moving toward the object side, moves toward the image side, the second lens unit G2, after moving toward the object side, moves toward the image side, the aperture stop S is fixed, the third lens unit G3 is fixed, the fourth lens unit G4 moves toward the object side, and the fifth lens unit G5 is fixed.

Moreover, at the time of varying magnification from the low magnification end to the high magnification end, distances between the lens units change as follows. A distance between the first lens unit G1 and the second lens unit G2 narrows. A distance between the second lens unit G2 and the third lens unit G3 widens from the low magnification end to an intermediate state, and narrows from the intermediate state to the high magnification end. A distance between the third lens unit G3 and the fourth lens unit G4 narrows. A distance between the fourth lens unit G4 and the fifth lens unit G5 widens.

An aspheric surface is used for four surfaces namely, an image-side surface of the positive meniscus lens L4, an image-side surface of the biconvex positive lens L9, an object-side surface of the negative meniscus lens L12, and image-side surface of the biconcave negative lens L14.

The variable magnification optical system according to the present example is an optical system suitable for an image pickup element having a pixel pitch of 1.8 µm. The fourth lens unit G4 corresponds to a predetermined positive lens unit. The third lens unit G3 corresponds to a predetermined negative lens unit.

Next, a variable magnification optical system according to an example 18 will be described below. FIG. 35A, FIG. 35B, and FIG. 35C are cross-sectional views along an optical axis showing an optical arrangement at the time of infinite object point focusing of the variable magnification optical system according to the example 18. FIG. 36A, FIG. 36B, FIG. 36C, FIG. 36D, FIG. 36E, FIG. 36F, FIG. 36G, FIG. 36H, FIG. 36I, FIG. 36J, FIG. 36K, and FIG. 36L are aberration diagrams at the time of infinite object point focusing of the variable magnification optical system according to the example 18.

The variable magnification optical system according to the example 18, as shown in FIG. 35A, FIG. 35B, and FIG. 35C, includes in order from an object side, a first lens unit G1 having a positive refractive power, a second lens unit G2 having a negative refractive power, a third lens unit G3 having a positive refractive power, and a fourth lens unit G4 having a negative refractive power.

The first lens unit G1 includes a positive meniscus lens L1 having a convex surface directed toward an image side, a negative meniscus lens L2 having a convex surface directed toward the image side, a biconvex positive lens L3, a positive meniscus lens L4 having a convex surface directed toward the image side, a biconvex positive lens L5, a biconcave negative lens L6, a negative meniscus lens L7 having a convex surface directed toward the object side, a biconvex positive lens L8, a biconvex positive lens L9, a negative meniscus lens L10 having a convex surface directed toward the object side, a biconvex positive lens L11, and a planoconvex positive lens L12.

Here, the positive meniscus lens L1 and the negative meniscus lens L2 are cemented. Moreover, the biconvex positive lens L5 and the biconcave negative lens L6 are cemented. Furthermore, the negative meniscus lens L7 and the biconvex positive lens L8 are cemented. Also, the negative meniscus lens L10 and the biconvex positive lens L11 are cemented.

The second lens unit G2 includes a biconcave negative lens L13, a positive meniscus lens L14 having a convex surface directed toward the object side, a biconcave negative lens L15, and a positive meniscus lens L16 having a convex surface directed toward the object side.

The third lens unit G3 includes a biconvex positive lens L17, a biconvex positive lens L18, and a biconcave negative lens L19. Here, the biconvex positive lens L18 and the biconcave negative lens L19 are cemented.

The fourth lens unit G4 includes a positive meniscus lens L20 having a convex surface directed toward the image side, a biconvex positive lens L21, a biconcave negative lens L22, a negative meniscus lens L23 having a convex surface directed toward the object side, a biconvex positive lens L24, a positive meniscus lens L25 having a convex surface directed toward the object side, and a biconcave negative lens L26. Here, the biconvex positive lens L21 and the biconcave negative lens L22 are cemented.

An aperture stop S is disposed in the first lens unit G1, between the biconvex positive lens L11 and the planoconvex positive lens L12.

At the time of varying magnification from a low magnification end to a high magnification end, the first lens unit G1 moves toward the object side, the aperture stop S moves together with the first lens unit G1 toward the object side, the second lens unit G2 moves toward the image side, the third lens unit G3 moves toward the object side, and the fourth lens unit G4 is fixed.

Moreover, at the time of varying magnification from the low magnification end to the high magnification end, distances between the lens units change as follows. A distance between the first lens unit G1 and the second lens unit G2 widens. A distance between the second lens unit G2 and the third lens unit G3 narrows. A distance between the third lens unit G3 and the fourth lens unit G4 widens.

An aspheric surface is used for six surfaces namely, an object-side surface of the biconcave negative lens L13, an image-side surface of the positive meniscus lens L14, an object-side surface of the biconcave negative lens L15, an image-side surface of the positive meniscus lens L16, an object-side surface of the positive meniscus lens L20, and an image-side surface of the biconcave negative lens L26.

The variable magnification optical system according to the present example is an optical system suitable for an image pickup element having a pixel pitch of 1.8 μm. The second lens unit G2 includes a resin lens.

Figure 37A:
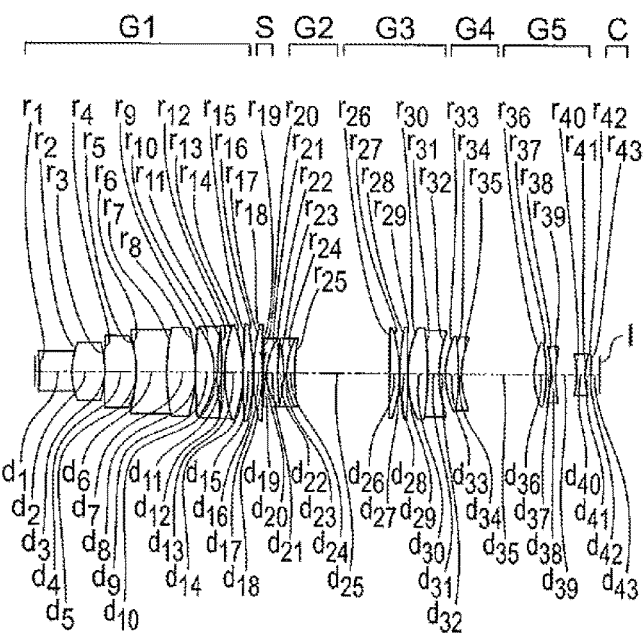
FIG. 37A, FIG. 37B, and FIG. 37C are cross-sectional views along an optical axis showing an optical arrangement at the time of infinite object point focusing of a variable magnification optical system according to an example 19.
Figure 37B:
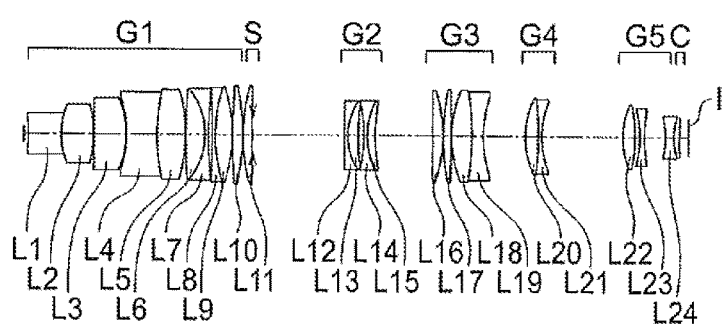
Figure 37C:
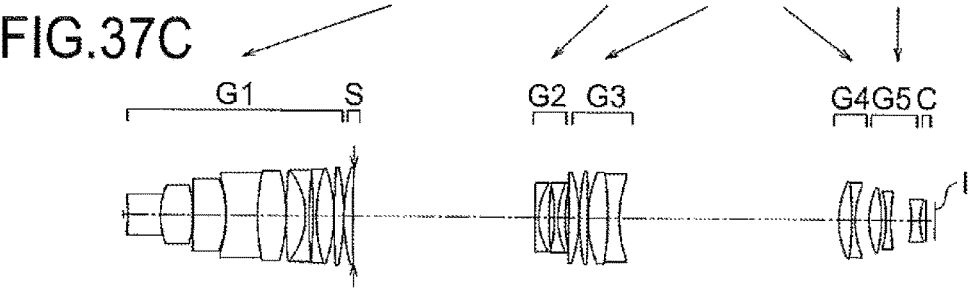

Next, a variable magnification optical system according to an example 19 will be described below. FIG. 37A, FIG. 37B, and FIG. 37C are cross-sectional views along an optical axis showing an optical arrangement at the time of infinite object point focusing of the variable magnification optical system according to the example 19. FIG. 38A, FIG. 38B, FIG. 38C, FIG. 38D, FIG. 38E, FIG. 38F, FIG. 38G, FIG. 38H, FIG. 38I, FIG. 38J, FIG. 38K, and FIG. 38L are aberration diagrams at the time of infinite object point focusing of the variable magnification optical system according to the example 19.

The variable magnification optical system according to the example 19, as shown in FIG. 37A, FIG. 37B, and FIG. 37C, includes in order from an object side, a first lens unit G1 having a positive refractive power, an aperture stop S, a second lens unit G2 having a negative refractive power, a third lens unit G3 having a positive refractive power, a fourth lens unit G4 having a negative refractive power, and a fifth lens unit G5 having a negative refractive power.

The first lens unit G1 includes a biconcave negative lens L1, a biconvex positive lens L2, a biconvex positive lens L3, a biconcave negative lens L4, a biconvex positive lens L5, a biconvex positive lens L6, a biconcave negative lens L7, a biconcave negative lens L8, a biconvex positive lens L9, a biconvex positive lens L10, and a positive meniscus lens L11 having a convex surface directed toward the object side.

Here, the biconcave negative lens L1 and the biconvex positive lens L2 are cemented. Moreover, the biconcave negative lens L4 and the biconvex positive lens L5 are cemented. Furthermore, the biconvex positive lens L6 and the biconcave negative lens L7 are cemented. Also, the biconcave negative lens L8 and the biconvex positive lens L9 are cemented.

The second lens unit G2 includes a negative meniscus lens L12 having a convex surface directed toward the object side, a positive meniscus lens L13 having a convex surface directed toward the object side, a biconcave negative lens L14, and a positive meniscus lens L15 having a convex surface directed toward the object side. Here, the negative meniscus lens L12 and the positive meniscus lens L13 are cemented. Moreover, the biconcave negative lens L14 and the positive meniscus lens L15 are cemented.

The third lens unit G3 includes a biconvex positive lens L16, a biconvex positive lens L17, a biconvex positive lens L18, and a biconcave negative lens L19. Here, the biconvex positive lens L18 and the biconcave negative lens L19 are cemented.

The fourth lens unit G4 includes a biconvex positive lens L20 and a biconcave negative lens L21. Here, the biconvex positive lens L20 and the biconcave negative lens L21 are cemented.

The fifth lens unit G5 includes a biconvex positive lens L22, a biconcave negative lens L23, and a biconcave negative lens L24.

The aperture stop S is disposed between the first lens unit G1 and the second lens unit G2. More specifically, the aperture stop S is disposed on the image side of the first lens unit G1, near the positive meniscus lens L11.

At the time of varying magnification from a low magnification end to a high magnification end, the first lens unit G1 moves toward the object side, the aperture stop S moves together with the first lens unit G1 toward the object side, the second lens unit G2 moves toward the object side, the third lens unit G3 moves toward the object side, the fourth lens unit G4, after moving toward the object side, moves toward the image side, and the fifth lens unit G5 is fixed.

Moreover, at the time of varying magnification from the low magnification end to the high magnification end, distances between the lens units change as follows. A distance between the first lens unit G1 and the second lens unit G2 widens. A distance between the second lens unit G2 and the third lens unit G3 narrows. A distance between the third lens unit G3 and the fourth lens unit G4 widens. A distance between the fourth lens unit G4 and the fifth lens unit G5, widens from the low magnification end to an intermediate state, and narrows from the intermediate state to the high magnification end.

An aspheric surface is used for one surface namely, an image-side surface of the biconcave negative lens L24.

The variable magnification optical system according to the present example is an optical system suitable for an image pickup element having a pixel pitch of 1.8 μm.

Next, numerical data of optical components comprising the optical system of each above example are shown. In numerical data of each example, r1, r2, . . . denotes a curvature radius of each lens surface, d1, d2, . . . denotes a thickness of each lens or an air distance between adjacent lens surfaces, nd1, nd2, . . . denotes a refractive index of each lens for d-line, v1, vd2, . . . denotes an Abbe number of each lens, * denotes an aspheric surface, LM denotes a low magnification end, HM denotes a high magnification end, ST denotes a standard state, NA denotes a numerical aperture on the object side, β denotes a magnification, f denotes a focal length of a total optical system, IH denotes an image height, fb denotes a back focus, LTL denotes a Lens total length. Lens total length is the distance from the frontmost lens surface to the rearmost lens surface plus back focus. The back focus is a unit which is expressed upon air conversion of a distance from the lens backmost surface to a paraxial image surface.

A shape of an aspheric surface is defined by the following expression where the direction of the optical axis is represented by z, the direction orthogonal to the optical axis is represented by y, a conical coefficient is represented by K, aspheric surface coefficients are represented by A4, A6, A8, A10, A12, A14, $$Z=(y^2/r)/[1+\{1-(1+k)(y/r)^2\}^{1/2}]+A4y^4+A6y^6+A8y^8+A10y^{10}+A12y^{12}+A14y^{14}$$

Further, E or e denotes exponent of ten. These symbols are commonly used in the following numerical data for each example.

Example 1

Unit mm

Surface data

| Surface no. | r | d | nd | vd |
|---|---|---|---|---|
| Object plane | ∞ | 1.36 | | |
| 1 | −309.327 | 8.77 | 1.69895 | 30.13 |
| 2 | 19.593 | 9.86 | 1.56384 | 60.67 |
| 3 | 169.774 | 1.49 | | |
| 4* | 87.226 | 9.97 | 1.49700 | 81.61 |
| 5* | −27.825 | Variable | | |
| 6* | 195.646 | 2.29 | 1.49700 | 81.61 |
| 7* | −65.067 | 0.07 | | |
| 8* | 193.037 | 4.44 | 1.63484 | 23.91 |
| 9* | −50.359 | 0.05 | | |
| 10* | −55.705 | 0.50 | 1.58360 | 30.33 |
| 11* | 117.155 | 1.58 | | |
| 12 | −387.151 | 7.75 | 1.49700 | 81.61 |
| 13 | −25.140 | 0.50 | 1.72047 | 34.71 |
| 14 | −39.322 | 1.14 | | |
| 15(Stop) | ∞ | Variable | | |
| 16 | −419.588 | 7.85 | 1.49700 | 81.61 |
| 17 | −27.193 | 0.50 | 1.72047 | 34.71 |
| 18 | −1483.065 | 6.81 | 1.49700 | 81.61 |
| 19 | −37.318 | 18.14 | | |
| 20* | 109.722 | 1.76 | 1.84666 | 23.78 |
| 21* | 160.100 | 7.52 | | |
| 22* | 32.393 | 8.64 | 1.53366 | 55.96 |
| 23* | −107.509 | 0.05 | | |
| 24* | 50.087 | 6.12 | 1.63484 | 23.91 |
| 25* | −95.106 | 0.05 | | |
| 26* | −103.168 | 3.30 | 1.58360 | 30.33 |
| 27* | 16.792 | Variable | | |
| 28* | −33.163 | 2.02 | 1.53366 | 55.96 |
| 29* | −19.376 | 6.82 | | |
| 30* | −11.318 | 1.35 | 1.53366 | 55.96 |
| 31* | 49.066 | 1.15 | | |
| 32 | ∞ | 0.30 | 1.51633 | 64.14 |
| 33 | ∞ | 2.00 | | |
| Image plane | ∞ | | | |

Aspherical surface data

4th surface k = −19.735
A4 = 1.38433e−06, A6 = 1.56209e−08, A8 = 7.39496e−13
5th surface -continued Unit mm k = −0.510
A4 = −4.14171e−06, A6 = −2.64065e−09, A8 = 1.84736e−11
6th surface k = −94.142
A4 = −4.70906e−06, A6 = −1.40159e−09, A8 = −1.17602e−12
7th surface k = −8.518
A4 = 2.73566e−06, A6 = 1.80370e−08, A8 = −6.72571e−12
8th surface k = −18.494
A4 = 5.31697e−07, A6 = 1.14493e−08, A8 = −2.38222e−11
9th surface k = 2.412
A4 = 2.38083e−06, A6 = −5.01743e−09, A8 = 1.48766e−11
10th surface k = −1.452
A4 = 3.36824e−06, A6 = 2.13590e−09, A8 = 1.71100e−11
11th surface k = 1.976
A4 = −3.10983e−06, A6 = 8.70979e−09, A8 = −7.12690e−12
20th surface k = −1.901
A4 = −2.70949e−07, A6 = −1.49730e−09, A8 = 6.66247e−13
21th surface k = −83.263
A4 = −8.31318e−07, A6 = 3.83390e−10, A8 = −4.09608e−13
22th surface k = −1.372
A4 = −2.44219e−06, A6 = 4.74755e−09, A8 = −7.17140e−12
23th surface k = −58.415
A4 = 3.99030e−07, A6 = −1.24591e−09, A8 = 1.66221e−12
24th surface k = −8.499
A4 = −3.71357e−06, A6 = 3.76244e−09, A8 = 2.52674e−12
25th surface k = −4.070
A4 = 7.72606e−07
26th surface k = −2.188
A4 = 8.90733e−07
27th surface k = −1.108
A4 = −1.06462e−05, A6 = 4.28130e−08, A8 = −5.96472e−11
28th surface k = −1.146
A4 = 2.15466e−05, A6 = 3.87834e−07, A8 = −7.79721e−10
29th surface k = −4.685
A4 = −3.46506e−05, A6 = 5.90726e−07, A8 = −1.63146e−09
30th surface k = −1.349
A4 = 1.28211e−04, A6 = −1.09079e−06, A8 = 2.14386e−09
31th surface k = −2.255
A4 = 1.19890e−06, A6 = 2.63532e−07, A8 = −2.51907e−09

Various data

-continued

Unit mm

|  | LM | HM |
|---|---|---|
| NA | 0.23 | 0.61 |
| β | −1.33 | −3.56 |
| f (mm) | 14.45 | 5.83 |
| IH (mm) | 11.00 | 11.00 |
| fb (in air) | 3.35 | 3.35 |
| LTL (in air) | 178.53 | 178.53 |
| d5 | 32.47 | 0.05 |
| d15 | 15.62 | 1.38 |
| d27 | 7.76 | 54.42 |

Unit focal length

| f1 = 73.27 | f2 = 55.92 | f3 = 59.97 | f4 = −23.38 |
|---|---|---|---|

Example 2

Unit mm

Surface data

| Surface no. | r | d | nd | νd |
|---|---|---|---|---|
| Object plane | ∞ | 1.08 | | |
| 1 | 105.320 | 9.00 | 1.69895 | 30.13 |
| 2 | 19.430 | 9.10 | 1.56384 | 60.67 |
| 3 | 77.997 | 0.11 | | |
| 4* | 56.271 | 6.22 | 1.49700 | 81.61 |
| 5 | −43.741 | 0.06 | | |
| 6 | −43.716 | 2.89 | 1.84666 | 23.78 |
| 7* | −39.010 | Variable | | |
| 8* | 273.740 | 2.78 | 1.49700 | 81.61 |
| 9* | −63.097 | 3.11 | | |
| 10* | 71.013 | 3.34 | 1.63484 | 23.91 |
| 11* | −147.957 | 0.05 | | |
| 12* | −1103.715 | 0.50 | 1.58360 | 30.33 |
| 13* | 33.167 | 4.18 | | |
| 14 | 543.275 | 10.00 | 1.49700 | 81.61 |
| 15 | −23.848 | 2.88 | 1.72047 | 34.71 |
| 16 | −33.305 | 1.00 | | |
| 17(Stop) | ∞ | Variable | | |
| 18 | 154.618 | 7.91 | 1.49700 | 81.61 |
| 19 | −41.703 | 0.50 | 1.72047 | 34.71 |
| 20 | 88.450 | 9.80 | 1.49700 | 81.61 |
| 21 | −58.806 | 1.14 | | |
| 22* | 97.787 | 3.05 | 1.91082 | 35.25 |
| 23* | 183.088 | Variable | | |
| 24* | 39.185 | 8.11 | 1.53366 | 55.96 |
| 25* | −273.061 | 0.05 | | |
| 26* | 39.379 | 6.99 | 1.63484 | 23.91 |
| 27* | −130.804 | 0.05 | | |
| 28* | −272.693 | 2.97 | 1.58360 | 30.33 |
| 29* | 16.301 | Variable | | |
| 30* | −143.895 | 3.21 | 1.53366 | 55.96 |
| 31 | −29.718 | 1.08 | | |
| 32* | −66.754 | 3.13 | 1.53366 | 55.96 |
| 33* | −46.956 | 8.53 | | |
| 34* | −12.948 | 1.00 | 1.53366 | 55.96 |
| 35* | 24.888 | 2.14 | | |
| 36 | ∞ | 0.30 | 1.51633 | 64.14 |
| 37 | ∞ | 2.00 | | |
| Image plane | ∞ | | | |

Aspherical surface data

4th surface k = 0.089
A4 = 8.91611e−07, A6 = 2.23110e−09
7th surface

-continued

Unit mm k = −0.957
A4 = −4.63936e−06, A6 = −3.47489e−09
8th surface k = −10.000
A4 = −7.98501e−06, A6 = 1.93962e−08
9th surface k = −10.000
A4 = 3.27233e−06, A6 = 9.66518e−09
10th surface k = 4.111
A4 = 2.92694e−06, A6 = −1.83189e−09
11th surface k = −10.000
A4 = 4.52716e−06, A6 = 1.06832e−08
12th surface k = 7.852
A4 = 4.90830e−06, A6 = 2.68297e−09
13th surface k = −1.026
A4 = −3.21839e−06, A6 = 9.95260e−10
22th surface k = 2.149
A4 = 1.62847e−07, A6 = −1.92713e−09
23th surface k = −5.323
A4 = −1.67614e−06, A6 = −9.82428e−10
24th surface k = −1.465
A4 = −3.87411e−06, A6 = −1.34487e−09
25th surface k = −10.000
A4 = 1.92162e−06, A6 = −3.25394e−09
26th surface k = −2.915
A4 = −5.00971e−06, A6 = 1.89801e−09
27th surface k = −4.067
A4 = 8.80372e−07, A6 = 7.56366e−10
28th surface k = −9.876
A4 = 2.61002e−06, A6 = 4.22180e−10
29th surface k = −1.001
A4 = −9.35453e−06, A6 = 1.30478e−09
30th surface k = −10.000
32th surface k = 6.084
A4 = −8.44512e−05, A6 = −3.38609e−08
33th surface k = 5.446
A4 = −6.60035e−05, A6 = 1.83701e−08
34th surface k = −3.939
A4 = −2.61809e−05, A6 = 4.45113e−09
35th surface -continued Unit mm k = −1.141
A4 = −9.96483e−06, A6 = 1.22337e−08

Various data

|  | LM | ST | HM |
|---|---|---|---|
| NA | 0.23 | 0.42 | 0.61 |
| β | −1.33 | −2.45 | −3.56 |
| f (mm) | 17.07 | 9.07 | 6.29 |
| IH (mm) | 11.00 | 11.00 | 11.00 |
| fb (in air) | 4.33 | 4.33 | 4.33 |
| LTL (in air) | 198.81 | 198.81 | 198.81 |
| d7 | 22.18 | 2.54 | 0.48 |
| d17 | 35.30 | 21.56 | 0.05 |
| d23 | 15.08 | 11.57 | 14.39 |
| d29 | 9.18 | 46.07 | 66.82 |

Unit focal length f1 = 67.39    f2 = 58.98    f3 = 117.51    f4 = 159.94
f5 = −28.91

Example 3

Unit mm

Surface data

| Surface no. | r | d | nd | νd |
|---|---|---|---|---|
| Object plane | ∞ | 1.06 | | |
| 1 | 41.070 | 4.74 | 1.75520 | 27.51 |
| 2 | 8.563 | 4.60 | 1.78800 | 47.37 |
| 3 | 46.948 | 0.10 | | |
| 4 | 29.514 | 2.70 | 1.59522 | 67.74 |
| 5 | −31.813 | 1.48 | 2.00178 | 19.32 |
| 6 | −18.329 | Variable | | |
| 7* | 124.136 | 1.65 | 1.49700 | 81.61 |
| 8* | −32.236 | 0.10 | | |
| 9* | 34.819 | 1.92 | 1.63484 | 23.91 |
| 10* | −76.356 | 0.92 | | |
| 11* | −1104.670 | 1.00 | 1.58360 | 30.33 |
| 12* | 14.613 | 1.43 | | |
| 13 | 113.857 | 4.12 | 1.49700 | 81.61 |
| 14 | −9.920 | 1.00 | 1.72047 | 34.71 |
| 15 | −15.135 | 0.10 | | |
| 16(Stop) | ∞ | Variable | | |
| 17 | 20.535 | 1.00 | 1.59551 | 39.24 |
| 18 | 13.158 | 4.13 | 1.49700 | 81.61 |
| 19 | −52.800 | 0.10 | | |
| 20 | 551.336 | 1.05 | 1.76182 | 26.52 |
| 21 | 40.653 | Variable | | |
| 22* | 17.515 | 2.90 | 1.53366 | 55.96 |
| 23* | −153.994 | 0.10 | | |
| 24* | 23.195 | 3.29 | 1.63484 | 23.91 |
| 25* | −29.612 | 0.25 | | |
| 26* | −35.687 | 1.05 | 1.58360 | 30.33 |
| 27* | 8.518 | Variable | | |
| 28 | −29.192 | 3.00 | 2.00178 | 19.32 |
| 29 | −16.510 | 4.68 | | |
| 30 | −12.512 | 3.00 | 1.49710 | 81.56 |
| 31 | −105.755 | 2.57 | | |
| 32* | −3.402 | 1.02 | 1.53366 | 55.96 |
| 33* | −8.695 | 1.31 | | |
| 34 | ∞ | 0.30 | 1.51633 | 64.14 |
| 35 | ∞ | 2.50 | | |
| Image plane | ∞ | | | |

-continued

Unit mm

Aspherical surface data

7th surface k = 47.232
A4 = −4.87695e−05, A6 = 2.41891e−07

8th surface k = −11.183
A4 = 1.81009e−05, A6 = 1.99065e−07

9th surface k = 3.846
A4 = 2.44426e−05, A6 = −1.06377e−07

10th surface k = 2.516
A4 = 3.51230e−05, A6 = 3.38996e−07

11th surface k = 16896.538
A4 = 4.48222e−05, A6 = 8.30907e−08

12th surface k = −1.054
A4 = −2.73924e−05, A6 = 1.11887e−07

22th surface k = −1.395
A4 = −2.91406e−05, A6 = −3.66094e−08

23th surface k = 3.305
A4 = 1.49379e−05, A6 = −5.54436e−08

24th surface k = −3.573
A4 = 4.30854e−05, A6 = 9.13174e−08

25th surface k = −4.313
A4 = 7.28845e−06, A6 = 2.68236e−08

26th surface k = −0.827
A4 = 2.51707e−05, A6 = −2.46076e−08

27th surface k = −1.066
A4 = −8.82735e−05, A6 = −3.26902e−07

32th surface k = −1.904
A4 = −1.01943e−03

33th surface k = −10.000
A4 = −4.34032e−04

Various data

|  | LM | ST | HM |
|---|---|---|---|
| NA | 0.23 | 0.37 | 0.61 |
| β | −3.39 | −5.55 | −9.06 |
| f (mm) | 4.42 | 2.59 | 1.58 |
| IH (mm) | 5.50 | 5.50 | 5.50 |
| fb (in air) | 4.00 | 4.00 | 4.00 |
| LTL (in air) | 109.37 | 109.37 | 109.37 |
| d6 | 7.54 | 1.08 | 0.20 |
| d16 | 23.30 | 15.60 | 0.20 |
| d21 | 17.13 | 8.89 | 6.92 |
| d27 | 3.38 | 25.78 | 44.03 |

-continued

Unit mm

Unit focal length

| f1 = 16.64 | f2 = 29.03 | f3 = 67.90 | f4 = 83.05 |
|---|---|---|---|
| f5 = −11.69 | | | |

Example 4

Unit mm

Surface data

| Surface no. | r | d | nd | vd |
|---|---|---|---|---|
| Object plane | ∞ | 1.11 | | |
| 1 | 42.854 | 4.88 | 1.75520 | 27.51 |
| 2 | 9.449 | 4.66 | 1.78800 | 47.37 |
| 3 | 47.957 | 0.10 | | |
| 4 | 30.363 | 2.69 | 1.59522 | 67.74 |
| 5 | −29.253 | 1.47 | 2.00178 | 19.32 |
| 6 | −18.329 | Variable | | |
| 7* | 123.257 | 1.68 | 1.49700 | 81.61 |
| 8* | −32.060 | 0.99 | | |
| 9* | 35.047 | 2.01 | 1.63484 | 23.91 |
| 10* | −79.370 | 0.25 | | |
| 11* | −1821.839 | 1.00 | 1.58360 | 30.33 |
| 12* | 14.209 | 1.49 | | |
| 13 | 55.686 | 4.49 | 1.49700 | 81.61 |
| 14 | −10.603 | 1.09 | 1.72047 | 34.71 |
| 15 | −16.874 | 0.10 | | |
| 16(Stop) | ∞ | Variable | | |
| 17 | 21.884 | 1.00 | 1.59551 | 39.24 |
| 18 | 13.326 | 4.51 | 1.49700 | 81.61 |
| 19 | −47.870 | 0.10 | | |
| 20 | 80.799 | 1.00 | 1.78472 | 25.68 |
| 21 | 29.165 | 5.82 | | |
| 22* | 17.839 | 2.84 | 1.53366 | 55.96 |
| 23* | −141.412 | 0.10 | | |
| 24* | 22.568 | 3.24 | 1.63484 | 23.91 |
| 25* | −31.098 | 0.30 | | |
| 26* | −37.031 | 1.04 | 1.58360 | 30.33 |
| 27* | 8.668 | Variable | | |
| 28 | −57.439 | 3.00 | 1.84666 | 23.78 |
| 29 | −19.966 | 5.00 | | |
| 30 | −13.457 | 1.98 | 1.59551 | 39.24 |
| 31 | 74.133 | Variable | | |
| 32 | 38.638 | 2.63 | 1.76200 | 40.10 |
| 33 | −12.934 | 2.19 | | |
| 34* | −3.874 | 1.00 | 1.53366 | 55.96 |
| 35* | 30.228 | 0.57 | | |
| 36 | ∞ | 0.30 | 1.51633 | 64.14 |
| 37 | ∞ | 1.50 | | |
| Image plane | ∞ | | | |

Aspherical surface data

7th surface k = 7.235
A4 = −5.19614e−05, A6 = 2.50133e−07
8th surface k = −11.739
A4 = 1.81171e−05, A6 = 1.75172e−07
9th surface k = 3.564
A4 = 2.27492e−05, A6 = −8.52746e−08
10th surface k = 2.968
A4 = 3.49251e−05, A6 = 3.28246e−07
11th surface -continued Unit mm k = 8348.181
A4 = 4.68276e−05, A6 = 9.24375e−08
12th surface k = −1.075
A4 = −2.82301e−05, A6 = 1.11162e−07
22th surface k = −1.371
A4 = −2.87639e−05, A6 = −5.26359e−08
23th surface k = −19.954
A4 = 1.60354e−05, A6 = −4.06352e−08
24th surface k = −3.428
A4 = −4.23418e−05, A6 = 8.62975e−08
25th surface k = −4.256
A4 = 6.91696e−06, A6 = 1.81029e−08
26th surface k = −1.204
A4 = 2.61385e−05, A6 = 8.71331e−09
27th surface k = −1.081
A4 = −9.08593e−05, A6 = −2.43864e−07
34th surface k = −1.883
A4 = −6.54448e−06
35th surface k = −10.000
A4 = 7.00971e−05

Various data

| | LM | ST | HM |
|---|---|---|---|
| NA | 0.23 | 0.37 | 0.61 |
| β | −2.66 | −4.36 | −7.12 |
| f (mm) | 4.56 | 2.81 | 1.84 |
| IH (mm) | 5.50 | 5.50 | 5.50 |
| fb (in air) | 2.26 | 2.26 | 2.26 |
| LTL (in air) | 105.01 | 105.01 | 105.01 |
| d6 | 3.39 | 0.39 | 0.20 |
| d16 | 25.00 | 13.89 | 0.20 |
| d27 | 11.29 | 18.68 | 21.14 |
| d31 | 0.38 | 7.10 | 18.52 |

Unit focal length

| f1 = 17.19 | f2 = 29.75 | f3 = 35.13 | f4 = −57.28 |
|---|---|---|---|
| f5 = −20.79 | | | |

Example 5

Unit mm

Surface data

| Surface no. | r | d | nd | vd |
|---|---|---|---|---|
| Object plane | ∞ | 1.36 | | |
| 1 | −78.153 | 4.96 | 1.75520 | 27.51 |
| 2 | −13.906 | 4.72 | 1.78800 | 47.37 |
| 3 | 54.471 | 0.11 | | |
| 4 | 40.308 | 3.57 | 1.59522 | 67.74 |
| 5 | −16.355 | 1.18 | 2.00178 | 19.32 |

-continued

| Unit mm | | | | |
|---|---|---|---|---|
| 6 | −18.329 | Variable | | |
| 7* | 12.651 | 3.12 | 1.63484 | 23.91 |
| 8* | 564.542 | 0.10 | | |
| 9* | −728.186 | 1.00 | 1.58360 | 30.33 |
| 10* | 7.738 | 1.00 | | |
| 11 | 14.801 | 2.08 | 1.49700 | 81.61 |
| 12 | −7.983 | 2.50 | 1.72047 | 34.71 |
| 13 | −16.723 | 0.10 | | |
| 14(Stop) | ∞ | Variable | | |
| 15 | 19.213 | 4.68 | 1.59551 | 39.24 |
| 16 | 12.883 | 7.13 | 1.49700 | 81.61 |
| 17 | −42.488 | 0.10 | | |
| 18* | 30.451 | 2.72 | 1.53366 | 55.96 |
| 19* | −92.785 | 0.10 | | |
| 20* | 20.461 | 4.44 | 1.58360 | 30.33 |
| 21* | 9.664 | Variable | | |
| 22 | −74.424 | 2.53 | 1.84666 | 23.78 |
| 23 | −19.328 | 0.60 | | |
| 24 | −15.389 | 1.00 | 1.59551 | 39.24 |
| 25 | −36.051 | Variable | | |
| 26 | −72.453 | 1.98 | 1.76200 | 40.10 |
| 27 | −12.030 | 2.28 | | |
| 28* | −4.538 | 1.00 | 1.53366 | 55.96 |
| 29* | 37.108 | 0.48 | | |
| 30 | ∞ | 0.30 | 1.51633 | 64.14 |
| 31 | ∞ | 2.00 | | |
| Image plane | ∞ | | | |

Aspherical surface data

7th surface k = −2.624
A4 = −2.10322e−05, A6 = −5.31733e−06
8th surface k = −63842.190
A4 = −8.43938e−06, A6 = −9.93994e−06
9th surface k = 42349.007
A4 = 3.74549e−05, A6 = 4.18833e−06
10th surface k = −1.256
A4 = −3.46706e−05, A6 = 5.68753e−06
18th surface k = −4.651
A4 = −3.33705e−05, A6 = −2.06561e−07
19th surface k = −8.744
A4 = 2.17150e−05, A6 = 1.27134e−07
20th surface k = −2.856
A4 = −3.37340e−05, A6 = 5.80900e−07
21th surface k = −1.171
A4 = −8.70252e−05, A6 = 7.56291e−07
28th surface k = −1.739
A4 = −7.16893e−05
29th surface k = −10.000
A4 = 9.52379e−05

Various data

| | LM | ST | HM |
|---|---|---|---|
| NA | 0.08 | 0.13 | 0.22 |
| β | −0.90 | −1.50 | −2.50 |

-continued

| Unit mm | | | |
|---|---|---|---|
| f (mm) | 10.73 | 7.64 | 4.88 |
| IH (mm) | 5.50 | 5.50 | 5.50 |
| fb (in air) | 2.67 | 2.67 | 2.67 |
| LTL (in air) | 84.48 | 84.48 | 84.48 |
| d6 | 20.87 | 8.96 | 2.21 |
| d14 | 6.26 | 10.50 | 6.04 |
| d21 | 1.28 | 7.14 | 6.65 |
| d25 | 0.38 | 2.19 | 13.89 |

| Unit focal length | | | |
|---|---|---|---|
| f1 = 45.53 | f2 = 37.73 | f3 = 24.41 | f4 = 90.21 |
| f5 = −15.55 | | | |

Example 6

| Unit mm | | | | |
|---|---|---|---|---|
| Surface data | | | | |
| Surface no. | r | d | nd | vd |
| Object plane | ∞ | 1.55 | | |
| 1 | −21.654 | 5.00 | 1.80610 | 40.88 |
| 2 | −10.000 | 3.96 | 1.84666 | 23.78 |
| 3 | −548.726 | 3.88 | 1.49700 | 81.54 |
| 4 | −12.343 | 0.10 | | |
| 5 | 80.653 | 2.42 | 1.91082 | 35.25 |
| 6 | −66.283 | Variable | | |
| 7 | −75.999 | 3.80 | 1.53366 | 55.96 |
| 8* | −17.526 | 0.10 | | |
| 9 | 281.305 | 6.49 | 1.60300 | 65.44 |
| 10 | −12.656 | 1.00 | 1.72047 | 34.71 |
| 11 | −51.571 | Variable | | |
| 12(Stop) | ∞ | Variable | | |
| 13 | −18.025 | 2.31 | 1.84666 | 23.78 |
| 14 | −13.172 | 0.22 | | |
| 15 | −12.839 | 1.00 | 1.78590 | 44.20 |
| 16 | −27.471 | Variable | | |
| 17 | 30.565 | 5.56 | 1.53366 | 55.96 |
| 18* | −21.816 | 0.10 | | |
| 19 | 21.908 | 5.65 | 1.49700 | 81.54 |
| 20 | −19.546 | 1.00 | 1.72047 | 34.71 |
| 21 | 26.502 | Variable | | |
| 22* | 12.910 | 3.15 | 1.53366 | 55.96 |
| 23 | 52.038 | 0.10 | | |
| 24 | 14.630 | 2.36 | 1.88300 | 40.76 |
| 25 | 7.838 | 2.64 | | |
| 26 | −76.371 | 9.78 | 1.84666 | 23.78 |
| 27 | −18.327 | 0.83 | | |
| 28* | −7.935 | 1.00 | 1.53366 | 55.96 |
| 29 | 18.435 | 0.85 | | |
| 30 | ∞ | 0.30 | 1.51633 | 64.14 |
| 31 | ∞ | 1.50 | | |
| Image plane | ∞ | | | |

Aspherical surface data

8th surface k = 0.000
A4 = 6.77268e−06
18th surface k = 0.000
A4 = 2.15805e−05
22th surface k = 0.000
A4 = −2.55392e−06
28th surface -continued Unit mm k = 0.000
A4 = 6.29028e−04

Various data

|  | LM | ST | HM |
|---|---|---|---|
| NA | 0.23 | 0.37 | 0.61 |
| β | −1.35 | −2.06 | −3.55 |
| f (mm) | 12.73 | 8.02 | 4.17 |
| IH (mm) | 5.50 | 5.50 | 5.50 |
| fb (in air) | 2.55 | 2.55 | 2.55 |
| LTL (in air) | 112.02 | 112.02 | 112.02 |
| d6 | 22.68 | 9.74 | 0.92 |
| d11 | 0.10 | 13.04 | 21.86 |
| d12 | 2.41 | 3.65 | 2.41 |
| d16 | 21.75 | 14.24 | 0.20 |
| d21 | 0.10 | 6.37 | 21.65 |

Unit focal length

| f1 = 23.06 | f2 = 33.06 | f3 = −79.41 | f4 = 28.31 |
|---|---|---|---|
| f5 = −18.28 | | | |

Example 7

Unit mm

Surface data

| Surface no. | r | d | nd | vd |
|---|---|---|---|---|
| Object plane | ∞ | 1.22 | | |
| 1 | −16.843 | 4.32 | 2.00178 | 19.32 |
| 2 | −8.636 | 1.72 | 1.84666 | 23.78 |
| 3 | 911.147 | 2.27 | 1.83481 | 42.71 |
| 4 | −9.828 | 0.10 | | |
| 5 | 14.525 | 6.33 | 1.72916 | 54.68 |
| 6 | 19.870 | Variable | | |
| 7 | −43.494 | 2.26 | 1.53366 | 55.96 |
| 8* | −10.891 | 0.10 | | |
| 9 | −253.131 | 3.87 | 1.60300 | 65.44 |
| 10 | −6.779 | 1.00 | 1.72047 | 34.71 |
| 11 | −23.734 | Variable | | |
| 12(Stop) | ∞ | 1.34 | | |
| 13 | −14.179 | 2.90 | 2.00178 | 19.32 |
| 14 | −10.167 | 0.37 | | |
| 15 | −9.637 | 1.00 | 1.80000 | 29.84 |
| 16 | −24.621 | Variable | | |
| 17 | 21.318 | 3.34 | 1.53366 | 55.96 |
| 18* | −22.052 | 0.10 | | |
| 19 | 14.906 | 3.32 | 1.49700 | 81.54 |
| 20 | −26.784 | 2.82 | 1.72047 | 34.71 |
| 21 | 15.222 | Variable | | |
| 22* | 50.082 | 1.97 | 1.53366 | 55.96 |
| 23 | −21.025 | 0.10 | | |
| 24 | −27.546 | 3.00 | 1.65844 | 50.88 |
| 25 | 12.611 | 18.41 | | |
| 26 | 14.962 | 2.54 | 2.00100 | 29.13 |
| 27 | −528.141 | 4.90 | | |
| 28* | −8.213 | 1.00 | 1.53366 | 55.96 |
| 29 | 9.675 | 1.19 | | |
| 30 | ∞ | 0.30 | 1.51633 | 64.14 |
| 31 | ∞ | 1.50 | | |
| Image plane | ∞ | | | |

-continued

Unit mm

Aspherical surface data

8th surface k = 0.000
A4 = −9.17289e−06

18th surface k = 0.000
A4 = 3.54433e−05

22th surface k = 0.000
A4 = 8.77643e−06

28th surface k = 0.000
A4 = 6.73848e−04

Various data

|  | LM | ST | HM |
|---|---|---|---|
| NA | 0.23 | 0.37 | 0.61 |
| β | −2.81 | −4.34 | −7.13 |
| f (mm) | 7.60 | 4.25 | 2.43 |
| IH (mm) | 4.75 | 4.75 | 4.75 |
| fb (in air) | 2.89 | 2.89 | 2.89 |
| LTL (in air) | 100.91 | 100.91 | 100.91 |
| d6 | 7.52 | 2.32 | 1.30 |
| d11 | 0.10 | 5.30 | 6.32 |
| d16 | 20.55 | 11.68 | 0.20 |
| d21 | 0.79 | 9.66 | 21.14 |

Unit focal length

| f1 = 10.33 | f2 = 21.29 | f3 = −62.18 | f4 = 23.61 |
|---|---|---|---|
| f5 = −14.82 | | | |

Example 8

Unit mm

Surface data

| Surface no. | r | d | nd | vd |
|---|---|---|---|---|
| Object plane | ∞ | 1.39 | | |
| 1 | −11.331 | 6.04 | 2.00178 | 19.32 |
| 2 | −13.131 | 0.10 | | |
| 3 | −946.281 | 3.29 | 1.67480 | 57.97 |
| 4 | −14.337 | 0.10 | | |
| 5 | 10.192 | 2.00 | 1.49700 | 81.55 |
| 6 | 10.568 | Variable | | |
| 7 | −51.413 | 2.81 | 1.53366 | 55.96 |
| 8* | −11.529 | 0.10 | | |
| 9 | −91.616 | 4.93 | 1.60300 | 65.44 |
| 10 | −7.195 | 1.00 | 1.72047 | 34.71 |
| 11 | −23.922 | Variable | | |
| 12(Stop) | ∞ | 1.73 | | |
| 13 | −13.536 | 1.96 | 2.00178 | 19.32 |
| 14 | −10.172 | 0.15 | | |
| 15 | −9.971 | 1.00 | 1.80000 | 29.84 |
| 16 | −22.978 | Variable | | |
| 17 | 27.381 | 3.57 | 1.53366 | 55.96 |
| 18* | −19.808 | 0.10 | | |
| 19 | 14.731 | 3.93 | 1.49700 | 81.54 |
| 20 | −22.234 | 3.34 | 1.72047 | 34.71 |
| 21 | 15.522 | Variable | | |
| 22* | 55.729 | 2.00 | 1.53366 | 55.96 |
| 23 | 11.191 | 17.90 | | |
| 24 | 12.797 | 3.15 | 2.00100 | 29.13 |

-continued

Unit mm

| 25 | −215.539 | 3.11 | | |
| 26* | −9.081 | 1.00 | 1.53366 | 55.96 |
| 27 | 9.711 | 1.34 | | |
| 28 | ∞ | 0.30 | 1.51633 | 64.14 |
| 29 | ∞ | 1.50 | | |
| Image plane | ∞ | | | |

Aspherical surface data

8th surface k = 0.000
A4 = 7.01903e−06

18th surface k = 0.000
A4 = 2.60215e−05

22th surface k = 0.000
A4 = 5.62828e−05

26th surface k = 0.000
A4 = 5.80353e−04

Various data

| | LM | ST | HM |
|---|---|---|---|
| NA | 0.23 | 0.37 | 0.61 |
| β | −2.18 | −3.57 | −5.83 |
| f (mm) | 16.47 | 7.96 | 4.39 |
| IH (mm) | 4.75 | 4.75 | 4.75 |
| fb (in air) | 3.04 | 3.04 | 3.04 |
| LTL (in air) | 100.91 | 100.91 | 100.91 |
| d6 | 13.55 | 5.34 | 2.99 |
| d11 | 0.10 | 8.31 | 10.66 |
| d16 | 20.15 | 11.49 | 0.20 |
| d21 | 0.77 | 9.43 | 20.72 |

Unit focal length f1 = 13.10  f2 = 23.49  f3 = −63.12  f4 = 24.18
f5 = −27.20

Example 9

Unit mm

Surface data

| Surface no. | r | d | nd | vd |
|---|---|---|---|---|
| Object plane | ∞ | 1.22 | | |
| 1 | −18.725 | 4.32 | 2.00178 | 19.32 |
| 2 | −31.804 | 2.51 | 1.83481 | 42.71 |
| 3 | −9.912 | 0.10 | | |
| 4 | 10.558 | 3.45 | 1.78800 | 47.37 |
| 5 | −20.000 | 2.50 | 1.69895 | 30.13 |
| 6 | 9.835 | Variable | | |
| 7 | 31.215 | 2.45 | 1.53366 | 55.96 |
| 8* | −11.432 | 0.10 | | |
| 9 | −22.184 | 3.65 | 1.60300 | 65.44 |
| 10 | −5.405 | 1.00 | 1.72047 | 34.71 |
| 11 | −23.159 | Variable | | |
| 12(Stop) | ∞ | 0.47 | | |
| 13 | −68.998 | 2.78 | 2.00178 | 19.32 |
| 14 | −10.619 | 1.00 | 1.75520 | 27.51 |
| 15 | 101.173 | Variable | | |
| 16 | 28.719 | 2.10 | 1.53366 | 55.96 |
| 17 | −160.043 | 0.10 | | |
| 18 | 43.831 | 2.52 | 1.53366 | 55.96 |

-continued

Unit mm

| 19* | −27.949 | 0.10 | | |
| 20 | 14.708 | 3.28 | 1.49700 | 81.54 |
| 21 | −36.048 | 7.91 | 1.72825 | 28.46 |
| 22 | 12.092 | Variable | | |
| 23* | −221.872 | 3.00 | 1.53366 | 55.96 |
| 24 | −12.551 | 0.10 | | |
| 25 | −25.159 | 3.00 | 1.60562 | 43.70 |
| 26 | 6.695 | Variable | | |
| 27 | 12.943 | 5.00 | 1.84666 | 23.78 |
| 28 | −30.308 | 1.30 | | |
| 29* | −7.934 | 2.00 | 1.53366 | 55.96 |
| 30 | 15.330 | 0.78 | | |
| 31 | ∞ | 0.30 | 1.51633 | 64.14 |
| 32 | ∞ | 1.50 | | |
| Image plane | ∞ | | | |

Aspherical surface data

8th surface k = 0.000
A4 = 2.69320e−05

19th surface k = 0.000
A4 = 2.55226e−05

23th surface k = 0.000
A4 = −9.20183e−05

29th surface k = 0.000
A4 = 9.37257e−04

Various data

| | LM | ST | HM |
|---|---|---|---|
| NA | 0.23 | 0.37 | 0.61 |
| β | −2.66 | −4.36 | −7.21 |
| f (mm) | 6.86 | 3.73 | 2.21 |
| IH (mm) | 4.75 | 4.75 | 4.75 |
| fb (in air) | 2.48 | 2.48 | 2.48 |
| LTL (in air) | 86.53 | 86.53 | 86.53 |
| d6 | 4.16 | 1.00 | 1.34 |
| d11 | 0.10 | 3.26 | 2.92 |
| d15 | 19.12 | 9.82 | 0.42 |
| d22 | 1.15 | 10.21 | 19.58 |
| d26 | 4.80 | 5.04 | 5.07 |

Unit focal length f1 = 10.62  f2 = 22.62  f3 = 627.38  f4 = 18.35
f5 = −13.98  f6 = 55.65

Example 10

Unit mm

Surface data

| Surface no. | r | d | nd | vd |
|---|---|---|---|---|
| Object plane | ∞ | 1.28 | | |
| 1 | 111.248 | 4.32 | 2.00178 | 19.32 |
| 2 | 158.973 | 1.45 | 1.83481 | 42.71 |
| 3 | −30.896 | 1.17 | | |
| 4 | 22.697 | 8.39 | 1.78800 | 47.37 |
| 5 | −20.000 | 2.50 | 1.69895 | 30.13 |
| 6 | 27.829 | Variable | | |
| 7 | 22.875 | 2.93 | 1.53366 | 55.96 |
| 8* | −8.265 | 0.10 | | |

-continued

Unit mm

| | | | | |
|---|---|---|---|---|
| 9 | −9.474 | 1.77 | 1.60300 | 65.44 |
| 10 | −5.539 | 5.00 | 1.72047 | 34.71 |
| 11 | −20.878 | Variable | | |
| 12(Stop) | ∞ | 0.47 | | |
| 13 | −41.774 | 2.83 | 2.00178 | 19.32 |
| 14 | −13.304 | 1.00 | 1.75520 | 27.51 |
| 15 | −4072.041 | Variable | | |
| 16 | 38.371 | 1.63 | 1.53366 | 55.96 |
| 17 | −615.493 | 0.10 | | |
| 18 | 33.168 | 2.66 | 1.53366 | 55.96 |
| 19* | −23.894 | 0.10 | | |
| 20 | 14.457 | 2.97 | 1.49700 | 81.54 |
| 21 | −43.409 | 5.18 | 1.72825 | 28.46 |
| 22 | 13.946 | Variable | | |
| 23* | −72.077 | 3.00 | 1.53366 | 55.96 |
| 24 | −12.453 | 0.10 | | |
| 25 | −544.479 | 3.00 | 1.60562 | 43.70 |
| 26 | 7.266 | Variable | | |
| 27 | 10.977 | 5.00 | 1.84666 | 23.78 |
| 28 | 12.750 | 1.35 | | |
| 29* | −8.703 | 2.00 | 1.53366 | 55.96 |
| 30 | 48.121 | 0.29 | | |
| 31 | ∞ | 0.30 | 1.51633 | 64.14 |
| 32 | ∞ | 1.50 | | |
| Image plane | ∞ | | | |

Aspherical surface data

8th surface k = 0.000
A4 = 8.73539e−05

19th surface k = 0.000
A4 = 3.09691e−05

23th surface k = 0.000
A4 = −2.50616e−04

29th surface k = 0.000
A4 = 9.69394e−04

Various data

| | LM | ST | HM |
|---|---|---|---|
| NA | 0.10 | 0.16 | 0.26 |
| β | −1.14 | −1.84 | −2.99 |
| f (mm) | 12.62 | 6.55 | 3.83 |
| IH (mm) | 4.75 | 4.75 | 4.75 |
| fb (in air) | 1.98 | 1.98 | 1.98 |
| LTL (in air) | 90.94 | 90.94 | 90.94 |
| d6 | 8.84 | 1.49 | 0.44 |
| d11 | 0.10 | 7.48 | 8.47 |
| d15 | 18.19 | 9.34 | 0.20 |
| d22 | 1.38 | 9.46 | 17.73 |
| d26 | 1.43 | 2.17 | 3.10 |

Unit focal length

| | | | |
|---|---|---|---|
| f1 = 17.71 | f2 = 27.43 | f3 = −216.23 | f4 = 19.30 |
| f5 = −22.79 | f6 = −32.66 | | |

Example 11

Unit mm

Surface data

| Surface no. | r | d | nd | νd |
|---|---|---|---|---|
| Object plane | ∞ | 2.20 | | |
| 1 | −12.923 | 2.88 | 1.83400 | 37.16 |

-continued

Unit mm

| | | | | |
|---|---|---|---|---|
| 2 | 13.709 | 9.75 | 1.65100 | 56.16 |
| 3 | −16.604 | 0.20 | | |
| 4 | 182.555 | 5.85 | 1.59522 | 67.74 |
| 5 | −22.860 | 1.46 | | |
| 6 | 92.504 | 10.00 | 1.78800 | 47.37 |
| 7 | 28.295 | 9.88 | 1.49700 | 81.54 |
| 8 | −35.089 | 10.14 | | |
| 9 | 87.517 | 4.49 | 1.49700 | 81.54 |
| 10 | −40.197 | 0.89 | | |
| 11 | 287.579 | 1.44 | 1.80400 | 46.57 |
| 12 | 20.222 | 6.32 | 1.43875 | 94.93 |
| 13 | −60.068 | 0.10 | | |
| 14 | 37.768 | 2.16 | 1.51823 | 58.96 |
| 15 | 90.424 | 0.87 | | |
| 16(Stop) | ∞ | Variable | | |
| 17 | −54.403 | 1.00 | 1.74100 | 52.64 |
| 18 | 31.130 | 1.00 | 1.75520 | 27.51 |
| 19 | 30.568 | 1.63 | | |
| 20 | −88.325 | 1.00 | 1.51823 | 58.96 |
| 21 | 21.260 | 2.53 | 1.80518 | 25.43 |
| 22 | 92.998 | Variable | | |
| 23 | 43.273 | 3.46 | 1.48749 | 70.23 |
| 24 | −69.631 | 0.10 | | |
| 25 | 46.333 | 1.70 | 1.72047 | 34.71 |
| 26 | 18.841 | 4.31 | 1.48749 | 70.23 |
| 27 | 167.650 | Variable | | |
| 28* | 25.488 | 6.25 | 1.59074 | 65.51 |
| 29 | −162.990 | 3.45 | | |
| 30 | −102.457 | 4.97 | 1.74964 | 30.84 |
| 31 | 71.456 | 24.55 | | |
| 32 | 14.091 | 3.33 | 1.84666 | 23.78 |
| 33 | 23.716 | 0.17 | | |
| 34 | 14.431 | 2.28 | 1.80518 | 25.42 |
| 35 | 6.611 | 1.54 | | |
| 36 | 7.048 | 5.11 | 1.75501 | 51.16 |
| 37* | 7.407 | 1.06 | | |
| 38 | ∞ | 0.30 | 1.51633 | 64.14 |
| 39 | ∞ | 3.00 | | |
| Image plane | ∞ | | | |

Aspherical surface data

28th surface k = 0.000
A4 = −2.44186e−06

37th surface k = 0.000
A4 = 1.73815e−04

Various data

| | LM | ST | HM |
|---|---|---|---|
| NA | 0.23 | 0.37 | 0.61 |
| β | −1.33 | −2.18 | −3.56 |
| f (mm) | 520.87 | 714.51 | 16.03 |
| IH (mm) | 3.00 | 3.00 | 3.00 |
| fb (in air) | 4.26 | 4.26 | 4.26 |
| LTL (in air) | 177.29 | 177.29 | 177.29 |
| d16 | 0.83 | 24.79 | 38.01 |
| d22 | 19.54 | 12.06 | 0.10 |
| d27 | 17.84 | 1.36 | 0.10 |

Unit focal length

| | | | |
|---|---|---|---|
| f1 = 18.81 | f2 = −25.27 | f3 = 52.53 | f4 = 44.84 |

Example 12

Unit mm

Surface data

| Surface no. | r | d | nd | vd |
|---|---|---|---|---|
| Object plane | ∞ | 1.27 | | |
| 1 | −22.784 | 7.97 | 2.00178 | 19.32 |
| 2 | −10.000 | 7.01 | 1.84666 | 23.78 |
| 3 | −120.689 | 0.10 | | |
| 4 | 514.184 | 9.49 | 1.88300 | 40.80 |
| 5 | −27.131 | 0.10 | | |
| 6 | −73.294 | 2.43 | 1.84666 | 23.78 |
| 7 | −27.362 | 0.10 | | |
| 8 | 42.765 | 5.81 | 1.49700 | 81.54 |
| 9 | −18.172 | 1.00 | 1.57501 | 41.50 |
| 10 | 45.777 | 1.29 | | |
| 11 | 2516.925 | 1.00 | 1.72047 | 34.71 |
| 12 | 32.396 | 4.09 | 1.49700 | 81.54 |
| 13 | −44.446 | 0.10 | | |
| 14 | 48.583 | 2.57 | 1.49700 | 81.54 |
| 15 | −164.344 | 0.10 | | |
| 16 | 47.475 | 1.70 | 1.80400 | 46.57 |
| 17 | 20.378 | 4.13 | 1.43875 | 94.93 |
| 18 | −109.125 | 6.77 | | |
| 19(Stop) | ∞ | 0.10 | | |
| 20 | ∞ | 1.45 | 1.58144 | 40.75 |
| 21 | −90.909 | Variable | | |
| 22 | 1800.703 | 1.00 | 1.72342 | 37.95 |
| 23 | 13.735 | 2.46 | 1.84666 | 23.78 |
| 24 | 46.722 | 1.31 | | |
| 25 | −37.078 | 1.00 | 1.67300 | 38.15 |
| 26 | 19.701 | 1.54 | 1.84666 | 23.78 |
| 27 | 31.766 | Variable | | |
| 28 | 45.153 | 2.51 | 1.72916 | 54.68 |
| 29 | −124.530 | 0.10 | | |
| 30 | 41.325 | 7.02 | 1.69680 | 55.53 |
| 31 | −22428.139 | 2.69 | 1.72047 | 34.71 |
| 32 | 25.110 | Variable | | |
| 33* | 36.836 | 4.21 | 1.72903 | 54.04 |
| 34 | −48.356 | 0.10 | | |
| 35 | 77.143 | 5.14 | 1.72916 | 54.68 |
| 36 | −24.384 | 6.01 | 1.90366 | 31.32 |
| 37 | 56.361 | 5.00 | | |
| 38 | 83.989 | 2.99 | 1.80610 | 33.27 |
| 39 | 35.268 | 19.30 | | |
| 40 | 89.478 | 4.68 | 1.84666 | 23.78 |
| 41 | −35.056 | 0.10 | | |
| 42 | 18.574 | 7.76 | 2.00178 | 19.32 |
| 43 | 16.654 | 1.84 | | |
| 44 | −39.853 | 1.00 | 1.75501 | 51.16 |
| 45* | 17.859 | 1.06 | | |
| 46 | ∞ | 0.30 | 1.51633 | 64.14 |
| 47 | ∞ | 5.00 | | |
| Image plane | ∞ | | | |

Aspherical surface data

33th surface k = 0.000
A4 = −6.49017e−06

45th surface k = 0.000
A4 = −1.78428e−05

Various data

| | LM | ST | HM |
|---|---|---|---|
| NA | 0.23 | 0.37 | 0.61 |
| β | −2.20 | −3.57 | −5.82 |
| f (mm) | 53.32 | 17.10 | 6.73 |
| IH (mm) | 5.50 | 5.50 | 5.50 |
| fb (in air) | 6.25 | 6.25 | 6.25 |
| LTL (in air) | 168.62 | 168.62 | 168.62 |

-continued

Unit mm

| | | | |
|---|---|---|---|
| d21 | 0.20 | 15.41 | 26.47 |
| d27 | 15.91 | 11.10 | 0.35 |
| d32 | 11.17 | 0.77 | 0.46 |

Unit focal length

| | | | |
|---|---|---|---|
| f1 = 14.92 | f2 = −22.16 | f3 = 60.23 | f4 = 29.18 |

Example 13

Unit mm

Surface data

| Surface no. | r | d | nd | vd |
|---|---|---|---|---|
| Object plane | ∞ | 1.37 | | |
| 1 | −40.987 | 10.00 | 1.83400 | 37.16 |
| 2 | −52.459 | 10.00 | 1.84666 | 23.78 |
| 3 | −39.893 | 0.10 | | |
| 4 | 941.821 | 10.00 | 1.88300 | 40.80 |
| 5 | −32.540 | 5.27 | | |
| 6 | −49.992 | 10.00 | 1.75520 | 27.51 |
| 7 | 53.602 | 10.00 | 1.84666 | 23.78 |
| 8 | −53.191 | 0.11 | | |
| 9 | 246.374 | 6.73 | 1.49700 | 81.54 |
| 10 | −27.066 | 1.03 | 1.61293 | 37.00 |
| 11 | 159.021 | 1.30 | | |
| 12 | −370.480 | 1.03 | 1.72047 | 34.71 |
| 13 | 54.649 | 7.11 | 1.49700 | 81.54 |
| 14 | −43.003 | 0.10 | | |
| 15 | 345.717 | 1.92 | 1.60562 | 43.70 |
| 16 | −299.011 | 0.10 | | |
| 17 | 100.141 | 1.00 | 1.80400 | 46.57 |
| 18 | 39.990 | 4.78 | 1.43875 | 94.93 |
| 19 | −2588.894 | 0.10 | | |
| 20 | 44.827 | 4.01 | 1.55332 | 71.68 |
| 21 | 238.990 | 0.69 | | |
| 22(Stop) | ∞ | Variable | | |
| 23 | 606.831 | 1.00 | 1.72047 | 34.71 |
| 24 | 15.793 | 2.83 | 1.84666 | 23.78 |
| 25 | 65.887 | 1.27 | | |
| 26 | −50.551 | 1.00 | 1.90366 | 31.32 |
| 27 | 26.061 | 1.77 | 2.00178 | 19.32 |
| 28 | 60.158 | Variable | | |
| 29 | −1382.268 | 2.98 | 1.74320 | 49.34 |
| 30 | −54.311 | 0.10 | | |
| 31 | 148.232 | 3.04 | 1.72903 | 54.04 |
| 32 | −251.038 | 13.53 | | |
| 33 | 88.724 | 5.33 | 1.69680 | 55.53 |
| 34 | −35.525 | 1.71 | 1.85026 | 32.27 |
| 35 | 63.954 | Variable | | |
| 36 | 40.123 | 10.00 | 1.69100 | 54.82 |
| 37 | −72.626 | 10.00 | 1.84666 | 23.78 |
| 38 | 48.338 | 12.91 | | |
| 39 | 56.312 | 9.96 | 1.76182 | 26.52 |
| 40 | −122.904 | Variable | | |
| 41 | 37.520 | 7.01 | 1.80810 | 22.76 |
| 42 | −69.737 | 1.19 | | |
| 43 | −42.881 | 4.58 | 1.55332 | 71.68 |
| 44 | 33.293 | 4.04 | | |
| 45 | −31.896 | 3.94 | 1.55332 | 71.68 |
| 46* | 24.848 | 0.78 | | |
| 47 | ∞ | 0.30 | 1.51633 | 64.14 |
| 48 | ∞ | 3.78 | | |
| Image plane | ∞ | | | |

Aspherical surface data
46th surface k = 0.000
A4 = −1.79537e−05

-continued

| Unit mm | | | |
|---|---|---|---|
| Various data | | | |
| | LM | ST | HM |
| NA | 0.11 | 0.23 | 0.61 |
| β | -1.25 | -2.43 | -6.52 |
| f (mm) | 756.14 | 38.15 | 6.44 |
| IH (mm) | 5.50 | 5.50 | 5.50 |
| fb (in air) | 4.75 | 4.75 | 4.75 |
| LTL (in air) | 271.52 | 271.52 | 271.52 |
| d22 | 0.20 | 35.65 | 74.82 |
| d28 | 40.06 | 23.80 | 0.85 |
| d35 | 29.80 | 1.82 | 7.44 |
| d40 | 13.15 | 21.94 | 0.10 |

| Unit focal length | | | |
|---|---|---|---|
| f1 = 27.17 | f2 = -29.13 | f3 = 62.73 | f4 = 60.88 |
| f5 = -41.12 | | | |

Example 14

| Unit mm | | | |
|---|---|---|---|
| Surface data | | | |
| Surface no. | r | d | nd | vd |
|---|---|---|---|---|
| Object plane | ∞ | 15.84 | | |
| 1 | 514.184 | 5.89 | 1.49700 | 81.61 |
| 2 | -22.397 | 19.71 | | |
| 3 | -123.845 | 2.23 | 1.49700 | 81.61 |
| 4 | -8.839 | 1.00 | 1.67300 | 38.15 |
| 5 | 28.890 | 3.54 | | |
| 6 | 217.991 | 3.39 | 1.55332 | 71.68 |
| 7 | -16.459 | 0.10 | | |
| 8 | 18.406 | 1.99 | 1.49700 | 81.61 |
| 9 | -80.696 | 0.10 | | |
| 10(Stop) | ∞ | 0.10 | | |
| 11 | ∞ | 1.19 | 1.58144 | 40.75 |
| 12 | -70.716 | Variable | | |
| 13 | -29.442 | 1.00 | 1.80139 | 45.45 |
| 14 | 16.540 | 1.18 | 1.84666 | 23.78 |
| 15 | 22.667 | 0.82 | | |
| 16 | -52.742 | 1.00 | 1.74100 | 52.64 |
| 17 | 19.274 | 1.65 | 1.84666 | 23.78 |
| 18 | 393.247 | Variable | | |
| 19 | 33.105 | 5.41 | 1.69680 | 55.53 |
| 20 | -35.152 | 0.84 | | |
| 21 | 43.213 | 8.12 | 1.69680 | 55.53 |
| 22 | -14.179 | 1.00 | 1.72047 | 34.71 |
| 23 | 23.564 | Variable | | |
| 24 | 34.073 | 2.23 | 1.72903 | 54.04 |
| 25 | 217.333 | 0.10 | | |
| 26 | 41.188 | 6.04 | 1.72916 | 54.68 |
| 27 | -13.176 | 1.00 | 1.90366 | 31.32 |
| 28 | 685.273 | 1.08 | | |
| 29 | -45.052 | 1.00 | 1.78472 | 25.68 |
| 30 | 23.447 | 0.41 | | |
| 31 | 18.238 | 4.12 | 2.00178 | 19.32 |
| 32 | -231.364 | 0.13 | | |
| 33 | 11.031 | 4.15 | 1.72916 | 54.68 |
| 34 | 22.882 | 1.45 | | |
| 35 | -254.659 | 1.13 | 1.78472 | 25.68 |
| 36* | 9.874 | 2.28 | | |
| 37 | ∞ | 0.30 | 1.51633 | 64.14 |
| 38 | ∞ | 6.00 | | |
| Image plane | ∞ | | | |

| Aspherical surface data |
|---|
| 36th surface |
| k = 0.000 |
| A4 = 8.44498e-05 |

-continued

| Unit mm | | | |
|---|---|---|---|
| Various data | | | |
| | LM | ST | HM |
| NA | 0.05 | 0.08 | 0.12 |
| β | -0.44 | -0.71 | -1.13 |
| f (mm) | 33.51 | 32.58 | 21.26 |
| IH (mm) | 5.50 | 5.50 | 5.50 |
| fb (in air) | 8.48 | 8.48 | 8.48 |
| LTL (in air) | 108.28 | 108.28 | 108.28 |
| d12 | 0.29 | 6.90 | 10.52 |
| d18 | 15.59 | 9.20 | 0.10 |
| d23 | 0.81 | 0.59 | 6.07 |

| Unit focal length | | | |
|---|---|---|---|
| f1 = 26.76 | f2 = -13.42 | f3 = 29.14 | f4 = 38.82 |

Example 15

| Unit mm | | | |
|---|---|---|---|
| Surface data | | | |
| Surface no. | r | d | nd | vd |
|---|---|---|---|---|
| Object plane | ∞ | 1.26 | | |
| 1 | -22.799 | 8.02 | 2.00178 | 19.32 |
| 2 | -10.000 | 6.07 | 1.84666 | 23.78 |
| 3 | -127.010 | 0.10 | | |
| 4 | 514.184 | 9.02 | 1.88300 | 40.80 |
| 5 | -35.317 | 0.10 | | |
| 6 | -76.547 | 2.66 | 1.84666 | 23.78 |
| 7 | -22.563 | 0.10 | | |
| 8 | 44.285 | 5.43 | 1.49700 | 81.54 |
| 9 | -16.636 | 1.00 | 1.56732 | 42.82 |
| 10 | 45.768 | 1.23 | | |
| 11 | -814.468 | 1.00 | 1.72047 | 34.71 |
| 12 | 31.752 | 3.97 | 1.49700 | 81.54 |
| 13 | -38.947 | 0.10 | | |
| 14 | 48.375 | 2.54 | 1.49700 | 81.54 |
| 15 | -121.012 | 0.10 | | |
| 16 | 43.876 | 1.00 | 1.80440 | 39.59 |
| 17 | 19.275 | 3.80 | 1.49700 | 81.61 |
| 18 | -244.353 | 0.61 | | |
| 19(Stop) | ∞ | 0.10 | | |
| 20 | ∞ | 1.41 | 1.58144 | 40.75 |
| 21 | -110.055 | Variable | | |
| 22* | -108.127 | 1.00 | 1.53366 | 55.96 |
| 23 | 21.294 | 0.10 | | |
| 24 | 17.087 | 1.91 | 1.63484 | 23.91 |
| 25* | 36.179 | 1.33 | | |
| 26* | -67.414 | 1.00 | 1.53366 | 55.96 |
| 27 | 19.991 | 0.46 | | |
| 28 | 25.954 | 1.28 | 1.63484 | 23.91 |
| 29* | 31.912 | Variable | | |
| 30 | 40.306 | 2.77 | 1.72916 | 54.68 |
| 31 | -162.235 | 0.10 | | |
| 32 | 48.391 | 5.96 | 1.72342 | 37.95 |
| 33 | -16.834 | 1.00 | 1.72047 | 34.71 |
| 34 | 25.124 | Variable | | |
| 35* | 30.385 | 5.11 | 1.72903 | 54.04 |
| 36 | -41.941 | 0.10 | | |
| 37 | 125.058 | 4.59 | 1.69680 | 55.53 |
| 38 | -21.149 | 4.09 | 1.91082 | 35.25 |
| 39 | 47.612 | 0.71 | | |
| 40 | 111.847 | 2.04 | 1.80000 | 29.84 |
| 41 | 47.347 | 34.06 | | |
| 42 | 60.461 | 5.15 | 1.84666 | 23.78 |
| 43 | -45.615 | 0.10 | | |
| 44 | 17.276 | 8.24 | 1.80810 | 22.76 |
| 45 | 15.879 | 1.85 | | |

-continued

Unit mm

| 46 | −46.940 | 1.00 | 1.85026 | 32.27 |
| 47* | 16.929 | 1.12 | | |
| 48 | ∞ | 0.30 | 1.51633 | 64.14 |
| 49 | ∞ | 5.00 | | |
| Image plane | ∞ | | | |

Aspherical surface data

22th surface $k = 0.000$
$A4 = -6.17401e-06$

25th surface $k = 0.000$
$A4 = 2.85432e-05$

26th surface $k = 0.000$
$A4 = 2.24191e-05$

29th surface $k = 0.000$
$A4 = -1.94648e-05$

35th surface $k = 0.000$
$A4 = -8.31031e-06$

47th surface $k = 0.000$
$A4 = -1.45299e-05$

Various data

| | LM | ST | HM |
|---|---|---|---|
| NA | 0.23 | 0.37 | 0.61 |
| β | −2.20 | −3.57 | −5.82 |
| f (mm) | 30.47 | 16.18 | 7.07 |
| IH (mm) | 5.50 | 5.50 | 5.50 |
| fb (in air) | 6.31 | 6.31 | 6.31 |
| LTL (in air) | 168.63 | 168.63 | 168.63 |
| d21 | 0.26 | 16.81 | 28.69 |
| d29 | 18.03 | 12.60 | 0.23 |
| d34 | 11.69 | 0.57 | 1.06 |

Unit focal length

| f1 = 14.14 | f2 = −24.35 | f3 = 73.60 | f4 = 31.94 |

Example 16

Unit mm

Surface data

| Surface no. | r | d | nd | vd |
|---|---|---|---|---|
| Object plane | ∞ | 1.35 | | |
| 1 | 43.231 | 9.70 | 1.76200 | 40.10 |
| 2 | 57.098 | 0.10 | | |
| 3 | 32.147 | 4.09 | 1.67003 | 47.23 |
| 4 | −18.329 | Variable | | |
| 5* | 107.325 | 1.67 | 1.49700 | 81.61 |
| 6* | −33.414 | 0.10 | | |
| 7* | 33.505 | 1.96 | 1.63484 | 23.91 |
| 8* | −101.909 | 0.70 | | |
| 9* | −8.0366e+6 | 1.00 | 1.58360 | 30.33 |
| 10* | 13.965 | 1.29 | | |
| 11 | 42.408 | 4.84 | 1.49700 | 81.61 |
| 12 | −10.327 | 1.00 | 1.72047 | 34.71 |
| 13 | −18.267 | 0.10 | | |

-continued

Unit mm

| 14(Stop) | ∞ | Variable | | |
| 15 | 22.493 | 1.00 | 1.61293 | 37.00 |
| 16 | 13.296 | 5.25 | 1.49700 | 81.61 |
| 17 | −31.912 | 0.10 | | |
| 18 | 31.545 | 1.00 | 1.80518 | 25.42 |
| 19 | 16.499 | 0.84 | | |
| 20* | 22.520 | 2.82 | 1.53366 | 55.96 |
| 21* | −54.016 | 0.10 | | |
| 22* | 19.422 | 3.27 | 1.63484 | 23.91 |
| 23* | −25.541 | 0.45 | | |
| 24* | −30.483 | 1.18 | 1.58360 | 30.33 |
| 25* | 8.393 | Variable | | |
| 26 | −40.913 | 2.38 | 1.84666 | 23.78 |
| 27 | −15.464 | 6.15 | | |
| 28 | −14.833 | 1.53 | 1.70000 | 48.08 |
| 29 | 69.314 | Variable | | |
| 30 | −2448.807 | 2.25 | 1.75500 | 52.32 |
| 31 | −11.550 | 2.43 | | |
| 32* | −3.805 | 1.55 | 1.53366 | 55.96 |
| 33* | 53.678 | 0.32 | | |
| 34 | ∞ | 0.30 | 1.51633 | 64.14 |
| 35 | ∞ | 1.50 | | |
| Image plane | ∞ | | | |

Aspherical surface data

5th surface $k = -151.903$
$A4 = -6.05656e-05, A6 = 2.88945e-07$

6th surface $k = -10.719$
$A4 = 1.97656e-05, A6 = 2.16972e-07$

7th surface $k = 3.055$
$A4 = 1.91538e-05, A6 = -6.99611e-08$

8th surface $k = -5.065$
$A4 = 3.62227e-05, A6 = 3.44566e-07$

9th surface $k = -1.15125e+23$
$A4 = 4.69062e-05, A6 = 1.05024e-07$

10th surface $k = -1.072$
$A4 = -2.81467e-05, A6 = 7.64679e-08$

20th surface $k = -1.107$
$A4 = -2.47911e-05, A6 = -4.27580e-08$

21th surface $k = -1.937$
$A4 = 1.40297e-05, A6 = -6.62424e-08$

22th surface $k = -3.162$
$A4 = -4.05322e-05, A6 = 6.65571e-08$

23th surface $k = -4.366$
$A4 = 7.04818e-06, A6 = 2.75944e-08$

24th surface $k = -1.195$
$A4 = 2.69706e-05, A6 = 2.26935e-08$

25th surface $k = -1.062$
$A4 = -8.69007e-05, A6 = 5.53276e-08$

32th surface

-continued

Unit mm k = −1.627
A4 = −6.41757e−05
33th surface k = −10.000
A4 = −3.45899e−05

Various data

|  | LM | ST | HM |
|---|---|---|---|
| NA | 0.23 | 0.37 | 0.61 |
| β | −2.66 | −4.36 | −7.12 |
| f (mm) | 3.75 | 2.55 | 1.74 |
| IH (mm) | 5.50 | 5.50 | 5.50 |
| fb (in air) | 2.01 | 2.01 | 2.01 |
| LTL (in air) | 80.46 | 86.36 | 98.54 |
| d4 | 4.10 | 1.45 | 0.20 |
| d14 | 6.08 | 3.23 | 0.20 |
| d25 | 9.06 | 11.22 | 12.61 |
| d29 | 0.34 | 9.58 | 24.65 |

Unit focal length f1 = 18.12  f2 = 31.26  f3 = 30.63  f4 = −92.49
f5 = −16.15

Example 17

Unit mm

Surface data

| Surface no. | r | d | nd | vd |
|---|---|---|---|---|
| Object plane | ∞ | 1.39 | | |
| 1 | −11.055 | 6.31 | 1.88300 | 40.76 |
| 2 | −11.606 | 0.10 | | |
| 3 | 35.525 | 3.92 | 1.71300 | 53.87 |
| 4 | −26.903 | 0.64 | | |
| 5 | 8.245 | 2.21 | 1.49700 | 81.61 |
| 6 | 7.987 | Variable | | |
| 7 | −102.909 | 2.33 | 1.53366 | 55.96 |
| 8* | −12.159 | 0.10 | | |
| 9 | −95.469 | 4.28 | 1.60300 | 65.44 |
| 10 | −6.261 | 1.00 | 1.72047 | 34.71 |
| 11 | −20.461 | Variable | | |
| 12(Stop) | ∞ | 1.61 | | |
| 13 | −12.688 | 2.17 | 2.00178 | 19.32 |
| 14 | −8.524 | 1.00 | 1.80000 | 29.84 |
| 15 | −30.929 | Variable | | |
| 16 | 25.638 | 3.53 | 1.53366 | 55.96 |
| 17* | −17.746 | 0.10 | | |
| 18 | 14.492 | 3.66 | 1.49700 | 81.54 |
| 19 | −21.933 | 6.30 | 1.69895 | 30.13 |
| 20 | 12.811 | Variable | | |
| 21* | 26.959 | 2.00 | 1.53366 | 55.96 |
| 22 | 8.270 | 10.81 | | |
| 23 | 13.080 | 2.75 | 1.82115 | 24.06 |
| 24 | −59.563 | 3.45 | | |
| 25* | −8.224 | 1.00 | 1.53366 | 55.96 |
| 26 | 13.053 | 0.94 | | |
| 27 | ∞ | 0.30 | 1.51633 | 64.14 |
| 28 | ∞ | 1.50 | | |
| Image plane | ∞ | | | |

-continued

Unit mm

Aspherical surface data

8th surface k = 0.000
A4 = 1.07108e−05
17th surface k = 0.000
A4 = 4.31973e−05
21th surface k = 0.000
A4 = 9.86864e−05
25th surface k = 0.000
A4 = 7.42389e−04

Various data

|  | LM | ST | HM |
|---|---|---|---|
| NA | 0.23 | 0.37 | 0.61 |
| β | −2.18 | −3.57 | −5.83 |
| f (mm) | 10.02 | 5.35 | 2.95 |
| IH (mm) | 4.75 | 4.75 | 4.75 |
| Fb (in air) | 2.64 | 2.64 | 2.64 |
| LTL (in air) | 89.02 | 89.53 | 81.81 |
| d6 | 9.99 | 4.01 | 2.77 |
| d11 | 0.10 | 6.59 | 0.10 |
| d15 | 16.48 | 9.57 | 0.20 |
| d20 | 0.55 | 7.46 | 16.83 |

Unit focal length f1 = 11.95  f2 = 21.07  f3 = −40.96  f4 = 20.20
f5 = −18.31

Example 18

Unit mm

Surface data

| Surface no. | r | d | nd | vd |
|---|---|---|---|---|
| Object plane | ∞ | Variable | | |
| 1 | −22.158 | 7.87 | 2.00178 | 19.32 |
| 2 | −10.000 | 5.52 | 1.80518 | 25.42 |
| 3 | −64.870 | 0.10 | | |
| 4 | 514.184 | 8.30 | 1.88300 | 40.76 |
| 5 | −29.149 | 0.10 | | |
| 6 | −49.162 | 2.15 | 1.92286 | 20.88 |
| 7 | −21.169 | 0.10 | | |
| 8 | 52.434 | 4.76 | 1.49700 | 81.54 |
| 9 | −14.067 | 1.00 | 1.56732 | 42.82 |
| 10 | 49.694 | 0.57 | | |
| 11 | 131.131 | 1.00 | 1.71736 | 29.52 |
| 12 | 24.619 | 3.48 | 1.49700 | 81.54 |
| 13 | −43.305 | 0.10 | | |
| 14 | 41.039 | 2.11 | 1.49700 | 81.54 |
| 15 | −237.199 | 0.10 | | |
| 16 | 41.438 | 1.00 | 1.80440 | 39.59 |
| 17 | 16.705 | 3.24 | 1.49700 | 81.61 |
| 18 | −499.930 | 0.10 | | |
| 19(Stop) | ∞ | 0.10 | | |
| 20 | ∞ | 1.42 | 1.58144 | 40.75 |
| 21 | −79.663 | Variable | | |
| 22* | −48.415 | 1.00 | 1.53366 | 55.96 |
| 23 | 34.525 | 0.10 | | |
| 24 | 24.319 | 1.86 | 1.63484 | 23.91 |

-continued

Unit mm

| | | | | |
|---|---|---|---|---|
| 25* | 198.494 | 1.02 | | |
| 26* | −29.143 | 1.00 | 1.53366 | 55.96 |
| 27 | 21.359 | 0.11 | | |
| 28 | 22.635 | 1.12 | 1.63484 | 23.91 |
| 29* | 24.666 | Variable | | |
| 30 | 30.973 | 3.70 | 1.72916 | 54.68 |
| 31 | −49.186 | 0.10 | | |
| 32 | 34.091 | 3.80 | 1.72916 | 54.68 |
| 33 | −34.101 | 1.00 | 1.71736 | 29.52 |
| 34 | 27.835 | Variable | | |
| 35* | −297.555 | 1.53 | 1.72903 | 54.04 |
| 36 | −50.238 | 0.10 | | |
| 37 | 45.319 | 4.28 | 1.69680 | 55.53 |
| 38 | −15.110 | 3.44 | 1.91082 | 35.25 |
| 39 | 37.743 | 12.29 | | |
| 40 | 9142.672 | 1.00 | 1.69680 | 55.53 |
| 41 | 27.912 | 3.93 | | |
| 42 | 41.712 | 3.93 | 1.84666 | 23.78 |
| 43 | −26.474 | 0.10 | | |
| 44 | 17.156 | 7.95 | 1.80810 | 22.76 |
| 45 | 16.815 | 1.98 | | |
| 46 | −19.556 | 1.00 | 1.69680 | 55.53 |
| 47* | 18.003 | 0.84 | | |
| 48 | ∞ | 0.30 | 1.51633 | 64.14 |
| 49 | ∞ | 5.00 | | |
| Image plane | ∞ | | | |

Aspherical surface data

22th surface k = 0.000
A4 = −9.78567e−06

25th surface k = 0.000
A4 = 2.55328e−05

26th surface k = 0.000
A4 = 5.13966e−05

29th surface k = 0.000
A4 = −1.05555e−05

35th surface k = 0.000
A4 = −1.83517e−05

47th surface k = 0.000
A4 = −1.29699e−04

Various data (numerical value of d0 denotes a distance from the optical system to the object plane)

| | LM | ST | HM |
|---|---|---|---|
| NA | 0.23 | 0.37 | 0.61 |
| β | −2.19 | −3.57 | −5.82 |
| f (mm) | 15.06 | 11.20 | 5.11 |
| IH (mm) | 5.50 | 5.50 | 5.50 |
| Fb (in air) | 6.03 | 6.03 | 6.03 |
| LTL (in air) | 124.31 | 135.94 | 139.46 |
| d0 | 1.26 | 1.01 | 0.93 |
| d21 | 0.31 | 17.54 | 26.22 |
| d29 | 16.77 | 10.41 | 0.29 |
| d34 | 1.76 | 2.52 | 7.47 |

-continued

Unit mm

Unit focal length

| | | | |
|---|---|---|---|
| f1 = 12.35 | f2 = −21.91 | f3 = 26.38 | f4 = −115.20 |

Example 19

Unit mm

Surface data

| Surface no. | r | d | nd | vd |
|---|---|---|---|---|
| Object plane | ∞ | 1.35 | | |
| 1 | −39.532 | 9.74 | 1.90366 | 31.32 |
| 2 | 23.654 | 9.75 | 2.00100 | 29.13 |
| 3 | −36.653 | 0.10 | | |
| 4 | 941.821 | 9.62 | 1.86400 | 40.58 |
| 5 | −26.876 | 0.10 | | |
| 6 | −36.098 | 9.15 | 1.76182 | 26.52 |
| 7 | 64.408 | 8.53 | 1.84666 | 23.78 |
| 8 | −49.688 | 0.10 | | |
| 9 | 185.423 | 5.72 | 1.49700 | 81.54 |
| 10 | −22.161 | 1.00 | 1.62004 | 36.26 |
| 11 | 115.347 | 1.20 | | |
| 12 | −280.013 | 1.00 | 1.72047 | 34.71 |
| 13 | 46.267 | 5.34 | 1.49700 | 81.54 |
| 14 | −44.160 | 0.10 | | |
| 15 | 264.207 | 2.83 | 1.43875 | 94.93 |
| 16 | −70.753 | 0.10 | | |
| 17 | 54.206 | 2.71 | 1.55332 | 71.68 |
| 18 | 547.062 | 0.28 | | |
| 19(Stop) | ∞ | Variable | | |
| 20 | 4894.995 | 1.00 | 1.72047 | 34.71 |
| 21 | 18.521 | 3.19 | 1.84666 | 23.78 |
| 22 | 83.205 | 1.69 | | |
| 23 | −45.352 | 1.00 | 1.90366 | 31.32 |
| 24 | 23.618 | 2.32 | 2.00178 | 19.32 |
| 25 | 57.491 | Variable | | |
| 26 | 3791.290 | 3.02 | 1.74320 | 49.34 |
| 27 | −44.426 | 0.10 | | |
| 28 | 72.431 | 2.41 | 1.72903 | 54.04 |
| 29 | −603.236 | 0.10 | | |
| 30 | 36.123 | 5.97 | 1.74100 | 52.64 |
| 31 | −91.650 | 3.40 | 1.85026 | 32.27 |
| 32 | 37.543 | Variable | | |
| 33 | 26.851 | 3.90 | 1.72916 | 54.68 |
| 34 | −100.532 | 1.00 | 1.84666 | 23.78 |
| 35 | 27.575 | Variable | | |
| 36 | 24.285 | 3.71 | 1.80810 | 22.76 |
| 37 | −45.497 | 1.42 | | |
| 38 | −33.596 | 1.39 | 1.55332 | 71.68 |
| 39 | 47.907 | 6.25 | | |
| 40 | −27.385 | 2.54 | 1.55332 | 71.68 |
| 41* | 18.759 | 1.62 | | |
| 42 | ∞ | 0.30 | 1.51633 | 64.14 |
| 43 | ∞ | 2.61 | | |
| Image plane | ∞ | | | |

Aspherical surface data
41th surface k = 0.000
A4 = 5.45815e−06

Various data

| | LM | ST | HM |
|---|---|---|---|
| NA | 0.11 | 0.23 | 0.61 |
| β | −1.26 | −2.43 | −6.51 |
| f (mm) | 32.90 | 20.74 | 5.35 |
| IH (mm) | 5.50 | 5.50 | 5.50 |
| Fb (in air) | 4.42 | 4.42 | 4.42 |

-continued

| Unit mm | | | |
|---|---|---|---|
| LTL (in air) | 168.17 | 198.03 | 241.71 |
| d19 | 0.20 | 27.61 | 54.61 |
| d25 | 28.14 | 17.06 | 1.05 |
| d32 | 1.87 | 12.75 | 65.62 |
| d35 | 21.75 | 24.42 | 4.23 |

Unit focal length

-continued

| Unit mm | | | | |
|---|---|---|---|---|
| f1 = 21.80 | f2 = −27.33 | f3 = 32.47 | f4 = −428.68 | |
| f5 = −155.34 | | | | |

Values of conditional expressions (1) to (21) in examples 1 to 19 are enumerated below. '-' (hyphen) indicates that there is no corresponding arrangement or the conditional expression is not satisfied.

| Conditional expression | Example1 | Example2 | Example3 | Example4 | Example5 |
|---|---|---|---|---|---|
| (1)$1/\beta_{HG1}$ | 0.62 | 0.75 | 0.57 | 0.57 | 0.70 |
| (2)$BF_L/Y$ | 0.31 | 0.40 | 0.75 | 0.43 | 0.51 |
| (3)$\Delta_{Gpmax}/\Delta_{Gpobj}$ | — | 0.06 | 0.34 | — | — |
| (4)$f_{G1}/f_{G2}$ | 1.31 | 1.14 | 0.57 | 0.58 | 1.21 |
| (4-1)$f_{G1}/f_{G2}$ | — | — | — | — | — |
| (5)$f_{G1}/f_{LGp}$ | 1.22 | 1.09 | 0.44 | 0.49 | 1.87 |
| (6)$D_{HGpop}/D_{HGpoi}$ | 0.57 | 0.49 | 0.22 | 0.21 | 0.37 |
| (7)$|D_{sGno}/\varphi_{Hs}|$ | — | — | — | — | — |
| (8)$\Delta_{G2max}/D_{HIGi}$ | — | — | — | — | — |
| (9)$f_{G3}/f_{G2}$ | — | — | — | — | — |
| (10)$f_{HG1G3}/f_{HGl}$ | — | — | — | — | — |
| (11)$D_{Hpn}/D_{Hpi}$ | — | — | — | — | — |
| (12)$|\Delta_{iomax}/\Delta_{max}|$ | — | — | — | — | — |
| (13)$|\Delta_{wd}/D_{wdmax}|$ | — | — | — | — | — |
| (14)$2 \times Y/p$ | 20000 | 20000 | 3929 | 5000 | 5000 |
| (15)$NA_H$ | 0.61 | 0.61 | 0.61 | 0.61 | 0.22 |
| (16)$\varepsilon_{H90}/p$ | 5.63 | 5.68 | 5.51 | 5.53 | 5.30 |
| (17)$NA'_H$ | 0.17 | 0.17 | 0.07 | 0.09 | 0.09 |
| (18)$LT_L/p$ | −0.9 | −0.5 | −0.8 | −0.5 | 0.3 |
| (19)$AT_H/p$ | 14.2 | 13.3 | 2.7 | 3.5 | 10.5 |
| (20)$CRA_{Lobj}$ | 3.6 | 1.7 | −1.3 | −0.3 | 3.9 |
| (21)$CRA_{Hobj}$ | 4.8 | 2.5 | 0.3 | 0.4 | 5.8 |
| Conditional expression | Example6 | Example7 | Example8 | Example9 | Example10 |
| (1)$1/\beta_{HG1}$ | 0.44 | 0.48 | 0.46 | 0.65 | 0.90 |
| (2)$BF_L/Y$ | 0.48 | 0.63 | 0.66 | 0.54 | 0.44 |
| (3)$\Delta_{Gpmax}/\Delta_{Gpobj}$ | — | — | — | — | — |
| (4)$f_{G1}/f_{G2}$ | 0.70 | 0.49 | 0.56 | 0.47 | 0.65 |
| (4-1)$f_{G1}/f_{G2}$ | — | — | — | — | — |
| (5)$f_{G1}/f_{LGp}$ | 0.81 | 0.44 | 0.54 | 0.58 | 0.92 |
| (6)$D_{HGpop}/D_{HGpoi}$ | 0.24 | 0.13 | 0.14 | 0.29 | 0.27 |
| (7)$|D_{sGno}/\varphi_{Hs}|$ | 0.21 | 0.12 | 0.14 | — | 0.05 |
| (8)$\Delta_{G2max}/D_{HIGi}$ | — | — | — | — | — |
| (9)$f_{G3}/f_{G2}$ | — | — | — | — | — |
| (10)$f_{HG1G3}/f_{HGl}$ | — | — | — | — | — |
| (11)$D_{Hpn}/D_{Hpi}$ | — | — | — | — | — |
| (12)$|\Delta_{iomax}/\Delta_{max}|$ | — | — | — | — | — |
| (13)$|\Delta_{wd}/D_{wdmax}|$ | — | — | — | — | — |
| (14)$2 \times Y/p$ | 10000 | 4318 | 5278 | 4318 | 4318 |
| (15)$NA_H$ | 0.61 | 0.61 | 0.61 | 0.61 | 0.26 |
| (16)$\varepsilon_{H90}/p$ | 6.10 | 5.51 | 5.43 | 5.56 | 5.40 |
| (17)$NA'_H$ | 0.17 | 0.09 | 0.10 | 0.08 | 0.09 |
| (18)$LT_L/p$ | −1.1 | −0.6 | −0.2 | −0.3 | 0.4 |
| (19)$AT_H/p$ | 44.0 | 29.5 | 27.5 | 17.6 | 5.2 |
| (20)$CRA_{Lobj}$ | −1.5 | −3.5 | −3.5 | −1.8 | −3.6 |
| (21)$CRA_{Hobj}$ | −5.0 | −2.2 | −3.0 | −0.9 | −2.1 |
| Conditional expression | Example11 | Example12 | Example13 | Example14 | Example15 |
| (1)$1/\beta_{HG1}$ | — | — | — | — | — |
| (2)$BF_L/Y$ | 1.45 | 1.16 | 0.88 | 1.56 | 1.17 |
| (3)$\Delta_{Gpmax}/\Delta_{Gpobj}$ | — | — | — | — | — |
| (4)$f_{G1}/f_{G2}$ | — | — | — | — | — |
| (4-1)$f_{G1}/f_{G2}$ | −0.74 | −0.67 | −0.93 | −1.99 | −0.58 |
| (5)$f_{G1}/f_{LGp}$ | — | — | — | — | — |
| (6)$D_{HGpop}/D_{HGpoi}$ | — | — | — | — | — |
| (7)$|D_{sGno}/\varphi_{Hs}|$ | — | — | — | — | — |
| (8)$\Delta_{G2max}/D_{HIGi}$ | 0.57 | 0.34 | 0.73 | 0.19 | 0.34 |
| (9)$f_{G3}/f_{G2}$ | −2.08 | −2.72 | −2.15 | −2.17 | −3.02 |
| (10)$f_{HG1G3}/f_{HGl}$ | 0.26 | 0.22 | 0.10 | 0.65 | 0.23 |
| (11)$D_{Hpn}/D_{Hpi}$ | 0.80 | 0.90 | 0.93 | 0.71 | 0.91 |
| (12)$|\Delta_{iomax}/\Delta_{max}|$ | — | — | — | — | — |
| (13)$|\Delta_{wd}/D_{wdmax}|$ | — | — | — | — | — |

-continued

| | | | | | |
|---|---|---|---|---|---|
| (14) $2 \times Y/p$ | 5455 | 6111 | 5000 | 6111 | 6111 |
| (15) $NA_H$ | 0.61 | 0.61 | 0.61 | 0.12 | 0.61 |
| (16) $\varepsilon_{H90}/p$ | 5.56 | 5.53 | 5.02 | 5.42 | 5.46 |
| (17) $NA'_H$ | 0.17 | 0.10 | 0.09 | 0.11 | 0.10 |
| (18) $LT_L/p$ | 1.9 | 1.4 | 3.4 | 2.8 | 1.5 |
| (19) $AT_H/p$ | 31.2 | 22.6 | 22.0 | 3.2 | 19.6 |
| (20) $CRA_{Lobj}$ | 0.5 | −1.0 | −0.4 | 1.8 | 3.6 |
| (21) $CRA_{Hobj}$ | 0.2 | −0.2 | 0.0 | 2.5 | 1.4 |

| Conditional expression | Example16 | Example17 | Example18 | Example19 |
|---|---|---|---|---|
| (1) $1/\beta_{HG1}$ | 0.59 | 0.46 | — | — |
| (2) $BF_L/Y$ | 0.38 | 0.58 | 1.12 | 0.82 |
| (3) $\Delta_{Gpmax}/\Delta_{Gpobj}$ | — | — | — | — |
| (4) $f_{G1}/f_{G2}$ | 0.58 | 0.57 | — | — |
| (4-1) $f_{G1}/f_{G2}$ | — | — | −0.56 | −0.80 |
| (5) $f_{G1}/f_{LGp}$ | 0.59 | 0.59 | — | — |
| (6) $D_{HGpop}/D_{HGpoi}$ | 0.19 | 0.21 | — | — |
| (7) $|D_{sGno}/\varphi_{Hs}|$ | — | 0.14 | — | — |
| (8) $\Delta_{G2max}/D_{HIGi}$ | — | — | 0.17 | 0.17 |
| (9) $f_{G3}/f_{G2}$ | — | — | −1.20 | −1.19 |
| (10) $f_{HG1G3}/f_{HGI}$ | — | — | −0.09 | −0.16 |
| (11) $D_{Hpn}/D_{Hpi}$ | — | — | 0.87 | 0.84 |
| (12) $|\Delta_{iomax}/\Delta_{max}|$ | 0.67 | 0.47 | 1.00 | 1.00 |
| (13) $|\Delta_{wd}/D_{wdmax}|$ | 0.00 | 0.00 | 0.27 | 0.00 |
| (14) $2 \times Y/p$ | 5000 | 5278 | 6111 | 6111 |
| (15) $NA_H$ | 0.61 | 0.61 | 0.61 | 0.61 |
| (16) $\varepsilon_{H90}/p$ | 5.45 | 5.43 | 5.44 | 6.16 |
| (17) $NA'_H$ | 0.09 | 0.10 | 0.10 | 0.09 |
| (18) $LT_L/p$ | −0.9 | −0.4 | 1.1 | 3.1 |
| (19) $AT_H/p$ | 5.9 | 30.7 | 31.2 | 35.8 |
| (20) $CRA_{Lobj}$ | −0.1 | −3.3 | 3.7 | 2.1 |
| (21) $CRA_{Hobj}$ | 0.5 | 0.9 | 1.5 | 0.5 |

Figure 39:
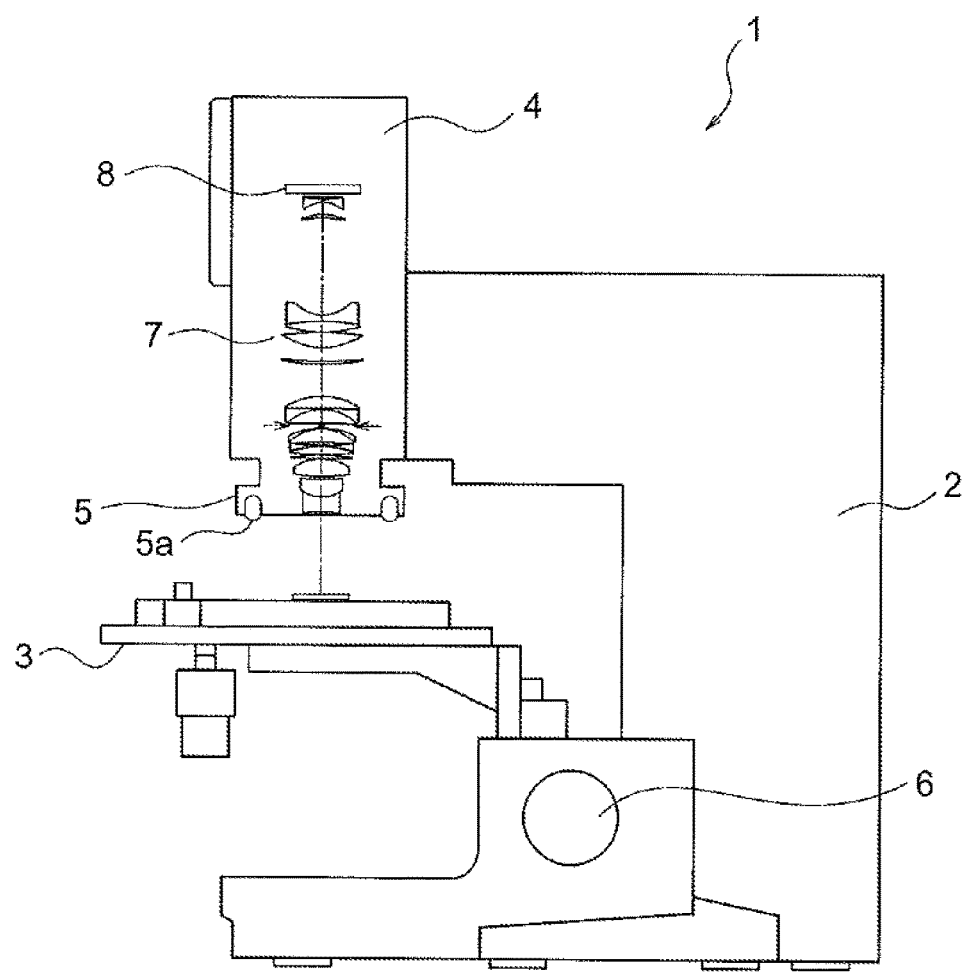
FIG. 39 is a diagram showing an arrangement of an image pickup apparatus and an image pickup system.

FIG. 39 is a diagram showing a microscope which is an optical instrument of the present embodiment. A microscope 1 is a microscope of an upright type. As shown in FIG. 39, the microscope 1 includes a main body 2, a stage 3, an image pickup unit 4, an illumination unit 5, an aiming knob 6, a variable magnification optical system 7, and an image pickup element 8.

The main body 2 is provided with the stage 3, the image pickup unit 4, and the aiming knob 6. A sample is to be mounted on the stage 3. The stage 3 is moved in an optical axial direction by the aiming knob 6. The stage 3 is moved by an operation (rotation) of the aiming knob 6, and accordingly, it is possible to adjust the focus on the sample. For this, a moving mechanism (not shown in the diagram) is provided between the main body 2 and the stage 3.

The image pickup unit 4 is provided with the illumination unit 5. The image pickup unit 4 and the illumination unit 5 are positioned above the stage 3. The illumination unit 5 includes illumination elements 5a disposed in annular shape. An LED (light emitting diode) is an example of the illumination element 5a.

The optical system 7 and the image pickup element 8 are disposed at an interior of the image pickup unit 4. The variable magnification optical system according to the example 1 for instance is used for the variable magnification optical system 7. A front end of the variable magnification optical system 7 is positioned at a central portion of the illumination unit 5.

From the illumination unit 5, illumination light is irradiated to a sample. In this case, the illumination is epi-illumination. Fluorescent light or reflected light from the sample passes through the variable magnification optical system 7 and is incident on the image pickup element 8. A sample image (an optical image) is formed on an image pickup surface of the image pickup element 8. The sample image is subjected to photoelectric conversion by the image pickup element 8, and accordingly, an image of the sample is acquired. The image of the sample is displayed on a display unit (not shown in the diagram). In such manner, an observer is able to observe the image of the sample.

Here, the microscope 1 includes the variable magnification optical system 7 (variable magnification optical system according to the present embodiment). The variable magnification optical system 7, while being an optical system having a short overall length, has a wide capturing area, a high resolution, and a capability of correcting aberrations favorably. Therefore, in the microscope 1, various aberrations are corrected favorably over a wide area, and a bright and sharp sample image is acquired.

In the abovementioned example, the variable magnification optical system was disposed in the image pickup unit. However, an arrangement is not restricted to such an arrangement. For example, in an objective lens with a parfocal distance of 75 mm, the image pickup element and the variable magnification optical system according to the present embodiment can be disposed in a frame member which holds the lens. In this case, similarly as the existing objective lens, the variable magnification optical system according to the present embodiment can be installed on a revolver. When such an arrangement is made, the existing objective lens and the optical system of the present embodiment can be used by switching.

The description was made by using an example of a microscope as an optical instrument using the abovementioned variable magnification optical system. However, the variable magnification optical system according to the present invention is not restricted to a microscope, and is applicable to an electronic image pickup apparatus (such as a lens unit for a portable camera, a laptop computer, and a portable information terminal) as an optical instrument.

Since the image pickup unit 4 includes the variable magnification optical system 7 and the image pickup element 8, the image pickup unit 4 can be deemed as an image pickup apparatus. In this case, since the microscope 1 includes the image pickup unit 4, the stage 3, and the illumination unit 5 (illumination apparatus), it can be called as an image pickup system. In FIG. 39, the stage 3 is joined to the main body 2 via an aiming mechanism (the aiming knob 6). However, the stage 3 may be installed directly on the main body 3 and not via the moving mechanism. By making such arrangement, it is possible to integrate the image pickup unit 4 and the stage 3 via the main body 2.

Figure 40:
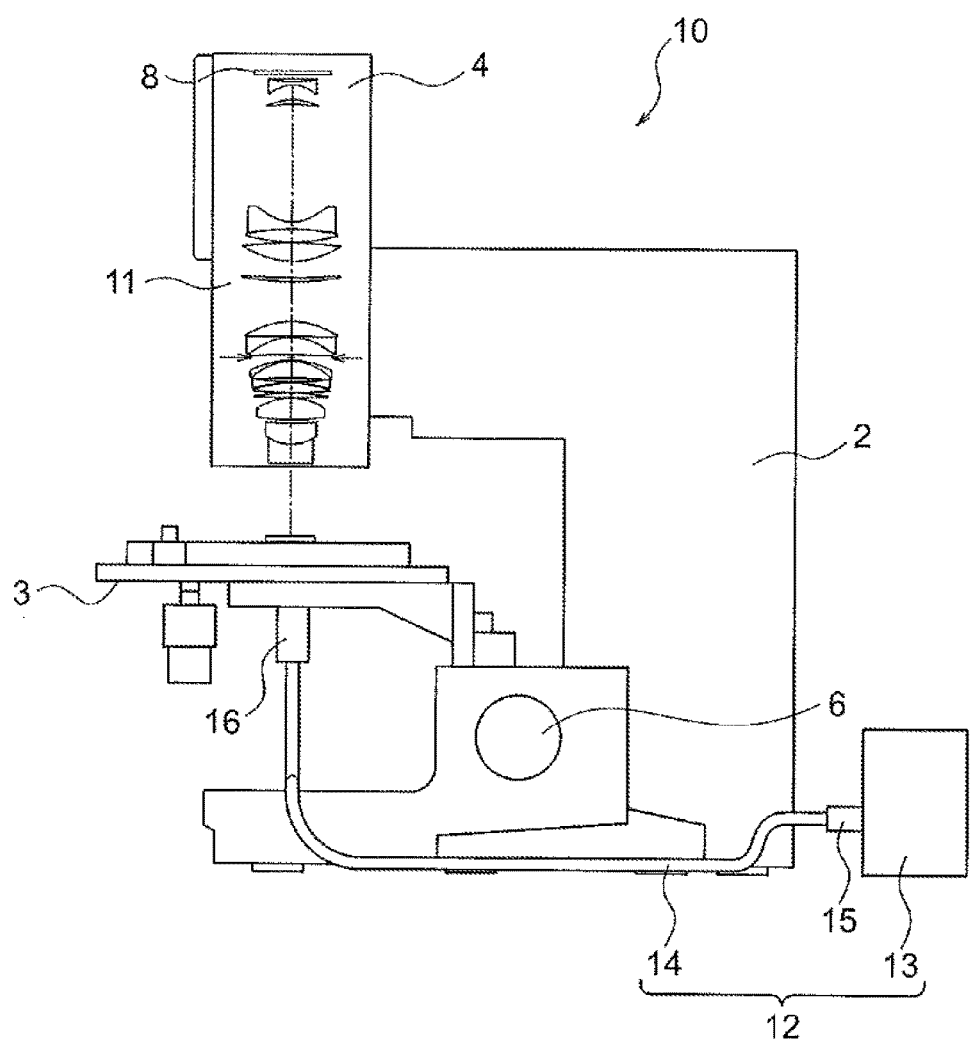
FIG. 40 is a diagram showing an arrangement of another image pickup apparatus and image pickup system.

FIG. 40 is a diagram showing a microscope which is an optical instrument according to the present embodiment. A microscope 10 is a microscope of an upright type. Same reference numerals are assigned to components which are same as in the microscope 1 (FIG. 39), and description thereof is omitted.

An variable magnification optical system 11 and the image pickup element 8 are disposed at the interior of the image pickup unit 4. The variable magnification optical system according to the example 1 is used for the variable magnification optical system 11.

The microscope 1 was provided with the illumination unit 5 at a side of the variable magnification optical system 7. Whereas, the microscope 10 is provided with an illumination unit 12 at a opposite side of the variable magnification optical system 11 across the stage 3. Accordingly, it is possible to carry out transmitted illumination in the microscope 10. The illumination unit 12 includes a light source unit 13 and a light guiding fiber 14.

The light source unit 13 includes a light source such as a halogen lamp, a mercury lamp, a xenon lamp, an LED, and a laser. The light source unit 13 includes a lens. Illumination light emitted from the light source passes through the lens and is incident on an incident-end 15 of the light guiding fiber 14. The illumination light incident on the light guiding fiber 14 is transmitted through the light guiding fiber 14 and emerges from an exit-end 16.

The exit-end 16 of the light guiding fiber 14 is connected to the stage 3 by a holding mechanism (not shown in the diagram). Here, the exit-end 16 of the light guiding fiber 14 is positioned on a lower surface of the stage 3. Therefore, the illumination light emerged from the exit-end 16 is directed toward the variable magnification optical system 11 from a lower side of the stage 3 and is irradiated to a sample. In such manner, transmitted illumination is carried out in the microscope 10.

The light guiding fiber 14 is held by the stage 3. However, the light guiding fiber 14 may be held by a means other than the stage 3. Moreover, the exit-end 16 of the light guiding fiber 14 may be positioned on an upper surface (the optical system 7 side) of the stage 3. By making such arrangement, it is possible to carry out epi-illumination in the microscope 10 similarly as in the microscope 1.

Transmitted light or fluorescent light from the sample passes through the variable magnification optical system 11 and is incident on the image pickup element 8. A sample image (an optical image) is formed on an image pickup surface of the image pickup element 8. The sample image is subjected to photoelectric conversion by the image pickup element 8, and accordingly, an image of the sample is acquired. The image of the sample is displayed on a display unit (not shown in the diagram). In such manner, the observer is able to observe the image of the sample.

Even the microscope 10 includes the variable magnification optical system 11 (variable magnification optical system according to the present embodiment). The variable magnification optical system 11, while being an optical system having a short overall length, has a wide capturing area, a high resolution, and a capability of correcting aberrations favorably. Therefore, in the microscope 10, various aberrations are corrected favorably over a wide area, and a bright and sharp sample image is acquired. The microscope 10 may have epi-illumination. Moreover, it is possible to make appropriate design variations in an arrangement of members in the microscope 10.

Figure 41:
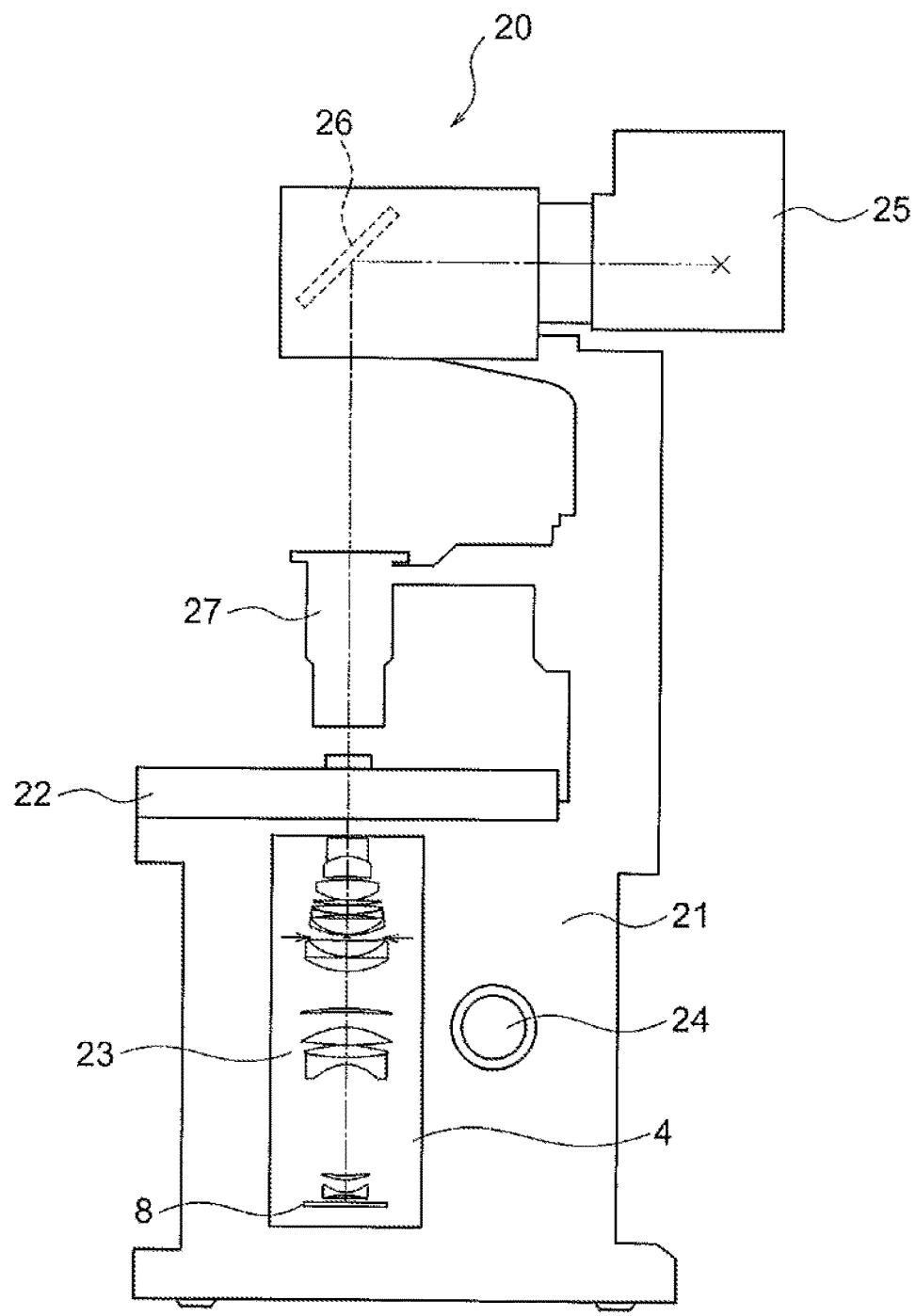
FIG. 41 is a diagram showing an arrangement of still another image pickup apparatus and image pickup system.

FIG. 41 is a diagram showing a microscope which is an optical instrument according to the present embodiment. A microscope 20 is a microscope of inverted type. The microscope 20 includes a main body 21, a stage 22, the image pickup unit 4, a variable magnification optical system 23, the image pickup element 8, an aiming knob 24, transmitted-illumination light source 25, a reflecting mirror 26, and a condenser lens 27.

Here, the variable magnification optical system 23 and the image pickup element 8 are disposed at the interior of the image pickup unit 4. The variable magnification optical system according to the example 1 is used for the variable magnification optical system 23.

The main body 21 is provided with the stage 22, the image pickup unit 4, and the aiming knob 24. A sample is to be placed on the stage 22. The image pickup unit 4 is to be moved in the optical axial direction by the aiming knob 24. The image pickup unit 4 is moved by an operation (rotation) of the aiming knob 24, and accordingly, it is possible to adjust the focus on the sample. For this, a moving mechanism (not shown in the diagram) is provided inside the main body 21, and the image pickup unit 4 is held by the moving mechanism.

Moreover, the main body 21 is provided with the transmitted-illumination light source 25, the reflecting mirror 26, and the condenser lens 27. The transmitted-illumination light source 25, the reflecting mirror 26, and the condenser lens 27 are disposed above the stage 22. Illumination light emitted from the transmitted-illumination light source 25 is reflected at the reflecting mirror 26, and is incident on the condenser lens 27. The condenser lens 27 is disposed on an upper surface of the stage 22. Therefore, the illumination light emerged from the condenser lens 27 travels from an upper side of the stage 22 toward the variable magnification optical system 23 and is irradiated to the sample. In such manner, transmitted-illumination is carried out in the microscope 20.

Even the microscope 20 includes the variable magnification optical system 23 (variable magnification optical system according to the present embodiment). The variable magnification optical system 23, while being an optical system having a short overall length, has a wide capturing area, a high resolution, and a capability of correcting aberrations favorably. Therefore, in the microscope 20, various aberrations are corrected favorably over a wide area, and a bright and sharp sample image is acquired. It is possible to make appropriate design variations in an arrangement of members in the microscope 20.

Figure 42A:
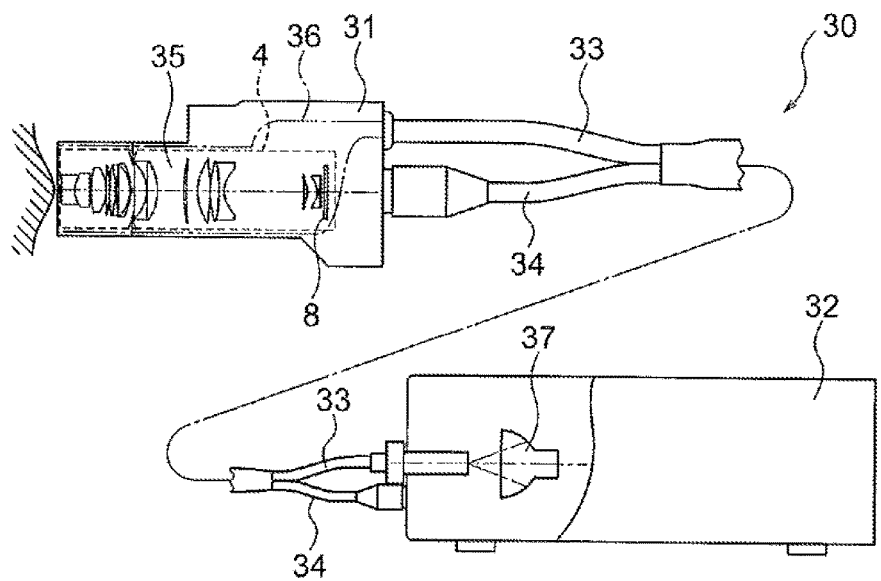
FIG. 42A and FIG. 42B are diagrams showing an arrangement of still another image pickup apparatus and image pickup system.
Figure 42B:
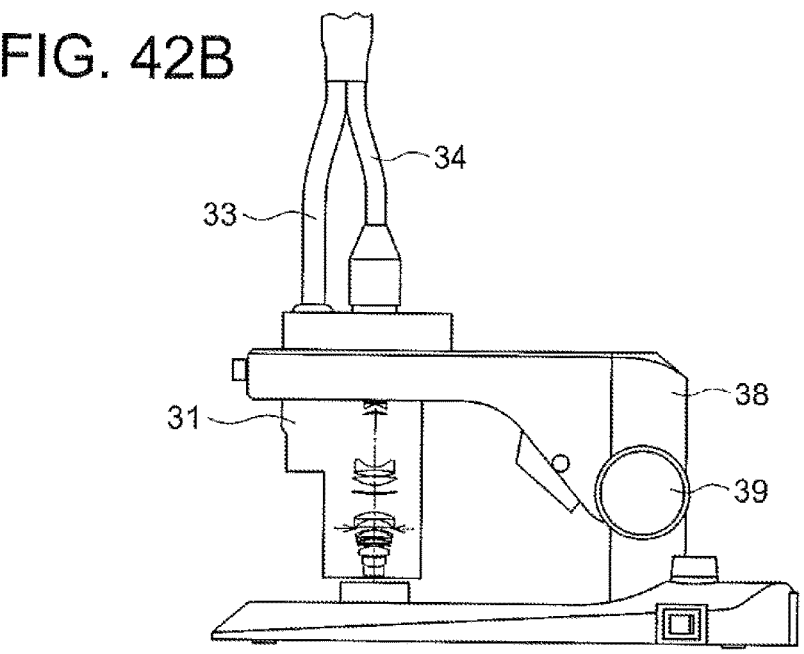

FIG. 42A and FIG. 42B are diagrams showing a microscope which is an optical instrument according to the present embodiment. FIG. 42A is a diagram showing an overall arrangement of the microscope and FIG. 42B is a diagram showing a microscope 30 in a fixed state.

The microscope 30 is a microscope of a portable type. The microscope 30 includes a probe unit 31, a control box 32, a light guiding fiber 33, a cable 34, the image pickup unit 4, a variable magnification optical system 35, the image pickup element 8, a light guiding body for illumination 36, and a light source 37.

The variable magnification optical system 35 and the image pickup element 8 are disposed at the interior of the image pickup unit 4. The variable magnification optical system according to the example 1 is used for the variable magnification optical system 35.

The probe unit 31 and the control box 32 are connected by the light guiding fiber 33 and the cable 34. The control box 32 includes the light source 37 and a processing unit (not shown in the diagram). The processing unit performs processing of an image signal from the probe unit.

The probe unit 31 has a size that enables the user to hold in a hand. The probe unit 31 includes the image pickup unit 4 and the light guiding body for illumination 36. The light guiding body for illumination 36 is disposed at an outer peripheral side of the image pickup unit 4. The light guiding body for illumination 36 is optically connected to the light guiding fiber 33. Illumination light emitted from the light source 37 is transmitted through the light guiding fiber 33, and is incident on the light guiding body for illumination 36. The illumination light is transmitted through the light guiding body for illumination 36 and emerges from the probe unit 31. In such manner, epi-illumination is carried in the microscope 30.

Reflected light or fluorescent light from a sample passes through the variable magnification optical system 35 and is incident on the image pickup element 8. A sample image (an optical image) is formed on the image pickup surface of the image pickup element. The sample image is subjected to photoelectric conversion by the image pickup element 8, and an image of the sample is acquired. The image of the sample is displayed on a display unit (not shown in the diagram). In such manner, the observer is able to observe the image of the sample.

The probe unit 31 is connected to the control box 32 by the light guiding fiber 33 and the cable 34. Therefore, it is possible to set freely a position and a direction of the probe unit 31. In this case, the posture (position and direction) of the probe unit 31 is to be fixed by the observer. However, sometimes, no sufficient stability is achieved by fixing by the observer.

For stabilizing the posture (position and direction) of the probe unit 31, the probe unit 31 may be held by a mount 38 as shown in FIG. 26B. By making such arrangement, it is possible to stabilize the posture (position and direction) of the probe unit 31.

The mount 38 is provided with an aiming knob 39. The probe unit 31 (image pickup unit 4) is to be moved in the optical axial direction by the aiming knob 39. The probe unit 31 is moved by an operation (rotation) of the aiming knob 39, and accordingly, it is possible to adjust the focus on the sample. For this, a moving mechanism (not shown in the diagram) is provided inside the mount 38.

Even the microscope 30 includes the variable magnification optical system 35 (variable magnification optical system according to the present embodiment). The variable magnification optical system 35, while being an optical system having a short overall length, has a wide capturing area, a high resolution, and a capability of correcting aberrations favorably. Therefore, in the microscope 30, various aberrations are corrected favorably over a wide area, and a bright and sharp sample image is acquired. It is possible to make appropriate design variations in an arrangement of members in the microscope 30.

Any optical system from among the variable magnification optical systems according to the examples 1 to 19 can be used in each of the microscope 1, the microscope 10, the microscope 20, the microscope 30, and the microscope 40.

According to the embodiments of the present invention, it is possible to provide a variable magnification optical system in which, the overall length of the optical system is short, and an axial aberration and an off-axis aberration are corrected favorably in an area of observation same as or wider than an area of observation in a conventional microscope, and an image pickup apparatus and an image pickup system using the variable magnification optical system.

In such manner, the present invention can have various modified examples without departing from the scope of the invention. Moreover, shapes and number of components is not necessarily limited to those described in each example. A lens which is not shown in the diagrams of the examples described heretofore, and which practically does not have a refractive power may be disposed in any of the lens units or outside any of the lens units.

Moreover, the following invention other than the above-mentioned invention is also included in the present invention.

[Appended Mode 1]

A variable magnification optical system in which, a magnification ratio varies from a low magnification end to a high magnification end, comprising:

a first lens unit having a positive refractive power, which is disposed nearest to an object; and a second lens unit having a positive refractive power, which is disposed on an image side of the first lens unit, wherein at a time of varying magnification, a distance between the first lens unit and the second lens unit changes, and the following conditional expression (1) is satisfied:

$$0<1/\beta_{HG1}<1 \tag{1},$$

where, $\beta_{HG1}$ denotes an imaging magnification of the first lens unit at the high magnification end.

[Appended Mode 2]

The variable magnification optical system according to Appended mode 1, wherein the following conditional expression (2) is satisfied:

$$0<BF_L/Y\leq4.3 \tag{2},$$

where, $BF_L$ denotes a back focus at the low magnification end, and

Y denotes a maximum image height of the overall variable magnification optical system.

[Appended Mode 3]

The variable magnification optical system according to Appended mode 1 or 2, wherein a stop is disposed on the image side of the second lens unit, and a predetermined positive lens unit is disposed on the image side of the stop, and the predetermined positive lens unit has a positive refractive power, and is a lens unit of which, a distance from the stop at the high magnification end is smaller than a distance from the stop at the low magnification end.

[Appended Mode 4]

The variable magnification optical system according to Appended mode 3, wherein the predetermined positive lens unit includes at least two or more than two positive lenses and one or more than one negative lens.

[Appended Mode 5]

The variable magnification optical system according to Appended mode 3, wherein a plurality of predetermined positive lens units is disposed on the image side of the stop, and a first predetermined positive lens unit from among the plurality of predetermined positive lens units, is disposed nearest to an object, and the following conditional expression (3) is satisfied:

$$0 < \Delta_{Gpmax}/\Delta_{Gpobj} \leq 0.6 \quad (3),$$

where, $\Delta_{Gpmax}$ denotes a maximum amount of change from among amounts of change in a distance on an optical axis between any two predetermined positive lens units, and $\Delta_{Gpobj}$ denotes a maximum amount of movement from among amounts of movement on the optical axis of the first predetermined positive lens unit, and here, $\Delta_{Gpmax}$ is the maximum of the amount of change in distance on the optical axis between the positive lens units from among all combinations of two lens units selected from three or more than three lens unit in a case in which, the predetermined positive lens units includes three or more than three lens units.

[Appended Mode 6]

The variable magnification optical system according to any one of Appended modes 1 to 5, wherein the following conditional expression (4) is satisfied:

$$0.1 \leq f_{G1}/f_{G2} \leq 5 \quad (4),$$

where, $f_{G1}$ denotes a focal length of the first lens unit, and $f_{G2}$ denotes a focal length of the second lens unit.

[Appended Mode 7]

The variable magnification optical system according to anyone of Appended modes 1 to 6, wherein at the time of varying magnification from the low magnification end to the high magnification end, the stop moves from the image side to the object side.

[Appended Mode 8]

The variable magnification optical system according to Appended mode 3, wherein the following conditional expression (5) is satisfied:

$$0.2 \leq f_{G1}/f_{LGp} \leq 10 \quad (5),$$

where, $f_{G1}$ denotes a focal length of the first lens unit, and $f_{LGp}$ denotes a focal length of the predetermined positive lens unit at the low magnification end.

[Appended Mode 9]

The variable magnification optical system according to any one of Appended modes 1 to 8, wherein one or more than one predetermined positive lens is included, and a high-dispersion glass material is used for the predetermined positive lens.

[Appended Mode 10]

The variable magnification optical system according to any one of Appended modes 3 to 5, and 9, wherein the following conditional expression (6) is satisfied:

$$-1 \leq D_{HGpop}/D_{HGpoi} \leq 0.65 \quad (6),$$

where, $D_{HGpop}$ denotes a distance on the optical axis from a lens surface nearest to the object up to a principal plane on the object side in the predetermined positive lens unit at the high magnification end, and $D_{HGpoi}$ denotes a distance on the optical axis from a lens surface nearest to the object up to a lens surface nearest to the image in the predetermined positive lens unit at the high magnification end.

[Appended Mode 11]

The variable magnification optical system according to any one of Appended modes 1 to 10, wherein a stop and a predetermined negative lens unit are included, and the predetermined negative lens unit has a negative refractive power, and is disposed to be adjacent to the stop, and the following conditional expression (7) is satisfied:

$$|D_{sGno}/\phi_{Hs}| \leq 1 \quad (7),$$

where, $D_{sGno}$ denotes a distance on the optical axis from the stop up to a lens surface nearest to the stop in the predetermined negative lens unit, and $\phi_{Hs}$ denotes a diameter of the stop at the high magnification end.

[Appended Mode 12]

The variable magnification optical system according to Appended mode 11, wherein the predetermined negative lens unit includes at least one or more than one positive lens and one or more than one negative lens, and a glass material having a dispersion higher than a dispersion of the negative lens is used for the positive lens.

[Appended Mode 13]

The variable magnification optical system according to Appended mode 12, wherein the positive lens and the negative lens are cemented.

[Appended Mode 14]

A variable magnification optical system in which, a magnification ratio varies from a low magnification end to a high magnification end, comprising:

a first lens unit having a positive refractive power, which is disposed nearest to an object; and a second lens unit having a negative refractive power, which is disposed on an image side of the first lens unit; wherein a stop which is disposed on the object side of the second lens unit is included; and at a time of varying magnification, the second lens unit moves, and a distance between the first lens unit and the second lens unit changes, and a third lens unit is disposed on an image side of the second lens unit, and the following conditional expression (8) is satisfied:

$$0.15 \leq \Delta_{G2max}/D_{HIGi} \leq 2 \quad (8),$$

where, $\Delta_{G2max}$ denotes a maximum amount of movement from among amounts of movement of the second lens unit on the optical axis, and $D_{HIGi}$ denotes a distance on the optical axis from a lens surface nearest to the object in the third lens unit up to an image plane, at the high magnification end.

[Appended Mode 15]

The variable magnification optical system according to Appended mode 14, wherein the following conditional expression (2) is satisfied:

$$0 < BF_L/Y \leq 4.3 \quad (2),$$

where, $BF_L$ denotes a back focus at the low magnification end, and

Y denotes a maximum image height of the overall variable magnification optical system.

[Appended Mode 16]

The variable magnification optical system according to Appended mode 14 or 15, wherein
one or more than one predetermined positive lens is included, and
a high-dispersion glass material is used for the predetermined positive lens.

[Appended Mode 17]

The variable magnification optical system according to any one of Appended modes 14 to 16, wherein the following conditional expression (4-1) is satisfied:

$$-2.5 \leq f_{G1}/f_{G2} \leq -0.2 \quad (4\text{-}1),$$

where,
$f_{G1}$ denotes a focal length of the first lens unit, and
$f_{G2}$ denotes a focal length of the second lens unit.

[Appended Mode 18]

The variable magnification optical system according to any one of Appended modes 14 to 17, wherein
the third lens unit has a positive refractive power, and is disposed on the image side of the second lens unit, to be adjacent to the second lens unit, and
at the time of varying magnification, a distance between the second lens unit and the third lens unit changes, and
the following conditional expression (9) is satisfied:

$$-7.5 \leq f_{G3}/f_{G2} \leq -1 \quad (9),$$

where,
$f_{G2}$ denotes a focal length of the second lens unit, and
$f_{G3}$ denotes a focal length of the third lens unit.

[Appended Mode 19]

The variable magnification optical system according to any one of Appended modes 14 to 18, wherein
a third lens unit having a positive refractive power is disposed on the image side of the second lens unit, and
one or more than one lens unit is included on the image side of the third lens unit, and
the following conditional expression (10) is satisfied:

$$0.07 \leq f_{HG1G3}/f_{HGI} \leq 1 \quad (10),$$

where,
$f_{HG1G3}$ denotes a combined focal length of the first lens unit, the second lens unit, and the third lens unit at the high magnification end, and
$f_{HGI}$ denotes a combined focal length of a lens unit which is positioned on the image side of the third lens unit at the high magnification end.

[Appended Mode 20]

The variable magnification optical system according to any one of Appended modes 14 to 19, wherein
the second lens unit includes at least one or more than one positive lens and one or more than one negative lens, and
a glass material having a dispersion higher than a dispersion of the negative lens is used for the positive lens.

[Appended Mode 21]

The variable magnification optical system according to anyone of Appended modes 14 to 20, wherein the second lens unit includes two or more than two negative lenses.

[Appended Mode 22]

The variable magnification optical system according to any one of Appended modes 14 to 21, wherein the first lens unit includes two or more than two sets of cemented lenses.

[Appended Mode 23]

The variable magnification optical system according to any one of Appended modes 18 to 22, wherein
one or more than one positive lens and one or more than one negative lens are included on the image side of the third lens unit, and out of the positive lens and the negative lens, an object-side positive lens which is disposed nearest to the object and an image-side negative lens which is disposed nearest to the image satisfy the following conditional expression (11):

$$0.5 \leq D_{Hpn}/D_{Hpi} \leq 0.99 \quad (11),$$

where,
$D_{Hpn}$ denotes a distance on the optical axis from an object-side surface of the object-side positive lens up to an image-side surface of the image-side negative lens, at the high magnification end, and
$D_{Hpi}$ denotes a distance on the optical axis from the object-side surface up to an image-side surface of the object-side positive lens, at the high magnification end.

[Appended Mode 24]

A variable magnification optical system according to any one of Appended modes 1 to 23, wherein
a lens unit which moves at the time of varying magnification is included, and
the following conditional expression (12) is satisfied:

$$0.01 \leq |\Delta_{iomax}/\Delta_{max}| \leq 5 \quad (12),$$

where,
$\Delta_{iomax}$ denotes a maximum amount of change from among amounts of change in the conjugate length, and
$\Delta_{max}$ denotes a maximum amount of movement from among amounts of movement of the lens unit which moves.

[Appended Mode 25]

The variable magnification optical system according to Appended mode 24, wherein
the first lens unit includes a first object-side lens which is disposed nearest to the object, and
the following conditional expression (13) is satisfied:

$$|\Delta_{wd}/D_{wdmax}| \leq 0.5 \quad (13),$$

where,
$\Delta_{wd}$ denotes a maximum amount of change from among amounts of change in a distance from the object up to an object-side surface of the first object-side lens, and
$D_{wdmax}$ denotes a maximum distance from among distances from the object up to the object-side surface of the first object-side lens.

[Appended Mode 26]

The variable magnification optical system according to Appended mode 24 or 25, wherein the first lens unit moves such that a distance from the first lens unit up to the object is constant.

[Appended Mode 27]

An image pickup apparatus comprising:
an image pickup element; and
a variable magnification optical system, wherein
an optical image is formed on the image pickup element by the variable magnification optical system, and
the variable magnification optical system is a variable magnification optical system according to any one of Appended modes 1 to 26, and
at the time of varying magnification, a distance between the first lens unit and the second lens unit is variable, and
the following conditional expressions (14) and (15) are satisfied:

$$3000 \leq 2 \times Y/p \quad (14),$$

and $$0.08 \leq NA_H \quad (15),$$

where,

Y denotes a maximum image height in the overall variable magnification optical system, p denotes a pixel pitch of the image pickup element, and $NA_H$ denotes a numerical aperture on the object side of the variable magnification optical system at the high magnification end.

[Appended Mode 28]

The variable magnification optical system according to Appended mode 27, wherein the following conditional expression (16) is satisfied:

$$1.0 < \varepsilon_{H90}/p < 10 \quad (16),$$

where, $\varepsilon_{H90}$ denotes a diameter of a 90% encircled energy of a point spread function on a best image plane when a point image for wavelength e-line was formed near a substantial center of the image pickup element, at the high magnification end of the variable magnification optical system, and p denotes the pixel pitch of the image pickup element.

[Appended Mode 29]

The image pickup apparatus according to Appended mode 27 or 28, wherein the following conditional expression (17) is satisfied:

$$0.06 < NA'_H \quad (17),$$

where, $NA'_H$ denotes a numerical aperture on the image side of the variable magnification optical system at the high magnification end.

[Appended Mode 30]

The image pickup apparatus according to any one of Appended modes 27 to 29, wherein the following conditional expression (18) is satisfied:

$$-7 < LT_L/p < 7 \quad (18),$$

where, $LT_L$ denotes a distance between centers of gravity at the low magnification end of the variable magnification optical system, and the distance between the centers of gravity is a distance between a center of gravity of the point spread function about a C-line and a center of gravity of the point spread function about a d-line, at a position which is 70% of the maximum image height, and p denotes the pixel pitch of the image pickup element.

[Appended Mode 31]

The image pickup apparatus according to any one of Appended mode 27 to 30, wherein the following conditional expression (19) is satisfied:

$$-50 < AT_H/p < 50 \quad (19),$$

where, $AT_H$ denotes a difference between the best focus position about a C-line and the best focus position about a d-line, near a substantial center of the image pickup element, and p denotes the pixel pitch of the image pickup element.

[Appended Mode 32]

The image pickup apparatus according to any one of Appended mode 27 to 31, wherein the following conditional expressions (20) and (21) are satisfied:

$$-7° < CRA_{Lobj} < 7° \quad (20),$$

and $$-7° < CRA_{Hobj} < 7° \quad (21),$$

where, $CRA_{Lobj}$ denotes an angle made by an object-side principal light ray with an optical axis, at the low magnification end, and $CRA_{Hobj}$ denotes an angle made by the object-side principal light ray with the optical axis, at the high magnification end, and here, the object-side principal light ray is a principal light ray that reaches a position at 90% of the maximum image height, from among principal light rays that are incident on the first lens unit, and regarding the sign of the angle, the angle is let to be negative when measured in a clockwise direction from the optical axis and the angle is let to be positive when measured in a counterclockwise direction from the optical axis.

[Appended Mode 33]

The image pickup apparatus according to any one of Appended mode 17 to 32, wherein focusing is carried out automatically while detecting an image contrast of an optical image.

[Appended Mode 34]

The image pickup apparatus according to any one of Appended modes 27 to 33, wherein the focusing is carried out by moving the image pickup element in an optical axial direction.

[Appended Mode 35]

The image pickup apparatus according to any one of Appended mode 27 to 43, comprising:

a variable magnification optical system according to any one of Appended modes 1 to 26 is used as the optical system.

[Appended Mode 36]

The variable magnification optical system according to any one of Appended modes 1 to 13, wherein the following conditional expression (12) is satisfied:

$$0.01 \leq |\Delta_{iomax}/\Delta_{max}| \leq 5 \quad (12),$$

where, $\Delta_{iomax}$ denotes a maximum amount of change from among amounts of change in the conjugate length, and $\Delta_{max}$ denotes a maximum amount of movement from among amounts of movement of the lens unit which moves.

[Appended Mode 37]

The variable magnification optical system according to Appended modes 36, wherein the first lens unit includes a first object-side lens which is disposed nearest to the object, and the following conditional expression (13) is satisfied:

$$|\Delta_{wd}/D_{wdmax}| \leq 0.5 \quad (13),$$

where, $\Delta_{wd}$ denotes a maximum amount of change from among amounts of change in a distance from the object up to an object-side surface of the first object-side lens, and $D_{wdmax}$ denotes a maximum distance from among distances from the object up to the object-side surface of the first object-side lens.

[Appended Mode 38]

The variable magnification optical system according to Appended mode 36 or 37, wherein the first lens unit moves such that a distance from the first lens unit up to the object is constant.

[Appended Mode 39]

The variable magnification optical system according to any one of Appended modes 14 to 23, wherein the following conditional expression (12) is satisfied:

$$0.01 \leq |\Delta_{iomax}/\Delta_{max}| \leq 5 \quad (12),$$

where, $\Delta_{iomax}$ denotes a maximum amount of change from among amounts of change in the conjugate length, and $\Delta_{max}$ denotes a maximum amount of movement from among amounts of movement of the lens unit which moves.

[Appended Mode 40]

The variable magnification optical system according to Appended modes 39, wherein the first lens unit includes a first object-side lens which is disposed nearest to the object, and the following conditional expression (13) is satisfied:

$$|\Delta_{wd}/D_{wdmax}| \leq 0.5 \qquad (13),$$

where, $\Delta_{wd}$ denotes a maximum amount of change from among amounts of change in a distance from the object up to an object-side surface of the first object-side lens, and $D_{wdmax}$ denotes a maximum distance from among distances from the object up to the object-side surface of the first object-side lens.

[Appended Mode 41]

The variable magnification optical system according to Appended mode 39 or 40, wherein the first lens unit moves such that a distance from the first lens unit up to the object is constant.

As described heretofore, the present invention is suitable for a variable magnification optical system in which, the overall length of the optical system is short, and an axial aberration and an off-axis aberration are corrected favorably in an area of observation same as or wider than an area of observation in a conventional microscope, and for an image pickup apparatus and an image pickup system using the variable magnification optical system.

What is claimed is:

1. A variable magnification optical system in which, a magnification ratio varies from a low magnification end to a high magnification end, comprising:

a first lens unit having a positive refractive power, which is disposed nearest to an object; and a second lens unit having a positive refractive power, which is disposed on an image side of the first lens unit, wherein at a time of varying magnification, a distance between the first lens unit and the second lens unit changes, and a stop is disposed on the image side of the second lens unit, and a predetermined positive lens unit is disposed on the image side of the stop, and the predetermined positive lens unit has a positive refractive power, and is a lens unit of which, a distance from the stop at the high magnification end is smaller than a distance from the stop at the low magnification end, and the following conditional expression (1) is satisfied:

$$0 < 1/\beta_{HG1} < 1 \qquad (1),$$

where, $\beta_{HG1}$ denotes an imaging magnification of the first lens unit at the high magnification end.

2. The variable magnification optical system according to claim 1, wherein the following conditional expression (2) is satisfied:

$$0 < BF_L/Y \leq 4.3 \qquad (2),$$

where, $BF_L$ denotes a back focus at the low magnification end, and

Y denotes a maximum image height of the overall variable magnification optical system.

3. The variable magnification optical system according to claim 1, wherein the predetermined positive lens unit includes at least two or more than two positive lenses and one or more than one negative lens.

4. The variable magnification optical system according to claim 1, wherein a plurality of predetermined positive lens units is disposed on the image side of the stop, and a first predetermined positive lens unit from among the plurality of predetermined positive lens units, is disposed nearest to an object, and the following conditional expression (3) is satisfied:

$$0 < \Delta_{Gpmax}/\Delta_{Gpobj} \leq 0.6 \qquad (3),$$

where, $\Delta_{Gpmax}$ denotes a maximum amount of change from among amounts of change in a distance on an optical axis between any two predetermined positive lens units, and $\Delta_{Gpobj}$ denotes a maximum amount of movement from among amounts of movement on the optical axis of the first predetermined positive lens unit, and here, $\Delta_{Gpmax}$ is the maximum of the amount of change in distance on the optical axis between the positive lens units from among all combinations of two lens units selected from three or more than three lens unit in a case in which, the predetermined positive lens units includes three or more than three lens units.

5. The variable magnification optical system according to claim 1, wherein the following conditional expression (4) is satisfied:

$$0.1 \leq f_{G1}/f_{G2} \leq 5 \qquad (4),$$

where, $f_{G1}$ denotes a focal length of the first lens unit, and $f_{G2}$ denotes a focal length of the second lens unit.

6. The variable magnification optical system according to claim 1, wherein at the time of varying magnification from the low magnification end to the high magnification end, the stop moves from the image side to the object side.

7. The variable magnification optical system according to claim 1, wherein the following conditional expression (5) is satisfied:

$$0.2 \leq f_{G1}/f_{LGp} \leq 10 \qquad (5),$$

where, $f_{G1}$ denotes a focal length of the first lens unit, and $f_{LGp}$ denotes a focal length of the predetermined positive lens unit at the low magnification end.

8. The variable magnification optical system according to claim 1, wherein one or more than one predetermined positive lens is included, and a high-dispersion glass material with Abbe number not more than 30 is used for the predetermined positive lens.

9. The variable magnification optical system according to claim 1, wherein the following conditional expression (6) is satisfied:

$$-1 \leq D_{HGpop}/D_{HGpoi} \leq 0.65 \qquad (6),$$

where, $D_{HGpop}$ denotes a distance on the optical axis from a lens surface nearest to the object up to a principal plane on the object side in the predetermined positive lens unit at the high magnification end, and $D_{HGpoi}$ denotes a distance on the optical axis from a lens surface nearest to the object up to a lens surface nearest to the image in the predetermined positive lens unit at the high magnification end.

10. The variable magnification optical system according to claim 1, wherein the stop and a predetermined negative lens unit are included, and the predetermined negative lens unit has a negative refractive power, and is disposed to be adjacent to the stop, and the following conditional expression (7) is satisfied:

$$|D_{sGno}/\phi_{Hs}| \leq 1 \qquad (7),$$

where, $D_{sGno}$ denotes a distance on the optical axis from the stop up to a lens surface nearest to the stop in the predetermined negative lens unit, and $\phi_{Hs}$ denotes a diameter of the stop at the high magnification end.

11. The variable magnification optical system according to claim 10, wherein the predetermined negative lens unit includes at least one or more than one positive lens and one or more than one negative lens, and a glass material having a dispersion higher than a dispersion of the negative lens is used for the positive lens.

12. The variable magnification optical system according to claim 11, wherein the positive lens and the negative lens are cemented.

13. A variable magnification optical system in which, a magnification ratio varies from a low magnification end to a high magnification end, comprising:

a first lens unit having a positive refractive power, which is disposed nearest to an object; and a second lens unit having a negative refractive power, which is disposed on an image side of the first lens unit; wherein a stop which is disposed on the object side of the second lens unit is included; and at a time of varying magnification, the second lens unit moves, and a distance between the first lens unit and the second lens unit changes, and a third lens unit is disposed on an image side of the second lens unit, and the following conditional expression (8) is satisfied:

$$0.15 \leq \Delta_{G2max}/D_{HIGi} \leq 2 \qquad (8),$$

where, $\Delta_{G2max}$ denotes a maximum amount of movement from among amounts of movement of the second lens unit on the optical axis, and $D_{HIGi}$ denotes a distance on the optical axis from a lens surface nearest to the object in the third lens unit up to an image plane, at the high magnification end.

14. The variable magnification optical system according to claim 13, wherein the following conditional expression (2) is satisfied:

$$0 < BF_L/Y \leq 4.3 \qquad (2),$$

where, $BF_L$ denotes a back focus at the low magnification end, and

Y denotes a maximum image height of the overall variable magnification optical system.

15. The variable magnification optical system according to claim 13, wherein one or more than one predetermined positive lens is included, and a high-dispersion glass material with Abbe number not more than 30 is used for the predetermined positive lens.

16. The variable magnification optical system according to claim 13, wherein the following conditional expression (4-1) is satisfied:

$$-2.5 \leq f_{G1}/f_{G2} \leq -0.2 \qquad (4-1),$$

where, $f_{G1}$ denotes a focal length of the first lens unit, and $f_{G2}$ denotes a focal length of the second lens unit.

17. The variable magnification optical system according to claim 13, wherein the third lens unit has a positive refractive power, and is disposed on the image side of the second lens unit, to be adjacent to the second lens unit, and at the time of varying magnification, a distance between the second lens unit and the third lens unit changes, and the following conditional expression (9) is satisfied:

$$-7.5 \leq f_{G3}/f_{G2} \leq -1 \qquad (9),$$

where, $f_{G2}$ denotes a focal length of the second lens unit, and $f_{G3}$ denotes a focal length of the third lens unit.

18. The variable magnification optical system according to claim 13, wherein a third lens unit having a positive refractive power is disposed on the image side of the second lens unit, and one or more than one lens unit is included on the image side of the third lens unit, and the following conditional expression (10) is satisfied:

$$0.07 \leq f_{HG1G3}/f_{HGI} \leq 1 \qquad (10),$$

where, $f_{HG1G3}$ denotes a combined focal length of the first lens unit, the second lens unit, and the third lens unit at the high magnification end, and $f_{HGI}$ denotes a combined focal length of a lens unit which is positioned on the image side of the third lens unit at the high magnification end.

19. The variable magnification optical system according to claim 13, wherein the second lens unit includes at least one or more than one positive lens and one or more than one negative lens, and a glass material having a dispersion higher than a dispersion of the negative lens is used for the positive lens.

20. The variable magnification optical system according to claim 13, wherein the second lens unit includes two or more than two negative lenses.

21. The variable magnification optical system according to claim 13, wherein the first lens unit includes two or more than two sets of cemented lenses.

22. The variable magnification optical system according to claim 17, wherein one or more than one positive lens and one or more than one negative lens are included on the image side of the third lens unit, and out of the positive lens and the negative lens, an object-side positive lens which is disposed nearest to the object and an image-side negative lens which is disposed nearest to the image satisfy the following conditional expression (11):

$$0.5 \leq D_{Hpn}/D_{Hpi} \leq 0.99 \qquad (11),$$

where, $D_{Hpn}$ denotes a distance on the optical axis from an object-side surface of the object-side positive lens up to an image-side surface of the image-side negative lens, at the high magnification end, and $D_{Hpi}$ denotes a distance on the optical axis from the object-side surface up to an image-side surface of the object-side positive lens, at the high magnification end.

23. A variable magnification optical system in which, a magnification ratio varies from a low magnification end to a high magnification end, comprising:
   a first lens unit having a positive refractive power, which is disposed nearest to an object; and
   a second lens unit which is disposed on an image side of the first lens unit, wherein
   a conjugate length of the variable magnification optical system changes at the time of varying magnification, and
   a lens unit which moves at the time of varying magnification is included, and
   the following conditional expression (12) is satisfied:

$$0.01 \leq |\Delta_{iomax}/\Delta_{max}| \leq 5 \tag{12}$$

where, $\Delta_{iomax}$ denotes a maximum amount of change from among amounts of change in the conjugate length, and $\Delta_{max}$ denotes a maximum amount of movement from among amounts of movement of the lens unit which moves.

24. The variable magnification optical system according to claim 23, wherein
   the first lens unit includes a first object-side lens which is disposed nearest to the object, and
   the following conditional expression (13) is satisfied:

$$|\Delta_{wd}/D_{wdmax}| \leq 0.5 \tag{13}$$

where, $\Delta_{wd}$ denotes a maximum amount of change from among amounts of change in a distance from the object up to an object-side surface of the first object-side lens, and $D_{wdmax}$ denotes a maximum distance from among distances from the object up to the object-side surface of the first object-side lens.

25. The variable magnification optical system according to claim 23, wherein the first lens unit moves such that a distance from the first lens unit up to the object is constant.

26. An image pickup apparatus comprising:
   an image pickup element; and
   a variable magnification optical system, wherein
   an optical image is formed on the image pickup element by the variable magnification optical system, and
   the variable magnification optical system is an optical system in which, a magnification ratio varies from a low magnification end to a high magnification end, and includes
   at least a first lens unit having a positive refractive power, which is disposed nearest to an object, and
   a second lens unit which is disposed on an image side of the first lens unit, and
   at the time of varying magnification, a distance between the first lens unit and the second lens unit is variable, and
   the following conditional expressions (14) and (15) are satisfied:

$$3000 \leq 2 \times Y/p \tag{14}$$

and $$0.08 \leq NA_H \tag{15}$$

where,

Y denotes a maximum image height in the overall variable magnification optical system, p denotes a pixel pitch of the image pickup element, and $NA_H$ denotes a numerical aperture on the object side of the variable magnification optical system at the high magnification end.

27. The variable magnification optical system according to claim 26, wherein the following conditional expression (16) is satisfied:

$$1.0 < \varepsilon_{H90}/p < 10 \tag{16}$$

where, $\varepsilon_{H90}$ denotes a diameter of a 90% encircled energy of a point spread function on a best image plane when a point image for wavelength e-line was formed near a substantial center of the image pickup element, at the high magnification end of the variable magnification optical system, and p denotes the pixel pitch of the image pickup element.

28. The image pickup apparatus according to claim 26, wherein the following conditional expression (17) is satisfied:

$$0.06 < NA'_H \tag{17}$$

where, $NA'_H$ denotes a numerical aperture on the image side of the variable magnification optical system at the high magnification end.

29. The image pickup apparatus according to claim 26, wherein the following conditional expression (18) is satisfied:

$$-7 < LT_L/p < 7 \tag{18}$$

where, $LT_L$ denotes a distance between centers of gravity at the low magnification end of the variable magnification optical system, and the distance between the centers of gravity is a distance between a center of gravity of the point spread function about a C-line and a center of gravity of the point spread function about a d-line, at a position which is 70% of the maximum image height, and p denotes the pixel pitch of the image pickup element.

30. The image pickup apparatus according to claim 26, wherein the following conditional expression (19) is satisfied:

$$-50 < AT_H/p < 50 \tag{19}$$

where, $AT_H$ denotes a difference between the best focus position about a C-line and the best focus position about a d-line, near a substantial center of the image pickup element, and p denotes the pixel pitch of the image pickup element.

31. The image pickup apparatus according to claim 26, wherein the following conditional expressions (20) and (21) are satisfied:

$$-7° < CRA_{Lobj} < 7° \tag{20}$$

and $$-7° < CRA_{Hobj} < 7° \tag{21}$$

where, $CRA_{Lobj}$ denotes an angle made by an object-side principal light ray with an optical axis, at the low magnification end, and $CRA_{Hobj}$ denotes an angle made by the object-side principal light ray with the optical axis, at the high magnification end, and here, the object-side principal light ray is a principal light ray that reaches a position at 90% of the maximum image height, from among principal light rays that are incident on the first lens unit, and regarding the sign of the angle, the angle is let to be negative when measured in a clockwise direction from the optical axis and the angle is let to be positive when measured in a counterclockwise direction from the optical axis.

32. The image pickup apparatus according to claim 26, wherein focusing is carried out automatically while detecting an image contrast of an optical image.

33. The image pickup apparatus according to claim 26, wherein the focusing is carried out by moving the image pickup element in an optical axial direction.

34. The image pickup apparatus according to claim 26, comprising:
  a variable magnification optical system according to claim 1; and
  an image pickup element.

35. An image pickup system comprising:
  an image pickup apparatus according to claim 26;
  a stage which holds an object to be observed; and
  a light source which illuminates the object.

36. The image pickup system according to claim 35, wherein focusing is carried out by moving the stage in an optical axial direction.

\* \* \* \* \*